United States Patent
Irani et al.

(10) Patent No.: US 10,504,518 B1
(45) Date of Patent: Dec. 10, 2019

(54) ACCELERATED TASK PERFORMANCE

(71) Applicant: Apple Inc., Cupertino, CA (US)

(72) Inventors: Cyrus D. Irani, Los Altos, CA (US); Oluwatomiwa Alabi, San Francisco, CA (US); Kellie Albert, San Jose, CA (US); Ieyuki Kawashima, San Jose, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/146,978

(22) Filed: Sep. 28, 2018

Related U.S. Application Data

(60) Provisional application No. 62/679,972, filed on Jun. 3, 2018, provisional application No. 62/729,967, filed on Sep. 11, 2018.

(51) Int. Cl.
| | |
|---|---|
| *G10L 15/22* | (2006.01) |
| *G10L 21/10* | (2013.01) |
| *G10L 15/18* | (2013.01) |
| *G06F 3/0488* | (2013.01) |
| *G10L 15/26* | (2006.01) |

(52) U.S. Cl.
CPC ............ *G10L 15/22* (2013.01); *G06F 3/0488* (2013.01); *G10L 15/18* (2013.01); *G10L 15/26* (2013.01); *G10L 21/10* (2013.01); *G10L 2015/223* (2013.01); *G10L 2015/225* (2013.01)

(58) Field of Classification Search
CPC ........ G10L 15/22; G10L 15/26; G10L 15/265
See application file for complete search history.

(56) References Cited

U.S. PATENT DOCUMENTS 7,292,978 B2 * 11/2007 Endo ................. G01C 21/3608
701/427
7,315,809 B2  1/2008 Xun
(Continued)

FOREIGN PATENT DOCUMENTS

AU  2015203483 A1  7/2015
CA  2694314 A1  8/2010
(Continued)

OTHER PUBLICATIONS

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.
(Continued)

*Primary Examiner* — Brian L Albertalli
(74) *Attorney, Agent, or Firm* — Dentons US LLP

(57) ABSTRACT

Systems and processes for accelerating task performance are provided. An example method includes, at an electronic device including a display and one or more input devices, displaying, on the display, a user interface including a suggestion affordance associated with a task, detecting, via the one or more input devices, a first user input corresponding to a selection of the suggestion affordance, in response to detecting the first user input: in accordance with a determination that the task is a task of a first type, performing the task, and in accordance with a determination that the task is a task of a second type different than the first type, displaying a confirmation interface including a confirmation affordance.

48 Claims, 147 Drawing Sheets

(56) References Cited

U.S. PATENT DOCUMENTS

| | | |
|---|---|---|
| 7,315,818 B2 | 1/2008 | Stevens et al. |
| 7,318,020 B1 | 1/2008 | Kim |
| 7,319,957 B2 | 1/2008 | Robinson et al. |
| 7,321,783 B2 | 1/2008 | Kim, II |
| 7,322,023 B2 | 1/2008 | Shulman et al. |
| 7,324,833 B2 | 1/2008 | White et al. |
| 7,324,947 B2 | 1/2008 | Jordan et al. |
| 7,328,155 B2 | 2/2008 | Endo et al. |
| 7,328,250 B2 | 2/2008 | Wang et al. |
| 7,333,998 B2 | 2/2008 | Heckerman et al. |
| 7,337,108 B2 | 2/2008 | Florencio et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,356,748 B2 | 4/2008 | Taleb |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,363,586 B1 | 4/2008 | Briggs et al. |
| 7,365,260 B2 | 4/2008 | Kawashima |
| 7,366,461 B1 | 4/2008 | Brown |
| 7,369,984 B2 | 5/2008 | Fairweather |
| 7,369,993 B1 | 5/2008 | Atal |
| 7,373,291 B2 | 5/2008 | Garst |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,110 B2 | 6/2008 | Petrunka et al. |
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,415,469 B2 | 8/2008 | Singh et al. |
| 7,418,382 B1 | 8/2008 | Maes |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,430,508 B2 | 9/2008 | Williamson et al. |
| 7,433,869 B2 | 10/2008 | Gollapudi |
| 7,433,921 B2 | 10/2008 | Ludwig et al. |
| 7,436,947 B2 | 10/2008 | Wadler et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,624 B2 | 11/2008 | Fuhrmann et al. |
| 7,447,635 B1 | 11/2008 | Konopka et al. |
| 7,447,637 B1 | 11/2008 | Grant et al. |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,251 B2 | 2/2009 | Gao et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,568,151 B2 | 7/2009 | Bargeron et al. |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,092 B2 | 9/2009 | Brockett et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |

(56) References Cited

U.S. PATENT DOCUMENTS

| | | |
|---|---|---|
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,607,083 B2 | 10/2009 | Gong et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,900 B1 | 12/2009 | Strom |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,828 B2 | 2/2010 | Lucas et al. |
| 7,657,844 B2 | 2/2010 | Gibson et al. |
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 | 3/2010 | Wibisono |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,202 B2 | 8/2010 | Spengler et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |

(56) References Cited

U.S. PATENT DOCUMENTS

| | | | |
|---|---|---|---|
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 | 11/2010 | Smith et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansai et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,231 B2 * | 10/2011 | Hirota .............. G06F 3/167 704/231 |
| 8,046,363 B2 | 10/2011 | Cha et al. |
| 8,046,374 B1 | 10/2011 | Bromwich et al. |
| 8,050,500 B1 | 11/2011 | Batty et al. |
| 8,054,180 B1 | 11/2011 | Scofield et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |

(56) References Cited

U.S. PATENT DOCUMENTS

| | | |
|---|---|---|
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,195,467 B2 | 6/2012 | Mozer et al. |
| 8,195,468 B2 | 6/2012 | Kennewick et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,401,163 B1 | 3/2013 | Kirchhoff et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,457,959 B2 | 6/2013 | Kaiser |
| 8,458,115 B2 | 6/2013 | Cai et al. |
| 8,458,278 B2 | 6/2013 | Christie et al. |
| 8,464,150 B2 | 6/2013 | Davidson et al. |
| 8,473,289 B2 | 6/2013 | Jitkoff et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,750 B1 | 8/2013 | Lei et al. |
| 8,521,513 B2 | 8/2013 | Millett et al. |
| 8,521,531 B1 | 8/2013 | Kim |
| 8,527,276 B1 | 9/2013 | Senior et al. |
| 8,537,033 B2 | 9/2013 | Gueziec |
| 8,543,398 B1 | 9/2013 | Strope et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,583,511 B2 | 11/2013 | Hendrickson |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,577 B1 * | 12/2013 | Stewart .......... G06F 3/167 704/231 |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,638,363 B2 | 1/2014 | King et al. |
| 8,639,516 B2 | 1/2014 | Lindahl et al. |

(56) References Cited

U.S. PATENT DOCUMENTS

| | | |
|---|---|---|
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,931 B2 | 7/2014 | Fux et al. |
| 8,781,456 B2 | 7/2014 | Prociw |
| 8,781,841 B1 | 7/2014 | Wang |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,302 B2 | 8/2014 | Xiao et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,009,046 B1 | 4/2015 | Stewart |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,037,967 B1 | 5/2015 | Al-Jefri et al. |
| 9,043,208 B2 | 5/2015 | Koch et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,063,979 B2 | 6/2015 | Chiu et al. |
| 9,070,366 B1 | 6/2015 | Mathias et al. |
| 9,071,701 B2 | 6/2015 | Donaldson et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,171,541 B2 | 10/2015 | Kennewick et al. |
| 9,171,546 B1 | 10/2015 | Pike |
| 9,190,062 B2 | 11/2015 | Haughay |
| 9,208,153 B1 | 12/2015 | Zaveri et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,286,910 B1 | 3/2016 | Li et al. |
| 9,292,487 B1 | 3/2016 | Weber |
| 9,292,489 B1 | 3/2016 | Sak et al. |
| 9,299,344 B2 | 3/2016 | Braho et al. |
| 9,300,718 B2 | 3/2016 | Khanna |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,330,659 B2 | 5/2016 | Ju et al. |
| 9,330,720 B2 | 5/2016 | Lee |
| 9,338,493 B2 | 5/2016 | Van Os et al. |
| 9,349,368 B1 | 5/2016 | LeBeau et al. |
| 9,361,084 B1 | 6/2016 | Costa |
| 9,367,541 B1 | 6/2016 | Servan et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,412,392 B2 | 8/2016 | Lindahl |
| 9,423,266 B2 | 8/2016 | Clark et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,454,957 B1 | 9/2016 | Mathias et al. |
| 9,471,566 B1 | 10/2016 | Zhang et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |

(56) References Cited

U.S. PATENT DOCUMENTS

| | | |
|---|---|---|
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,720,907 B2 | 8/2017 | Bangalore et al. |
| 9,721,566 B2 | 8/2017 | Newendorp et al. |
| 9,734,839 B1 | 8/2017 | Adams |
| 9,741,343 B1 | 8/2017 | Miles et al. |
| 9,747,083 B1 | 8/2017 | Roman et al. |
| 9,934,785 B1 | 4/2018 | Hulaud |
| 9,948,728 B2 | 4/2018 | Linn et al. |
| 9,967,381 B1 | 5/2018 | Kashimba et al. |
| 9,990,176 B1 | 6/2018 | Gray |
| 10,037,758 B2 | 7/2018 | Jing et al. |
| 10,191,718 B2 | 1/2019 | Rhee et al. |
| 10,200,824 B2 | 2/2019 | Gross et al. |
| 2003/0191629 A1* | 10/2003 | Yoshizawa .............. G10L 15/22 704/10 |
| 2005/0125234 A1* | 6/2005 | Endo ................ G01C 21/3608 704/275 |
| 2005/0266884 A1 | 12/2005 | Marriott et al. |
| 2007/0124149 A1* | 5/2007 | Shen ........................ G10L 15/26 704/275 |
| 2008/0000103 A1 | 1/2008 | Rastegar et al. |
| 2008/0001785 A1 | 1/2008 | Elizarov et al. |
| 2008/0010050 A1 | 1/2008 | Fux et al. |
| 2008/0010355 A1 | 1/2008 | Vieri et al. |
| 2008/0010605 A1 | 1/2008 | Frank et al. |
| 2008/0012950 A1 | 1/2008 | Lee et al. |
| 2008/0013751 A1 | 1/2008 | Hiselius |
| 2008/0015863 A1 | 1/2008 | Agapi et al. |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0021886 A1 | 1/2008 | Wang-Aryattanwanich et al. |
| 2008/0022208 A1 | 1/2008 | Morse |
| 2008/0027711 A1 | 1/2008 | Rajendran et al. |
| 2008/0027726 A1 | 1/2008 | Hansen et al. |
| 2008/0031475 A1 | 2/2008 | Goldstein |
| 2008/0033719 A1 | 2/2008 | Hall et al. |
| 2008/0033723 A1 | 2/2008 | Jang et al. |
| 2008/0034032 A1 | 2/2008 | Healey et al. |
| 2008/0034044 A1 | 2/2008 | Bhakta et al. |
| 2008/0034081 A1 | 2/2008 | Marshall et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046250 A1 | 2/2008 | Agapi et al. |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0050027 A1 | 2/2008 | Bashyam et al. |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0052080 A1 | 2/2008 | Narayanan et al. |
| 2008/0052262 A1 | 2/2008 | Kosinov et al. |
| 2008/0055194 A1 | 3/2008 | Baudino et al. |
| 2008/0056459 A1 | 3/2008 | Vallier et al. |
| 2008/0056579 A1 | 3/2008 | Guha |
| 2008/0057922 A1 | 3/2008 | Kokes et al. |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0062141 A1 | 3/2008 | Chaudhri |
| 2008/0065382 A1 | 3/2008 | Gerl et al. |
| 2008/0065387 A1 | 3/2008 | Cross et al. |
| 2008/0071529 A1 | 3/2008 | Silverman et al. |
| 2008/0071544 A1 | 3/2008 | Beaufays et al. |
| 2008/0071742 A1 | 3/2008 | Yang et al. |
| 2008/0072143 A1 | 3/2008 | Assadollahi |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0080411 A1 | 4/2008 | Cole |
| 2008/0082332 A1 | 4/2008 | Mallett et al. |
| 2008/0082338 A1 | 4/2008 | O"Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0085689 A1 | 4/2008 | Zellner |
| 2008/0086306 A1 | 4/2008 | Hirota et al. |
| 2008/0091406 A1 | 4/2008 | Baldwin et al. |
| 2008/0091426 A1 | 4/2008 | Rempel et al. |
| 2008/0091428 A1 | 4/2008 | Bellegarda |
| 2008/0091443 A1 | 4/2008 | Strope et al. |
| 2008/0096531 A1 | 4/2008 | Mcquaide et al. |
| 2008/0096533 A1 | 4/2008 | Manfredi et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0100579 A1 | 5/2008 | Robinson et al. |
| 2008/0101584 A1 | 5/2008 | Gray et al. |
| 2008/0103774 A1 | 5/2008 | White |
| 2008/0109222 A1 | 5/2008 | Liu |
| 2008/0109402 A1 | 5/2008 | Wang et al. |
| 2008/0114480 A1 | 5/2008 | Harb |
| 2008/0114598 A1 | 5/2008 | Prieto et al. |
| 2008/0114604 A1 | 5/2008 | Wei et al. |
| 2008/0114841 A1 | 5/2008 | Lambert |
| 2008/0115084 A1 | 5/2008 | Scott et al. |
| 2008/0118143 A1 | 5/2008 | Gordon et al. |
| 2008/0119953 A1 | 5/2008 | Reed |
| 2008/0120102 A1 | 5/2008 | Rao |
| 2008/0120112 A1 | 5/2008 | Jordan et al. |
| 2008/0120196 A1 | 5/2008 | Reed et al. |
| 2008/0120311 A1 | 5/2008 | Reed |
| 2008/0120312 A1 | 5/2008 | Reed |
| 2008/0120330 A1 | 5/2008 | Reed |
| 2008/0120342 A1 | 5/2008 | Reed et al. |
| 2008/0122796 A1 | 5/2008 | Jobs et al. |
| 2008/0124695 A1 | 5/2008 | Myers et al. |
| 2008/0126075 A1 | 5/2008 | Thorn et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0126491 A1 | 5/2008 | Portele et al. |
| 2008/0129520 A1 | 6/2008 | Lee |
| 2008/0130867 A1 | 6/2008 | Bowen |
| 2008/0131006 A1 | 6/2008 | Oliver |
| 2008/0132221 A1 | 6/2008 | Willey et al. |
| 2008/0132295 A1 | 6/2008 | Horowitz |
| 2008/0133215 A1 | 6/2008 | Sarukkai |
| 2008/0133228 A1 | 6/2008 | Rao |
| 2008/0133230 A1 | 6/2008 | Herforth et al. |
| 2008/0133241 A1 | 6/2008 | Baker et al. |
| 2008/0133244 A1 | 6/2008 | Bodin et al. |
| 2008/0133245 A1 | 6/2008 | Proulx et al. |
| 2008/0133479 A1 | 6/2008 | Zelevinsky et al. |

(56) References Cited

U.S. PATENT DOCUMENTS

| | | |
|---|---|---|
| 2008/0133956 A1 | 6/2008 | Fadell |
| 2008/0140413 A1 | 6/2008 | Millman et al. |
| 2008/0140415 A1 | 6/2008 | Shostak |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1 | 6/2008 | Reed et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154599 A1 | 6/2008 | Muschett et al. |
| 2008/0154600 A1 | 6/2008 | Tian et al. |
| 2008/0154603 A1 | 6/2008 | Oddo |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 | 7/2008 | Mactavish et al. |
| 2008/0162137 A1 | 7/2008 | Saitoh et al. |
| 2008/0162471 A1 | 7/2008 | Bernard |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0167876 A1 | 7/2008 | Bakis et al. |
| 2008/0168052 A1 | 7/2008 | Ott et al. |
| 2008/0168144 A1 | 7/2008 | Lee |
| 2008/0168366 A1 | 7/2008 | Kocienda et al. |
| 2008/0172698 A1 | 7/2008 | Berger et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189360 A1 | 8/2008 | Kiley et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201000 A1 | 8/2008 | Heikkila et al. |
| 2008/0201306 A1 | 8/2008 | Cooper et al. |
| 2008/0201375 A1 | 8/2008 | Khedouri et al. |
| 2008/0201434 A1 | 8/2008 | Holmes et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0215678 A1 | 9/2008 | Coletrane et al. |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansai et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura et al. |
| 2008/0235023 A1 | 9/2008 | Kennewick et al. |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0242322 A1 | 10/2008 | Scott et al. |
| 2008/0242363 A1 | 10/2008 | Onda et al. |
| 2008/0243501 A1 | 10/2008 | Hafsteinsson et al. |
| 2008/0243834 A1 | 10/2008 | Rieman et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254419 A1 | 10/2008 | Cohen |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0261572 A1 | 10/2008 | Tsui et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0267416 A1 | 10/2008 | Goldstein et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0270344 A1 | 10/2008 | Yurick et al. |
| 2008/0273672 A1 | 11/2008 | Didcock et al. |
| 2008/0277473 A1 | 11/2008 | Kotlarsky et al. |
| 2008/0281510 A1 | 11/2008 | Shahine |
| 2008/0281582 A1 | 11/2008 | Hsu et al. |
| 2008/0288259 A1 | 11/2008 | Chambers et al. |
| 2008/0288460 A1 | 11/2008 | Poniatowski et al. |
| 2008/0292112 A1 | 11/2008 | Valenzuela et al. |
| 2008/0294418 A1 | 11/2008 | Cleary et al. |
| 2008/0294517 A1 | 11/2008 | Hill |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300857 A1 | 12/2008 | Barbaiani et al. |
| 2008/0300871 A1 | 12/2008 | Gilbert |
| 2008/0300877 A1 | 12/2008 | Gilbert et al. |
| 2008/0300878 A1 | 12/2008 | Bennett |
| 2008/0300886 A1 | 12/2008 | Patch |
| 2008/0301567 A1 | 12/2008 | Martin et al. |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |
| 2008/0319735 A1 | 12/2008 | Kambhatla et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006096 A1 | 1/2009 | Li et al. |

(56) References Cited

U.S. PATENT DOCUMENTS

| | | |
|---|---|---|
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0027334 A1 | 1/2009 | Foulk et al. |
| 2009/0028435 A1 | 1/2009 | Wu et al. |
| 2009/0030685 A1 | 1/2009 | Cerra et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048841 A1 | 2/2009 | Pollet et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055380 A1 | 2/2009 | Peng et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076798 A1 | 3/2009 | Oh et al. |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077047 A1 | 3/2009 | Cooper et al. |
| 2009/0077165 A1 | 3/2009 | Rhodes et al. |
| 2009/0077464 A1 | 3/2009 | Goldsmith et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0091537 A1 | 4/2009 | Huang et al. |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125299 A1* | 5/2009 | Wang .................. G10L 15/22 704/201 |
| 2009/0125477 A1 | 5/2009 | Lu et al. |
| 2009/0125602 A1 | 5/2009 | Bhatia et al. |
| 2009/0125947 A1 | 5/2009 | Ibaraki |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138430 A1 | 5/2009 | Nambiar et al. |
| 2009/0138736 A1 | 5/2009 | Chin |
| 2009/0138828 A1 | 5/2009 | Schultz et al. |
| 2009/0144036 A1 | 6/2009 | Jorgensen et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1 | 8/2009 | Mozer et al. |
| 2009/0204478 A1 | 8/2009 | Kaib et al. |
| 2009/0204596 A1 | 8/2009 | Brun et al. |

(56) References Cited

U.S. PATENT DOCUMENTS

| | | |
|---|---|---|
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0278804 A1 | 11/2009 | Rubanovich et al. |
| 2009/0281789 A1 | 11/2009 | Weibel et al. |
| 2009/0284471 A1 | 11/2009 | Longe et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299751 A1 | 12/2009 | Jung |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036928 A1 | 2/2010 | Granito et al. |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |

(56) References Cited

U.S. PATENT DOCUMENTS

| | | |
|---|---|---|
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100385 A1 | 4/2010 | Davis et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0128701 A1 | 5/2010 | Nagaraja |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0268537 A1 | 10/2010 | Al-Telmissani |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318366 A1 | 12/2010 | Sullivan et al. |
| 2010/0318576 A1 | 12/2010 | Kim |
| 2010/0322438 A1 | 12/2010 | Siotis |
| 2010/0324709 A1 | 12/2010 | Starmen |

(56) References Cited

U.S. PATENT DOCUMENTS

| | | |
|---|---|---|
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066468 A1 | 3/2011 | Huang et al. |
| 2011/0066634 A1 | 3/2011 | Phillips et al. |
| 2011/0072033 A1 | 3/2011 | White et al. |
| 2011/0072492 A1 | 3/2011 | Mohler et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0103682 A1 | 5/2011 | Chidlovskii et al. |
| 2011/0105097 A1 | 5/2011 | Tadayon et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0141141 A1 | 6/2011 | Kankainen |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Deng et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Peek et al. |
| 2011/0202526 A1 | 8/2011 | Lee et al. |
| 2011/0202874 A1 | 8/2011 | Ramer et al. |
| 2011/0205149 A1 | 8/2011 | Tom et al. |
| 2011/0208511 A1 | 8/2011 | Sikstrom et al. |

(56) References Cited

U.S. PATENT DOCUMENTS

| | | |
|---|---|---|
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sate et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282663 A1 | 11/2011 | Talwar et al. |
| 2011/0282888 A1 | 11/2011 | Koperski et al. |
| 2011/0282906 A1 | 11/2011 | Wong |
| 2011/0283189 A1 | 11/2011 | McCarty |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0306426 A1 | 12/2011 | Novak et al. |
| 2011/0307241 A1 | 12/2011 | Weibel et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0101823 A1 | 4/2012 | Weng et al. |
| 2012/0108166 A1 | 5/2012 | Hymel |
| 2012/0108221 A1 | 5/2012 | Thomas et al. |
| 2012/0110456 A1 | 5/2012 | Larco et al. |
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0128322 A1 | 5/2012 | Shaffer et al. |
| 2012/0130709 A1 | 5/2012 | Bocchieri et al. |
| 2012/0136572 A1 | 5/2012 | Norton |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0179467 A1 | 7/2012 | Williams |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |

(56) References Cited

U.S. PATENT DOCUMENTS

| | | |
|---|---|---|
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233266 A1 | 9/2012 | Hassan et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0018659 A1 | 1/2013 | Chi |
| 2013/0024576 A1 | 1/2013 | Dishneau et al. |
| 2013/0027875 A1 | 1/2013 | Zhu et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0073286 A1 | 3/2013 | Bastea-Forte et al. |
| 2013/0073346 A1 | 3/2013 | Chun et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |

(56) References Cited

U.S. PATENT DOCUMENTS

| | | |
|---|---|---|
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0165232 A1 | 6/2013 | Nelson et al. |
| 2013/0166303 A1 | 6/2013 | Chang et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0176244 A1 | 7/2013 | Yamamoto et al. |
| 2013/0176592 A1 | 7/2013 | Sasaki |
| 2013/0179172 A1 | 7/2013 | Nakamura et al. |
| 2013/0179440 A1 | 7/2013 | Gordon |
| 2013/0183944 A1 | 7/2013 | Mozer et al. |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0191117 A1 | 7/2013 | Atti et al. |
| 2013/0197911 A1 | 8/2013 | Wei et al. |
| 2013/0204813 A1 | 8/2013 | Master et al. |
| 2013/0204897 A1 | 8/2013 | McDougall |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0282709 A1 | 10/2013 | Zhu et al. |
| 2013/0283168 A1 | 10/2013 | Brown et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311184 A1 | 11/2013 | Badavne et al. |
| 2013/0311997 A1 | 11/2013 | Gruber et al. |
| 2013/0316746 A1 | 11/2013 | Miller et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0339256 A1 | 12/2013 | Shroff |
| 2013/0346068 A1 | 12/2013 | Solem et al. |
| 2013/0346347 A1 | 12/2013 | Patterson et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0012574 A1 | 1/2014 | Pasupalak et al. |
| 2014/0012580 A1 | 1/2014 | Ganong et al. |
| 2014/0012586 A1 | 1/2014 | Rubin et al. |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0046934 A1 | 2/2014 | Zhou et al. |
| 2014/0047001 A1 | 2/2014 | Phillips et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0068751 A1 | 3/2014 | Last et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074815 A1 | 3/2014 | Plimton |
| 2014/0078065 A1 | 3/2014 | Akkok et al. |
| 2014/0079195 A1 | 3/2014 | Srivastava et al. |
| 2014/0080428 A1 | 3/2014 | Rhoads et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0096209 A1 | 4/2014 | Saraf et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |

(56) References Cited

U.S. PATENT DOCUMENTS

| | | |
|---|---|---|
| 2014/0122059 A1 | 5/2014 | Patel et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0134983 A1 | 5/2014 | Jung et al. |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163976 A1 | 6/2014 | Park et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164476 A1 | 6/2014 | Thomson |
| 2014/0164532 A1 | 6/2014 | Lynch et al. |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0173460 A1 | 6/2014 | Kim |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188477 A1 | 7/2014 | Zhang |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0214429 A1 | 7/2014 | Pantel |
| 2014/0214537 A1 | 7/2014 | Yoo et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0230055 A1 | 8/2014 | Boehl |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244268 A1 | 8/2014 | Abdelsamie et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0272821 A1 | 9/2014 | Pitschel et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278429 A1 | 9/2014 | Ganong, III |
| 2014/0278435 A1 | 9/2014 | Ganong et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281983 A1 | 9/2014 | Xian et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324884 A1 | 10/2014 | Lindahl et al. |
| 2014/0337048 A1 | 11/2014 | Brown et al. |
| 2014/0337266 A1 | 11/2014 | Wolverton et al. |
| 2014/0337371 A1 | 11/2014 | Li |
| 2014/0337438 A1 | 11/2014 | Govande et al. |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0344627 A1 | 11/2014 | Schaub et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0361973 A1 | 12/2014 | Raux et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0370817 A1 | 12/2014 | Luna |
| 2014/0370841 A1 | 12/2014 | Roberts et al. |

(56) References Cited

U.S. PATENT DOCUMENTS

| | | |
|---|---|---|
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2015/0003797 A1 | 1/2015 | Schmidt |
| 2015/0006148 A1 | 1/2015 | Goldszmit et al. |
| 2015/0006157 A1 | 1/2015 | Andrade Silva et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0031416 A1 | 1/2015 | Wells et al. |
| 2015/0033219 A1 | 1/2015 | Breiner et al. |
| 2015/0033275 A1 | 1/2015 | Natani et al. |
| 2015/0039292 A1 | 2/2015 | Suleman et al. |
| 2015/0039299 A1 | 2/2015 | Weinstein et al. |
| 2015/0039305 A1 | 2/2015 | Huang |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0053779 A1 | 2/2015 | Adamek et al. |
| 2015/0053781 A1 | 2/2015 | Nelson et al. |
| 2015/0058013 A1 | 2/2015 | Pakhomov et al. |
| 2015/0058018 A1 | 2/2015 | Georges et al. |
| 2015/0058785 A1 | 2/2015 | Ookawara |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0067822 A1 | 3/2015 | Randall |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0082229 A1 | 3/2015 | Ouyang et al. |
| 2015/0088511 A1 | 3/2015 | Bharadwaj et al. |
| 2015/0088514 A1 | 3/2015 | Typrin |
| 2015/0088522 A1 | 3/2015 | Hendrickson et al. |
| 2015/0088523 A1 | 3/2015 | Schuster |
| 2015/0095031 A1 | 4/2015 | Conkie et al. |
| 2015/0095278 A1 | 4/2015 | Flinn et al. |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120723 A1 | 4/2015 | Deshmukh et al. |
| 2015/0121216 A1 | 4/2015 | Brown et al. |
| 2015/0127350 A1 | 5/2015 | Agiomyrgiannakis |
| 2015/0133109 A1 | 5/2015 | Freeman et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0154185 A1 | 6/2015 | Waibel |
| 2015/0154976 A1 | 6/2015 | Mutagi |
| 2015/0161370 A1 | 6/2015 | North et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quast et al. |
| 2015/0169336 A1 | 6/2015 | Harper et al. |
| 2015/0170664 A1 | 6/2015 | Doherty et al. |
| 2015/0172463 A1 | 6/2015 | Quast et al. |
| 2015/0178388 A1 | 6/2015 | Winnemoeller et al. |
| 2015/0179176 A1 | 6/2015 | Ryu et al. |
| 2015/0185964 A1 | 7/2015 | Stout |
| 2015/0186012 A1 | 7/2015 | Coleman et al. |
| 2015/0186110 A1 | 7/2015 | Kannan |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0205858 A1 | 7/2015 | Xie et al. |
| 2015/0208226 A1 | 7/2015 | Kuusilinna et al. |
| 2015/0212791 A1 | 7/2015 | Kumar et al. |
| 2015/0213796 A1 | 7/2015 | Waltermann et al. |
| 2015/0220507 A1 | 8/2015 | Mohajer et al. |
| 2015/0221304 A1 | 8/2015 | Stewart |
| 2015/0221307 A1 | 8/2015 | Shah et al. |
| 2015/0227505 A1 | 8/2015 | Morimoto |
| 2015/0227633 A1 | 8/2015 | Shapira |
| 2015/0228281 A1 | 8/2015 | Raniere |
| 2015/0234636 A1 | 8/2015 | Barnes, Jr. |
| 2015/0234800 A1 | 8/2015 | Patrick et al. |
| 2015/0242091 A1 | 8/2015 | Lu et al. |
| 2015/0243278 A1 | 8/2015 | Kibre et al. |
| 2015/0243283 A1 | 8/2015 | Halash et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0254057 A1 | 9/2015 | Klein et al. |
| 2015/0254058 A1* | 9/2015 | Klein ............... G06F 3/167 704/275 |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261496 A1 | 9/2015 | Faaborg et al. |
| 2015/0269139 A1 | 9/2015 | McAteer et al. |
| 2015/0277574 A1 | 10/2015 | Jain et al. |
| 2015/0278370 A1 | 10/2015 | Stratvert et al. |
| 2015/0279358 A1 | 10/2015 | Kingsbury et al. |
| 2015/0279360 A1 | 10/2015 | Mengibar et al. |
| 2015/0281380 A1 | 10/2015 | Wang et al. |
| 2015/0286627 A1 | 10/2015 | Chang et al. |
| 2015/0287401 A1 | 10/2015 | Lee et al. |
| 2015/0287409 A1 | 10/2015 | Jang |
| 2015/0288629 A1 | 10/2015 | Choi et al. |
| 2015/0294086 A1 | 10/2015 | Kare et al. |
| 2015/0294516 A1 | 10/2015 | Chiang |
| 2015/0295915 A1 | 10/2015 | Xiu |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0309997 A1 | 10/2015 | Lee et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0312182 A1 | 10/2015 | Langholz |
| 2015/0317069 A1 | 11/2015 | Clements et al. |
| 2015/0317310 A1 | 11/2015 | Eiche et al. |
| 2015/0324041 A1 | 11/2015 | Varley et al. |
| 2015/0324334 A1 | 11/2015 | Lee et al. |
| 2015/0331664 A1 | 11/2015 | Osawa et al. |

(56) References Cited

U.S. PATENT DOCUMENTS

| | | |
|---|---|---|
| 2015/0331711 A1 | 11/2015 | Huang et al. |
| 2015/0332667 A1 | 11/2015 | Mason |
| 2015/0339049 A1 | 11/2015 | Kasemset et al. |
| 2015/0339391 A1 | 11/2015 | Kang et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347385 A1 | 12/2015 | Flor et al. |
| 2015/0347393 A1 | 12/2015 | Futrell et al. |
| 2015/0347733 A1 | 12/2015 | Tsou et al. |
| 2015/0347985 A1 | 12/2015 | Gross et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0350031 A1 | 12/2015 | Burks et al. |
| 2015/0352999 A1 | 12/2015 | Bando et al. |
| 2015/0355879 A1 | 12/2015 | Beckhardt et al. |
| 2015/0364140 A1 | 12/2015 | Thorn |
| 2015/0370531 A1 | 12/2015 | Faaborg |
| 2015/0370780 A1 | 12/2015 | Wang et al. |
| 2015/0371639 A1 | 12/2015 | Foerster et al. |
| 2015/0371665 A1 | 12/2015 | Naik et al. |
| 2015/0373183 A1 | 12/2015 | Woolsey et al. |
| 2015/0379993 A1 | 12/2015 | Subhojit et al. |
| 2015/0382047 A1 | 12/2015 | Napolitano et al. |
| 2015/0382079 A1 | 12/2015 | Lister et al. |
| 2016/0004690 A1 | 1/2016 | Bangalore et al. |
| 2016/0014476 A1 | 1/2016 | Caliendo, Jr. et al. |
| 2016/0018900 A1 | 1/2016 | Tu et al. |
| 2016/0019886 A1 | 1/2016 | Hong |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034811 A1 | 2/2016 | Paulik et al. |
| 2016/0042735 A1 | 2/2016 | Vibbert et al. |
| 2016/0042748 A1 | 2/2016 | Jain et al. |
| 2016/0048666 A1 | 2/2016 | Dey et al. |
| 2016/0055422 A1 | 2/2016 | Li |
| 2016/0062605 A1 | 3/2016 | Agarwal et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071521 A1 | 3/2016 | Haughay |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094979 A1 | 3/2016 | Naik et al. |
| 2016/0098991 A1 | 4/2016 | Luo et al. |
| 2016/0111091 A1 | 4/2016 | Bakish |
| 2016/0117386 A1 | 4/2016 | Ajmera et al. |
| 2016/0118048 A1* | 4/2016 | Heide ............... G10L 15/22 704/275 |
| 2016/0119338 A1 | 4/2016 | Cheyer |
| 2016/0125048 A1 | 5/2016 | Hamada |
| 2016/0125071 A1 | 5/2016 | Gabbai |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0155442 A1 | 6/2016 | Kannan et al. |
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173960 A1 | 6/2016 | Snibbe et al. |
| 2016/0179462 A1 | 6/2016 | Bjorkengren |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1 | 8/2016 | Pender |
| 2016/0225372 A1 | 8/2016 | Cheung et al. |
| 2016/0239645 A1 | 8/2016 | Heo et al. |
| 2016/0240187 A1 | 8/2016 | Fleizach et al. |
| 2016/0240189 A1* | 8/2016 | Lee ..................... G06F 3/167 |
| 2016/0247061 A1 | 8/2016 | Trask et al. |
| 2016/0253312 A1 | 9/2016 | Rhodes |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0275941 A1 | 9/2016 | Bellegarda et al. |
| 2016/0275947 A1 | 9/2016 | Li et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0286045 A1 | 9/2016 | Shaltiel et al. |
| 2016/0293168 A1 | 10/2016 | Chen |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0313906 A1 | 10/2016 | Kilchenko et al. |
| 2016/0314788 A1 | 10/2016 | Jitkoff et al. |
| 2016/0314792 A1 | 10/2016 | Alvarez et al. |
| 2016/0315996 A1 | 10/2016 | Ha et al. |
| 2016/0321261 A1 | 11/2016 | Spasojevic et al. |
| 2016/0322045 A1 | 11/2016 | Hatfeild et al. |
| 2016/0322050 A1 | 11/2016 | Wang et al. |
| 2016/0328205 A1 | 11/2016 | Agrawal et al. |
| 2016/0328893 A1 | 11/2016 | Cordova et al. |
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1 | 11/2016 | Basu et al. |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360382 A1 | 12/2016 | Gross et al. |
| 2016/0364378 A1 | 12/2016 | Futrell et al. |
| 2016/0371250 A1 | 12/2016 | Rhodes |
| 2016/0378747 A1 | 12/2016 | Orr et al. |
| 2016/0379091 A1 | 12/2016 | Lin et al. |
| 2016/0379626 A1 | 12/2016 | Deisher et al. |

(56) References Cited

U.S. PATENT DOCUMENTS

| | | |
|---|---|---|
| 2016/0379633 A1 | 12/2016 | Lehman et al. |
| 2016/0379641 A1 | 12/2016 | Liu et al. |
| 2017/0004824 A1 | 1/2017 | Yoo et al. |
| 2017/0011303 A1 | 1/2017 | Annapureddy et al. |
| 2017/0011742 A1 | 1/2017 | Jing et al. |
| 2017/0018271 A1 | 1/2017 | Khan et al. |
| 2017/0019987 A1 | 1/2017 | Dragone et al. |
| 2017/0031576 A1 | 2/2017 | Saoji et al. |
| 2017/0040002 A1 | 2/2017 | Basson et al. |
| 2017/0055895 A1 | 3/2017 | Des Jardins et al. |
| 2017/0060853 A1 | 3/2017 | Lee et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0076720 A1 | 3/2017 | Gopalan et al. |
| 2017/0083179 A1 | 3/2017 | Gruber et al. |
| 2017/0083285 A1 | 3/2017 | Meyers et al. |
| 2017/0091168 A1 | 3/2017 | Bellegarda et al. |
| 2017/0092270 A1 | 3/2017 | Newendorp et al. |
| 2017/0092278 A1 | 3/2017 | Evermann et al. |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0132199 A1 | 5/2017 | Vescovi et al. |
| 2017/0140644 A1 | 5/2017 | Hwang et al. |
| 2017/0154033 A1 | 6/2017 | Lee |
| 2017/0154055 A1 | 6/2017 | Dimson et al. |
| 2017/0161018 A1 | 6/2017 | Lemay et al. |
| 2017/0169818 A1 | 6/2017 | VanBlon et al. |
| 2017/0169819 A1 | 6/2017 | Mese et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0199874 A1 | 7/2017 | Patel et al. |
| 2017/0200066 A1 | 7/2017 | Wang et al. |
| 2017/0221486 A1 | 8/2017 | Kurata et al. |
| 2017/0227935 A1 | 8/2017 | Su et al. |
| 2017/0228382 A1 | 8/2017 | Haviv et al. |
| 2017/0230709 A1 | 8/2017 | Van Os et al. |
| 2017/0242653 A1 | 8/2017 | Lang et al. |
| 2017/0243468 A1 | 8/2017 | Dotan-Cohen et al. |
| 2017/0256256 A1 | 9/2017 | Wang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0316775 A1 | 11/2017 | Le et al. |
| 2017/0316782 A1 | 11/2017 | Haughey et al. |
| 2017/0323637 A1 | 11/2017 | Naik |
| 2017/0329490 A1 | 11/2017 | Esinovskaya et al. |
| 2017/0345411 A1 | 11/2017 | Raitio et al. |
| 2017/0346949 A1 | 11/2017 | Sanghavi et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2018/0007060 A1 | 1/2018 | Leblang et al. |
| 2018/0007538 A1 | 1/2018 | Naik et al. |
| 2018/0012596 A1 | 1/2018 | Piernot et al. |
| 2018/0033431 A1 | 2/2018 | Newendorp et al. |
| 2018/0054505 A1 | 2/2018 | Hart et al. |
| 2018/0060312 A1 | 3/2018 | Won |
| 2018/0063624 A1 | 3/2018 | Boesen |
| 2018/0067914 A1 | 3/2018 | Chen et al. |
| 2018/0090143 A1 | 3/2018 | Saddler et al. |
| 2018/0107945 A1 | 4/2018 | Gao et al. |
| 2018/0108346 A1 | 4/2018 | Paulik et al. |
| 2018/0137856 A1 | 5/2018 | Gilbert |
| 2018/0137857 A1 | 5/2018 | Zhou et al. |
| 2018/0144748 A1 | 5/2018 | Leong |
| 2018/0157372 A1 | 6/2018 | Kurabayashi |
| 2018/0232203 A1 | 8/2018 | Gelfenbeyn et al. |
| 2018/0253652 A1 | 9/2018 | Palzer et al. |
| 2018/0278740 A1* | 9/2018 | Choi ................. H04M 1/72519 |
| 2018/0336449 A1 | 11/2018 | Adan et al. |

FOREIGN PATENT DOCUMENTS

| | | |
|---|---|---|
| CA | 2792412 A1 | 7/2011 |
| CA | 2666438 C | 6/2013 |
| CN | 101162153 A | 4/2008 |
| CN | 101174366 A | 5/2008 |
| CN | 101179754 A | 5/2008 |
| CN | 101183525 A | 5/2008 |
| CN | 101188644 A | 5/2008 |
| CN | 101228503 A | 7/2008 |
| CN | 101233741 A | 7/2008 |
| CN | 101246020 A | 8/2008 |
| CN | 101271689 A | 9/2008 |
| CN | 101277501 A | 10/2008 |
| CN | 101281745 A | 10/2008 |
| CN | 101292282 A | 10/2008 |
| CN | 101297541 A | 10/2008 |
| CN | 101325756 A | 12/2008 |
| CN | 101416471 A | 4/2009 |
| CN | 101427244 A | 5/2009 |
| CN | 101448340 A | 6/2009 |
| CN | 101453498 A | 6/2009 |
| CN | 101499156 A | 8/2009 |
| CN | 101500041 A | 8/2009 |
| CN | 101535983 A | 9/2009 |
| CN | 101547396 A | 9/2009 |
| CN | 101557432 A | 10/2009 |
| CN | 101604521 A | 12/2009 |
| CN | 101632316 A | 1/2010 |
| CN | 101636736 A | 1/2010 |
| CN | 101673544 A | 3/2010 |
| CN | 101751387 A | 6/2010 |
| CN | 101847405 A | 9/2010 |
| CN | 101894547 A | 11/2010 |
| CN | 101939740 A | 1/2011 |
| CN | 101951553 A | 1/2011 |
| CN | 102137193 A | 7/2011 |
| CN | 102160043 A | 8/2011 |
| CN | 102246136 A | 11/2011 |
| CN | 202035047 U | 11/2011 |
| CN | 102282609 A | 12/2011 |
| CN | 202092650 U | 12/2011 |
| CN | 102368256 A | 3/2012 |
| CN | 102405463 A | 4/2012 |
| CN | 102498457 A | 6/2012 |
| CN | 102629246 A | 8/2012 |
| CN | 102682771 A | 9/2012 |
| CN | 102685295 A | 9/2012 |
| CN | 102693725 A | 9/2012 |
| CN | 102792320 A | 11/2012 |
| CN | 102801853 A | 11/2012 |
| CN | 102870065 A | 1/2013 |
| CN | 102917004 A | 2/2013 |
| CN | 103035240 A | 4/2013 |
| CN | 103038728 A | 4/2013 |
| CN | 103093334 A | 5/2013 |
| CN | 103135916 A | 6/2013 |
| CN | 103744761 A | 4/2014 |

(56) References Cited

FOREIGN PATENT DOCUMENTS

| | | |
|---|---|---|
| CN | 103795850 A | 5/2014 |
| CN | 103930945 A | 7/2014 |
| CN | 104038621 A | 9/2014 |
| CN | 104284257 A | 1/2015 |
| CN | 104423625 A | 3/2015 |
| CN | 104463552 A | 3/2015 |
| CN | 104516522 A | 4/2015 |
| CN | 104854583 A | 8/2015 |
| CN | 104951077 A | 9/2015 |
| CN | 105247511 A | 1/2016 |
| CN | 105264524 A | 1/2016 |
| CN | 105471705 A | 4/2016 |
| CN | 107919123 A | 4/2018 |
| DE | 102008024258 A1 | 11/2009 |
| EP | 1333650 A2 | 8/2003 |
| EP | 1892700 A1 | 2/2008 |
| EP | 1912205 A2 | 4/2008 |
| EP | 1939860 A1 | 7/2008 |
| EP | 1944997 A2 | 7/2008 |
| EP | 651543 B1 | 9/2008 |
| EP | 1909263 B1 | 1/2009 |
| EP | 1335620 B1 | 3/2009 |
| EP | 2069895 A1 | 6/2009 |
| EP | 2081185 A1 | 7/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2329348 | 6/2011 |
| EP | 2400373 A1 | 12/2011 |
| EP | 2431842 A2 | 3/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2733598 A2 | 5/2014 |
| EP | 2801890 A1 | 11/2014 |
| EP | 2801972 A1 | 11/2014 |
| EP | 2849177 A1 | 3/2015 |
| EP | 2930715 A1 | 10/2015 |
| EP | 2938022 A1 | 10/2015 |
| EP | 2940556 A1 | 11/2015 |
| EP | 3035329 A1 | 6/2016 |
| EP | 3224708 A1 | 10/2017 |
| EP | 3246916 A1 | 11/2017 |
| EP | 3300074 A1 | 3/2018 |
| FR | 2911201 A1 | 7/2008 |
| GB | 2445436 A | 7/2008 |
| GB | 2445667 A | 7/2008 |
| JP | 2008-009120 A | 1/2008 |
| JP | 2008-21002 A | 1/2008 |
| JP | 2008-26381 A | 2/2008 |
| JP | 2008-39928 A | 2/2008 |
| JP | 2008-58813 A | 3/2008 |
| JP | 2008-064687 A | 3/2008 |
| JP | 2008-90545 A | 4/2008 |
| JP | 2008-97003 A | 4/2008 |
| JP | 2008-134949 A | 6/2008 |
| JP | 2008-158510 A | 7/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |
| JP | 2008-269480 A | 11/2008 |
| JP | 2008-271481 A | 11/2008 |
| JP | 2008-275731 A | 11/2008 |
| JP | 2008-299221 A | 12/2008 |
| JP | 2009-2850 A | 1/2009 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-069062 A | 4/2009 |
| JP | 2009-98490 A | 5/2009 |
| JP | 2009-110300 A | 5/2009 |
| JP | 2009-134409 A | 6/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-223840 A | 10/2009 |
| JP | 2009-294913 A | 12/2009 |
| JP | 2009-294946 A | 12/2009 |
| JP | 2009-543166 A | 12/2009 |
| JP | 2010-66519 A | 3/2010 |
| JP | 2010-78979 A | 4/2010 |
| JP | 2010-108378 A | 5/2010 |
| JP | 2010-518475 A | 5/2010 |
| JP | 2010-518526 A | 5/2010 |
| JP | 2010-157207 A | 7/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2011-250027 A | 12/2011 |
| JP | 2012-014394 A | 1/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-518847 A | 8/2012 |
| JP | 2013-37688 A | 2/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013/140520 A | 7/2013 |
| JP | 2013-527947 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2014-10688 A | 1/2014 |
| JP | 2014-026629 A | 2/2014 |
| JP | 2014-60600 A | 4/2014 |
| JP | 2014-72586 A | 4/2014 |
| JP | 2014-077969 A | 5/2014 |
| JP | 2014/109889 A | 6/2014 |
| JP | 2014-124332 A | 7/2014 |
| JP | 2014-145842 A | 8/2014 |
| JP | 2014-150323 A | 8/2014 |
| JP | 2014-222514 A | 11/2014 |
| JP | 2015-8001 A | 1/2015 |
| JP | 2015-501022 A | 1/2015 |
| JP | 2015-41845 A | 3/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-528140 A | 9/2015 |
| JP | 2015-528918 A | 10/2015 |
| JP | 2016-119615 A | 6/2016 |

(56) References Cited

FOREIGN PATENT DOCUMENTS

| | | |
|---|---|---|
| KR | 10-0801227 B1 | 2/2008 |
| KR | 10-0810500 B1 | 3/2008 |
| KR | 10-2008-0033070 A | 4/2008 |
| KR | 10-0819928 B1 | 4/2008 |
| KR | 10-2008-0049647 A | 6/2008 |
| KR | 10-2008-0059332 A | 6/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-1178310 B1 | 8/2012 |
| KR | 10-2012-0120316 A | 11/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-1334342 B1 | 11/2013 |
| KR | 10-2013-0131252 A | 12/2013 |
| KR | 10-2013-0133629 A | 12/2013 |
| KR | 10-2014-0147557 A | 12/2014 |
| KR | 10-2015-0043512 A | 4/2015 |
| KR | 10-2016-0010523 A | 1/2016 |
| RU | 2349970 C2 | 3/2009 |
| RU | 2353068 C2 | 4/2009 |
| RU | 2364917 C2 | 8/2009 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |
| TW | 201227715 A1 | 7/2012 |
| TW | 201245989 A1 | 11/2012 |
| TW | 201312548 A1 | 3/2013 |
| WO | 2008/030970 A2 | 3/2008 |
| WO | 2008/071231 A1 | 6/2008 |
| WO | 2008/085742 A2 | 7/2008 |
| WO | 2008/098900 A2 | 8/2008 |
| WO | 2008/109835 A2 | 8/2008 |
| WO | 2008/120036 A1 | 10/2008 |
| WO | 2008/130095 A1 | 10/2008 |
| WO | 2008/140236 A1 | 11/2008 |
| WO | 2008/142472 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/054373 A2 | 5/2010 |
| WO | 2010/075623 A1 | 7/2010 |
| WO | 2010/100937 A1 | 9/2010 |
| WO | 2010/141802 A1 | 12/2010 |
| WO | 2011/057346 A1 | 5/2011 |
| WO | 2011/060106 A1 | 5/2011 |
| WO | 2011/088053 A2 | 7/2011 |
| WO | 2011/093025 A1 | 8/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2011/088053 A3 | 1/2012 |
| WO | 2012/019637 A1 | 2/2012 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/163113 A1 | 10/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/028797 A1 | 2/2014 |
| WO | 2014/031505 A1 | 2/2014 |
| WO | 2014/066352 A1 | 5/2014 |
| WO | 2014/078965 A1 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/200728 A1 | 12/2014 |
| WO | 2014/204659 A2 | 12/2014 |
| WO | 2015/018440 A1 | 2/2015 |
| WO | 2015/030796 A1 | 3/2015 |
| WO | 2015/041892 A1 | 3/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/200207 A1 | 12/2015 |
| WO | 2016/028946 A1 | 2/2016 |
| WO | 2016/033257 A1 | 3/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/11881 A1 | 7/2016 |
| WO | 2016/144840 A1 | 9/2016 |
| WO | 2016/144982 A1 | 9/2016 |
| WO | 2016/175354 A1 | 11/2016 |
| WO | 2016/209444 A1 | 12/2016 |
| WO | 2017/044260 A1 | 3/2017 |

(56) References Cited

FOREIGN PATENT DOCUMENTS

WO  2017/044629 A1  3/2017
WO  2017/053311 A1  3/2017

OTHER PUBLICATIONS

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.
"DIRECTV™ Voice", Now Part of the DIRECTTV Mobile App for Phones, Sep. 18, 2013, 5 pages.
"Galaxy S7: How to Adjust Screen Timeout & Lock Screen Timeout", Available online at:- "https://www.youtube.com/watch?v=n6e1WKUS2ww", Jun. 9, 2016, 1 page.
Headset Button Controller v7.3 APK Full APP Download for Android, Blackberry, iPhone, Jan. 27, 2014, 11 pages.
Hear voice from Google translate, Available on URL:https://www.youtube.com/watch?v=18AvMhFqD28, Jan. 28, 2011, 1 page.
"Hey Google: How to Create a Shopping List with Your Google Assistant", Available online at:—https://www.youtube.com/watch?v=w9NCsElaxlY, May 25, 2018, 1 page.
"How to Enable Google Assistant on Galaxy 57 and other Android Phones (No Root)", Available online at:—"https://www.youtube.com/watch?v=HeklQbWyksE", Mar. 20, 2017, 1 page.
"How to Use Ok Google Assistant Even Phone is Locked", Available online at:—"https://www.youtube.com/watch?v=9B_gP4j_SP8", Mar. 12, 2018, 1 page.
Interactive Voice, available at <http://www.helloivee.com/company/>, retrieved on Feb. 10, 2014, 2 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Office Action received for Danish Patent Application No. PA201870358, dated Aug. 23, 2018, 10 pages.
Search Report and Opinion received for Danish Patent Application No. PA201870357, dated Aug. 16, 2018, 11 pages.
Search Report and Opinion received for Danish Patent Application No. PA201870359, dated Aug. 31, 2018, 9 pages.
Search Report and Opinion received for Danish Patent Application No. PA201870360, dated Sep. 7, 2018, 9 pages.
"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.
Speaker Recognition, Wikipedia, The Free Enclyclopedia, Nov. 2, 2010, 4 pages.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Alfred App, "Alfred", available at <http://www.alfredapp.com/>, retrieved on Feb. 8, 2012, 5 pages.
Anania, Peter, "Amazon Echo with Home Automation (Smartthings)", Available online at https://www.youtube.com/watch?v=LMW6aXmsWNE, Dec. 20, 2015, 1 page.

API.AI, "Android App Review—Speaktoit Assistant", Available at <https://www.youtube.com/watch?v=myE498nyfGw>, Mar. 30, 2011, 3 pages.
Apple Computer, "Knowledge Navigator", published by Apple Computer no later than 2008, as depicted in Exemplary Screenshots from video entitled 'Knowledge Navigator', 2008, 7 pages.
Apple, "VoiceOver", available at <http://www.apple.com/accessibility/voiceover/>, May 19, 2014, 3 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).
Ash Brook, Daniel L., "Enabling Mobile Microinteractions", Retrieved from the Internet: URL: "http://danielashbrook.com/wp-content/uploads/2012/06/2009-Ashbrook-Thesis.pdr", May 2010, 186 pages.
Berry et al., "PTIME: Personalized Assistance for Calendaring", ACM Transactions on Intelligent Systems and Technology, vol. 2, No. 4, Article 40, Jul. 2011, pp. 1-22.
Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Butcher, Mike, "EVI Arrives in Town to go Toe-to-Toe with Siri", TechCrunch, Jan. 23, 2012, 2 pages.
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Castleos, "Whole House Voice Control Demonstration", available online at : https://www.youtube.com/watch?v=9SRCoxrZ_W4, Jun. 2, 2012, 26 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chen, Yi, "Multimedia Siri Finds and Plays Whatever You Ask for", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Deedeevuu, "Amazon Echo Alarm Feature", Available online at https://www.youtube.com/watch?v=fdjU8eRLk7c, Feb. 16, 2015, 1 page.
EARTHLING1984, "Samsung Galaxy Smart Stay Feature Explained", Available online at:—"https://www.youtube.com/watch?v=RpjBNtSjupI", May 29, 2013, 1 page.
Elliott et al., "Annotation Suggestion and Search for Personal Multimedia Objects on the Web", CIVR, Jul. 7-9, 2008, pp. 75-84.
Erol et al., "Multimedia Clip Generation From Documents for Browsing on Mobile Devices", IEEE Transactions on Multimedia, vol. 10, No. 5, Aug. 2008, 13 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Filipowicz, Luke, "How to use the Quick Type Keyboard in iOS 8", available online at <https://www.imore.com/comment/568232>, Oct. 11, 2014, pp. 1-17.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.

(56) References Cited

OTHER PUBLICATIONS

Gannes, Liz, "Alfred App Gives Personalized Restaurant Recommendations", AllThingsD, Jul. 18, 2011, pp. 1-3.
Gomez et al., "Mouth Gesture and Voice Command Based Robot Command Interface", IEEE International Conference on Robotics and Automation, May 12-17, 2009, pp. 333-338.
Gruber, Thomas R., et al., U.S Appl. No. 61/186,414, filed Jun. 12, 2009 titled "System and Method for Semantic Auto-Completion" 13 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
id3.org, "id3v2.4.0-Frames", available at <http://id3.org/id3v2.4.0-frames?action=print>, retrieved on Jan. 22, 2015, 41 pages.
iNEWS and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012,, pp. 4821-4824.
Kane et al., "Slide Rule: Making Mobile Touch Screens Accessible to Blind People Using Multi-Touch Interaction Techniques", ASSETS, Oct. 13-15, 2008, pp. 73-80.
Karn, Ujjwal, "An Intuitive Explanation of Convolutional Neural Networks", The Data Science Blog, Aug. 11, 2016, 23 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Knownav, "Knowledge Navigator", YouTube Video available at <http://www.youtube.com/watch?v=QRH8eimU_20>, Apr. 29, 2008, 1 page.

Lewis, Cameron, "Task Ave for iPhone Review", Mac Life, Available at <http://www.maclife.com/article/reviews/task_ave_iphone_review>, Mar. 3, 2011, 5 pages.
Liou et al., "Autoencoder for Words", Neurocomputing, vol. 139, Sep. 2014, pp. 84-96.
Mactech, "KeyStrokes 3.5 for Mac OS X Boosts Word Prediction", available at <http://www.mactech.com/news/?p=1007129>, retrieved on Jan. 7, 2008, 3 pages.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Manning et al., "Introduction to Information Retrieval", New York, Cambridge University Press, 2008, 504 pages.
Martins et al., "Extracting and Exploring the Geo-Temporal Semantics of Textual Resources", Semantic Computing, IEEE International Conference, 2008, pp. 1-9.
Mhatre et al., "Donna Interactive Chat-bot acting as a Personal Assistant", International Journal of Computer Applications (0975-8887), vol. 140, No. 10, Apr. 2016, 6 pages.
Microsoft, "Turn On and Use Magnifier", available at <http://www.microsoft.com/windowsxp/using/accessibility/magnifierturnon.mspx>, retrieved on Jun. 6, 2009.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Morrison, Jonathan, "iPhone 5 Siri Demo", Online Available at <https://www.youtube.com/watch?v=_wHWwG5lhWc>, Sep. 21, 2012, 3 pages.
Morton, Philip, "Checking If an Element Is Hidden", StackOverflow, Available at <http://stackoverflow.com/questions/178325/checking-if-an-element-is-hidden>, Oct. 7, 2008, 12 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Nozawa, Naoki et al., "iPhone 4S Perfect Manual", vol. 1, First Edition, Nov. 11, 2011, 5 pages.
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).
Osxdaily, "Get a List of Sin Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the

(56) References Cited

OTHER PUBLICATIONS

Twenty-Second Conference on Innovative Applications of Artificial Intelligence, XP055114607, Jul. 11, 2010, pp. 1821-1826.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Oct. 25-29, 2014, pp. 1532-1543.
Phoenix Solutions, Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me . . . Show/Hide Performance", available at http://www.learningjquery.com/2010/05/now-you-see-me-showhide-performance, May 4, 2010, 3 pages.
Rios, Mafe, "New bar search for Facebook", Youtube, available at "https://www.youtube.com/watch?v=vwgN1WbvCas", 1 page.
Routines, "SmartThings Support", Available online at <https://web.archive.org/web/20151207165701/https://support.smartthings.com/hc/en-us/articles/205380034-Routines>, 2015, 2 pages.
Samsung, "SGH-a885 Series—Portable Quad-Band Mobile Phone-User Manual", Retrieved from the Internet: URL: "http://web.archive.org/web/20100106113758/http://www.comparecellular.com/images/phones/userguide1896.pdr", Jan. 1, 2009, 144 pages.
Sarawagi, Sunita, "CRF Package Page", available at <http://crf.sourceforge.net/>, retrieved on Apr. 6, 2011, 2 pages.
Seehafer, Brent, "Activate google assistant on Galaxy S7 with screen off", Available online at:—"https://productforums.google.com/forum/#!topic/websearch/Ip3gIGBHLVI", Mar. 8, 2017, 4 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Simonite, Tom, "One Easy Way to Make Siri Smarter", Technology Review, Oct. 18, 2011, 2 pages.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", At&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", Interspeech 2012, ISCA's 13 Annual Conference, Sep. 9-13, 2012, pp. 194-197.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Textndrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakTolt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Vlingo Incar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Vodafone Deutschland, "Samsung Galaxy S3 Tastatur Spracheingabe", Available online at—"https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJgpWgQS98w>, Jul. 27, 2009, 1 page.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
X.Ai, "How it Works", May 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yan et al., "A Scalable Approach to Using DNN-Derived Features in GMM-HMM Based Acoustic Modeling for LVCSR", InInterspeech, 2013, pp. 104-108.
Yates, Michael C., "How Can I Exit Google Assistant After I'm Finished With It", Available online at:—"https://productforums.google.com/forum/#!msg/phone-by-google/faECnR2RJwA/gKNtOkQgAQAJ", Jan. 11, 2016, 2 pages.
Young et al., "The Hidden Information State model: A practical framework for PPMDP-based spoken dialogue management", Computer Speech & Language, vol. 24, Issue 2, 2010, pp. 150-174.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.

(56) References Cited

OTHER PUBLICATIONS

Non-Final Office Action received for U.S. Appl. No. 16/146,381, dated Dec. 26, 2018, 21 pages.
Office Action received for Danish Patent Application No. PA201870357, dated Dec. 10, 2018, 2 pages.
Office Action received for Danish Patent Application No. PA201870359, dated Dec. 12, 2018, 6 pages.
Office Action received for Danish Patent Application No. PA201870360, dated Nov. 30, 2018, 5 pages.
Office Action received for Danish Patent Application No. PA201870358, dated Dec. 18, 2018, 12 pages.
Samsung Support, "Create a Quick Command in Bixby to launch custom settings by at your command", Retrieved from internet: https://www.facebook.com/samsungsupport/videos/10154746303151213, published on Nov. 13, 2017, 1 page.
Non-Final Office Action received for U.S. Appl. No. 16/146,963, dated Feb. 27, 2019, 22 pages.
Office Action received for Danish Patent Application No. PA201870357, dated Jan. 28, 2019, 7 pages.
Non-Final Office Action received for U.S. Appl. No. 16/146,883, dated Mar. 7, 2019, 22 pages.
Office Action received for Danish Patent Application No. PA201870358, dated May 20, 2019, 2 pages.
Final Office Action received for U.S. Appl. No. 16/146,381, dated Apr. 23, 2019, 22 pages.
Office Action received for Danish Patent Application No. PA201870357, dated Apr. 10, 2019, 3 pages.
Office Action received for Danish Patent Application No. PA201870360, dated Apr. 30, 2019, 3 pages.
Office Action received for Danish Patent Application No. PA201870359, dated Apr. 25, 2019, 4 pages.
Invitation to Pay Addition Fees and Partial International Search Report received for PCT Patent Application No. PCT/US2019/030244, dated Jun. 26, 2019, 14 pages.
International Search Report and Written Opinion received for PCT Patent Application No. PCT/US2019/030244, dated Aug. 20, 2019, 21 pages.
Office Action received for Australian Patent Application No. 2019100576, dated Aug. 16, 2019, 6 pages.
Intention to Grant received for Danish Patent Application No. PA201870359, dated Sep. 16, 2019, 2 pages.

\* cited by examiner

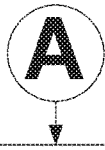

918
in response to detecting the first user input:

920
in accordance with a determination that the task is a task of a first type, perform the task

922
in accordance with a determination that the task is a task of a second type different than the first type, display a confirmation interface including a confirmation affordance

924
the confirmation interface includes an application affordance

926
while displaying the confirmation interface:

928
detect a second user input corresponding to a selection of the confirmation affordance

930
in response to detecting the second user input, perform the task

932
detect a third user input corresponding to a selection of the application affordance

934
in response to detecting the third user input, execute an application associated with the task

*FIG. 9B*

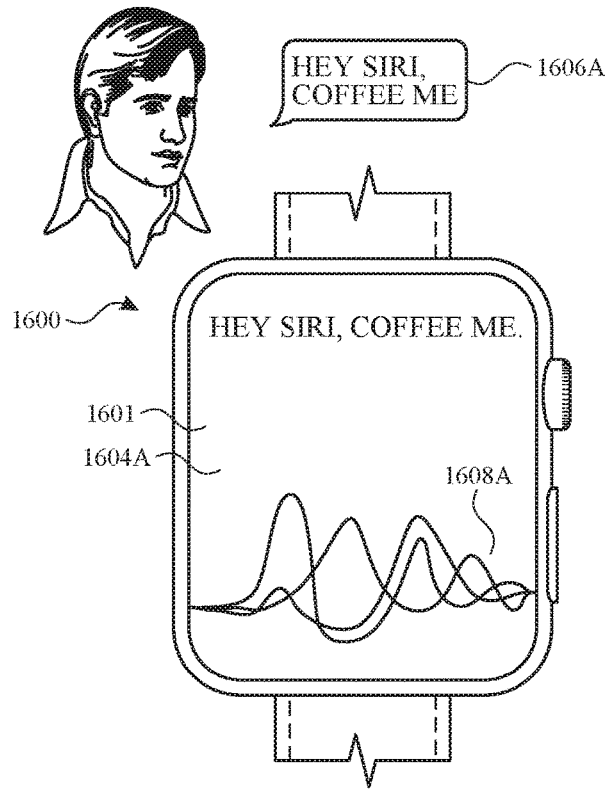
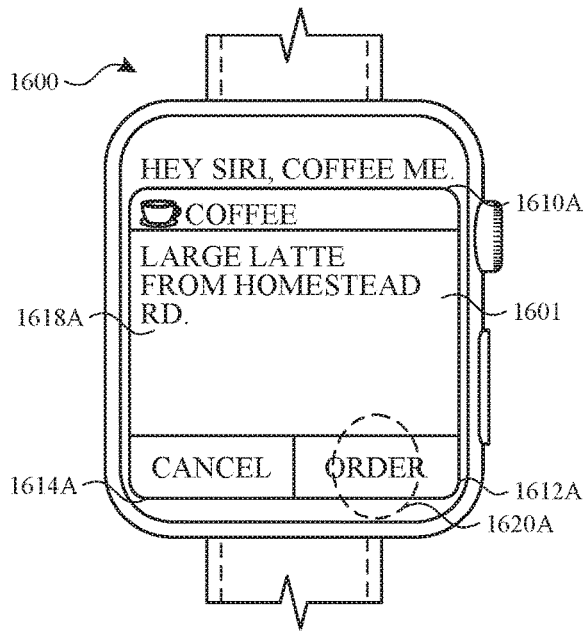
FIG. 16M
FIG. 16N
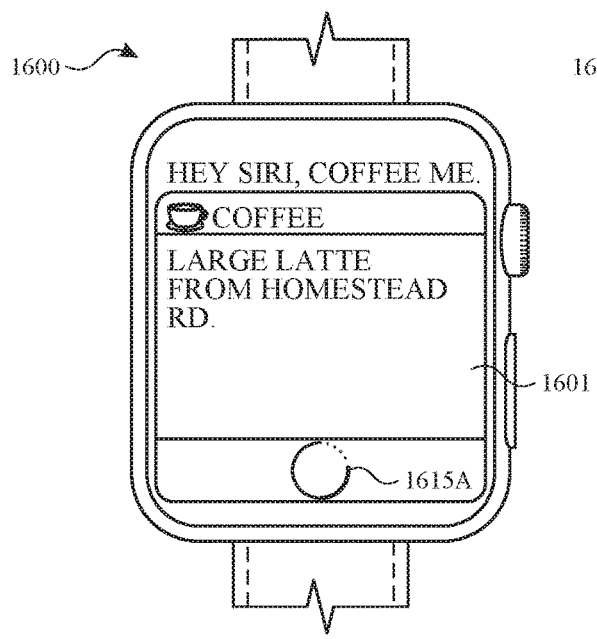
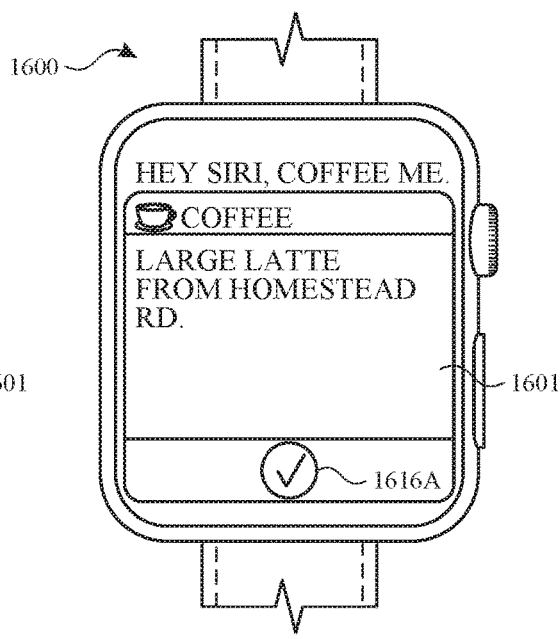
FIG. 16O
FIG. 16P

ACCELERATED TASK PERFORMANCE

CROSS-REFERENCE TO RELATED APPLICATIONS

This Application claims priority to U.S. Provisional Application 62/679,972, entitled "ACCELERATED TASK PERFORMANCE" filed Jun. 3, 2018 and to U.S. Provisional Application 62/729,967, entitled "ACCELERATED TASK PERFORMANCE", filed Sep. 11, 2018, the entire content of which is hereby incorporated by reference.

FIELD

This relates generally to digital assistants and, more specifically, to accelerating task performance using a digital assistant.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input, operationalize the user's intent into a task, and perform the task. In some systems, performing tasks in this manner may be constrained in the manner by which a task is identified. In some cases, however, a user may be limited to a particular set of commands such that the user cannot readily instruct a digital assistant to perform a task using natural-language speech inputs. Further, in many instances digital assistants fail to adapt based on previous user behavior and in turn lack a desirable optimization of user experience.

SUMMARY

Example methods are described herein. An example method includes, at an electronic device with a display and a touch-sensitive surface, displaying, on the display, a user interface including a suggestion affordance associated with a task, detecting, via the one or more input devices, a first user input corresponding to a selection of the suggestion affordance; in response to detecting the first user input: in accordance with a determination that the task is a task of a first type, performing the task; and in accordance with a determination that the task is a task of a second type different than the first type, displaying a confirmation interface including a confirmation affordance.

Example electronic devices are described herein. An example electronic device comprises one or more processors, a memory, and one or more programs, wherein the one or more programs are stored in the memory and configured to be executed by the one or more processors, the one or more programs including instructions for: displaying, on the display, a user interface including a suggestion affordance associated with a task; detecting, via the one or more input devices, a first user input corresponding to a selection of the suggestion affordance; in response to detecting the first user input: in accordance with a determination that the task is a task of a first type, performing the task; and in accordance with a determination that the task is a task of a second type different than the first type, displaying a confirmation interface including a confirmation affordance.

An example electronic device includes means for displaying, on the display, a user interface including a suggestion affordance associated with a task, means for detecting, via the one or more input devices, a first user input corresponding to a selection of the suggestion affordance, means for, in response to detecting the first user input: in accordance with a determination that the task is a task of a first type, performing the task; and in accordance with a determination that the task is a task of a second type different than the first type, displaying a confirmation interface including a confirmation affordance.

Example non-transitory computer-readable media are disclosed herein. An example non-transitory computer-readable medium stores one or more programs comprising instructions, which when executed by one or more processors of an electronic device, cause the electronic device to: display, on the display, a user interface including a suggestion affordance associated with a task; detect, via the one or more input devices, a first user input corresponding to a selection of the suggestion affordance; in response to detecting the first user input: in accordance with a determination that the task is a task of a first type, perform the task; and in accordance with a determination that the task is a task of a second type different than the first type, display a confirmation interface including a confirmation affordance.

Displaying a user interface including a suggestion affordance and selectively requiring confirmation to perform a task in response to selection of the suggestion affordance provides a user with an easily recognizable and intuitive approach for performing tasks on the electronic device, thereby reducing the number of user inputs otherwise needed to perform such tasks. Thus, displaying user interfaces in this manner enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

An example method includes, at an electronic device having one or more processors, displaying a plurality of candidate task affordances including a candidate task affordance associated with a task, detecting a set of inputs including a first user input corresponding to a selection of the candidate task affordance associated with the task, in response to detecting the set of user inputs, displaying a first interface for generating a voice shortcut associated with the task, while displaying the first interface: receiving, by the audio input device, a natural-language speech input, and displaying, in the first interface, a candidate phrase, wherein the candidate phrase is based on the natural-language speech input, after displaying the candidate phrase, detecting, via the touch-sensitive surface, a second user input, and in response to detecting the second user input, associating the candidate phrase with the task.

An example non-transitory computer-readable storage medium stores one or more programs. The one or more programs comprise instructions, which when executed by one or more processors of an electronic device, cause the electronic device to display a plurality of candidate task affordances including a candidate task affordance associated with a task, detect a set of inputs including a first user input corresponding to a selection of the candidate task affordance associated with the task, in response to detecting the set of user inputs, display a first interface for generating a voice shortcut associated with the task, while displaying the first interface: receive, by the audio input device, a natural-language speech input, and display, in the first interface, a candidate phrase, wherein the candidate phrase is based on the natural-language speech input, after displaying the candidate phrase, detect, via the touch-sensitive surface, a second user input, and in response to detecting the second user input, associate the candidate phrase with the task.

An example electronic device comprises one or more processors, a memory, and one or more programs, where the one or more programs are stored in the memory and configured to be executed by the one or more processors, the one or more programs including instructions for displaying a plurality of candidate task affordances including a candidate task affordance associated with a task, detecting a set of inputs including a first user input corresponding to a selection of the candidate task affordance associated with the task, in response to detecting the set of user inputs, displaying a first interface for generating a voice shortcut associated with the task, while displaying the first interface: receiving, by the audio input device, a natural-language speech input, and displaying, in the first interface, a candidate phrase, wherein the candidate phrase is based on the natural-language speech input, after displaying the candidate phrase, detecting, via the touch-sensitive surface, a second user input, and in response to detecting the second user input, associating the candidate phrase with the task.

An example electronic device comprises means for displaying a plurality of candidate task affordances including a candidate task affordance associated with a task, means for detecting a set of inputs including a first user input corresponding to a selection of the candidate task affordance associated with the task, means for, in response to detecting the set of user inputs, displaying a first interface for generating a voice shortcut associated with the task, means for, while displaying the first interface: receiving, by the audio input device, a natural-language speech input, and displaying, in the first interface, a candidate phrase, wherein the candidate phrase is based on the natural-language speech input, means for, after displaying the candidate phrase, detecting, via the touch-sensitive surface, a second user input, and means for, in response to detecting the second user input, associating the candidate phrase with the task.

Providing candidate phrases based on a natural-language speech input and associating candidate phrases with respective tasks allows a user to accurately and efficiently generate user-specific voice shortcuts that can be used to perform tasks on the electronic device. For example, allowing a user to associate voice shortcuts with tasks in this manner allows a user to visually confirm that a desired voice shortcut has been selected and assigned to the correct task, thereby reducing the likelihood of an incorrect or unwanted association. Thus, providing candidate phrases in the manner described provides for more efficient use of the electronic device (e.g., by helping the user to provide proper inputs and reducing user mistakes when operating/interacting with the device), which, additionally, reduces power usage and improves battery life of the device by enabling the user to use the device more quickly and efficiently.

An example method includes, at an electronic device having one or more processors, receiving context data associated with the electronic device, determining, based on the context data, a task probability for a task, determining, based on the context data, a parameter probability for a parameter, wherein the parameter is associated with the task, determining, based on the task probability and the parameter probability, whether the task satisfies suggestion criteria, in accordance with a determination that the task satisfies the suggestion criteria, displaying, on the display, a suggestion affordance corresponding to the task and the parameter, and in accordance with a determination that the task does not satisfy the suggestion criteria, forgoing displaying the suggestion affordance.

An example non-transitory computer-readable storage medium stores one or more programs. The one or more programs comprise instructions, which when executed by one or more processors of an electronic device, cause the electronic device to receive context data associated with the electronic device, determine, based on the context data, a task probability for a task, determine, based on the context data, a parameter probability for a parameter, wherein the parameter is associated with the task, determine, based on the task probability and the parameter probability, whether the task satisfies suggestion criteria, in accordance with a determination that the task satisfies the suggestion criteria, display, on the display, a suggestion affordance corresponding to the task and the parameter, and in accordance with a determination that the task does not satisfy the suggestion criteria, forgo displaying the suggestion affordance.

An example electronic device comprises one or more processors, a memory, and one or more programs, where the one or more programs are stored in the memory and configured to be executed by the one or more processors, the one or more programs including instructions for receiving context data associated with the electronic device, determining, based on the context data, a task probability for a task, determining, based on the context data, a parameter probability for a parameter, wherein the parameter is associated with the task, determining, based on the task probability and the parameter probability, whether the task satisfies suggestion criteria, in accordance with a determination that the task satisfies the suggestion criteria, displaying, on the display, a suggestion affordance corresponding to the task and the parameter, and in accordance with a determination that the task does not satisfy the suggestion criteria, forgoing displaying the suggestion affordance.

An example electronic device comprises means for means for receiving context data associated with the electronic device, means for determining, based on the context data, a task probability for a task, means for determining, based on the context data, a parameter probability for a parameter, wherein the parameter is associated with the task, means for determining, based on the task probability and the parameter probability, whether the task satisfies suggestion criteria, means for, in accordance with a determination that the task satisfies the suggestion criteria, displaying, on the display, a suggestion affordance corresponding to the task and the parameter, and means for in accordance with a determination that the task does not satisfy the suggestion criteria, forgoing displaying the suggestion affordance.

Selectively providing suggestion affordances associated with tasks, as described herein, allows a user to efficiently and conveniently perform tasks relevant to the user on the electronic device. By way of example, suggestion affordances displayed by the electronic device can correspond to tasks identified based on context data of the electronic device, such as context data indicative of prior use of the electronic device by the user. Thus, selectively providing suggestions in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

An example method includes, at an electronic device having one or more processors, receiving a natural-language speech input, determining whether the natural-language speech input satisfies voice shortcut criteria, in accordance with a determination that the natural-language speech input satisfies the voice shortcut criteria: identifying a task associated with the voice shortcut, and performing the task associated with the voice shortcut, and in accordance with a determination that the natural-language speech input does not satisfy the voice shortcut criteria: identifying a task associated with the natural-language speech input, and performing the task associated with the natural-language speech input.

An example non-transitory computer-readable storage medium stores one or more programs. The one or more programs comprise instructions, which when executed by one or more processors of an electronic device, cause the electronic device to receive a natural-language speech input, determine whether the natural-language speech input satisfies voice shortcut criteria, in accordance with a determination that the natural-language speech input satisfies the voice shortcut criteria: identify a task associated with the voice shortcut, and perform the task associated with the voice shortcut, and in accordance with a determination that the natural-language speech input does not satisfy the voice shortcut criteria: identify a task associated with the natural-language speech input, and perform the task associated with the natural-language speech input.

An example electronic device comprises one or more processors, a memory, and one or more programs, where the one or more programs are stored in the memory and configured to be executed by the one or more processors, the one or more programs including instructions for receiving a natural-language speech input, determining whether the natural-language speech input satisfies voice shortcut criteria, in accordance with a determination that the natural-language speech input satisfies the voice shortcut criteria: identifying a task associated with the voice shortcut, and performing the task associated with the voice shortcut, and in accordance with a determination that the natural-language speech input does not satisfy the voice shortcut criteria: identifying a task associated with the natural-language speech input, and performing the task associated with the natural-language speech input.

An example electronic device comprises means for means for receiving a natural-language speech input, means for determining whether the natural-language speech input satisfies voice shortcut criteria, means for, in accordance with a determination that the natural-language speech input satisfies the voice shortcut criteria: identifying a task associated with the voice shortcut, and performing the task associated with the voice shortcut, and means for, in accordance with a determination that the natural-language speech input does not satisfy the voice shortcut criteria: identifying a task associated with the natural-language speech input, and performing the task associated with the natural-language speech input.

Performing tasks in response to natural-language speech inputs (e.g., voice shortcuts), as described herein, provides an intuitive and efficient approach for performing tasks on the electronic device. By way of example, one or more tasks may be performed in response to a natural-language speech input without any additional input from the user. Accordingly, performing tasks in response to natural-language speech inputs in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

An example method includes, at an electronic device having one or more processors, receiving, with a digital assistant, a natural-language speech input, determining a voice shortcut associated with the natural-language speech input, determining a task corresponding to the voice shortcut, causing an application to initiate performance of the task, receiving a response from the application, wherein the response is associated with the task, determining, based on the response, whether the task was successfully performed, and providing an output indicating whether the task was successfully performed.

An example non-transitory computer-readable storage medium stores one or more programs. The one or more programs comprise instructions, which when executed by one or more processors of an electronic device, cause the electronic device to receive, with a digital assistant, a natural-language speech input, determine a voice shortcut associated with the natural-language speech input, determine a task corresponding to the voice shortcut, cause an application to initiate performance of the task, receive a response from the application, wherein the response is associated with the task, determine, based on the response, whether the task was successfully performed, and provide an output indicating whether the task was successfully performed.

An example electronic device comprises one or more processors, a memory, and one or more programs, where the one or more programs are stored in the memory and configured to be executed by the one or more processors, the one or more programs including instructions for receiving, with a digital assistant, a natural-language speech input, determining a voice shortcut associated with the natural-language speech input, determining a task corresponding to the voice shortcut, causing an application to initiate performance of the task, receiving a response from the application, wherein the response is associated with the task, determining, based on the response, whether the task was successfully performed, and providing an output indicating whether the task was successfully performed.

An example electronic device comprises means for means for receiving, with a digital assistant, a natural-language speech input, means for determining a voice shortcut associated with the natural-language speech input, and means for determining a task corresponding to the voice shortcut, means for causing an application to initiate performance of the task, means for receiving a response from the application, wherein the response is associated with the task, means for determining, based on the response, whether the task was successfully performed, and means for providing an output indicating whether the task was successfully performed.

Providing an output, as described herein, allows the digital assistant to provide feedback and/or other information from an application, for instance during the course of a dialog (e.g., conversational dialog) between a user and the digital assistant, in an intuitive and flexible manner. By way of example, the digital assistant may provide (e.g., relay) natural-language expressions from an application to the user such that the user can interact with the application without opening or otherwise directly accessing the application. Accordingly, providing natural-language outputs in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

An example method includes receiving a plurality of media items from an application, receiving context data associated with the electronic device, determining a task based on the plurality of media items and the context data, determining whether the task satisfies suggestion criteria, in accordance with a determination that the task satisfies the suggestion criteria, displaying, on the display, a suggestion affordance corresponding to the task, and in accordance with a determination that the task does not satisfy the suggestion criteria, forgoing displaying the suggestion affordance.

An example electronic device comprises one or more processors, a memory, and one or more programs, wherein the one or more programs are stored in the memory and configured to be executed by the one or more processors, the one or more programs including instructions for receiving a plurality of media items from an application, receiving context data associated with the electronic device, determining a task based on the plurality of media items and the context data, determining whether the task satisfies suggestion criteria, in accordance with a determination that the task satisfies the suggestion criteria, displaying, on the display, a suggestion affordance corresponding to the task, and in accordance with a determination that the task does not satisfy the suggestion criteria, forgoing displaying the suggestion affordance.

An example electronic device comprises means for receiving a plurality of media items from an application, means for receiving context data associated with the electronic device, means for determining a task based on the plurality of media items and the context data, means for determining whether the task satisfies suggestion criteria, means for, in accordance with a determination that the task satisfies the suggestion criteria, displaying, on the display, a suggestion affordance corresponding to the task, and means for, in accordance with a determination that the task does not satisfy the suggestion criteria, forgoing displaying the suggestion affordance.

An example non-transitory computer-readable medium stores one or more programs comprising instructions, which when executed by one or more processors of an electronic device, cause the electronic device to receive a plurality of media items from an application, receive context data associated with the electronic device, determine a task based on the plurality of media items and the context data, determine whether the task satisfies suggestion criteria, in accordance with a determination that the task satisfies the suggestion criteria, display, on the display, a suggestion affordance corresponding to the task, and in accordance with a determination that the task does not satisfy the suggestion criteria, forgo displaying the suggestion affordance.

Selectively providing suggestion affordances corresponding to tasks, as described herein, allows a user to efficiently and conveniently perform tasks relevant to the user on the electronic device. By way of example, suggestion affordances displayed by the electronic device can correspond to tasks identified based on media consumption and/or determined media preferences of the user. Thus, selectively providing suggestions in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

An example method includes receiving, using a digital assistant, a user input including a shortcut; and in response to receiving the user input including the shortcut: determining a set of tasks associated with the shortcut; performing a first task of the set of tasks, wherein the first task is associated with a first application; providing a first response indicating whether the first task was successfully performed; performing a second task of the set of tasks, wherein the second task is associated with a second application different than the first application; and after providing the first response, providing a second response indicating whether the second task was successfully performed.

An example electronic device comprises one or more processors, a memory, and one or more programs, wherein the one or more programs are stored in the memory and configured to be executed by the one or more processors, the one or more programs including instructions for receiving, using a digital assistant, a user input including a shortcut; and in response to receiving the user input including the shortcut: determining a set of tasks associated with the shortcut; performing a first task of the set of tasks, wherein the first task is associated with a first application; providing a first response indicating whether the first task was successfully performed; performing a second task of the set of tasks, wherein the second task is associated with a second application different than the first application; and after providing the first response, providing a second response indicating whether the second task was successfully performed.

An example electronic device comprises means for receiving, using a digital assistant, a user input including a shortcut; and means for, in response to receiving the user input including the shortcut: determining a set of tasks associated with the shortcut; performing a first task of the set of tasks, wherein the first task is associated with a first application; providing a first response indicating whether the first task was successfully performed; performing a second task of the set of tasks, wherein the second task is associated with a second application different than the first application; and after providing the first response, providing a second response indicating whether the second task was successfully performed.

An example non-transitory computer-readable medium stores one or more programs comprising instructions, which when executed by one or more processors of an electronic device, cause the electronic device to receive, using a digital assistant, a user input including a shortcut; and in response to receiving the user input including the shortcut: determine a set of tasks associated with the shortcut; perform a first task of the set of tasks, wherein the first task is associated with a first application; provide a first response indicating whether the first task was successfully performed; perform a second task of the set of tasks, wherein the second task is associated with a second application different than the first application; and after providing the first response, provide a second response indicating whether the second task was successfully performed.

Performing a set of tasks in response to user inputs including shortcuts (e.g., voice shortcuts), as described herein, provides an intuitive and efficient approach for sequentially performing one or more tasks on the electronic device. By way of example, one or more tasks may be performed in response to a single user input without any additional input from the user. Accordingly, performing tasks in response to natural-language speech inputs in this manner decreases the number of inputs and amount of time needed for the user to successfully operate the electronic device (e.g., by helping the user to provide proper inputs and reducing user mistakes when operating/interacting with the device), which, additionally, reduces power usage and improves battery life of the device.

BRIEF DESCRIPTION OF THE DRAWINGS

FIGS. 9A-9B are a flow diagram illustrating a method of providing suggestions, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
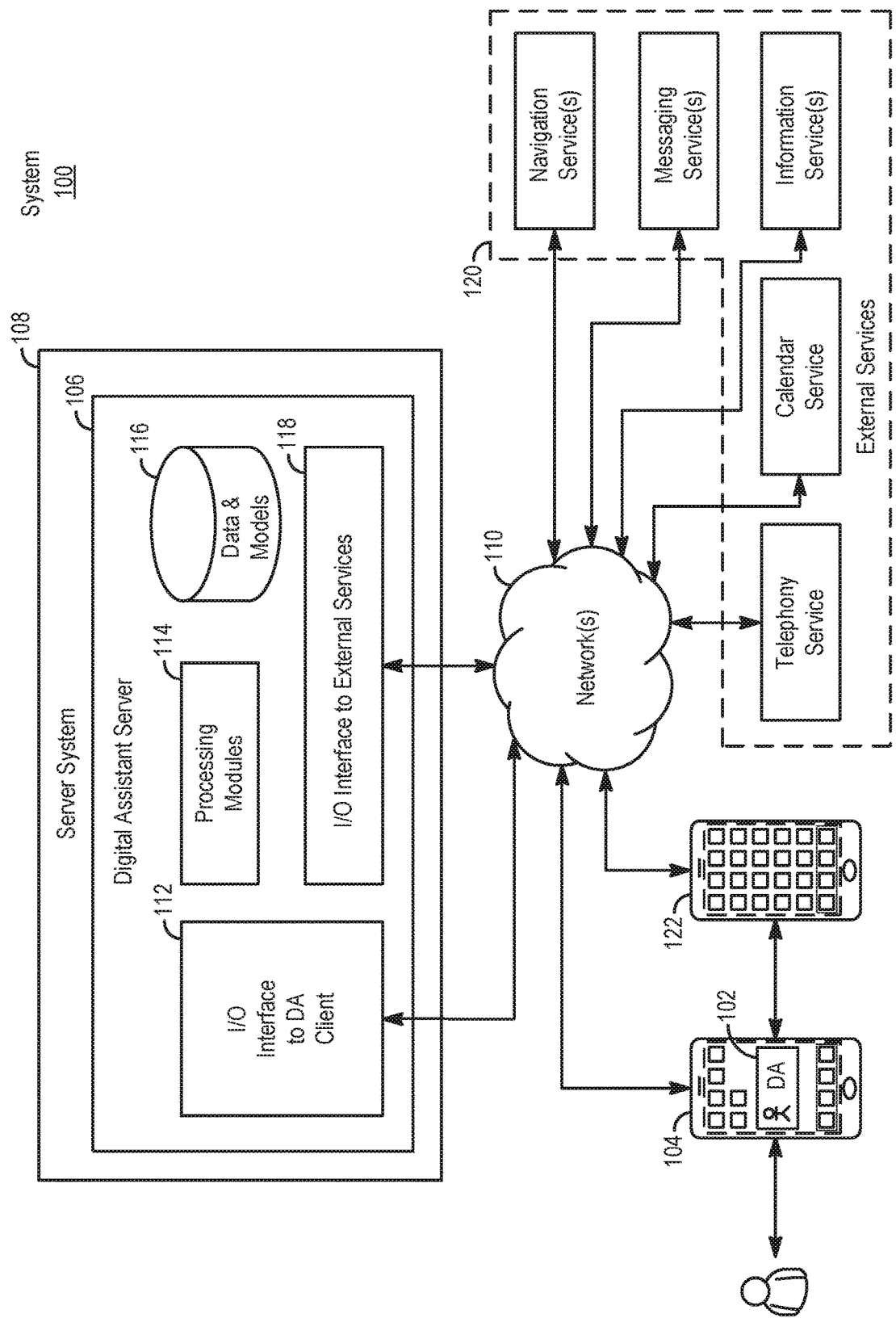
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
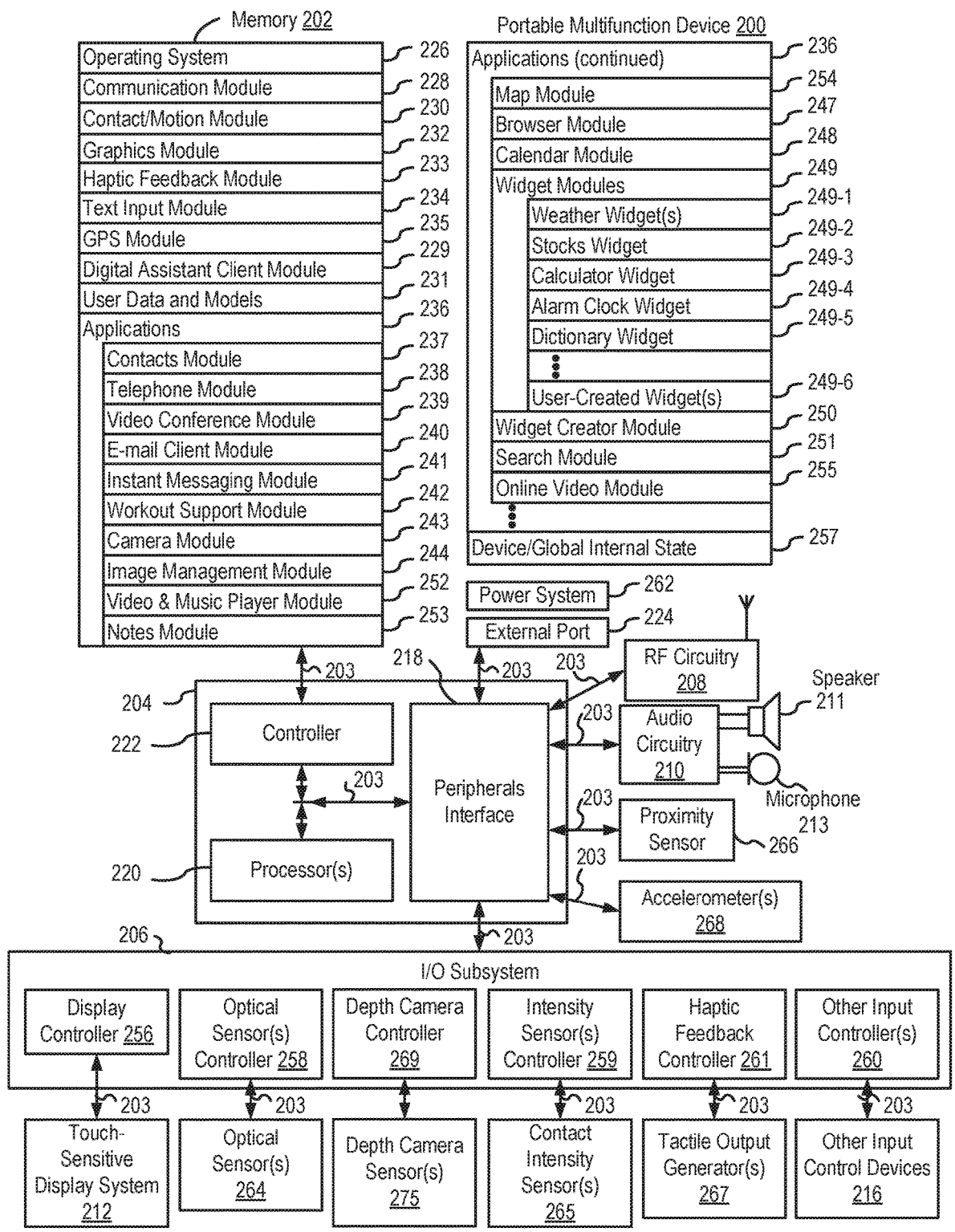
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, depth camera controller 269, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button optionally disengages a lock of touch screen 212 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) optionally turns power to device 200 on or off. The functionality of one or more of the buttons is, optionally, user customizable. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output optionally includes graphics, text, icons, video, and any combination thereof (collectively termed "graphics"). In some embodiments, some or all of the visual output optionally corresponds to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 optionally uses LCD (liquid crystal display) technology, LPD (light emitting polymer display) technology, or LED (light emitting diode) technology, although other display technologies are used in other embodiments. Touch screen 212 and display controller 256 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 optionally has a video resolution in excess of 100 dpi. In some embodiments, the touch screen has a video resolution of approximately 160 dpi. The user optionally makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 212 or an extension of the touch-sensitive surface formed by the touch screen.

Device 200 also includes power system 262 for powering the various components. Power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 optionally also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 optionally receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more depth camera sensors 275. FIG. 2A shows a depth camera sensor coupled to depth camera controller 269 in I/O subsystem 206. Depth camera sensor 275 receives data from the environment to create a three dimensional model of an object (e.g., a face) within a scene from a viewpoint (e.g., a depth camera sensor). In some embodiments, in conjunction with imaging module 243 (also called a camera module), depth camera sensor 275 is optionally used to determine a depth map of different portions of an image captured by the imaging module 243. In some embodiments, a depth camera sensor is located on the front of device 200 so that the user's image with depth information is, optionally, obtained for video conferencing while the user views the other video conference participants on the touch screen display and to capture selfies with depth map data. In some embodiments, the depth camera sensor 275 is located on the back of device, or on the back and the front of the device 200. In some embodiments, the position of depth camera sensor 275 can be changed by the user (e.g., by rotating the lens and the sensor in the device housing) so that a depth camera sensor 275 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 optionally also includes one or more proximity sensors 266. FIG. 2A shows proximity sensor 266 coupled to peripherals interface 218. Alternately, proximity sensor 266 is, optionally, coupled to input controller 260 in I/O subsystem 206. Proximity sensor 266 optionally performs as described in U.S. patent application Ser. No. 11/241,839, "Proximity Detector In Handheld Device"; Ser. No. 11/240,788, "Proximity Detector In Handheld Device", Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 optionally also includes one or more accelerometers 268. FIG. 2A shows accelerometer 268 coupled to peripherals interface 218. Alternately, accelerometer 268 is, optionally, coupled to an input controller 260 in I/O subsystem 206. Accelerometer 268 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer and a GPS (or GLONASS or other global navigation system) receiver for obtaining information concerning the location and orientation (e.g., portrait or landscape) of device 200.

Figure 4:
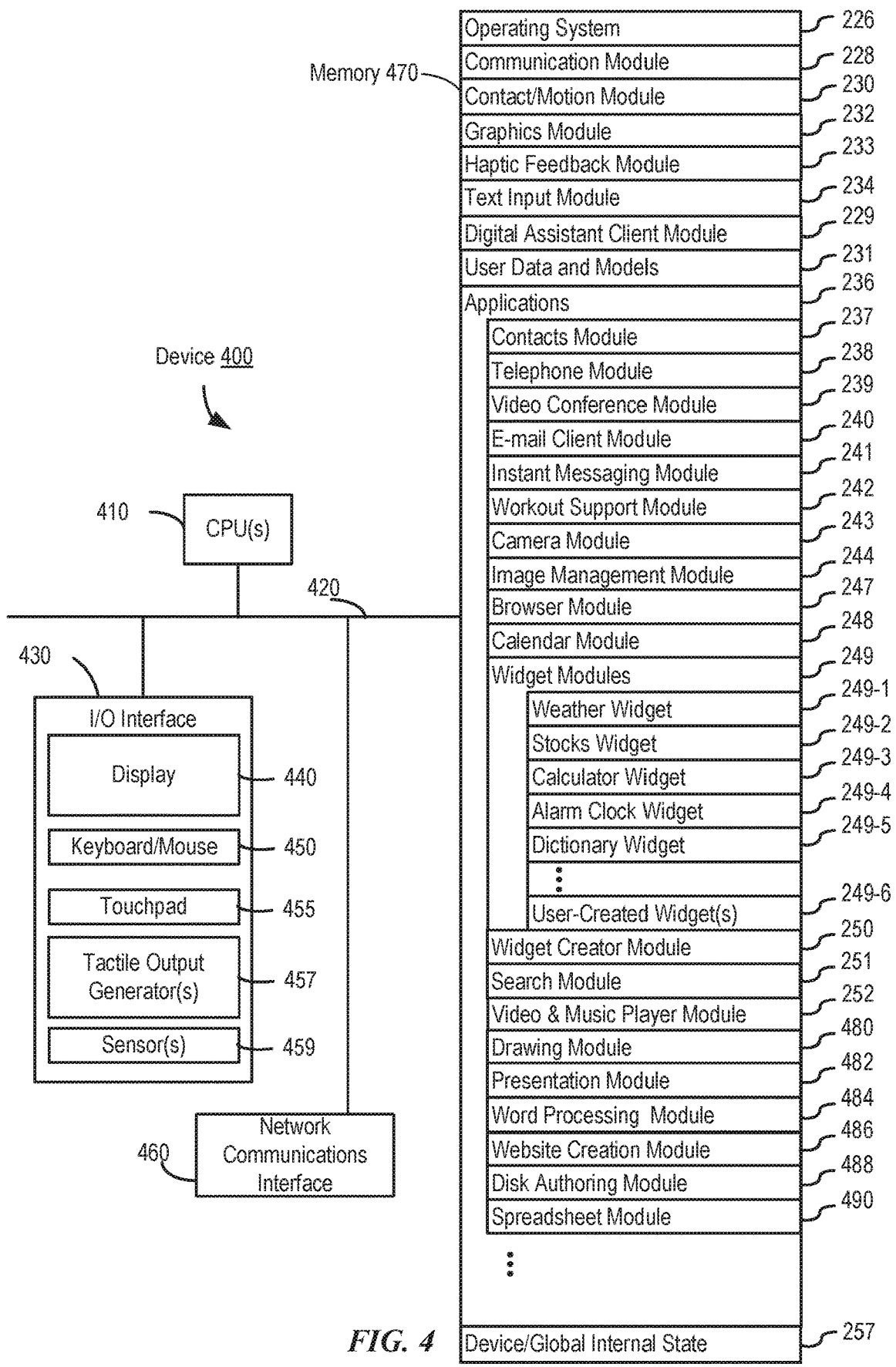
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is optionally, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 optionally include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which optionally include one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are, optionally, stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are, optionally, used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are, optionally, used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout, and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that are, optionally, downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 208, touch screen 212, display controller 256, contact/motion module 230, graphics module 232, text input module 234, and browser module 247, the widget creator module 250 are, optionally, used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are, optionally, used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is optionally, combined with music player module into a single module (e.g., video and music player module 252, FIG. 2A). In some embodiments, memory 202 optionally stores a subset of the modules and data structures identified above. Furthermore, memory 202 optionally stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is, optionally, reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
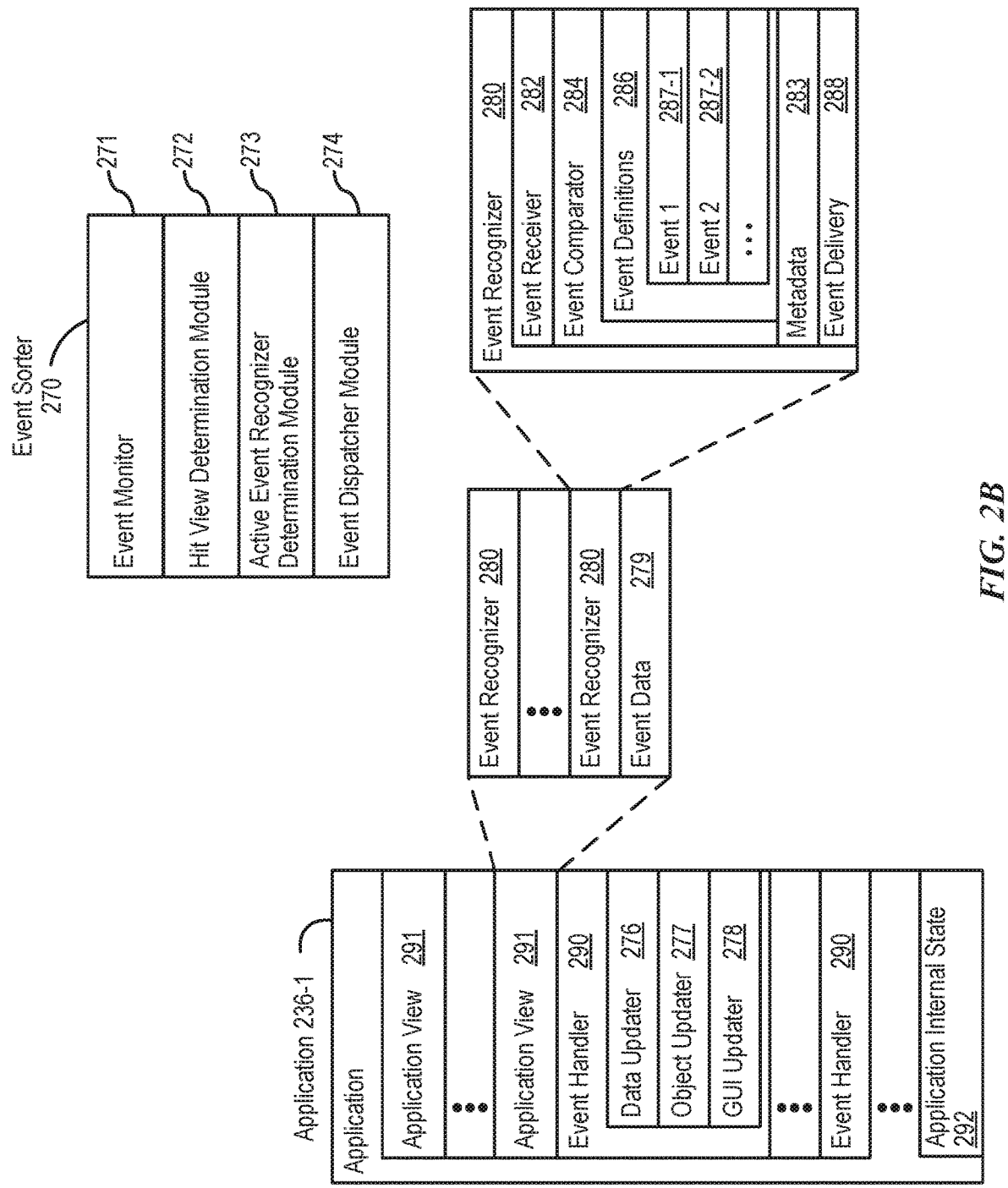
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which optionally include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
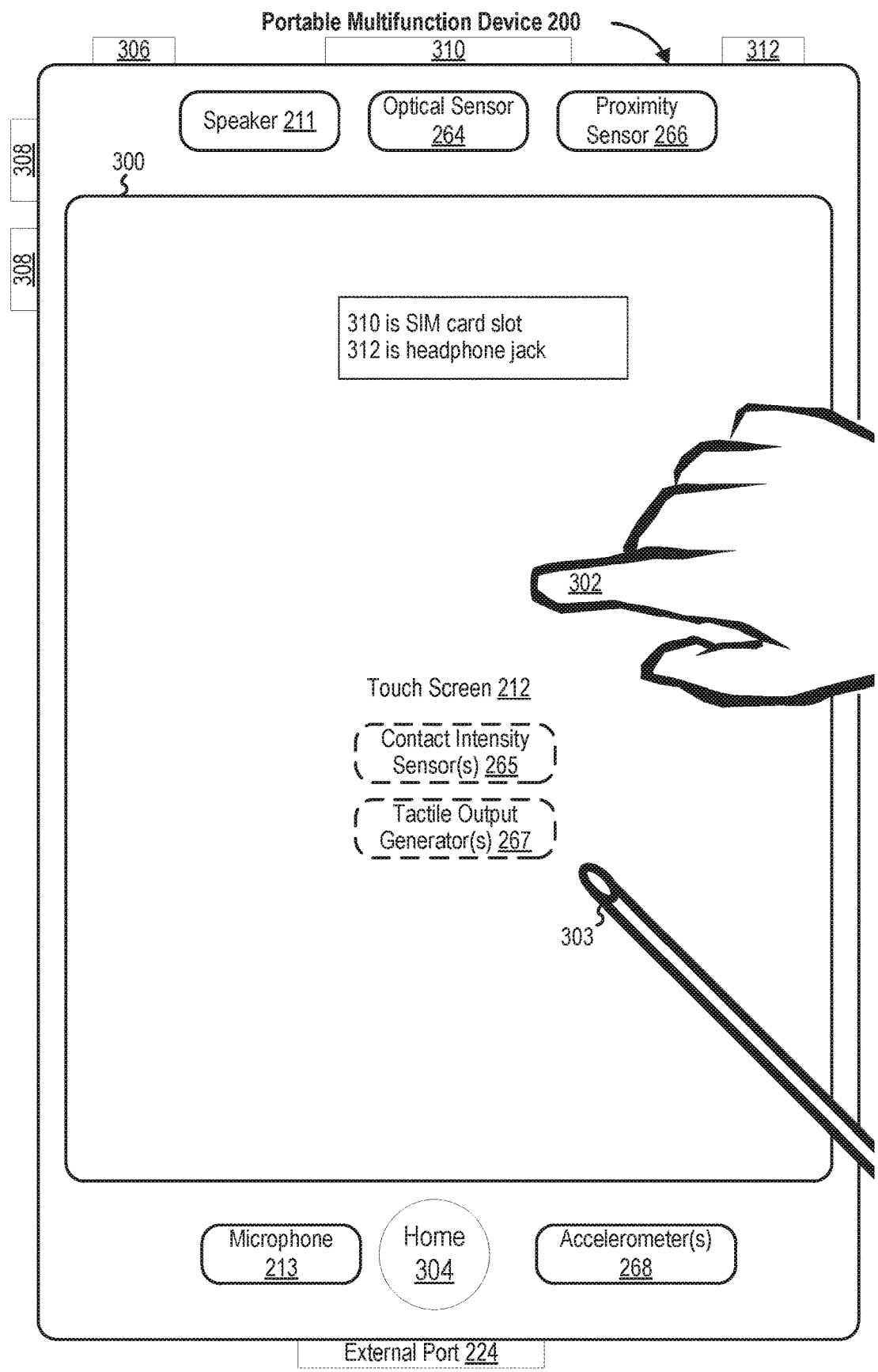
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 optionally also includes one or more physical buttons, such as "home" or menu button 304. As described previously, menu button 304 is, optionally, used to navigate to any application 236 in a set of applications that are, optionally, executed on device 200. Alternatively, in some embodiments, the menu button is implemented as a soft key in a GUI displayed on touch screen 212.

In some embodiments, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 470 optionally stores a subset of the modules and data structures identified above. Furthermore, memory 470 optionally stores additional modules and data structures not described above.

Attention is now directed towards embodiments of user interfaces that are, optionally, implemented on, for example, portable multifunction device 200.

Figure 5A:
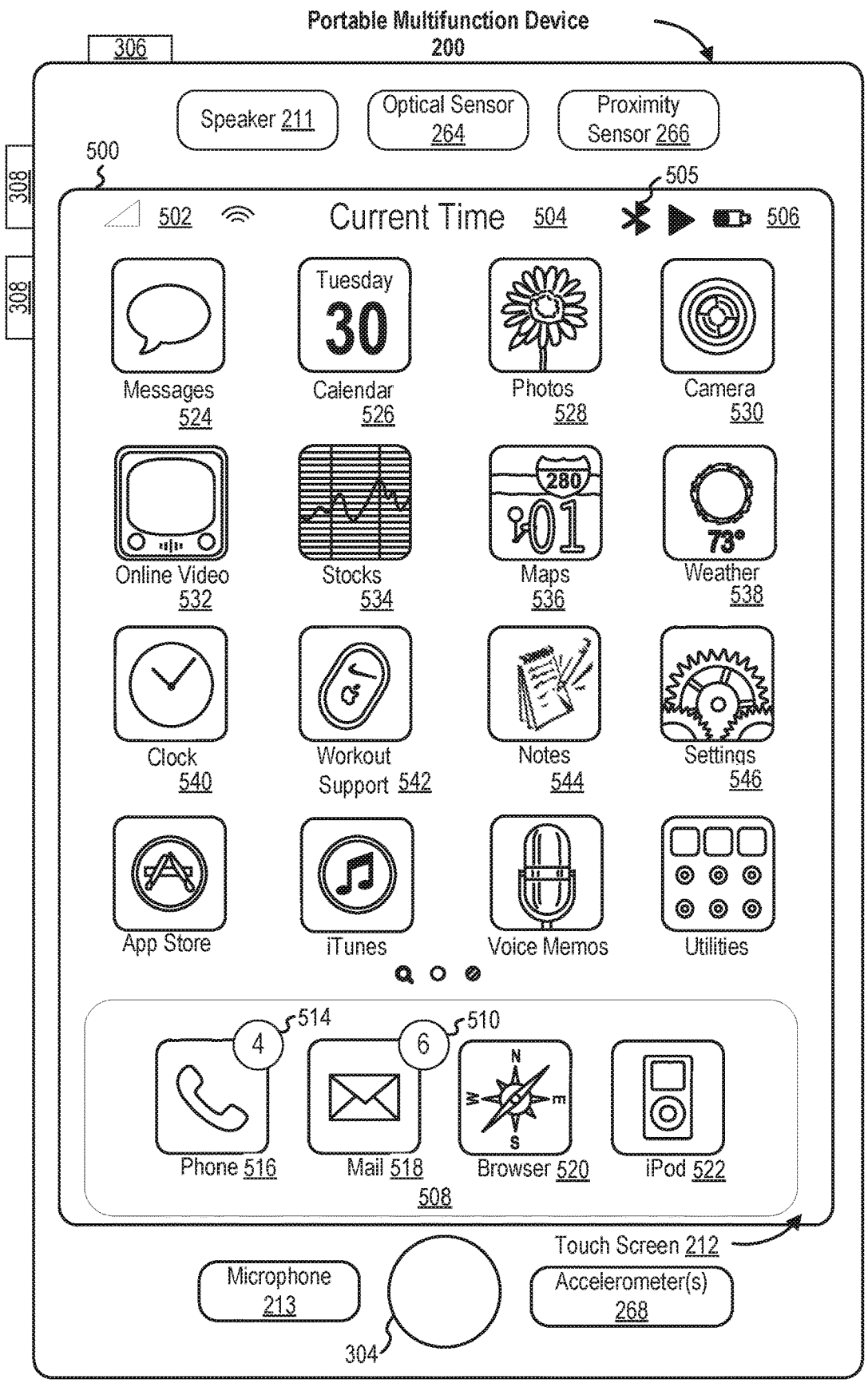
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are, optionally, implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:

Icon 516 for telephone module 238, labeled "Phone," which optionally includes an indicator 514 of the number of missed calls or voicemail messages;

Icon 518 for e-mail client module 240, labeled "Mail," which optionally includes an indicator 510 of the number of unread e-mails;

Icon 520 for browser module 247, labeled "Browser;" and

Icon 522 for video and music player module 252, also referred to as iPod (trademark of Apple Inc.) module 252, labeled "iPod;" and Icons for other applications, such as:

Icon 524 for IM module 241, labeled "Messages;"

Icon 526 for calendar module 248, labeled "Calendar;"

Icon 528 for image management module 244, labeled "Photos;"

Icon 530 for camera module 243, labeled "Camera;"

Icon 532 for online video module 255, labeled "Online Video;"

Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
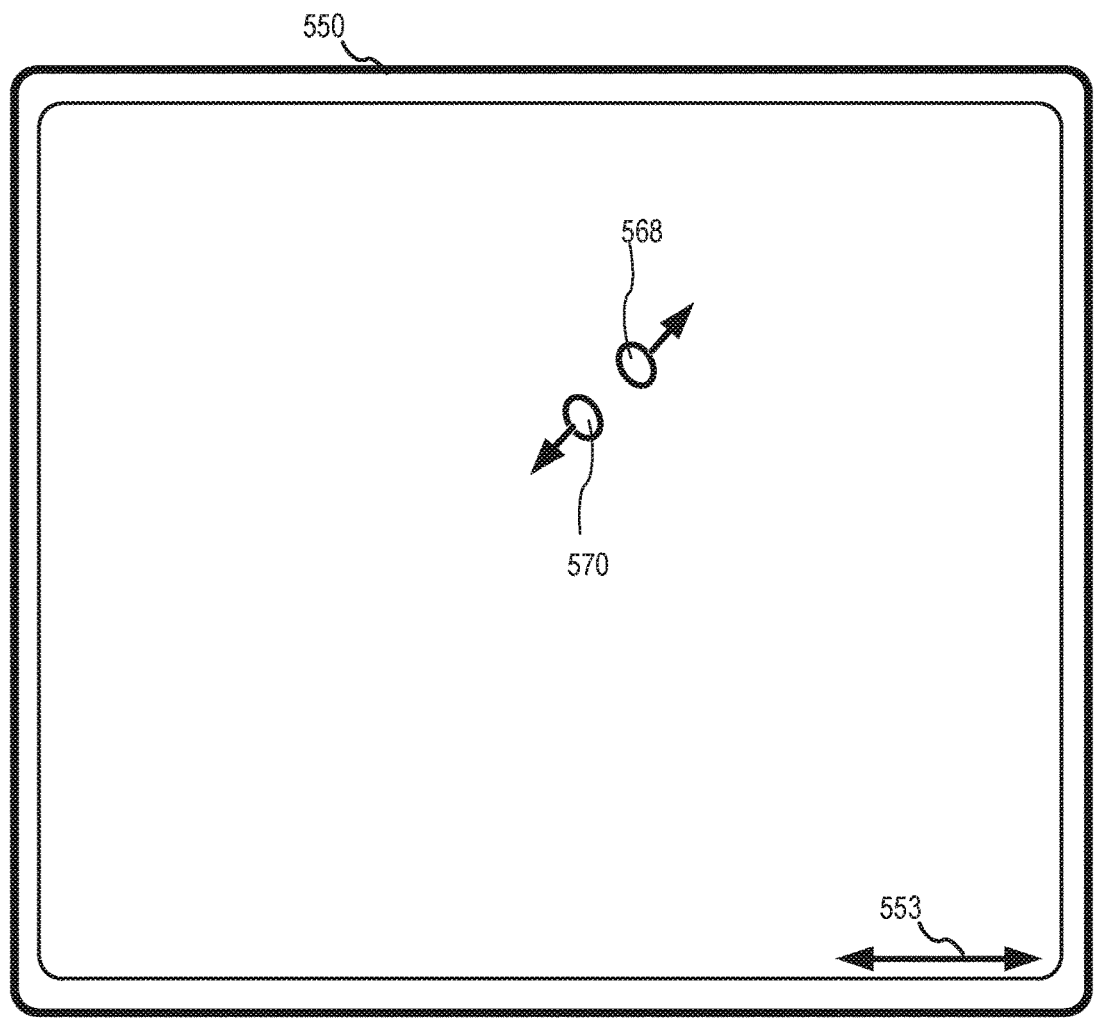
FIG. 5B illustrates an exemplary user interface for a multifunction device with a touch-sensitive surface that is separate from the display, according to various examples.
Figure 5B:
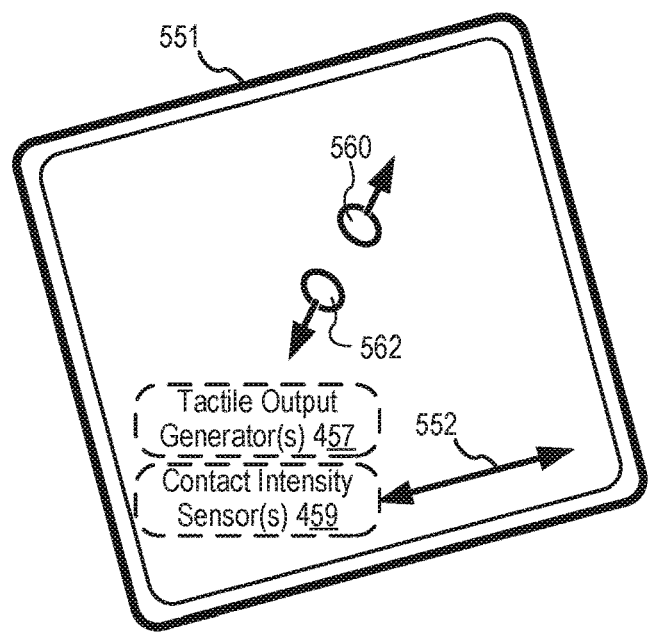

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples that follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
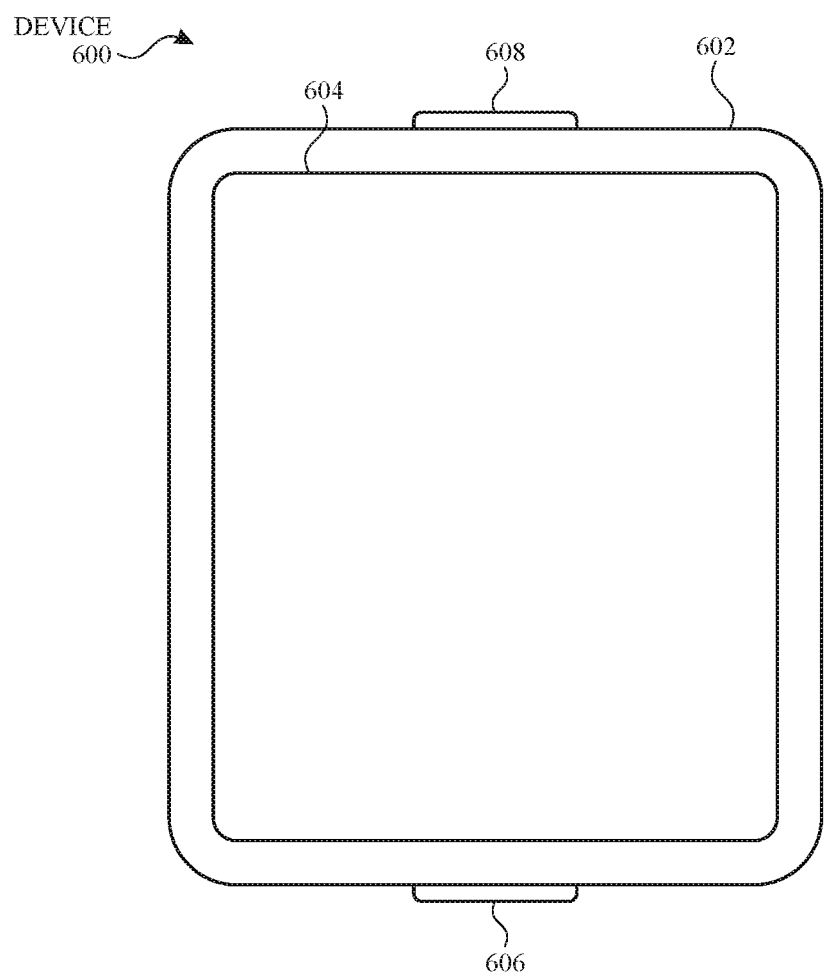
FIG. 6A illustrates a personal electronic device, according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) optionally includes one or more intensity sensors for detecting intensity of contacts (e.g., touches) being applied. The one or more intensity sensors of touch screen 604 (or the touch-sensitive surface) can provide output data that represents the intensity of touches. The user interface of device 600 responds to touches based on their intensity, meaning that touches of different intensities can invoke different user interface operations on device 600.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
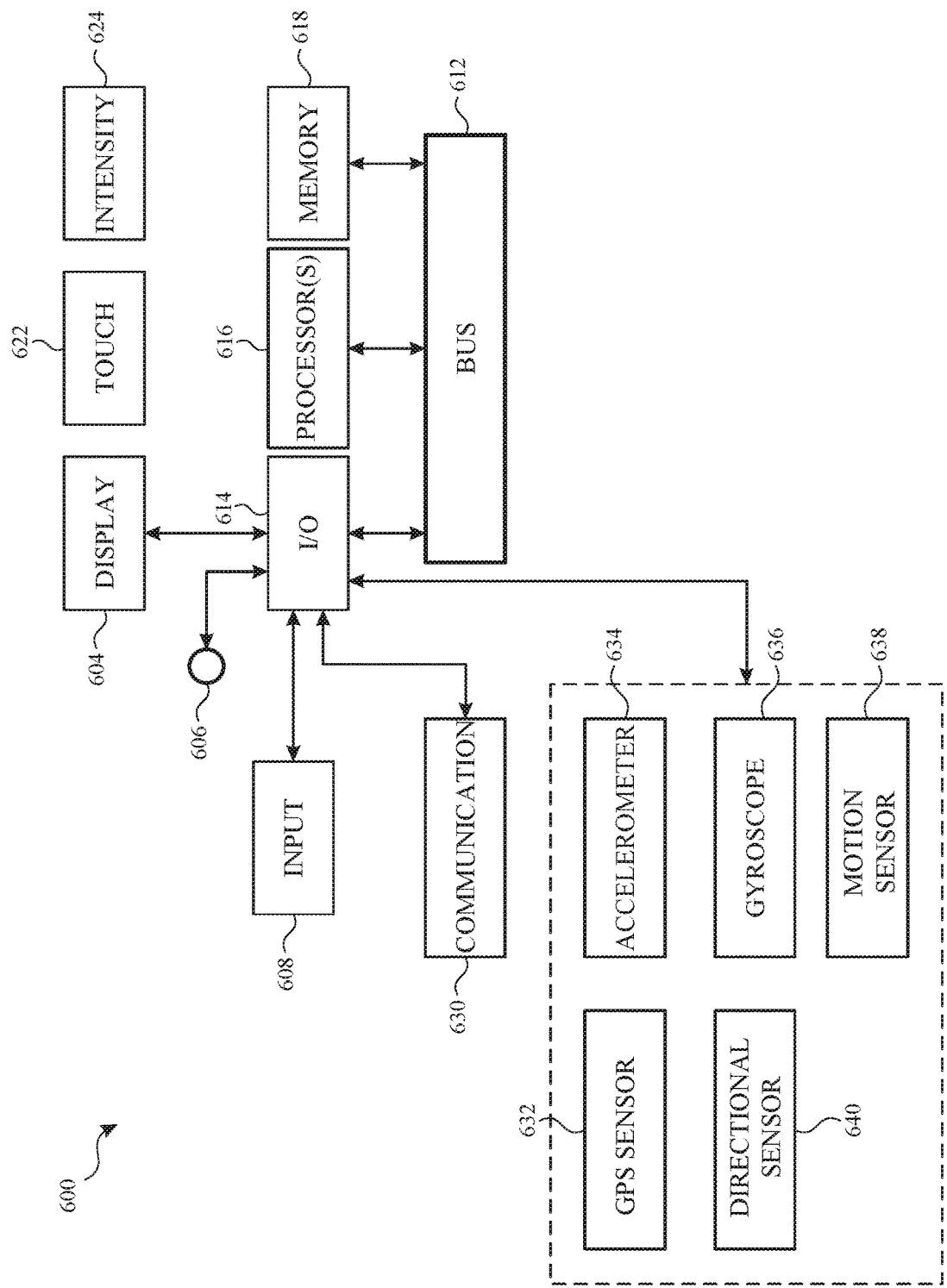
FIG. 6B is a block diagram illustrating a personal electronic device, according to various examples.

FIG. 6B depicts exemplary personal electronic device 600. In some embodiments, device 600 optionally includes some or all of the components described with respect to FIGS. 2A, 2B, and 4. Device 600 has bus 612 that operatively couples I/O section 614 with one or more computer processors 616 and memory 618. I/O section 614 is optionally connected to display 604, which can have touch-sensitive component 622 and, optionally, intensity sensor 624 (e.g., contact intensity sensor). In addition, I/O section 614 is optionally connected with communication unit 630 for receiving application and operating system data, using Wi-Fi, Bluetooth, near field communication (NFC), cellular, and/or other wireless communication techniques. Device 600 optionally includes input mechanisms 606 and/or 608. Input mechanism 606 is, optionally, a rotatable input device or a depressible and rotatable input device, for example. Input mechanism 608 is, optionally, a button, in some examples.

Input mechanism 608 is, optionally, a microphone, in some examples. Personal electronic device 600 optionally includes various sensors, such as GPS sensor 632, accelerometer 634, directional sensor 640 (e.g., compass), gyroscope 636, motion sensor 638, and/or a combination thereof, all of which are, optionally, operatively connected to I/O section 614.

Memory 618 of personal electronic device 600 can include one or more non-transitory computer-readable storage media, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In some examples, the storage medium is a non-transitory computer-readable storage medium. The non-transitory computer-readable storage medium any type of storage including but not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 600 is not limited to the components and configuration of FIG. 6B, but can include other or additional components in multiple configurations.

Figure 10A:
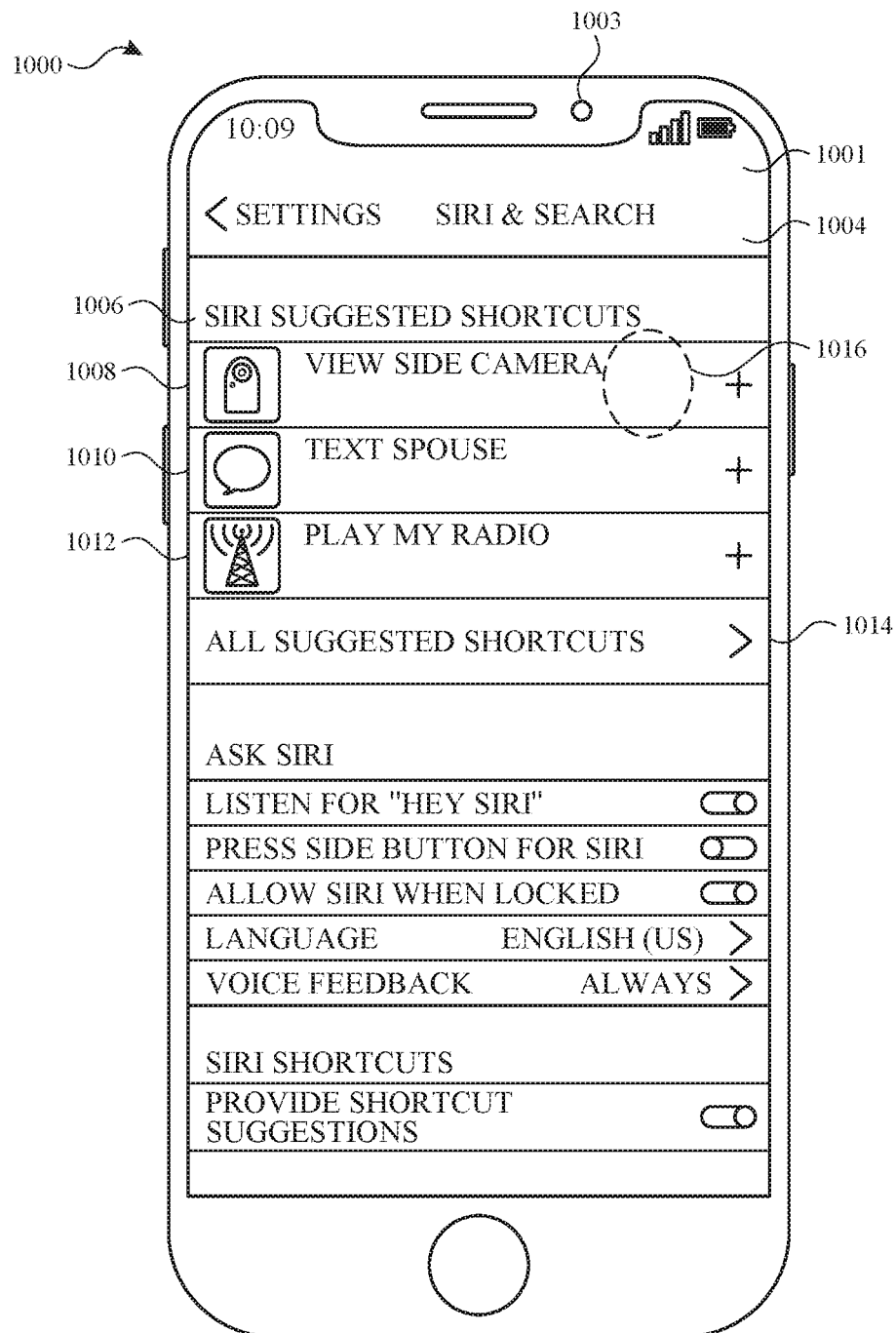
FIGS. 10A-10AJ illustrate exemplary user interfaces for providing voice shortcuts, according to various examples.

As used here, the term "affordance" refers to a user-interactive graphical user interface object that is, optionally, displayed on the display screen of devices 200, 400, 600, 800, 1000, 1600 and/or 1800 (FIGS. 2A, 4, and 6A-B, FIGS. 8A-8AF, FIGS. 10A-10AJ, FIGS. 16A-16S, 18A-18D). For example, an image (e.g., icon), a button, and text (e.g., hyperlink) each optionally constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation)

rather than being used to determine whether to perform a first operation or a second operation.

Figure 6C:
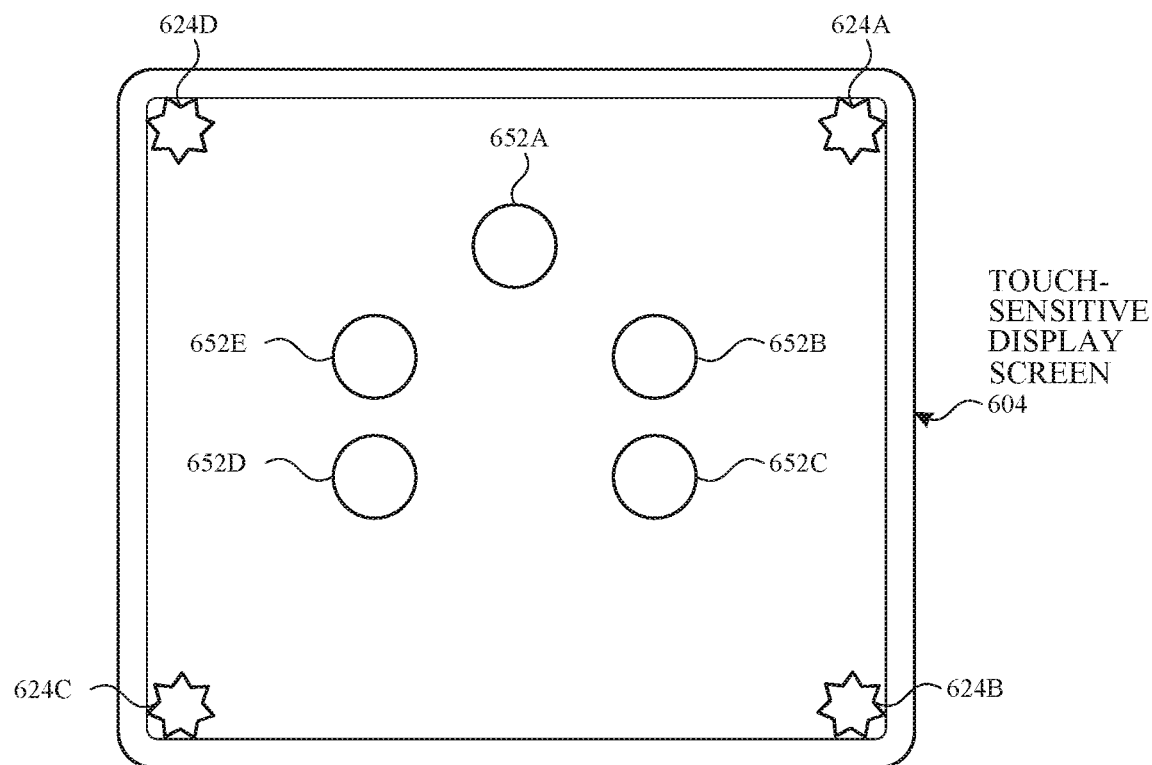
FIGS. 6C-6D illustrate exemplary components of a personal electronic device having a touch-sensitive display and intensity sensors in accordance with some embodiments.
Figure 6C:
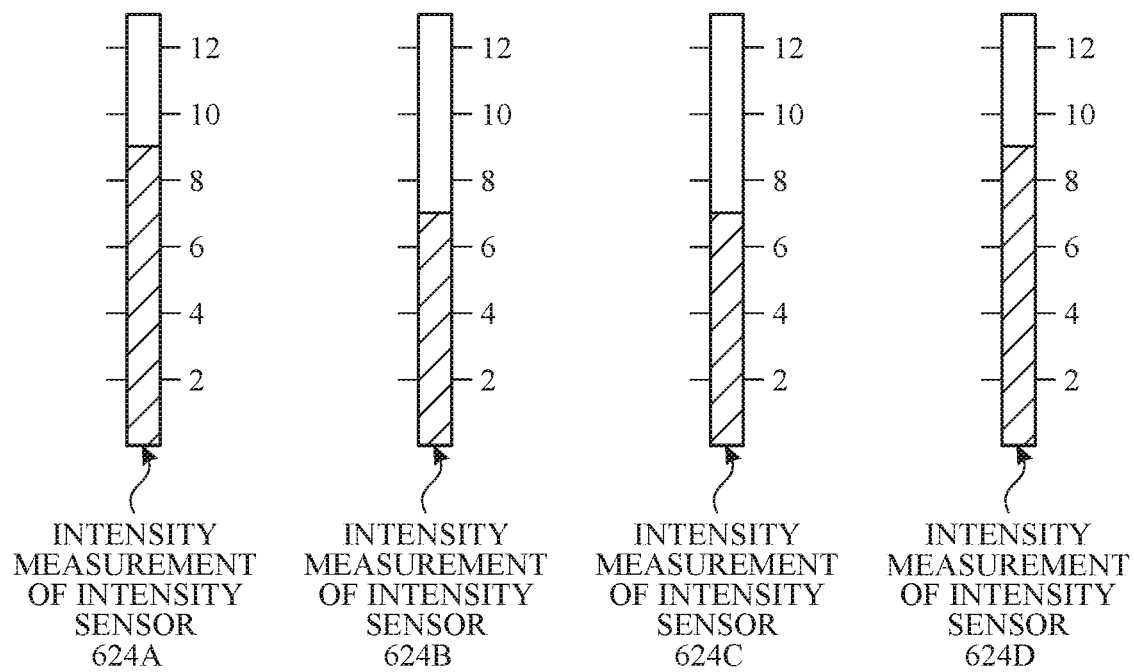
Figure 6D:
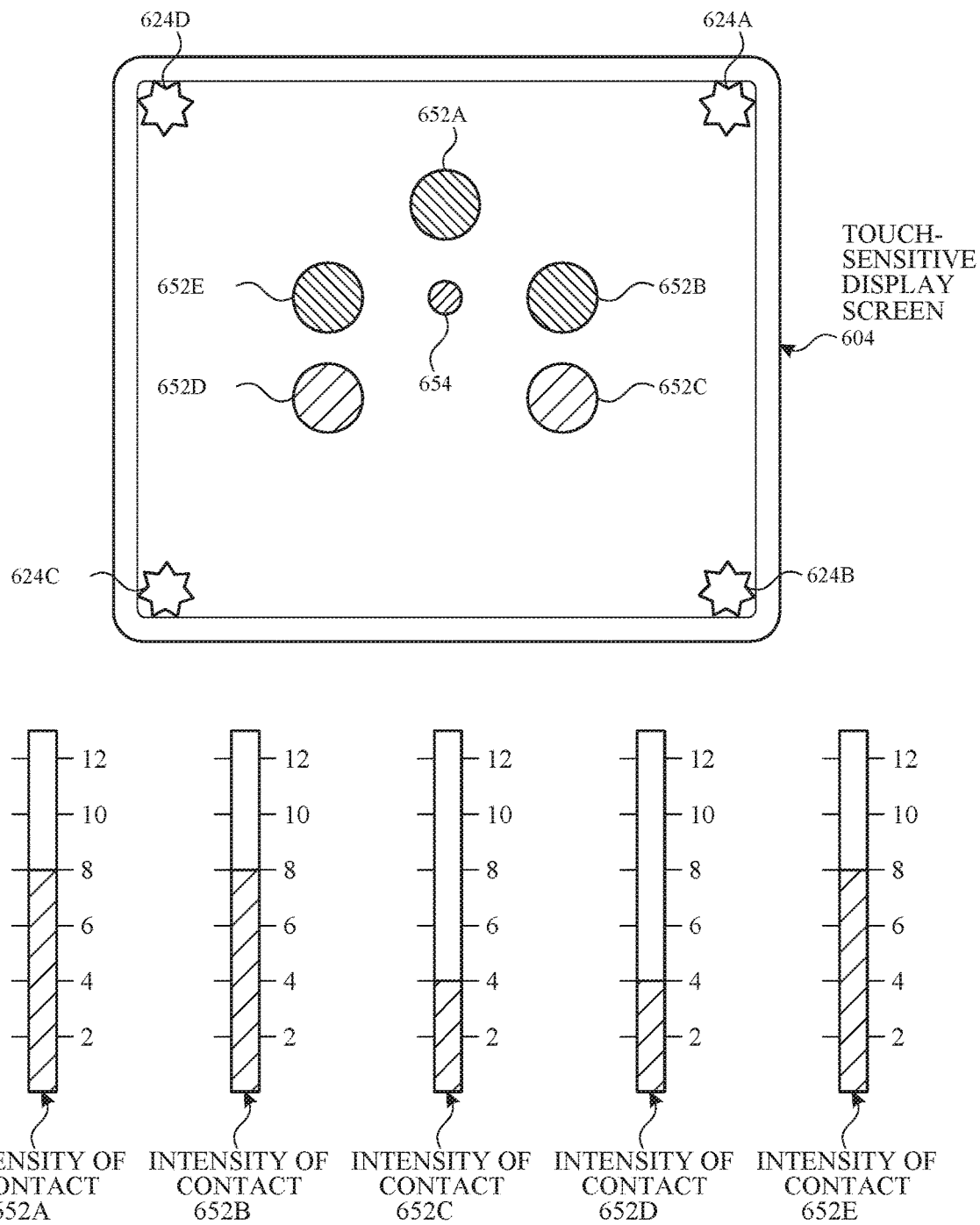

FIG. 6C illustrates detecting a plurality of contacts 652A-652E on touch-sensitive display screen 604 with a plurality of intensity sensors 624A-624D. FIG. 6C additionally includes intensity diagrams that show the current intensity measurements of the intensity sensors 624A-624D relative to units of intensity. In this example, the intensity measurements of intensity sensors 624A and 624D are each 9 units of intensity, and the intensity measurements of intensity sensors 624B and 624C are each 7 units of intensity. In some implementations, an aggregate intensity is the sum of the intensity measurements of the plurality of intensity sensors 624A-624D, which in this example is 32 intensity units. In some embodiments, each contact is assigned a respective intensity that is a portion of the aggregate intensity. FIG. 6D illustrates assigning the aggregate intensity to contacts 652A-652E based on their distance from the center of force 654. In this example, each of contacts 652A, 652B, and 652E are assigned an intensity of contact of 8 intensity units of the aggregate intensity, and each of contacts 652C and 652D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 6C-6D can be performed using an electronic device similar or identical to device 104, 200, 400, or 600. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 6C-6D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 6E:
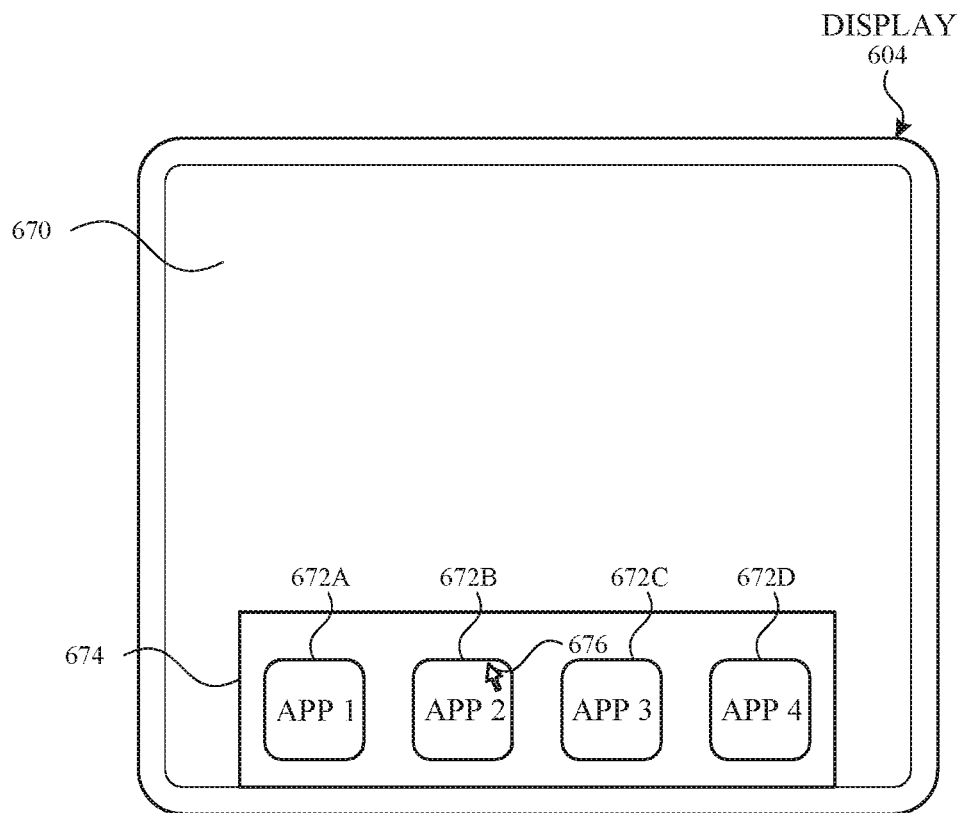
FIGS. 6E-6H illustrate exemplary components and user interfaces of a personal electronic device in accordance with some embodiments.
Figure 6E:
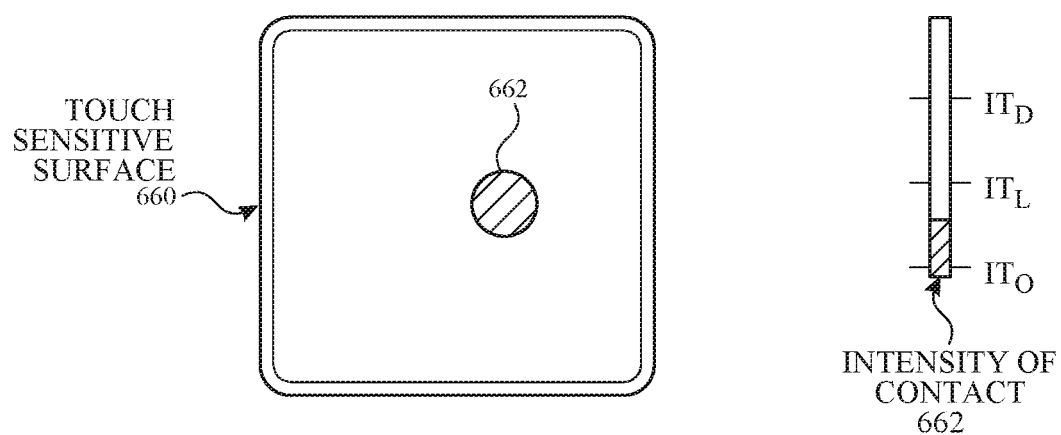
Figure 6F:
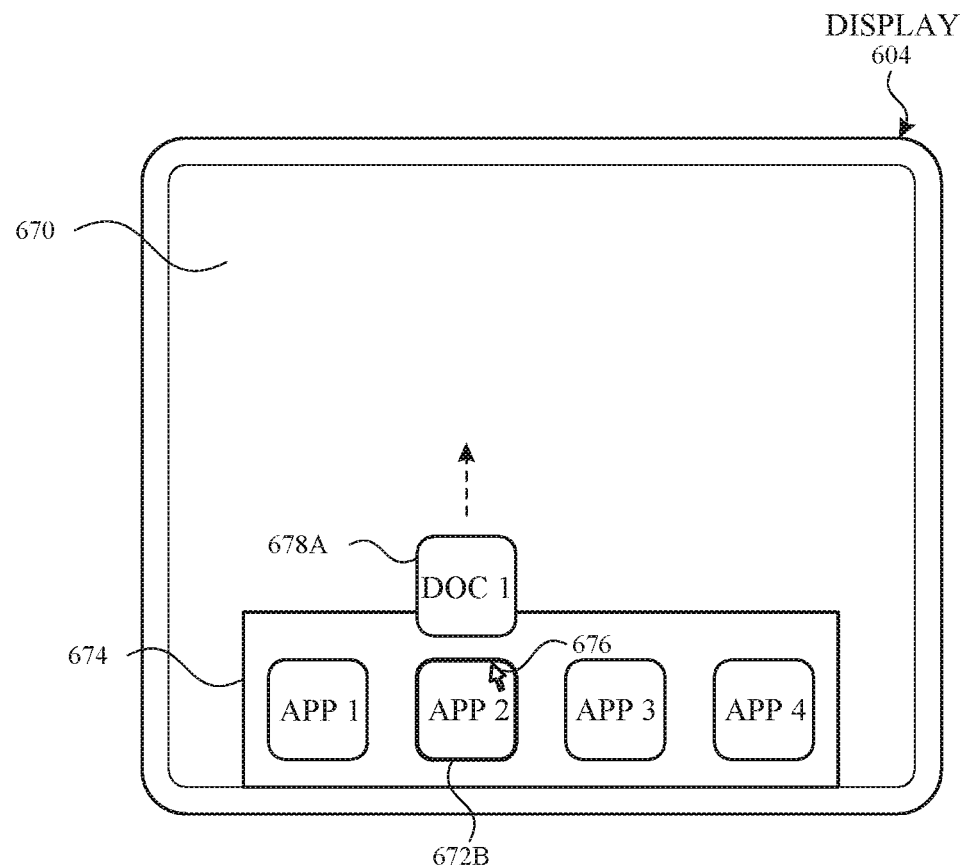
Figure 6F:
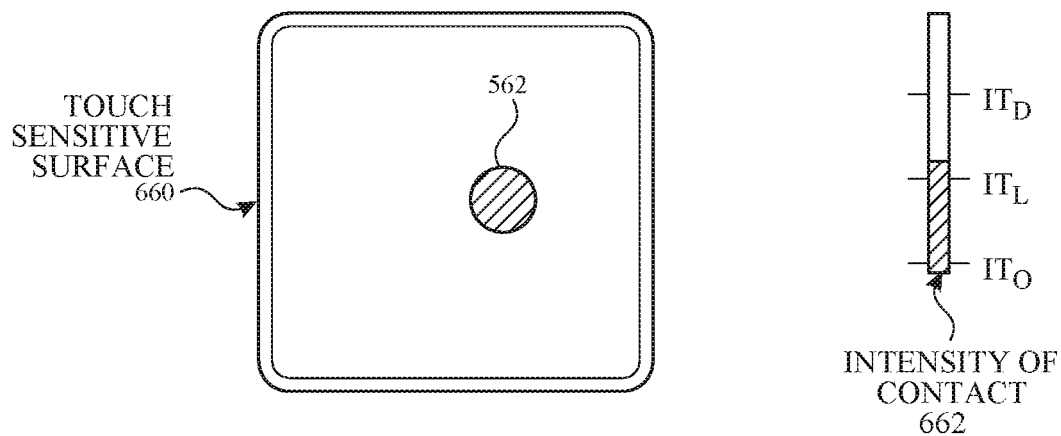
Figure 6G:
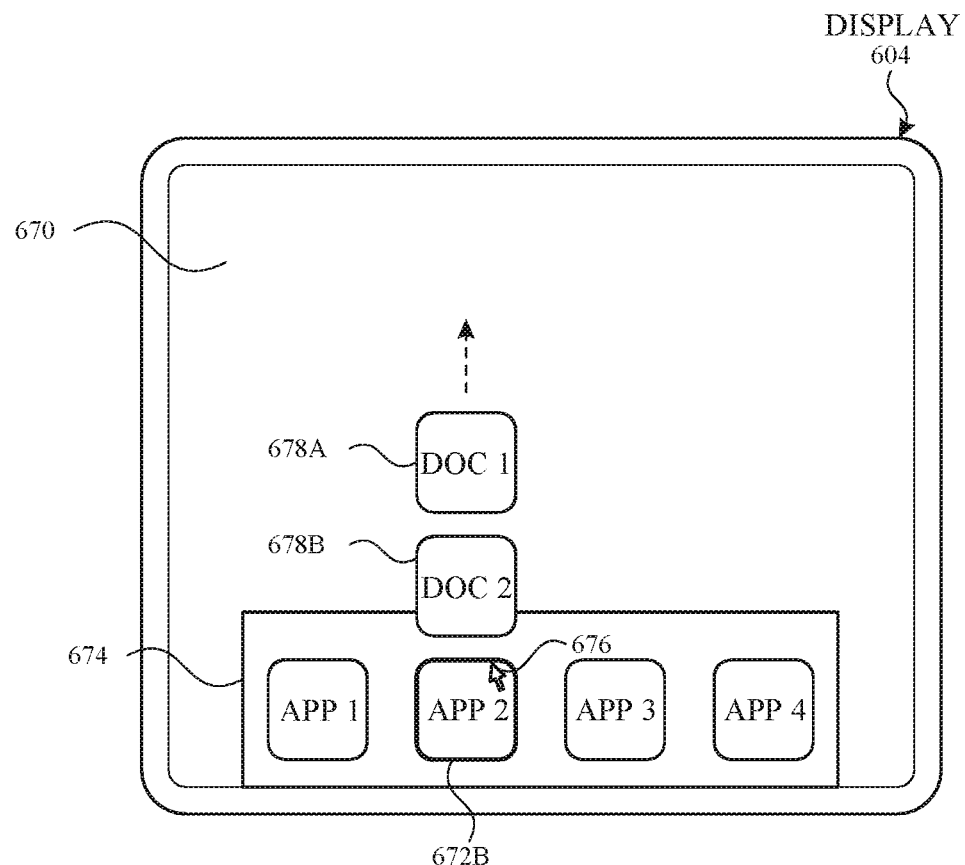
Figure 6G:
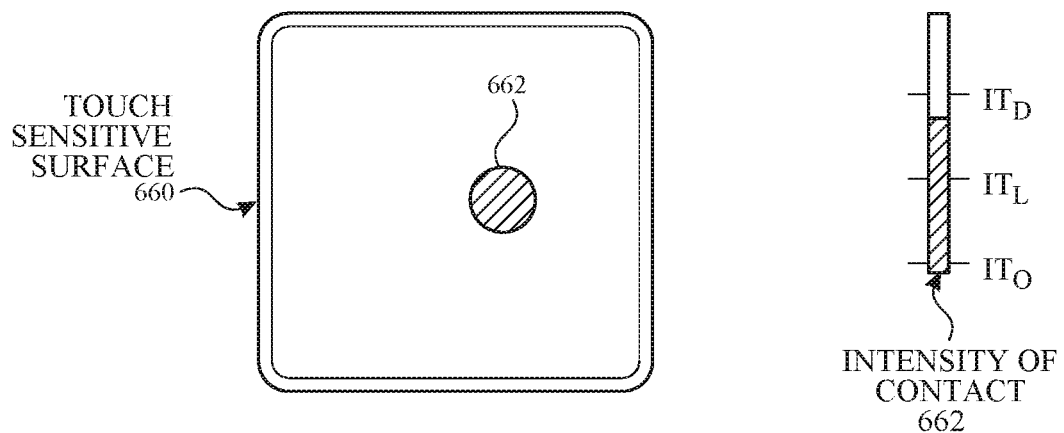
Figure 6H:
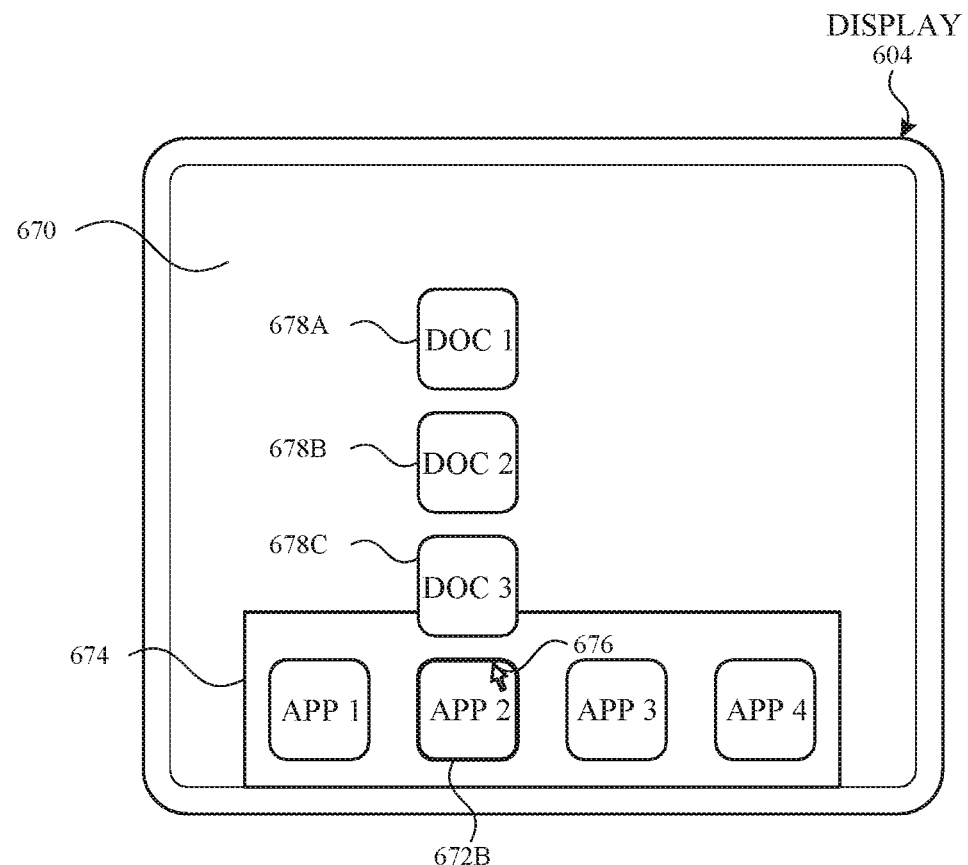
Figure 6H:
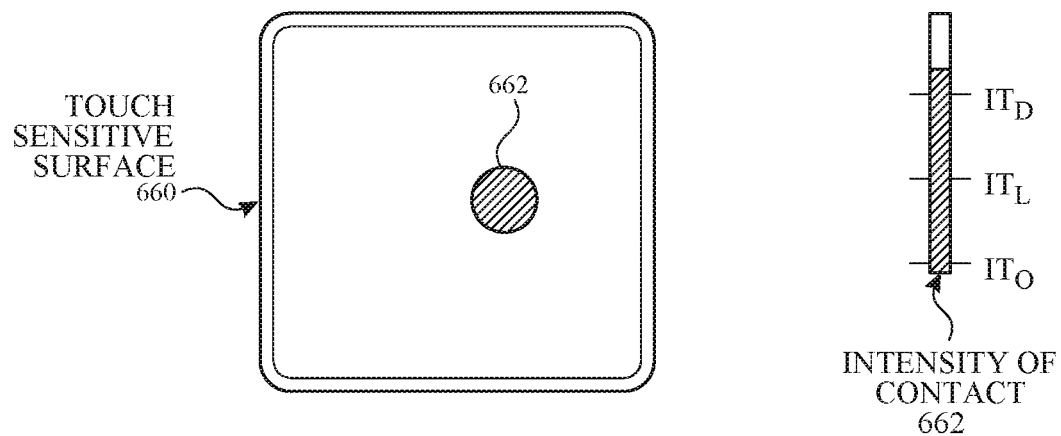

FIGS. 6E-6H illustrate detection of a gesture that includes a press input that corresponds to an increase in intensity of a contact 662 from an intensity below a light press intensity threshold (e.g., "$IT_L$") in FIG. 6E, to an intensity above a deep press intensity threshold (e.g., "$IT_D$") in FIG. 6H. The gesture performed with contact 662 is detected on touch-sensitive surface 660 while cursor 676 is displayed over application icon 672B corresponding to App 2, on a displayed user interface 670 that includes application icons 672A-672D displayed in predefined region 674. In some embodiments, the gesture is detected on touch-sensitive display 604. The intensity sensors detect the intensity of contacts on touch-sensitive surface 660. The device determines that the intensity of contact 662 peaked above the deep press intensity threshold (e.g., "$IT_D$"). Contact 662 is maintained on touch-sensitive surface 660. In response to the detection of the gesture, and in accordance with contact 662 having an intensity that goes above the deep press intensity threshold (e.g., "$IT_D$") during the gesture, reduced-scale representations 678A-678C (e.g., thumbnails) of recently opened documents for App 2 are displayed, as shown in FIGS. 6F-6H. In some embodiments, the intensity, which is compared to the one or more intensity thresholds, is the characteristic intensity of a contact. It should be noted that the intensity diagram for contact 662 is not part of a displayed user interface, but is included in FIGS. 6E-6H to aid the reader.

In some embodiments, the display of representations 678A-678C includes an animation. For example, representation 678A is initially displayed in proximity of application icon 672B, as shown in FIG. 6F. As the animation proceeds, representation 678A moves upward and representation 678B is displayed in proximity of application icon 672B, as shown in FIG. 6G. Then, representations 678A moves upward, 678B moves upward toward representation 678A, and representation 678C is displayed in proximity of application icon 672B, as shown in FIG. 6H. Representations 678A-678C form an array above icon 672B. In some embodiments, the animation progresses in accordance with an intensity of contact 662, as shown in FIGS. 6F-6G, where the representations 678A-678C appear and move upwards as the intensity of contact 662 increases toward the deep press intensity threshold (e.g., "$IT_D$"). In some embodiments, the intensity, on which the progress of the animation is based, is the characteristic intensity of the contact. The operations described with reference to FIGS. 6E-6H can be performed using an electronic device similar or identical to device 104, 200, 400, or 600.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 200, 400, and/or 600) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

3. Digital Assistant System

Figure 7A:
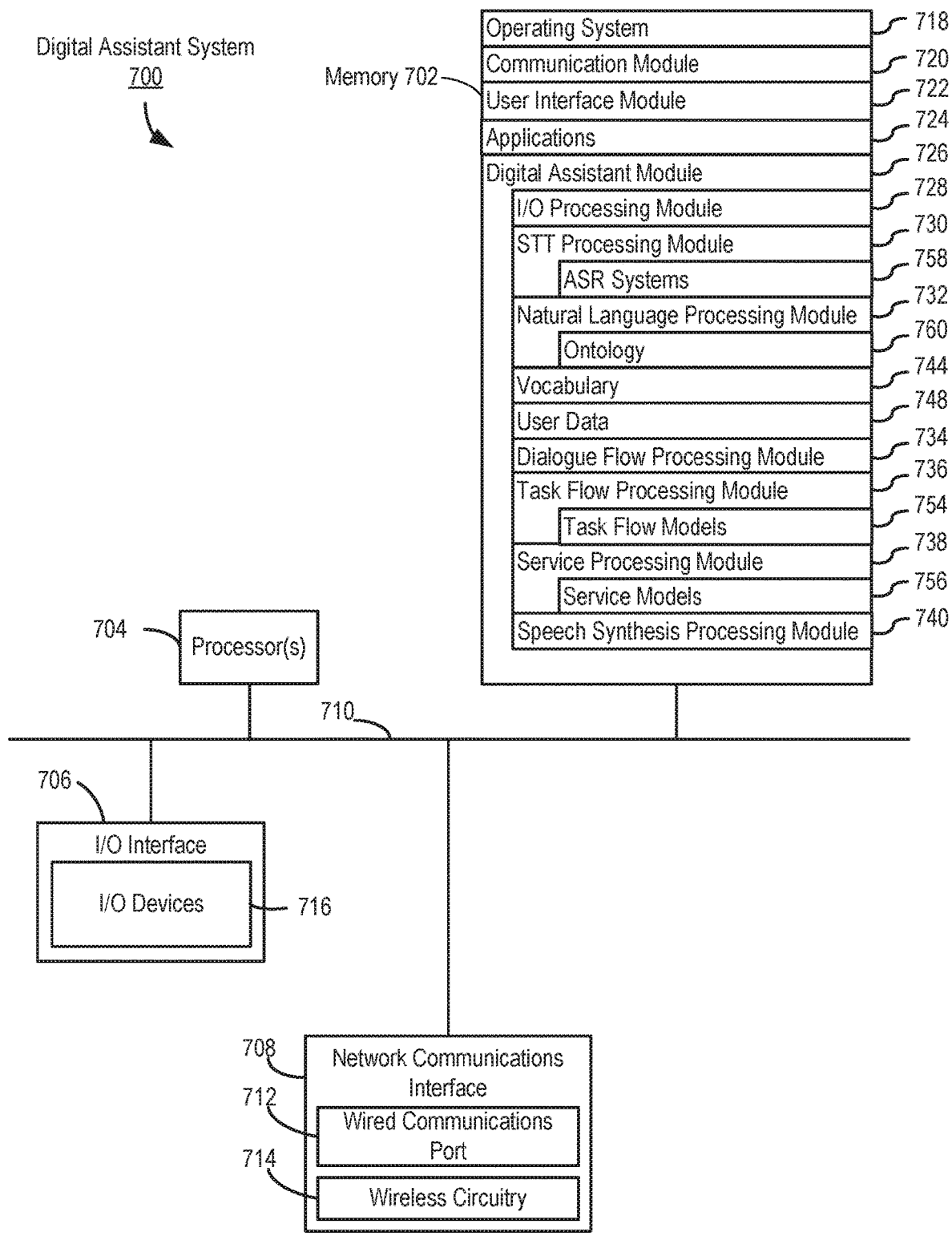
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 800, 1000, 1404, 1600, 1800) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 1200, and 1404 in FIGS. 2A, 4, 6A-H, 12, and 14 respectively. In some examples, digital assistant system 700 represents the server portion of a digital assistant implementation, and can interact with the user through a client-side portion residing on a user device (e.g., devices 104, 200, 400, 600, 800, 1000, 1404, 1600, 1800).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
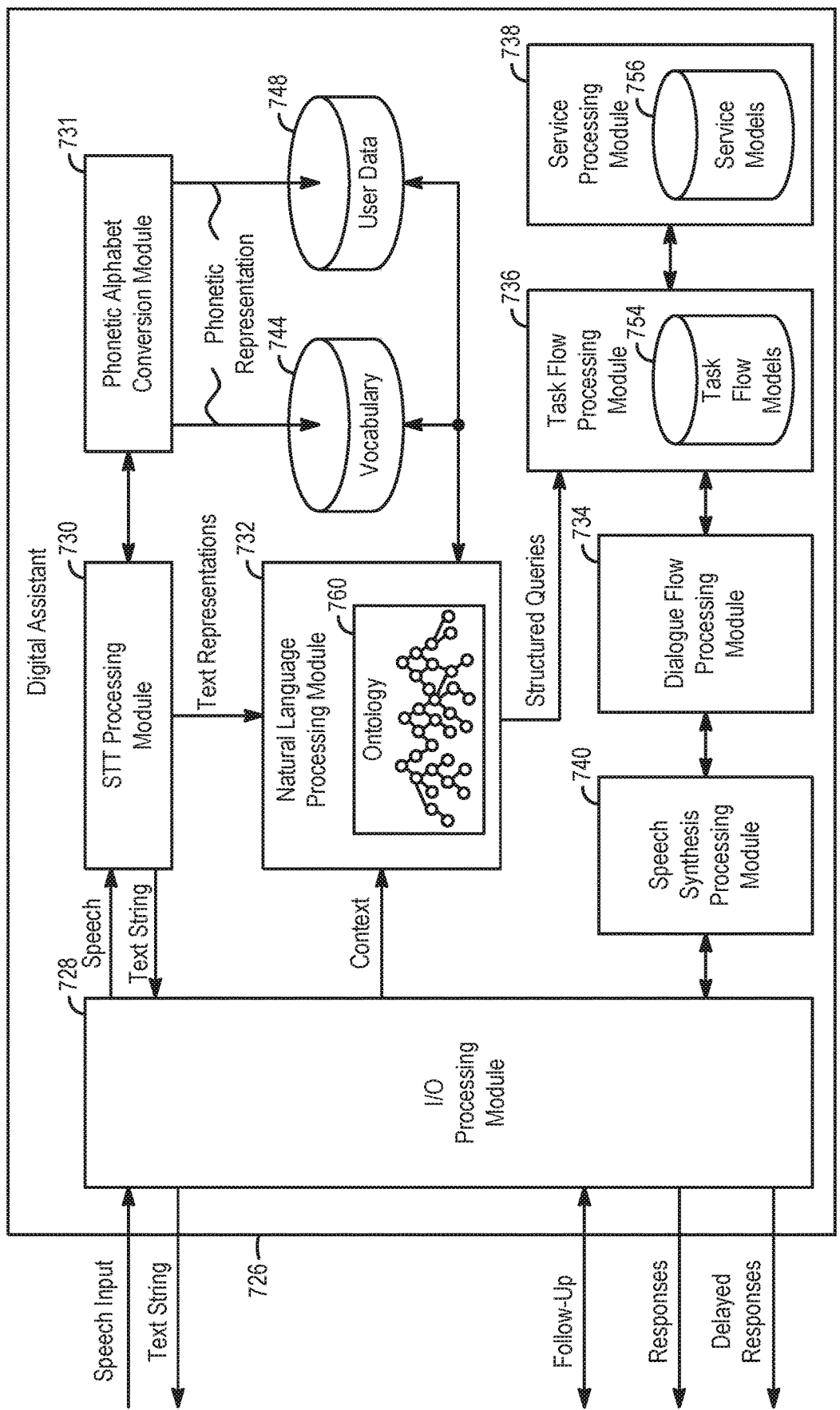
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪroʊ/ and /təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪroʊ/ is ranked higher than /təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪroʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪroʊ/ (associated with the United States) is ranked higher than the candidate pronunciation /təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /təˈmeɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
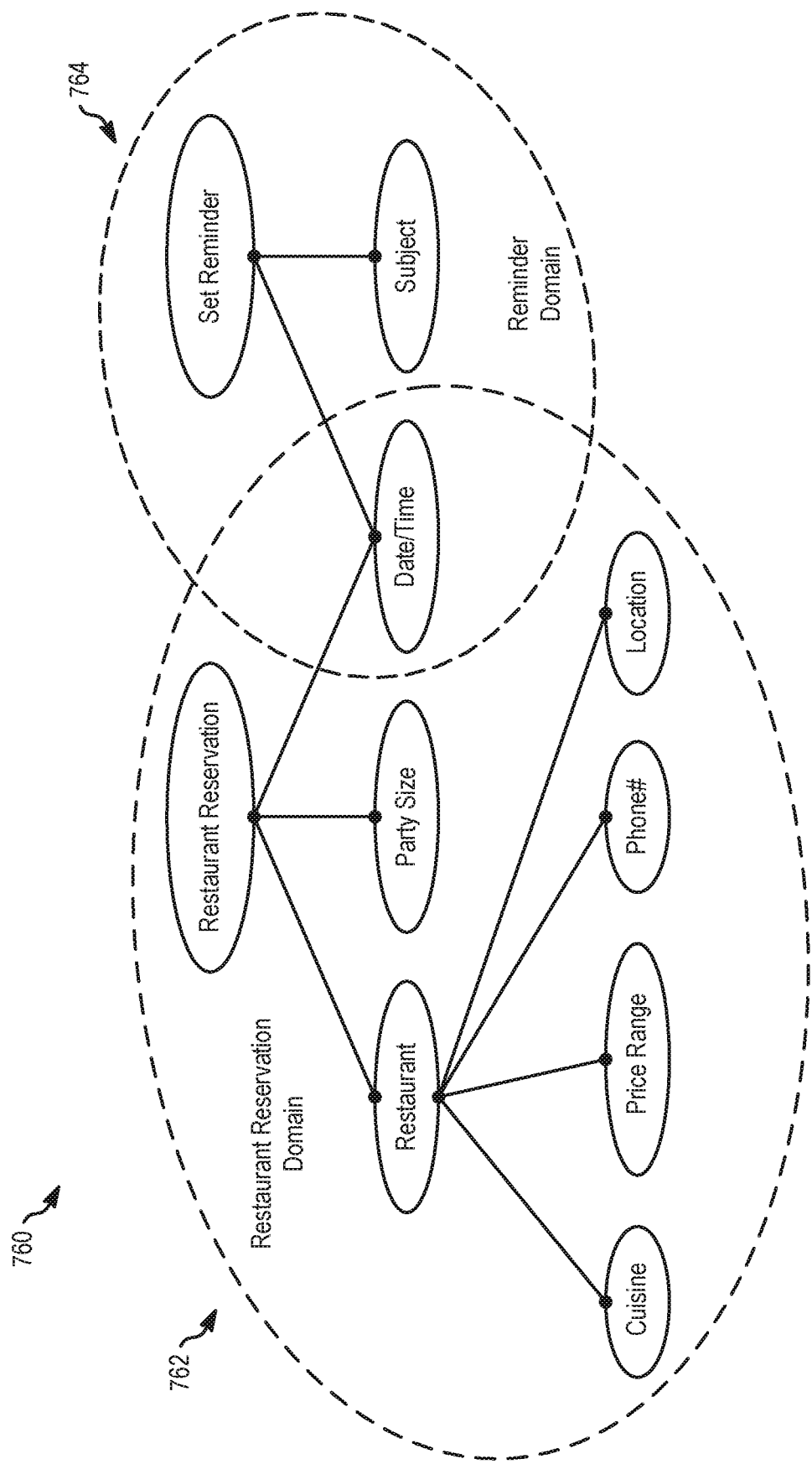
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as (Party Size) and (Date) are not specified in the structured query based on the information currently available. In some examples, natural language processing module 732 populates some parameters of the structured query with received contextual information. For example, in some examples, if the user requested a sushi restaurant "near me," natural language processing module 732 populates a (location) parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Accelerated Task Performance

Figure 8A:
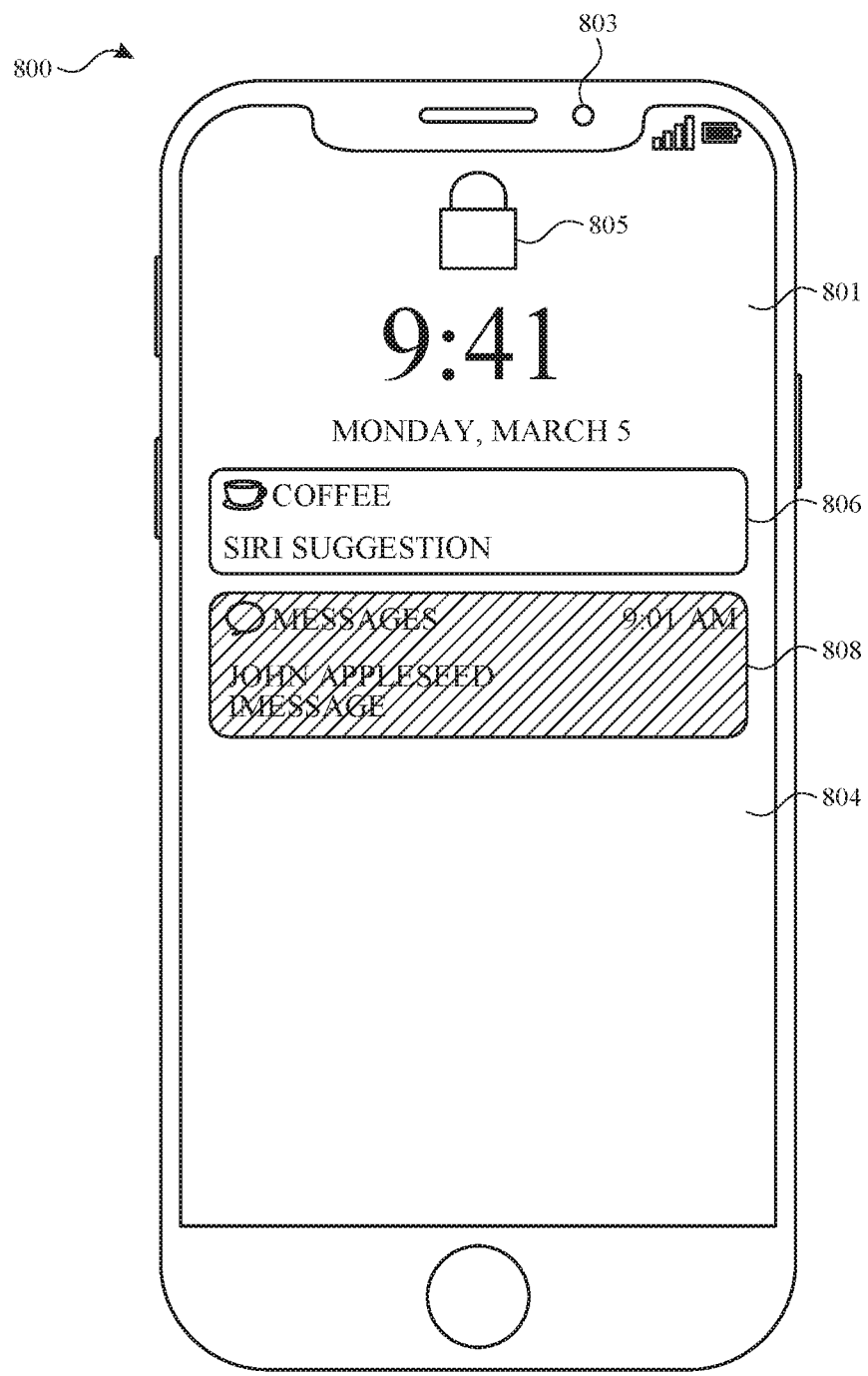
FIGS. 8A-8AF illustrate exemplary user interfaces for providing suggestions, according to various examples.

FIGS. 8A-8AF exemplary user interfaces for providing suggestions on an electronic device (e.g., device 104, device 122, device 200, device 600, or device 700), in accordance with some embodiments. The user interfaces in these figures are used to illustrate the processes described below, including the processes in FIGS. 9A-9B.

FIG. 8A illustrates an electronic device 800 (e.g., device 104, device 122, device 200, device 600, or device 700). In the non-limiting exemplary embodiment illustrated in FIGS. 8A-8AF, electronic device 800 is a smartphone. In other embodiments, electronic device 800 can be a different type of electronic device, such as a wearable device (e.g., a smartwatch). In some examples, electronic device 800 has a display 801, one or more input devices (e.g., touchscreen of display 801, a button, a microphone), and a wireless communication radio. In some examples, the electronic device 800 includes a plurality of cameras. In some examples, the electronic device includes only one camera. In some examples, the electronic device includes one or more biometric sensors (e.g., biometric sensor 803) which, optionally, include a camera, such as an infrared camera, a thermographic camera, or a combination thereof.

In FIG. 8A, the electronic device 800 displays, on display 801, a lock screen interface, such as the lock screen interface 804, while the electronic device is in a locked state. The lock screen interface 804 includes a suggestion affordance 806 and a notification 808. As shown, the suggestion affordance 806 is associated with an application named "Coffee" and the notification 808 is a message notification associated with a messaging application indicating that the electronic device has received a new message from a contact stored on the electronic device ("John Appleseed"). In some examples, an application (e.g., third-party application) may specify the manner in which a suggestion affordance is displayed. An application may specify the color of a suggestion affordance, for instance. In some examples, while in the locked state, the electronic device 800 operates in a secured manner. By way of example, while operating in the locked state, the electronic device 800 does not display contents of a task suggestion associated with the suggestion affordance 806 or a message associated with the notification 808. In some embodiments, the locked state further corresponds to restrictions on access to other data (including other applications) and/or limitations on permissible inputs.

In some examples, the suggestion affordance 806 is displayed in a first manner and the notification 808 is displayed in a second manner. As an example, suggestion affordance 806 is displayed using a first color and notification 808 is displayed using a second color different than the first color. As another example, the suggestion affordance 806 may be displayed using a first shape and the notification 808 may be displayed using a second shape different than the first shape.

In some examples, while operating in the locked state, the electronic device authenticates a user of the electronic device. A user may be authenticated, for instance, biometrically using biometric sensor 803 (e.g., facial recognition, fingerprint recognition) or in response to entry of a valid passcode (e.g., password, numerical passcode). In some examples, in response to authenticating the user, the electronic device 800 transitions to an unlocked state and displays lock screen interface 810. In some examples, while displaying the lock screen interface 810, the electronic device 800 displays an animation indicating that the electronic device 800 is transitioning from the locked state to the unlocked state (e.g., lock indicator 805 transitions from locked to unlocked state).

Figure 8B:
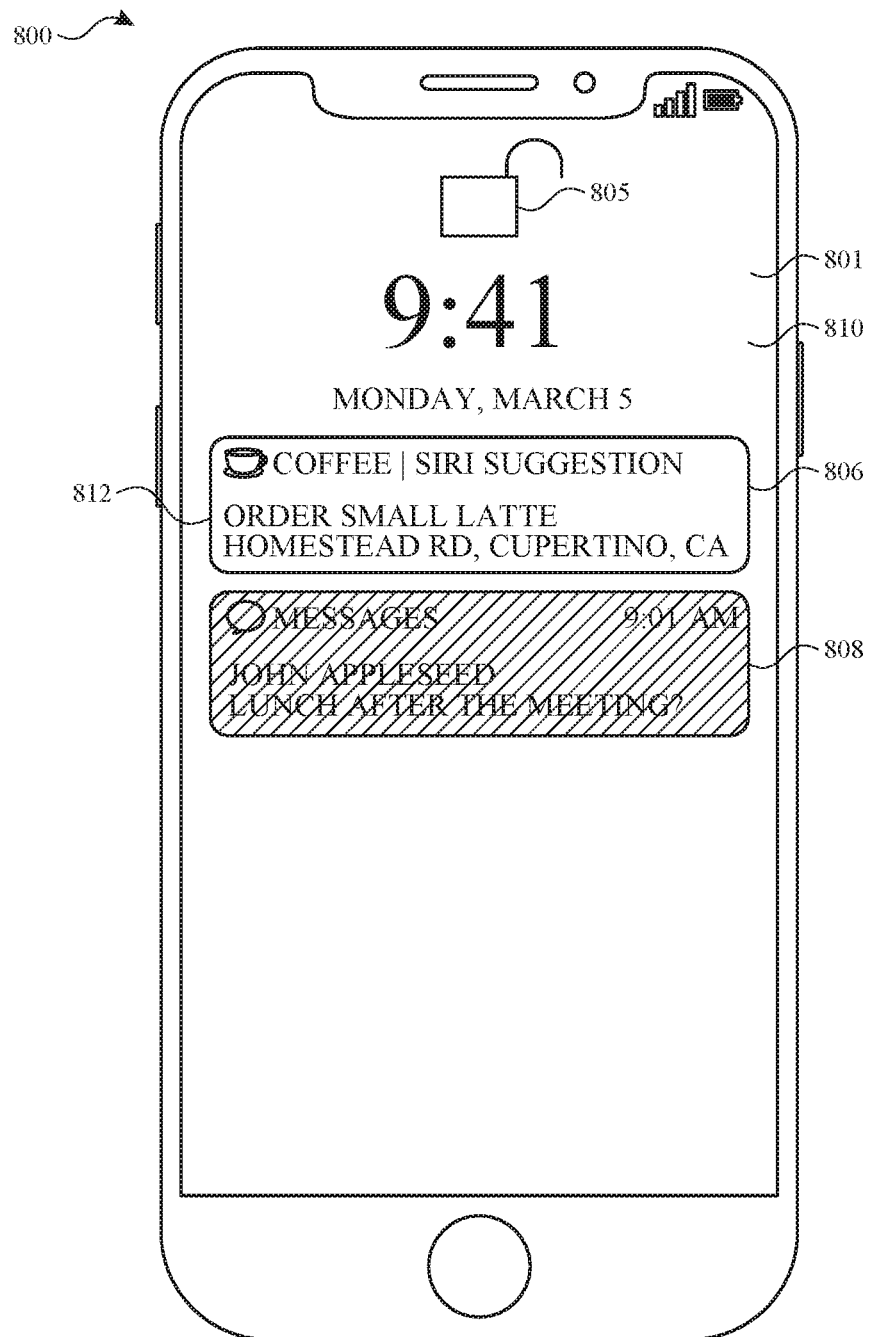

In some examples, while operating in the unlocked state, the electronic device 800 the electronic device 800 operates in an unsecured manner (e.g., secured data is accessible to the authenticated user). By way of example, as illustrated in FIG. 8B, the electronic device 800 displays contents of the task suggestion associated with the suggestion affordance 806 and the message associated with the notification 808. As illustrated, contents of the task suggestion associated with suggestion affordance include task indicator 812 indicating a task associated with the task suggestion and one or more parameters associated with the task.

Figure 8C:
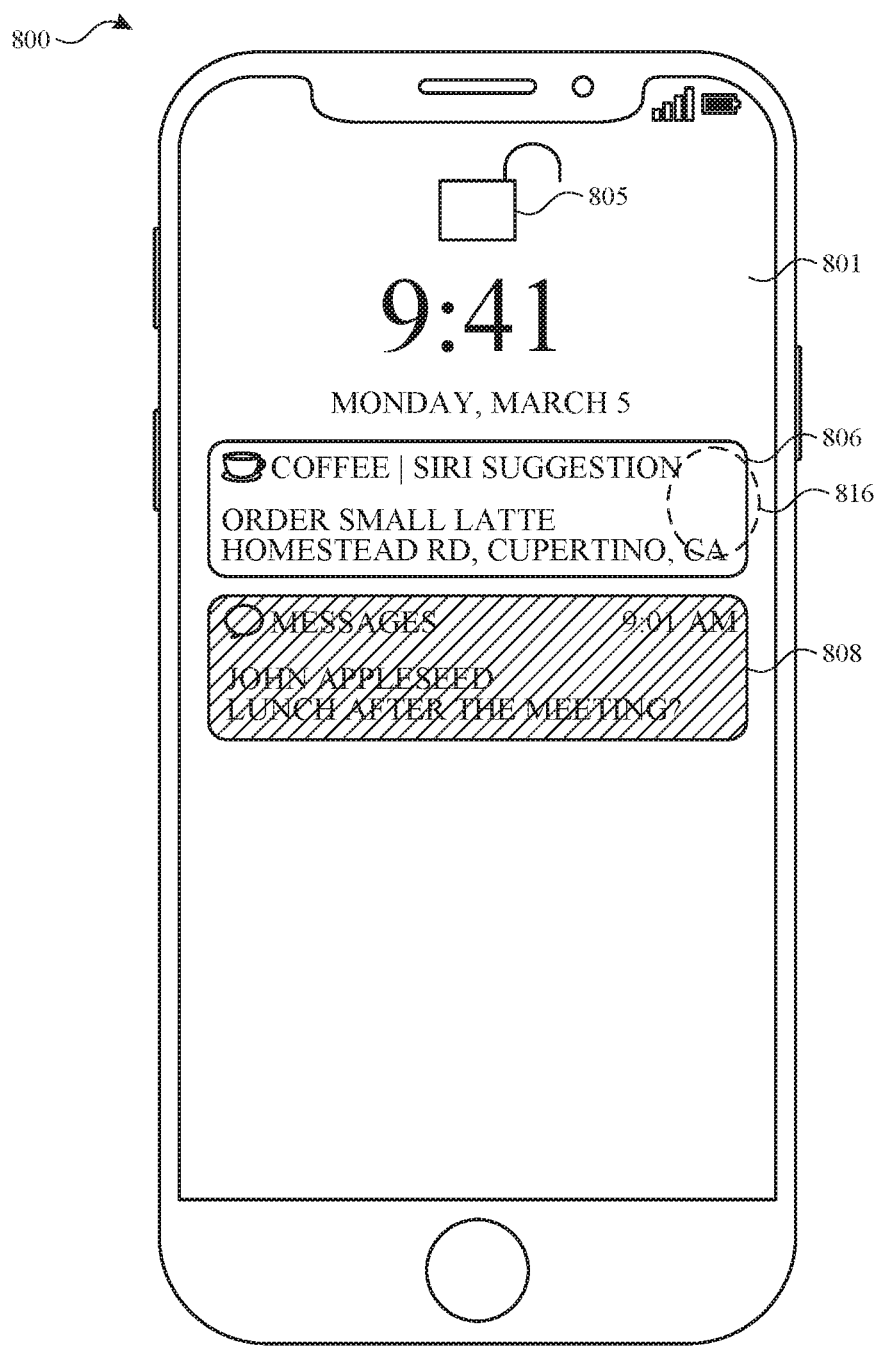

While displaying the lock screen interface 810, the electronic device 800 detects selection (e.g., activation) of suggestion affordance 806. For example, as shown in FIG. 8C, the selection is a tap gesture 816 on the suggestion affordance 806. As will be described in more detail below, in response to detecting tap gesture 816, the electronic device 800 selectively performs the task associated with the suggestion affordance 806. If the task is a task of a first type (e.g., a background task), the electronic device 800 performs the task without requiring further user input. The electronic device 800 further may cease display of the suggestion affordance 806, as illustrated in FIG. 8H.

Figure 8D:
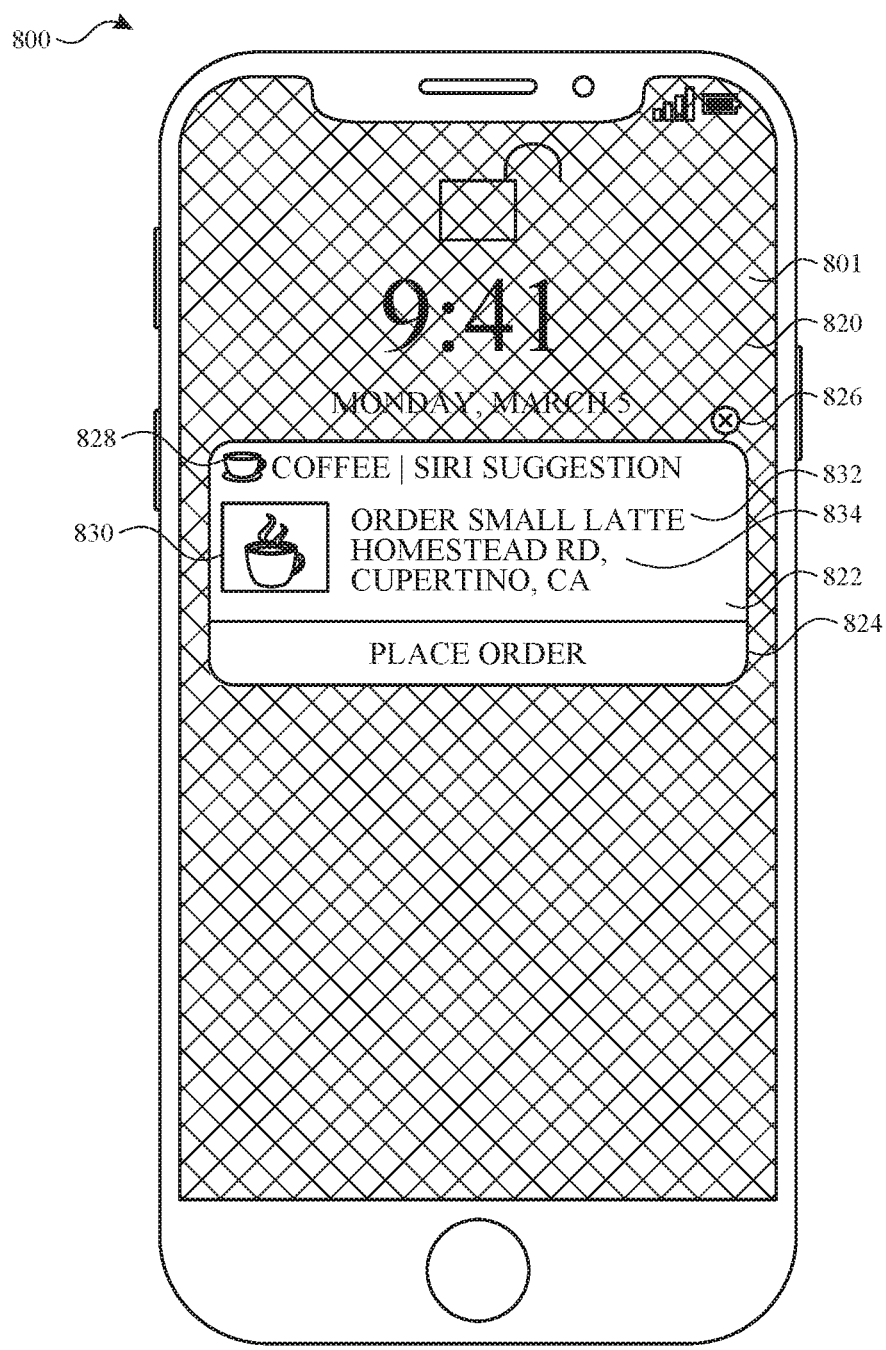

With reference to FIG. 8D, if the task is a task of a second type different than the first type, the electronic device 800 displays a confirmation interface, such as confirmation interface 820. Confirmation interface 820 includes task content 822, confirmation affordance 824, and cancel affordance 826. In some examples, task content 822 includes one or more of application indicator 828, application icon 830, and task indicator 832. In some examples, application indicator 828 indicates the application associated with the task. Application indicator 828 includes a name of the application (e.g., "Coffee") and/or an icon associated with the application. Application icon 830 includes an icon (or other image) associated with the task and/or the application associated with the task. Task indicator 832 indicates the task corresponding to the suggestion affordance ("Order") and/or one or more parameters associated with the task (small, latte, Homestead Rd. Cupertino Calif.).

In some examples, in response to selection of the cancel affordance 826, the electronic device 800 ceases display of the confirmation interface 820. In some examples, the application indicator 828 is implemented as an application affordance, and in response to selection of the application indicator 828, the electronic device 800 opens the application associated with the task (e.g., "Coffee"). In some examples, the application icon 830 is implemented as an application affordance, and in response to selection of the application icon 830, the electronic device 800 opens the application associated with the task.

In some examples, opening an application includes preloading the application with one or more parameters. For instance, suggestion affordance 806 is associated with a task for placing an order using a coffee application, and parameters associated with the task include a size of the coffee (e.g., small), a type of the coffee (e.g., latte), and a location for pickup of the order (Homestead Rd. location in Cupertino, Calif.). Accordingly, in some examples, opening the application in this manner includes inserting one or more parameters of the task on behalf of the user. By way of example, opening the application by way of selecting application indicator 828 or application icon 830 may cause the electronic device to open coffee application and present an interface (e.g., shopping cart interface) by which the user can confirm an order of a small latte at the Homestead Rd. location. In some examples, parameters are preloaded such that the electronic device performs the task in response to an input confirming intent to perform the task. In this manner, the number of inputs required for a user to perform a particular task using an application may be reduced.

Figure 8E:
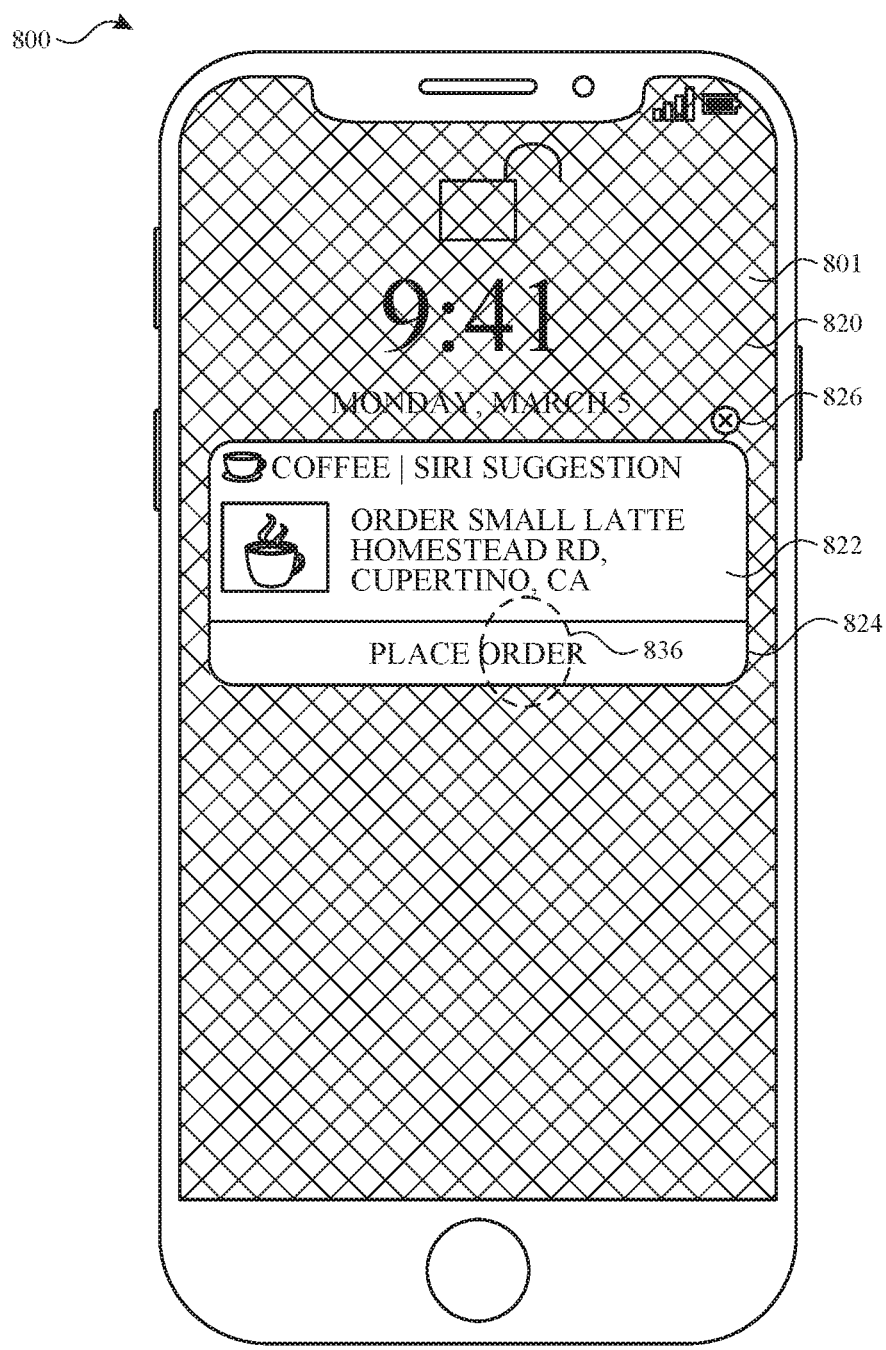
Figure 8F:
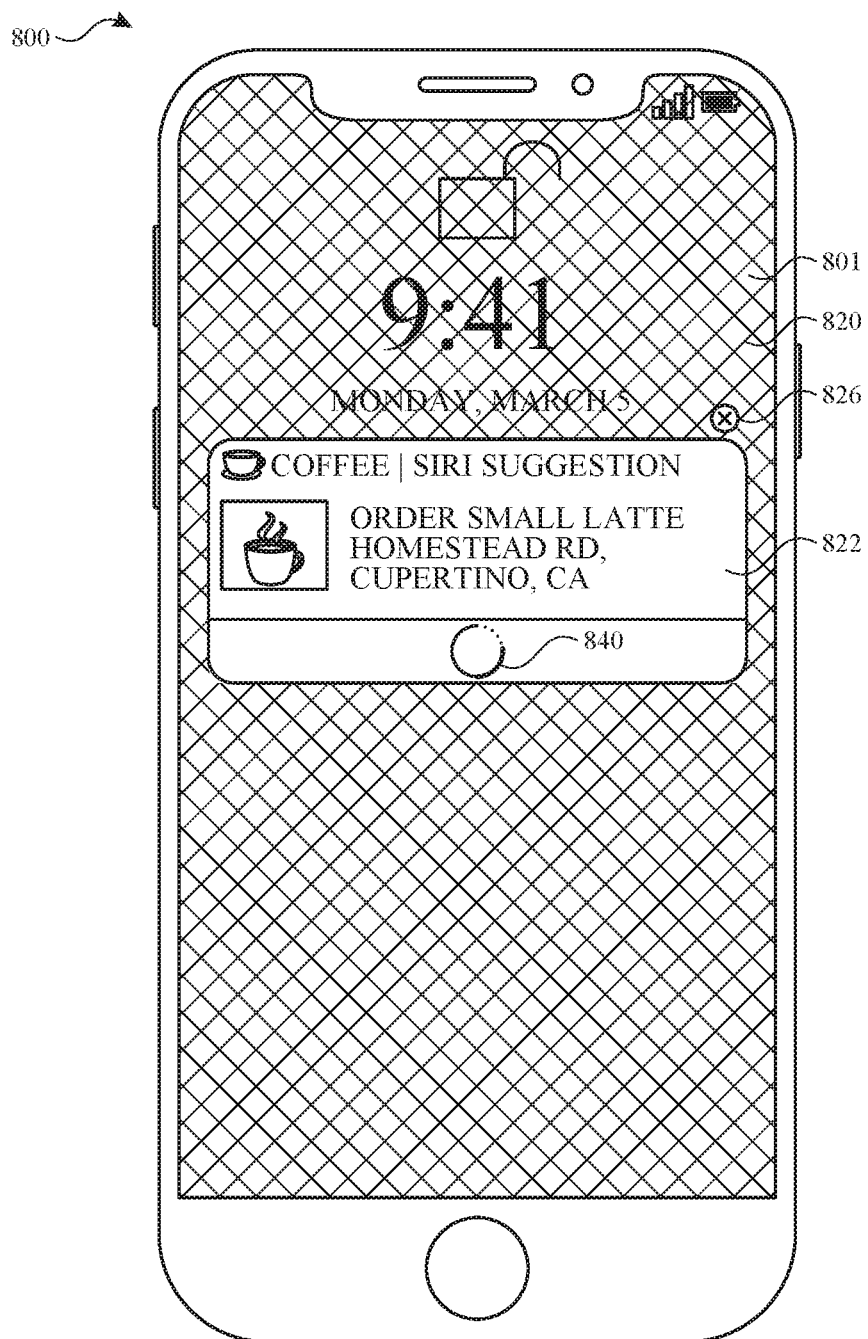

In some examples, an application (e.g., third-party application) may specify the manner in which a confirmation affordance is displayed. An application may specify the color of a confirmation affordance, for instance. In some examples, while displaying the confirmation interface 820, the electronic device 800 detects selection of the confirmation affordance 824. For example, as shown in FIG. 8E, the selection is a tap gesture 836 on the confirmation affordance 824. In response to detecting tap gesture 836, the electronic device 800 performs the task. In some examples, while performing the task, the electronic device 800, optionally, displays a progress indicator 840, indicating that the task is being performed. In some examples, display of the progress indicator 840 replaces display of the confirmation affordance 824.

Figure 8G:
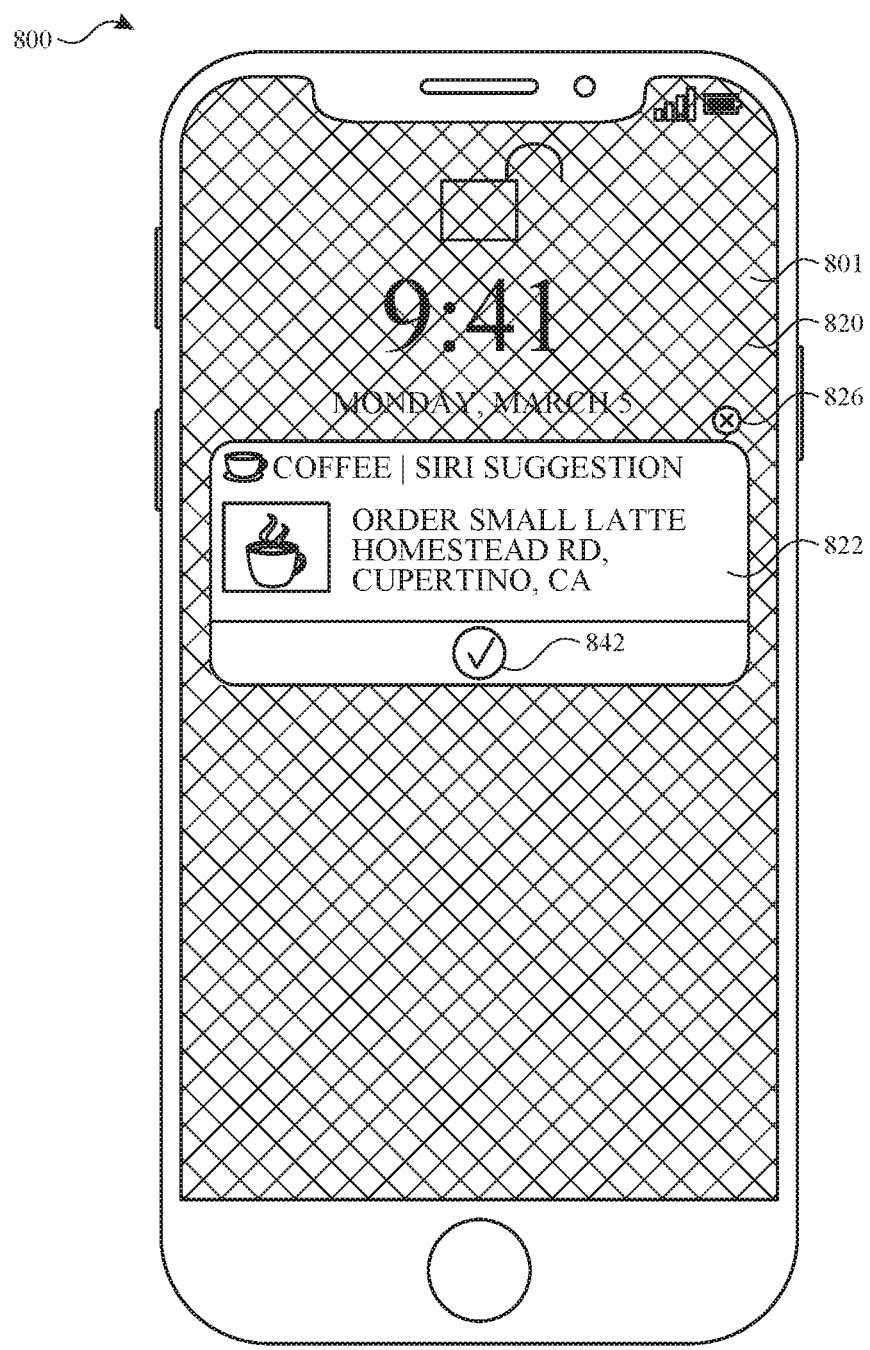
Figure 8H:
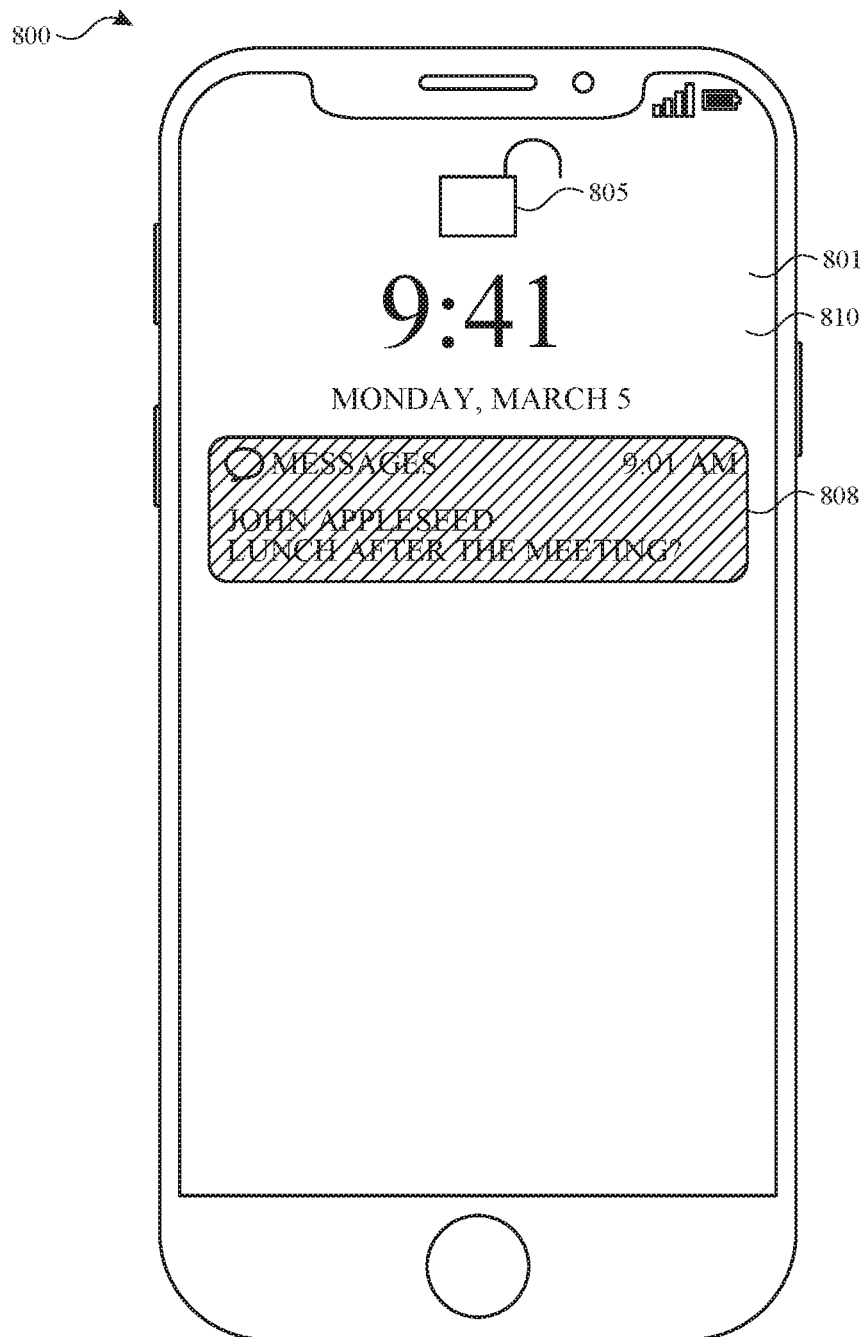

Once task has been performed, the electronic device 800 provides an output indicating whether the task was performed successfully. In the example of FIG. 8G, the task is performed successfully, and as a result, the electronic device 800 displays a success indicator 842, indicating that the task was successfully performed. In some examples, display of the success indicator 842 replaces display of the progress indicator 840. In some examples, a predetermined amount of time after the task has been completed, the electronic device replaces display of the confirmation interface 820 with lock screen interface 810. As illustrated, because the task associated with suggestion affordance 806 was performed, suggestion affordance 806 is not included in lock screen interface 810 in FIG. 8H.

Figure 8I:
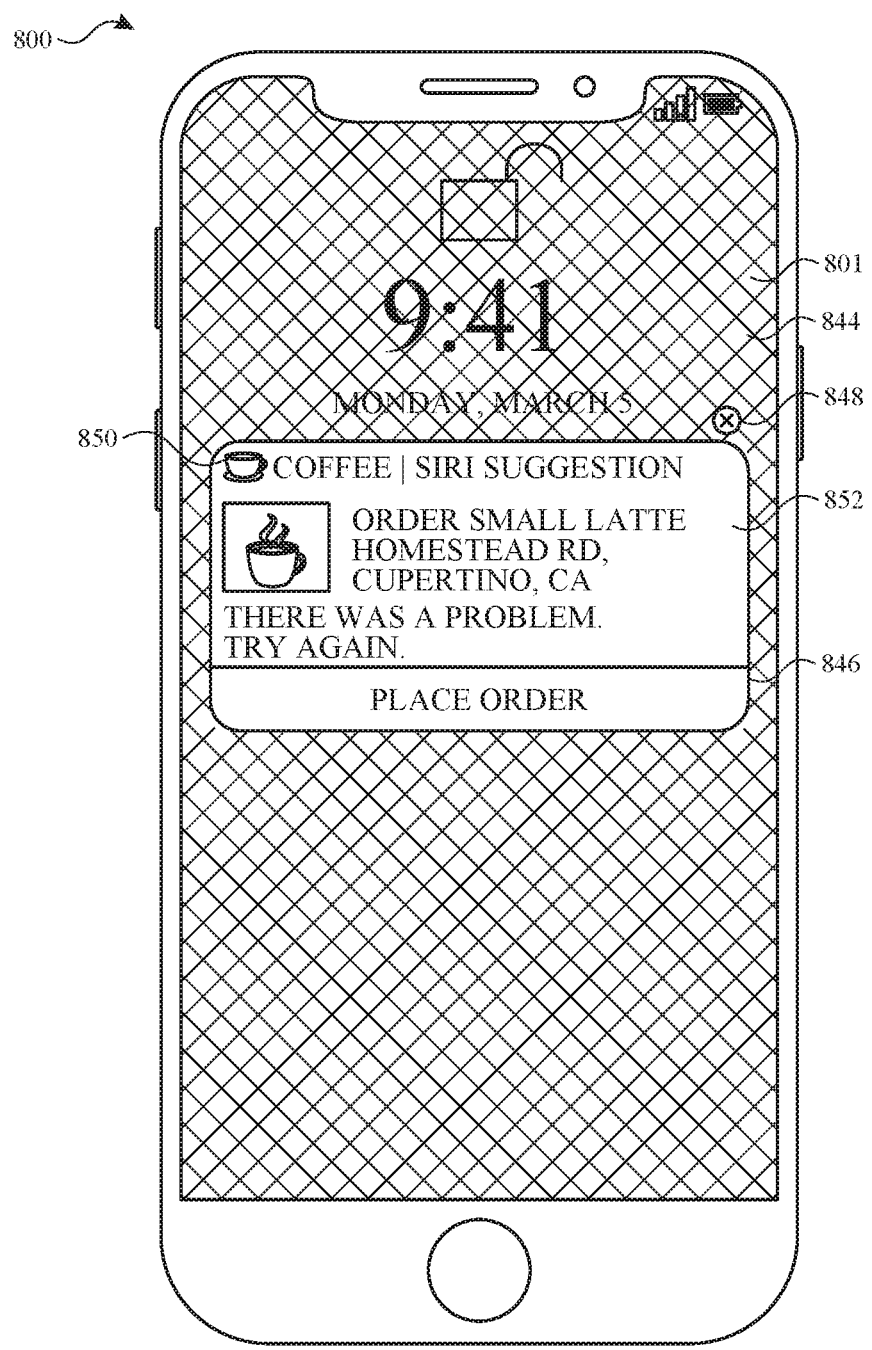

In the example of FIG. 8I, the task was not performed successfully, and as a result, the electronic device 800 displays a failure interface 844. The failure interface 844 includes a retry affordance 846, a cancel affordance 848, and application affordance 850. The failure interface further includes content 852. In some examples, in response to selection of the retry affordance 846, the electronic device 800 performs the task again. In some examples, in response to selection of the cancel affordance, the electronic device 800 ceases display of the failure interface 844. In some examples, in response to selection of the application affordance 850, the electronic device 800 opens an application associated with the task. Content 852 may include information directed to the task, such as one or more parameters used to perform the task. In some examples, content 852 further specifies whether the task was performed successfully. Content 852 may, for example, indicate that the electronic device failed to perform the task successfully (e.g., "There was a problem. Please try again.").

Figure 8J:
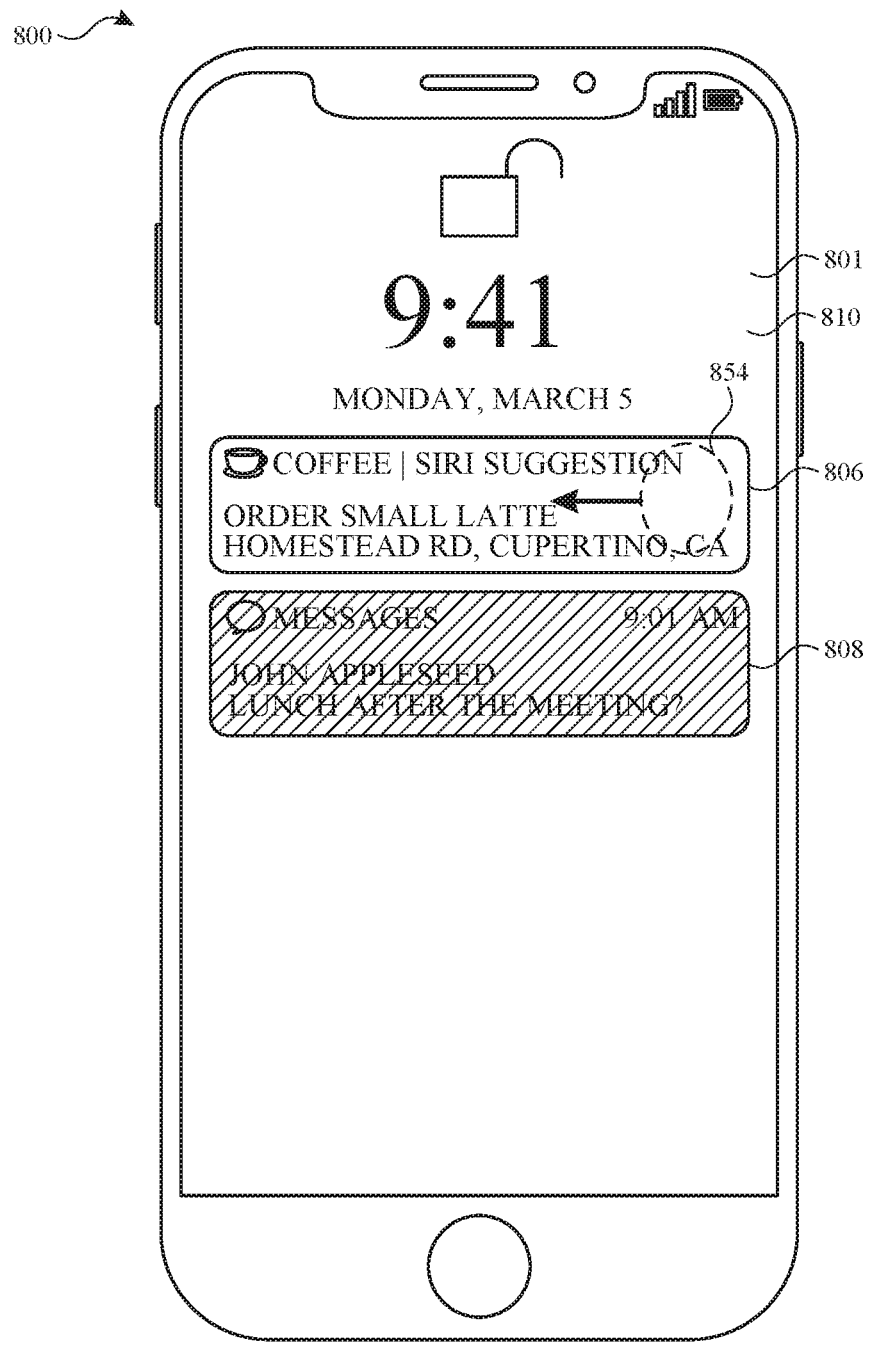
Figure 8K:
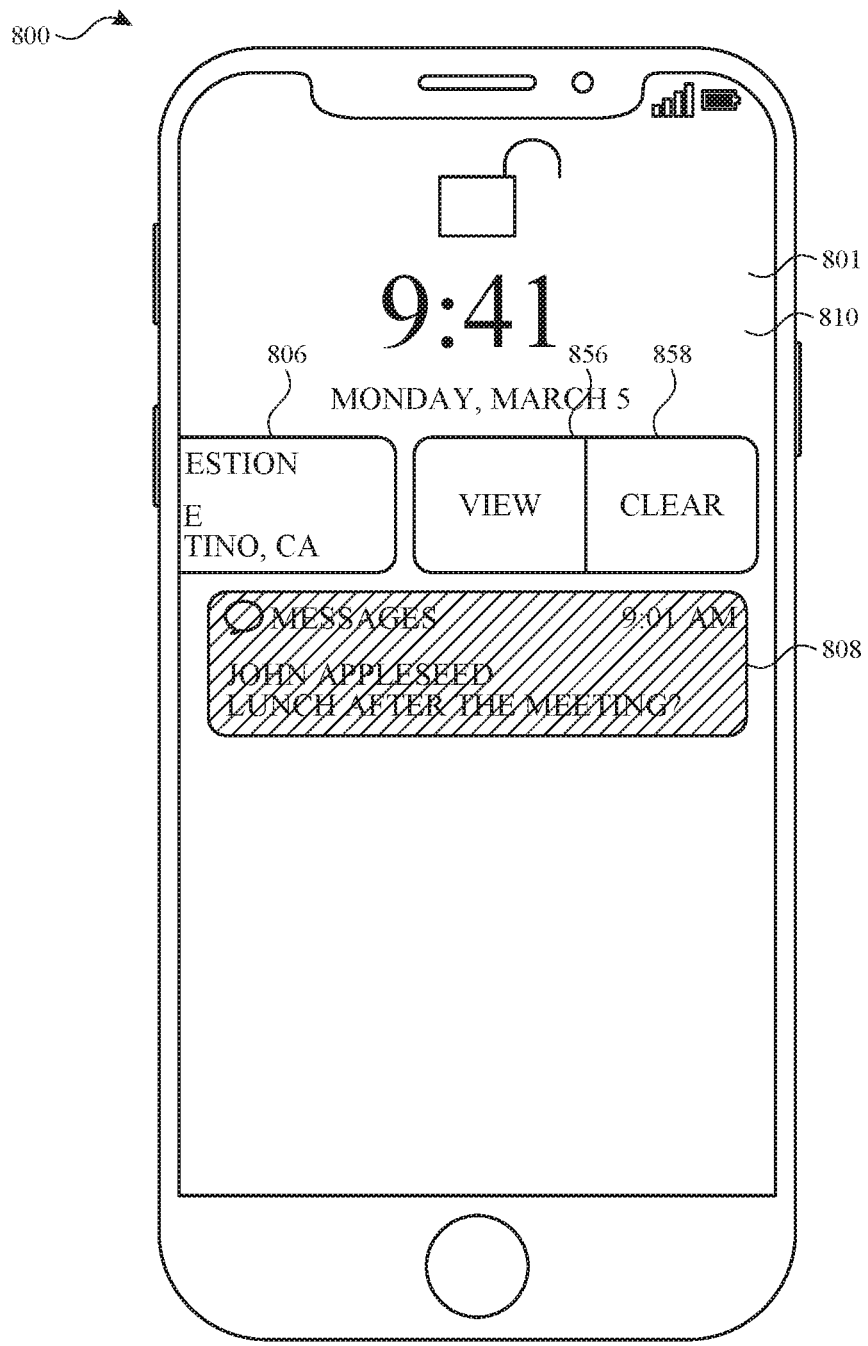

In FIG. 8J, the selection of suggestion affordance 806 is a swipe gesture 854 on the suggestion affordance 806. In response to detecting the swipe gesture 854, the electronic device 800 displaces (e.g., slides) the suggestion affordance 806 in a leftward direction to display (e.g., reveal) view affordance 856 and clear affordance 858 as shown in FIG. 8K. In some examples, in response to selection of the view affordance 856, the electronic device 800 displays a confirmation interface, such as the confirmation interface 820 (FIG. 8D). In some examples, in response to selection of the clear affordance 858, the electronic device 800 ceases to display the suggestion affordance 806.

Figure 8L:
Figure 8M:
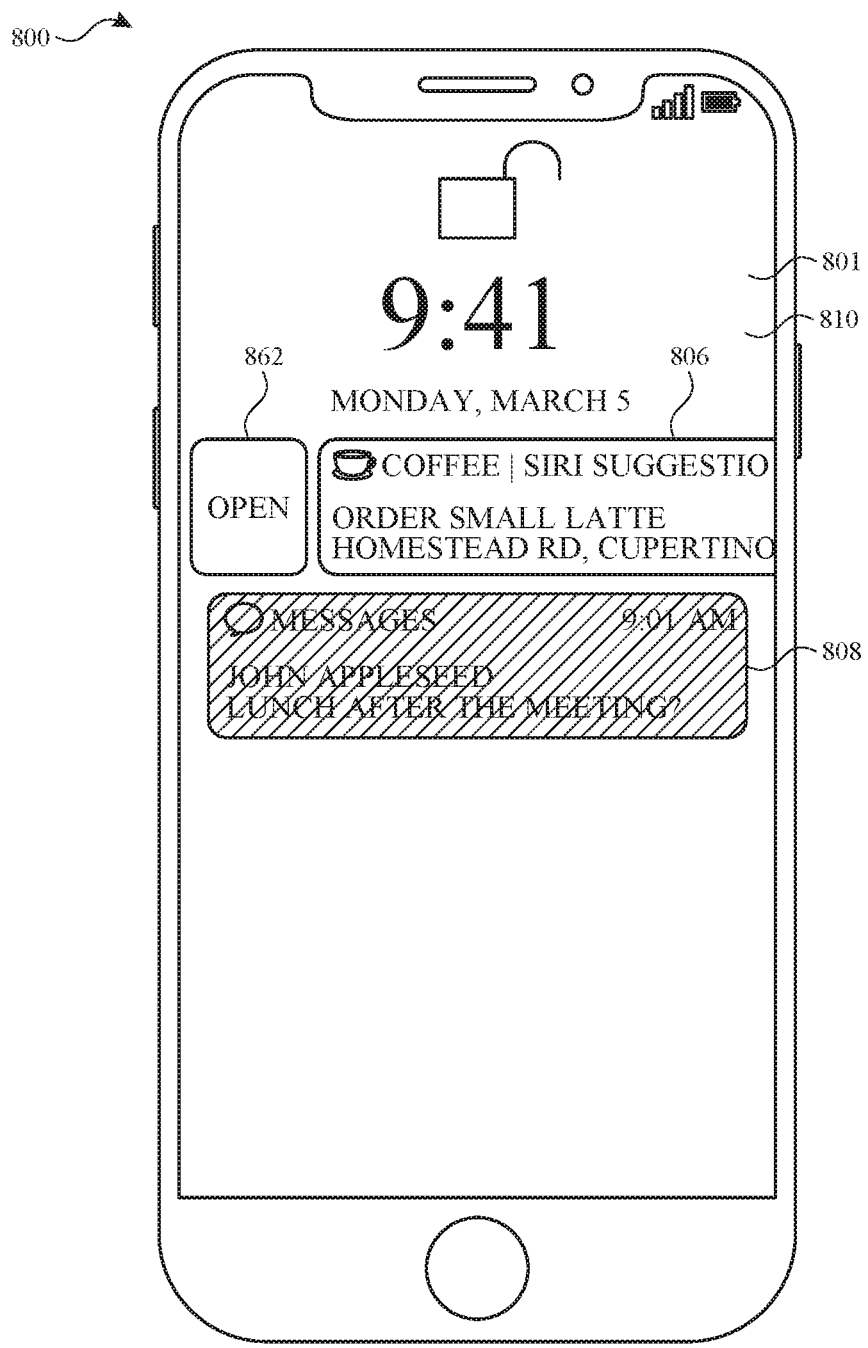

In FIG. 8L, the selection of suggestion affordance 806 is a swipe gesture 860 on the suggestion affordance 806. In response to detecting the swipe gesture 860, the electronic device 800 displaces (e.g., slides) the suggestion affordance 806 in a rightward direction to display (e.g., reveal) open affordance 862 as shown in FIG. 8M. In some examples, in response to selection of open affordance 862, the electronic device opens an application associated with the task of the suggestion affordance (e.g., "Coffee").

Figure 8N:
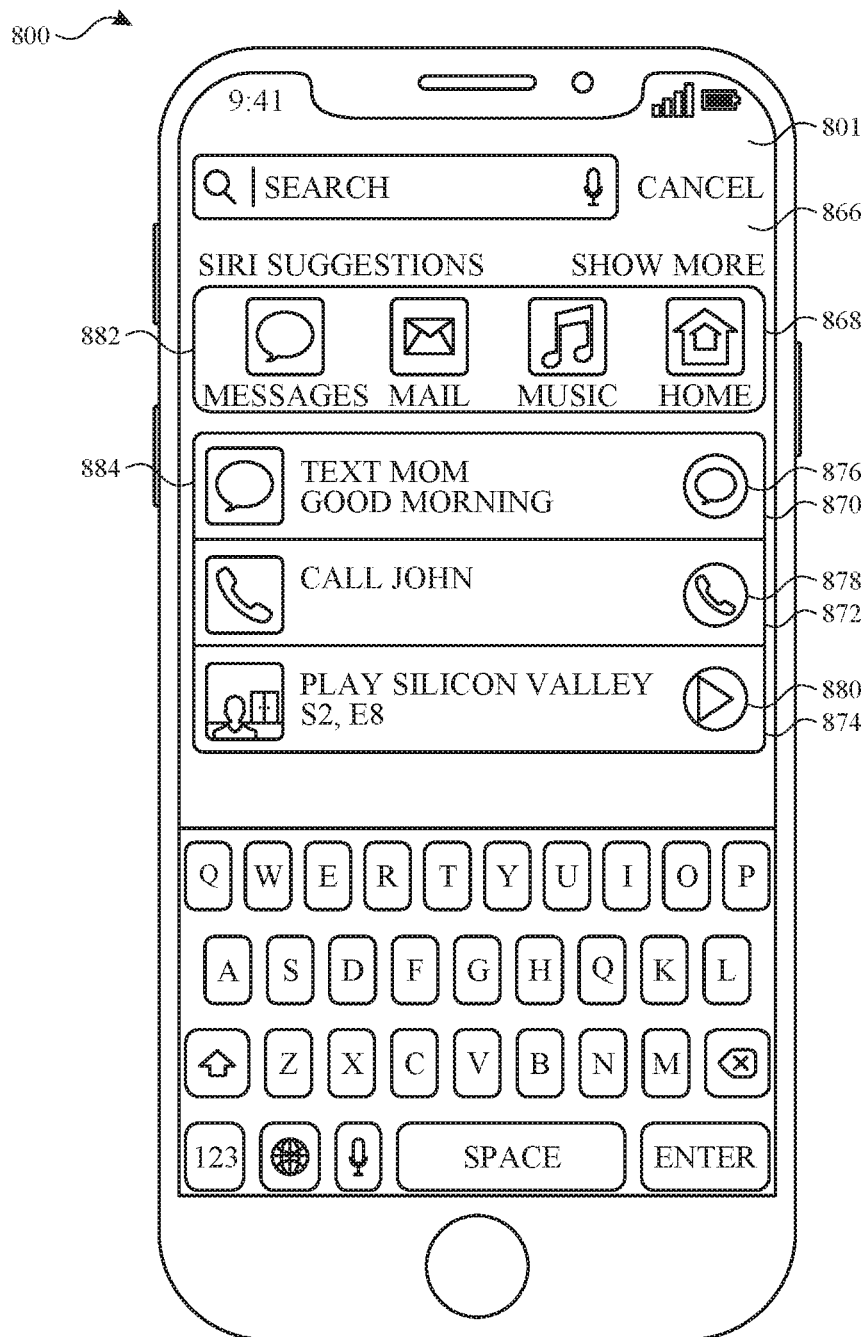

In FIG. 8N, the electronic device 800 displays, on display 801, a search screen interface, such as the search screen interface 866. The search screen interface 866 includes suggested applications 868 and suggestion affordances 870, 872, 874. As shown, the suggestion affordance 870 is associated with a messaging application, suggestion affordance 872 is associated with a telephone application, and suggestion affordance 874 is associated with a media playback application.

In some examples, suggestion affordances optionally include a glyph (e.g., glyph 876, 878, 880) indicating a category of a task associated with the suggestion affordance. Categories specified in this manner may include "monetary," "messages," "phone," "video," and "media" in some examples. Suggestion affordances (e.g., suggestion affordance 806 of FIG. 8A) may be displayed without a glyph if, for instance, the task of the suggestion affordance does not correspond to a task category. In the example shown in FIG. 8N, suggestion affordance 870 is associated with a task for sending a text message and accordingly includes a messaging glyph 876 indicating that the task is associated with text messaging. As another example, suggestion affordance 872 is associated with a task for initiating a phone call and accordingly includes a telephone glyph 878 indicating that the task is associated with telephone functionality. As yet another example, suggestion affordance 874 is associated with a task for playback of a video and accordingly includes a playback glyph 880 indicating that the task is associated with media playback. It will be appreciated that any number of types of glyphs may be used, corresponding to any number of respective task categories.

Figure 8O:
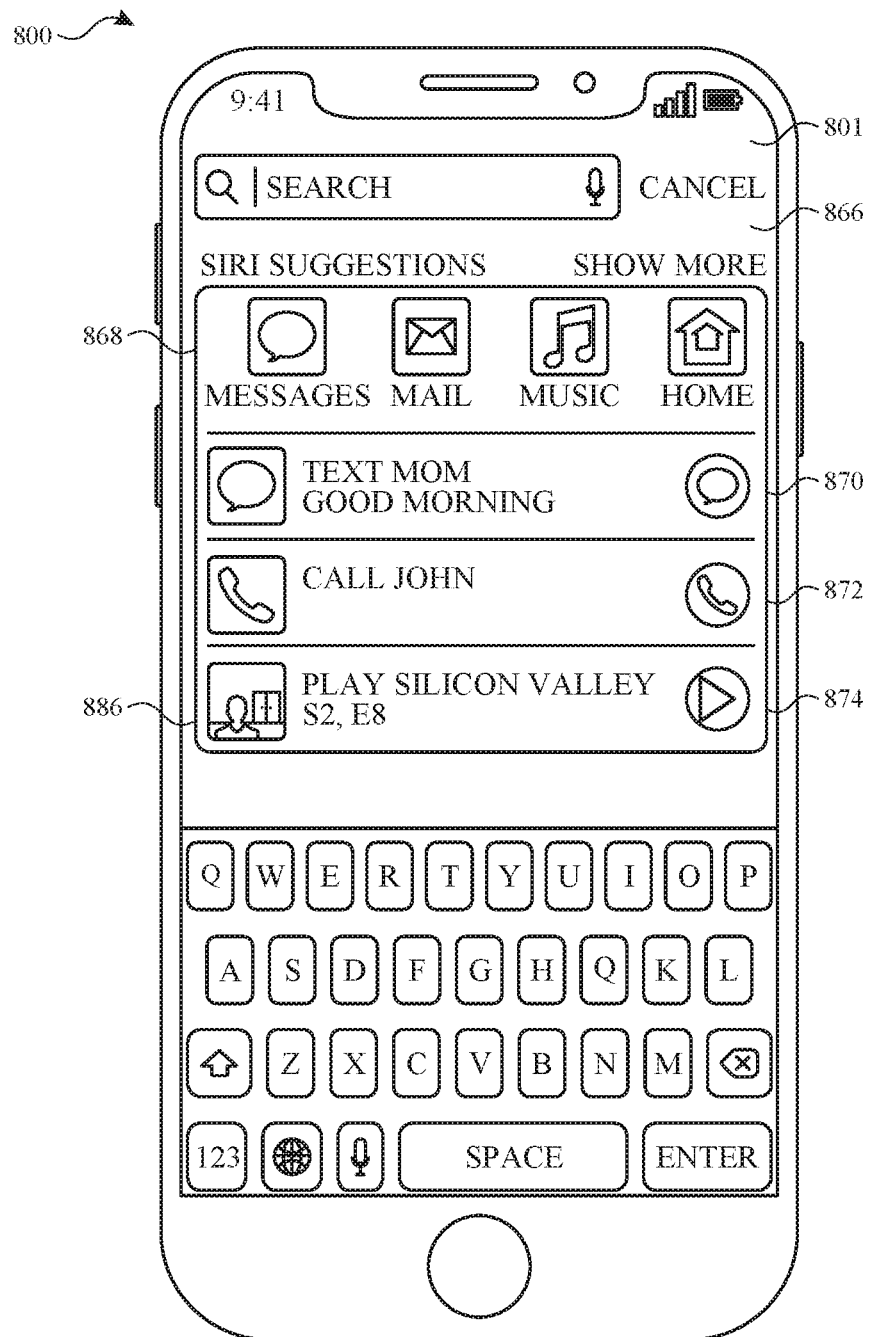
Figure 8P:
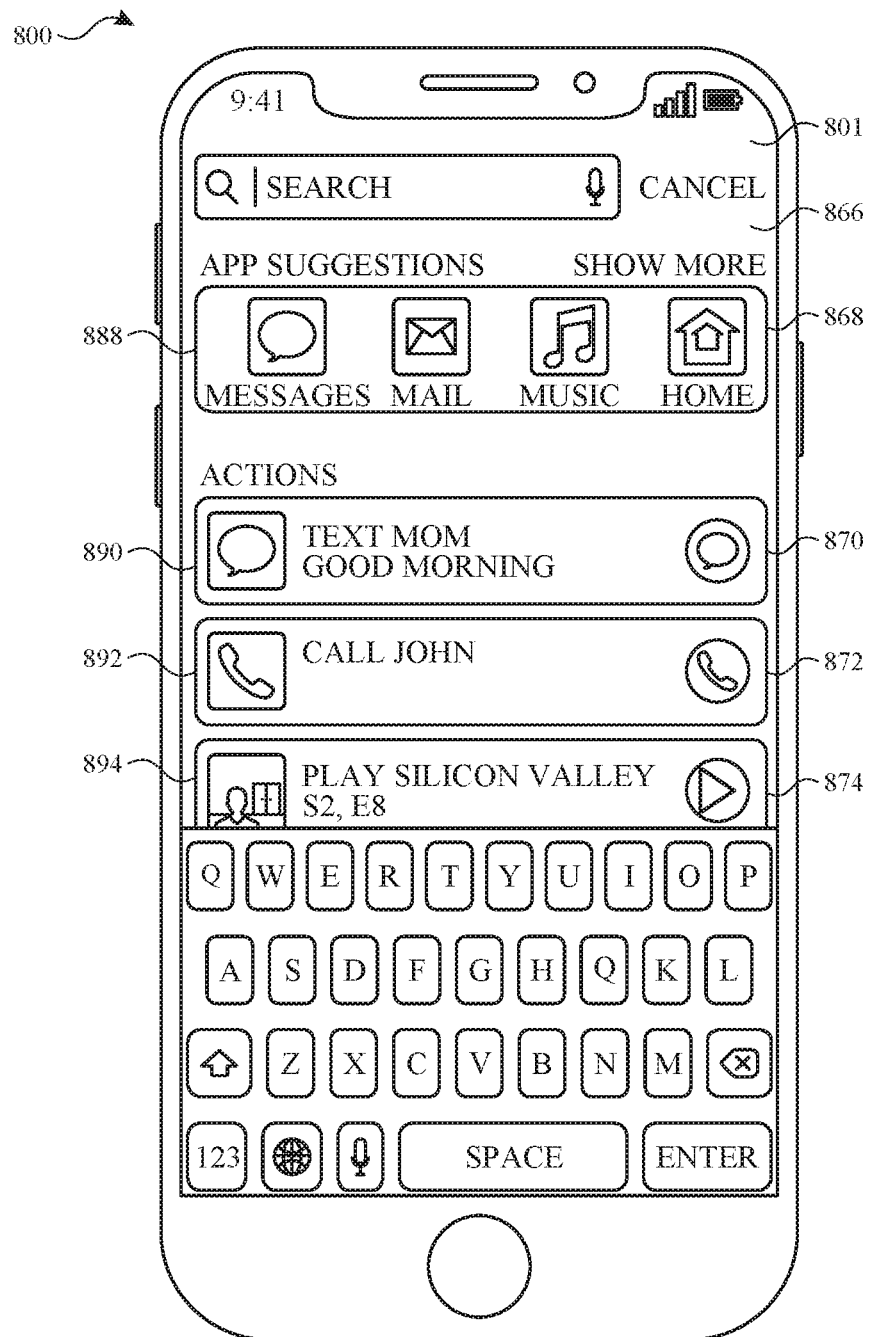

FIGS. 8N-P illustrate various manners in which suggested applications and suggestion affordances may be displayed in a search screen interface, such as the search screen interface. As illustrated in FIG. 8N, in at least one example, suggested applications and suggestion affordances may be displayed in respective portions of a search screen interface (e.g., portions 882, 884). As illustrated in FIG. 8O, in at least one example, suggested applications and suggestion affordances may be displayed in a same portion of a search screen interface (e.g., portion 886). As illustrated in FIG. 8P, in at least one example, suggested applications and each suggestion affordance may be displayed in a respective portion of a search screen interface (e.g., portion 888, 890, 892, 894).

In some examples, while displaying the search screen interface 866, the electronic device 800 detects selection of the suggestion affordance, such as the suggestion affordance 870. In some examples, because the task associated with suggestion affordance 870 is a task of a predetermined type (e.g., background task), the electronic device performs (e.g., automatically performs) the task associated with the suggestion affordance 870 in response to selection of the affordance 870 with an input of a first type (e.g., tap gesture). Additionally or alternatively, in response to selection of the affordance 870 with an input of a second type different than the first type, the electronic device 800 displays a confirmation interface requesting confirmation of the task from a user.

Figure 8Q:
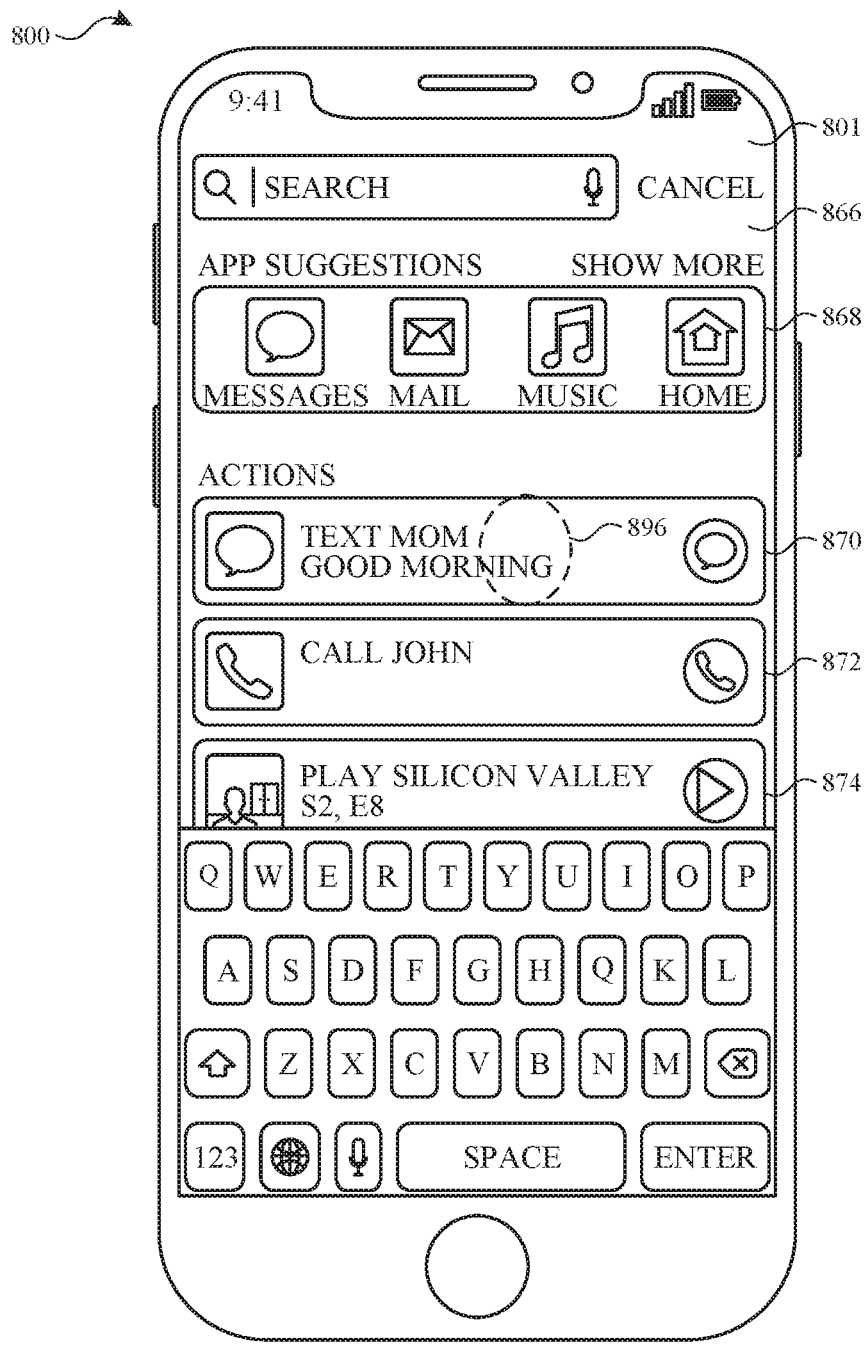
Figure 8R:
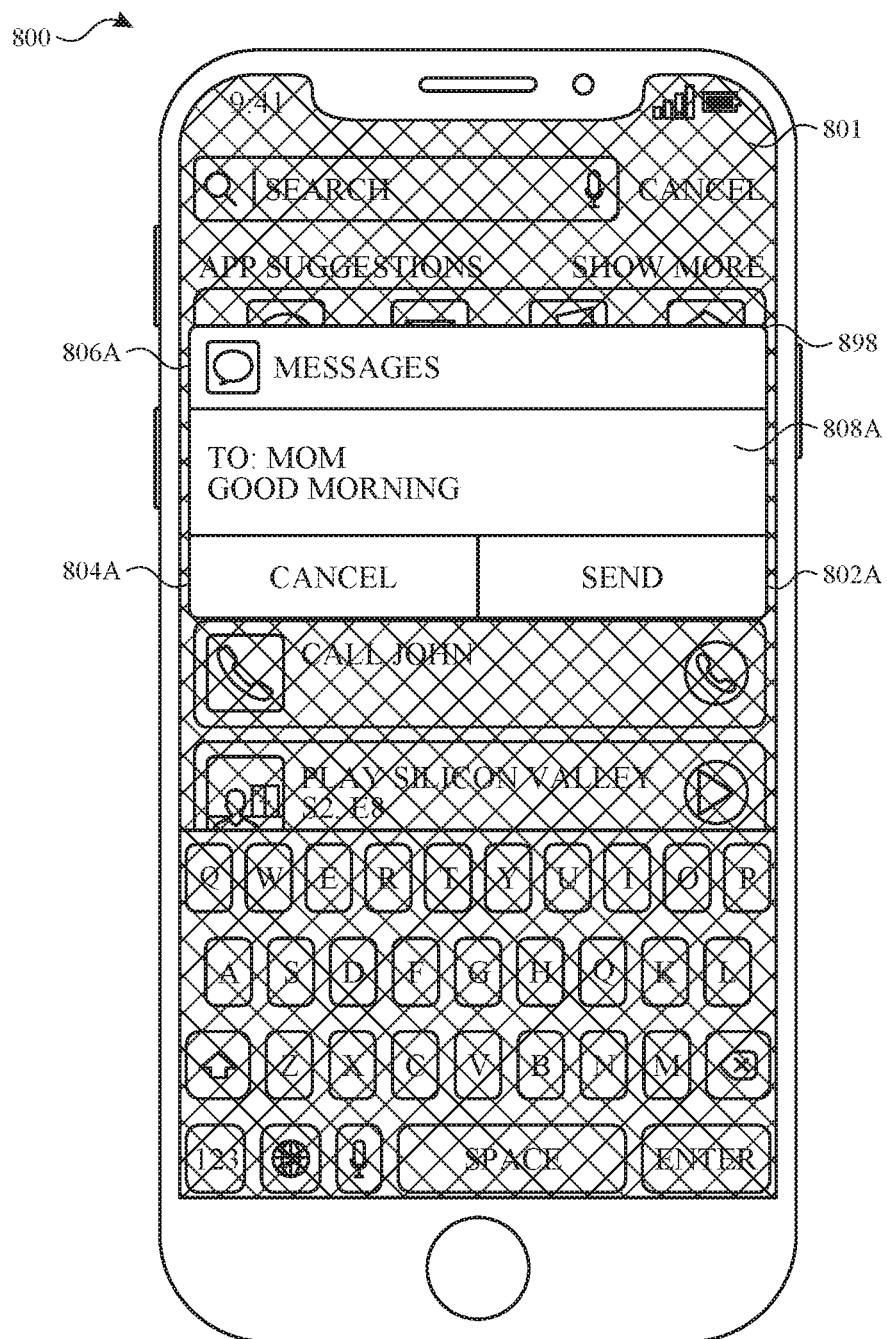

For example, as shown in FIG. 8Q, the selection is a touch gesture 896 on the confirmation affordance 824. In some examples, touch gesture 896 is a touch input satisfying a threshold intensity and/or threshold duration such that the touch gesture 896 may be differentiated from a tap gesture. As shown in FIG. 8R, in response to detecting touch gesture 896, the electronic device 800 displays confirmation interface 898. Confirmation interface 898 includes confirmation affordance 802A, cancel affordance 804A, application indicator 806A, and content 808A. In some examples, selection of the cancel affordance 804A causes the electronic device 800 to cease display of the confirmation interface 898 and/or forgo performing the task associated with suggestion affordance 870. In some examples, application indicator 806A indicates the application associated with the task. Application indicator 806A may include a name of the application (e.g., "Messages") and/or an icon associated with the application. Content 808A may include information directed to the task, such as one or more parameters used to perform the task. For instance, content 808A may specify that a recipient of a text message is a contact "Mom" and the text of the text message is "Good Morning". In some examples, content 808A may be implemented as an affordance.

Figure 8S:
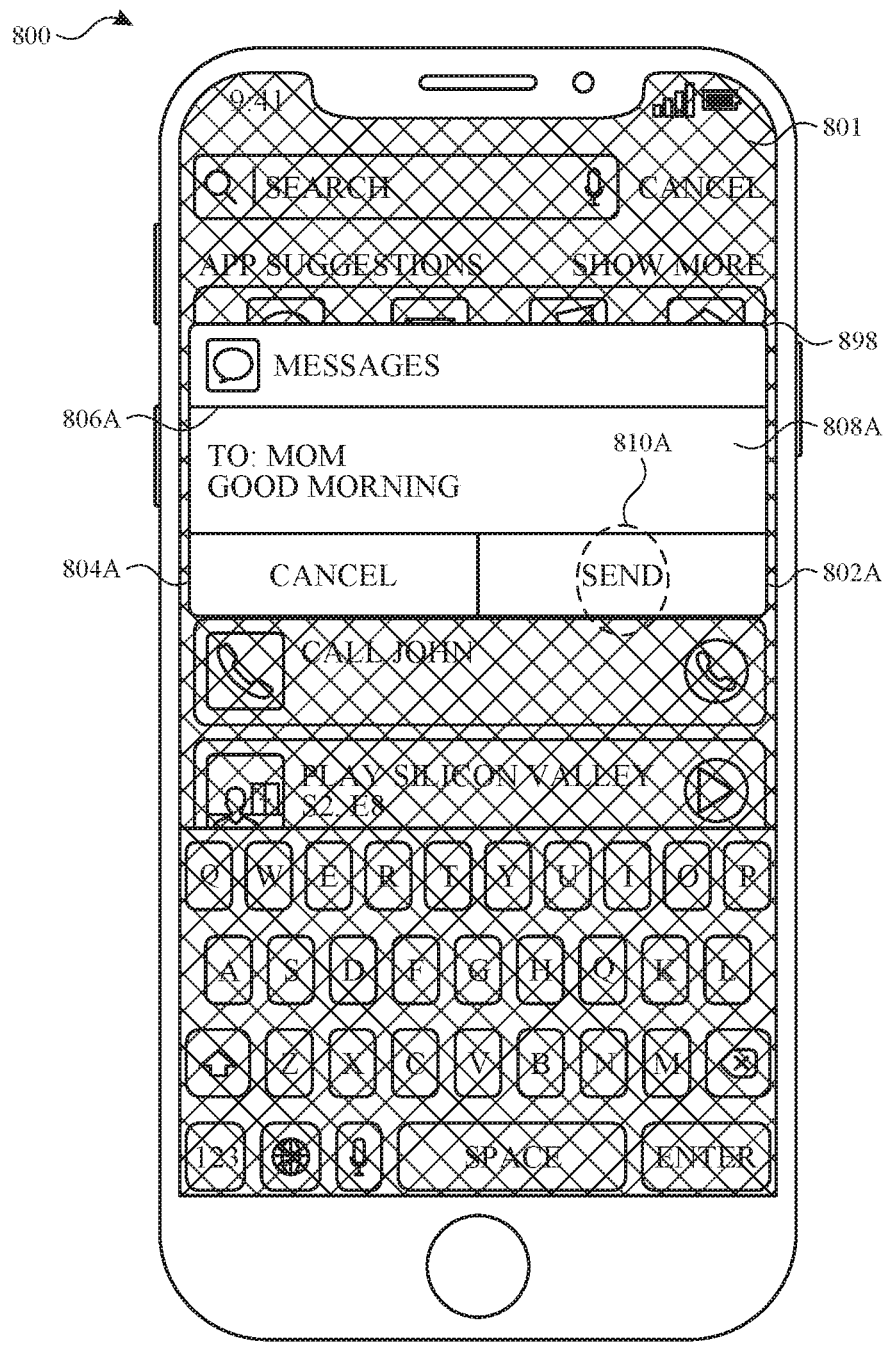
Figure 8T:
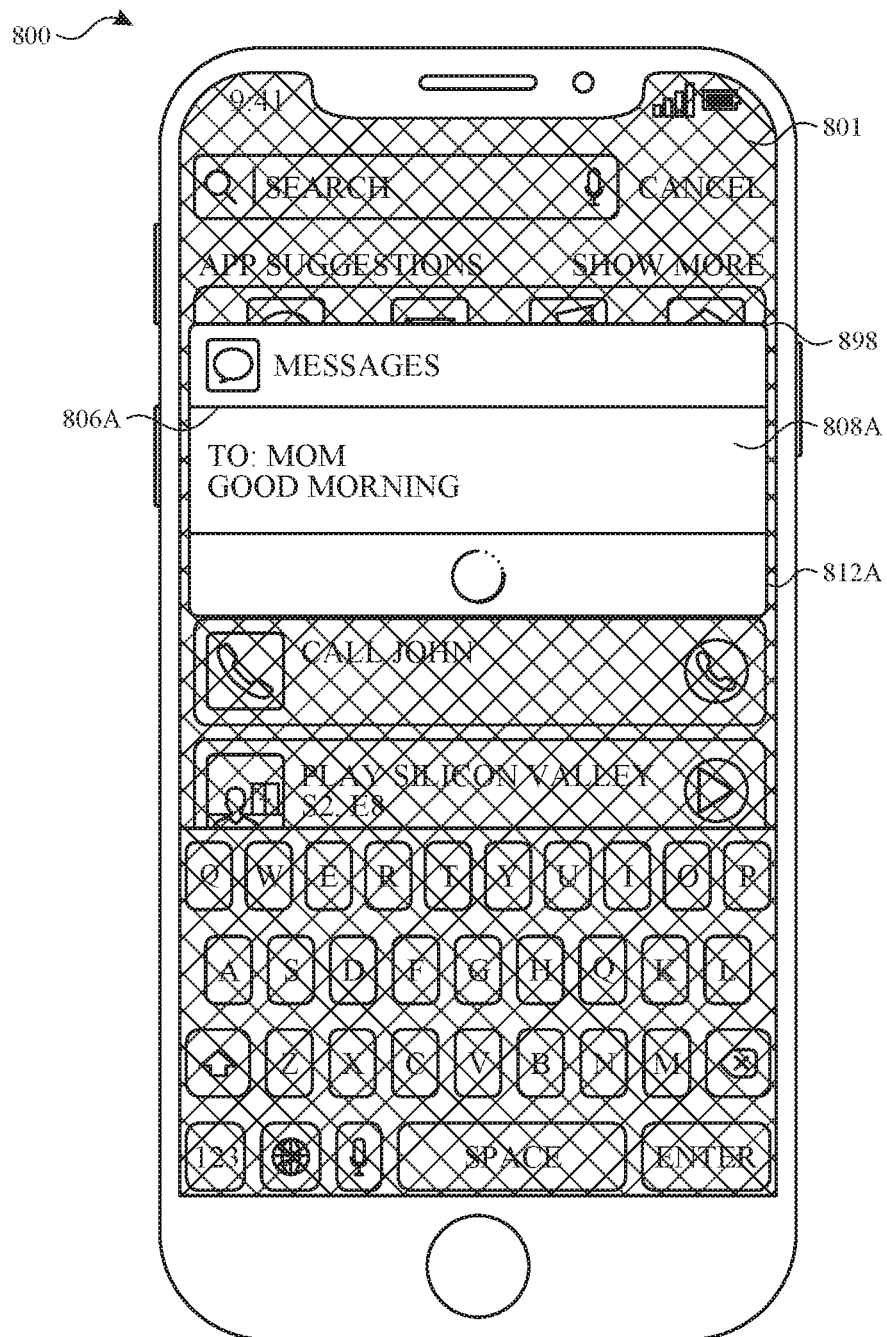

While displaying the confirmation interface 898, the electronic device 800 detects selection of the confirmation affordance 802A. For example, as shown in FIG. 8S, the selection is a tap gesture 810A on the confirmation affordance 824. In response to detecting the tap gesture 810A, the electronic device 800 performs a task associated with suggestion affordance 870. As shown in FIG. 8T, in some examples, while performing the task, the electronic device 800, optionally, displays a progress indicator 812A, indicating that the task is being performed. In some examples, display of the progress indicator 812A replaces display of the confirmation affordance 802A and cancel affordance 804A.

Figure 8U:
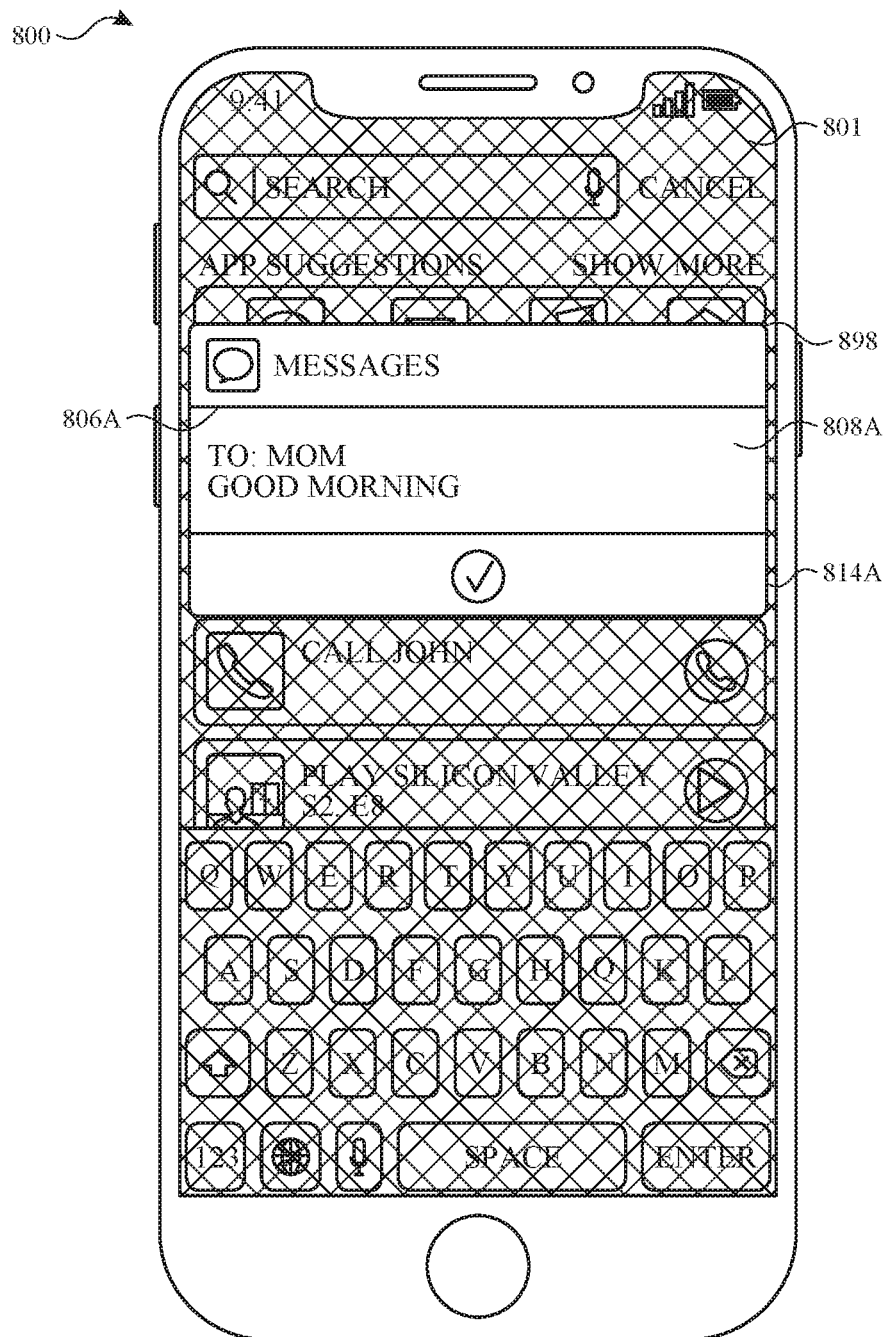
Figure 8V:
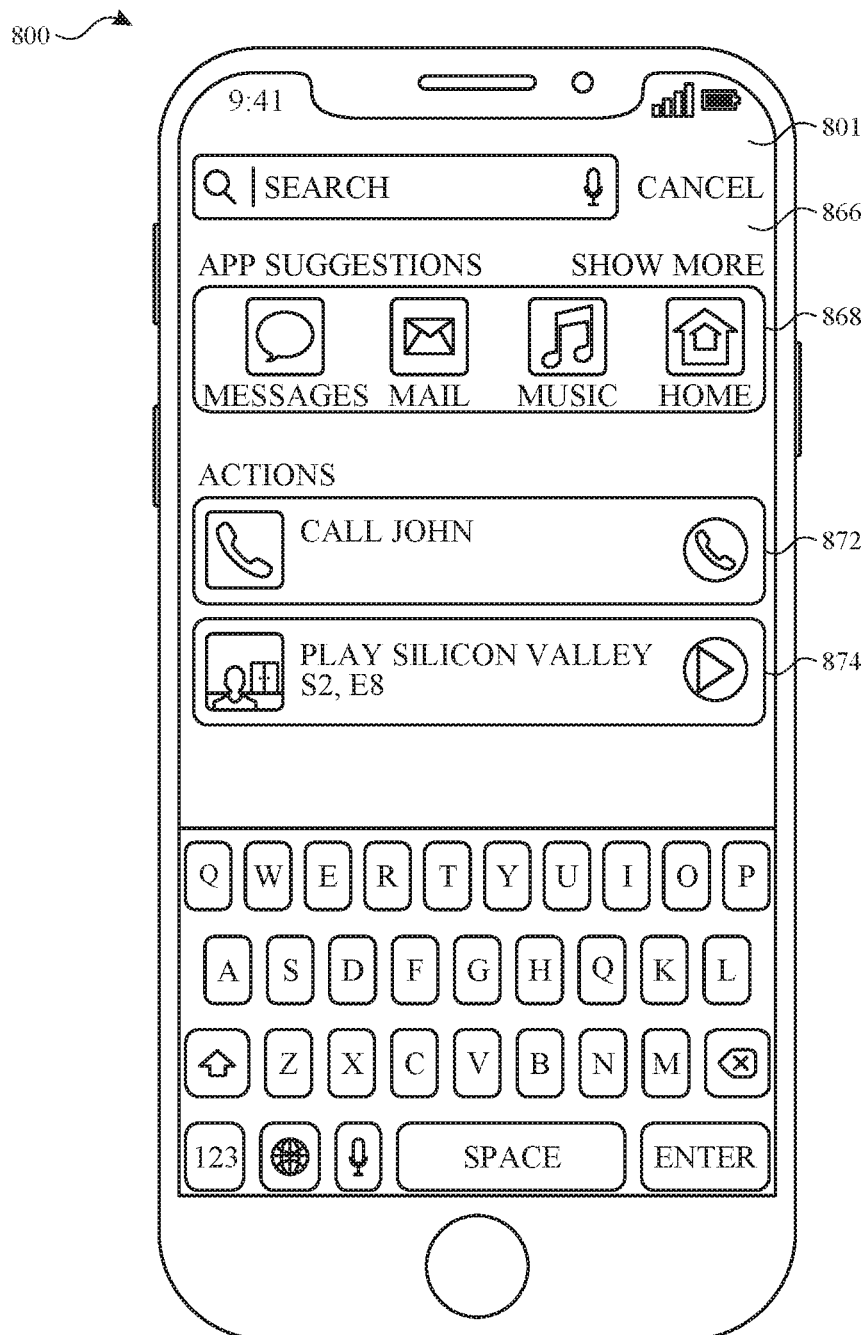

Once task has been performed, the electronic device 800 provides an output indicating whether the task was performed successfully. In the example of FIG. 8U, the task is performed successfully, and as a result, the electronic device 800 displays a success indicator 814A, indicating that the task was successfully performed (e.g., text message to "Mom" was successfully sent). In some examples, display of the success indicator 814A replaces display of the progress indicator 812A. In some examples, a predetermined amount of time after the task has been completed, the electronic device replaces display of the confirmation interface 898 with search screen interface 866. As illustrated in FIG. 8V, because the task associated with suggestion affordance 870 was performed, suggestion affordance 870 is not included in search screen interface 866.

Figure 8W:
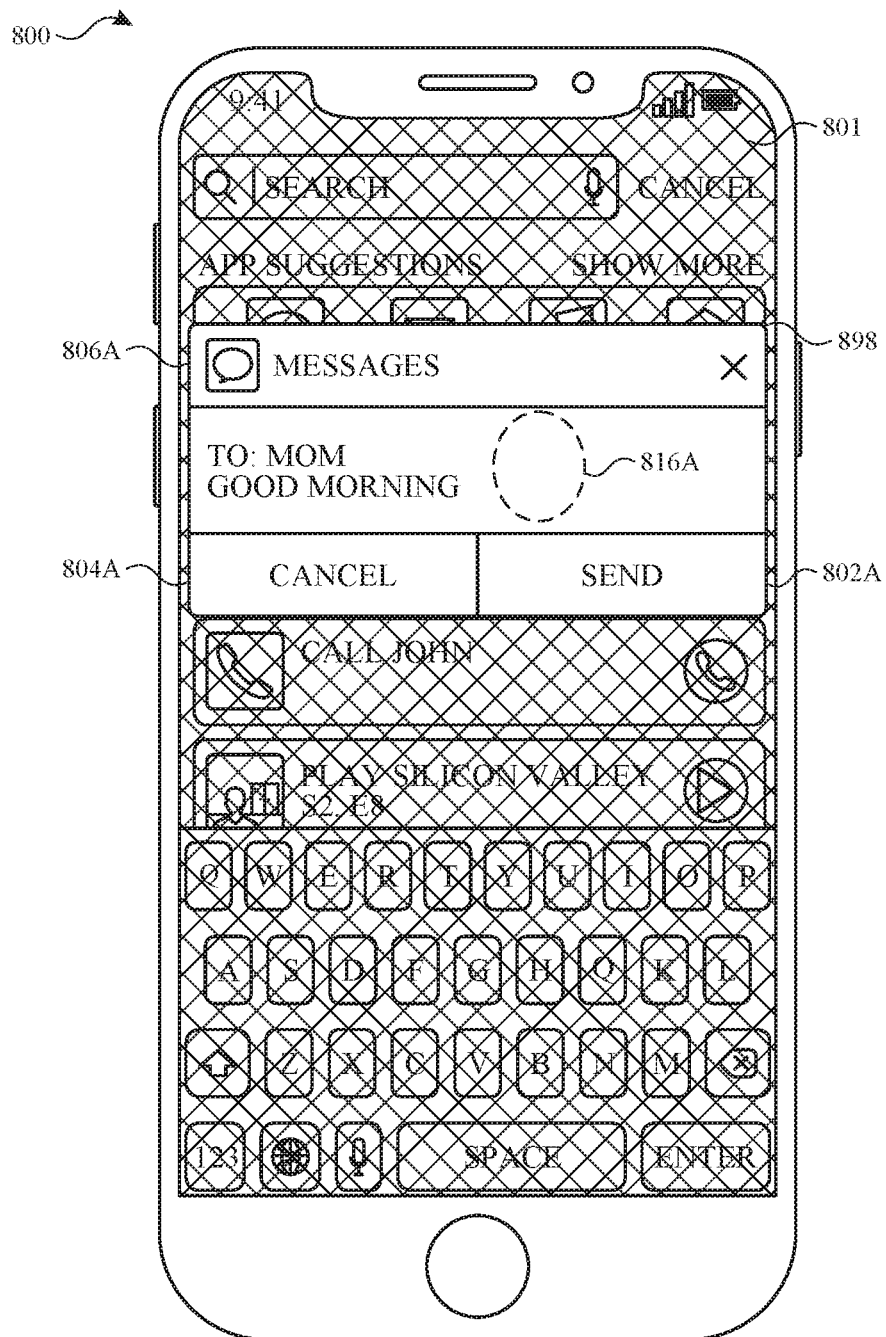
Figure 8X:
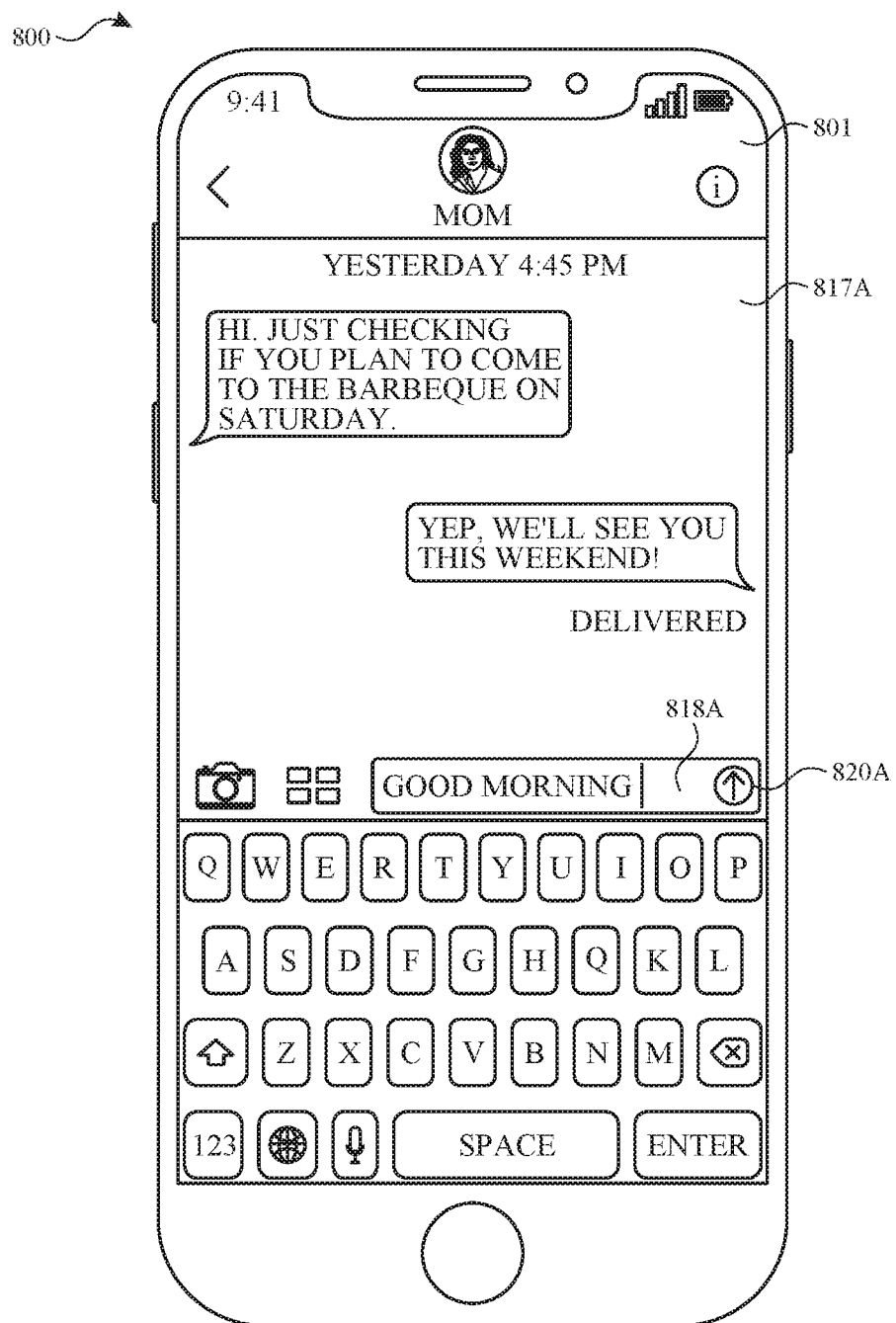

In some examples, while displaying the confirmation interface 898, the electronic device 800 detects selection of content 808A. For example, as shown in FIG. 8W, the selection is a tap gesture 816A on the content 808A. In response to detecting the tap gesture 816A, the electronic device 800 opens the application associated with the suggestion affordance 870 as shown in FIG. 8X.

In some examples, opening an application in this manner includes preloading the application with one or more parameters associated with the task. In this manner, a user may perform a task within an application using a reduced number of inputs. By way of example, in response to selection of the content 808A associated with the suggestion affordance 870, the electronic device 800 opens a messaging application and preloads the messaging application with parameters specified by the suggestion affordance 870. In particular, the messaging application may be directed to a messaging interface 817A for providing messages to the recipient "Mom", and an input string "Good Morning" may be inserted into a message composition field 818A of the messaging application.

Figure 8Y:
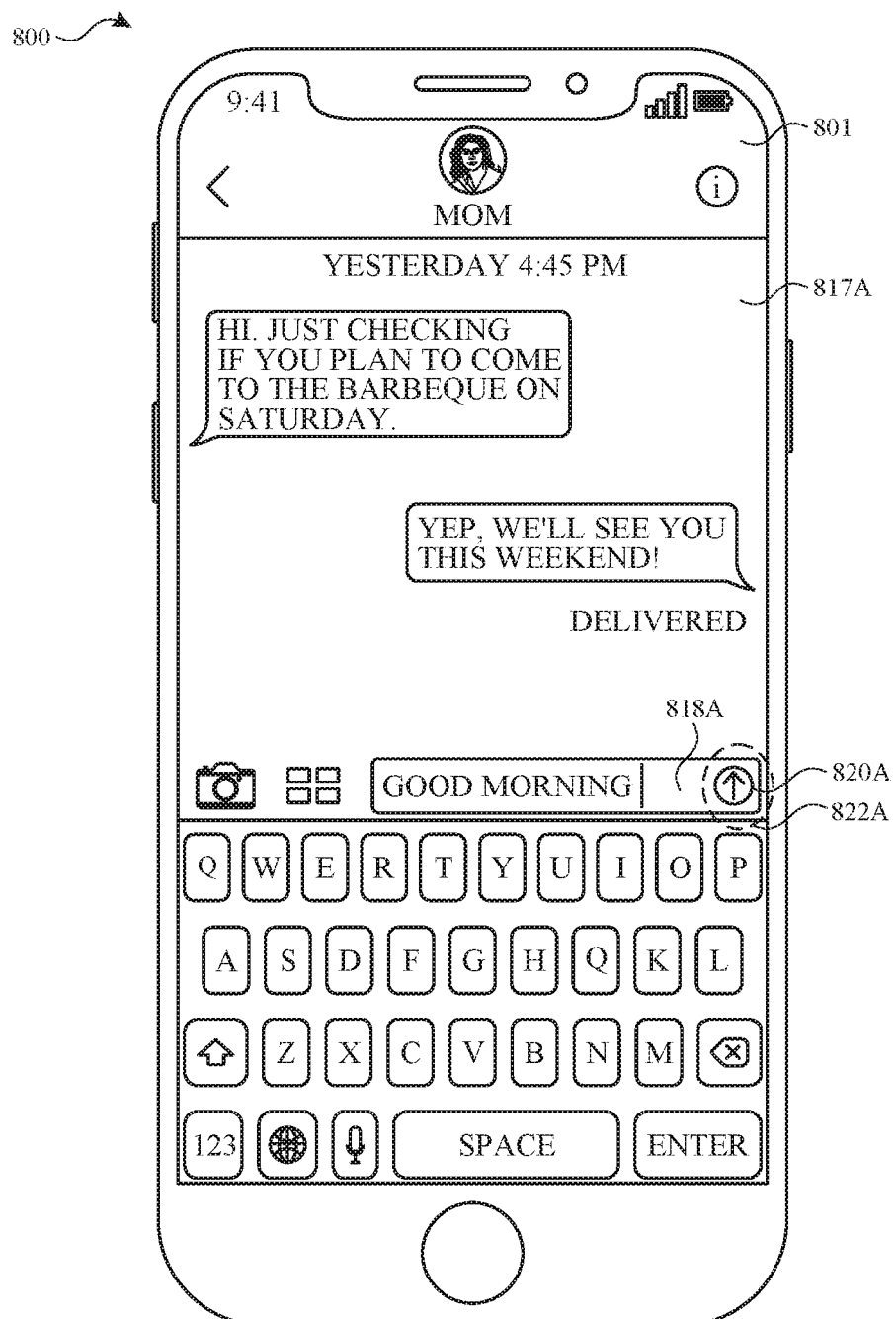
Figure 8Z:
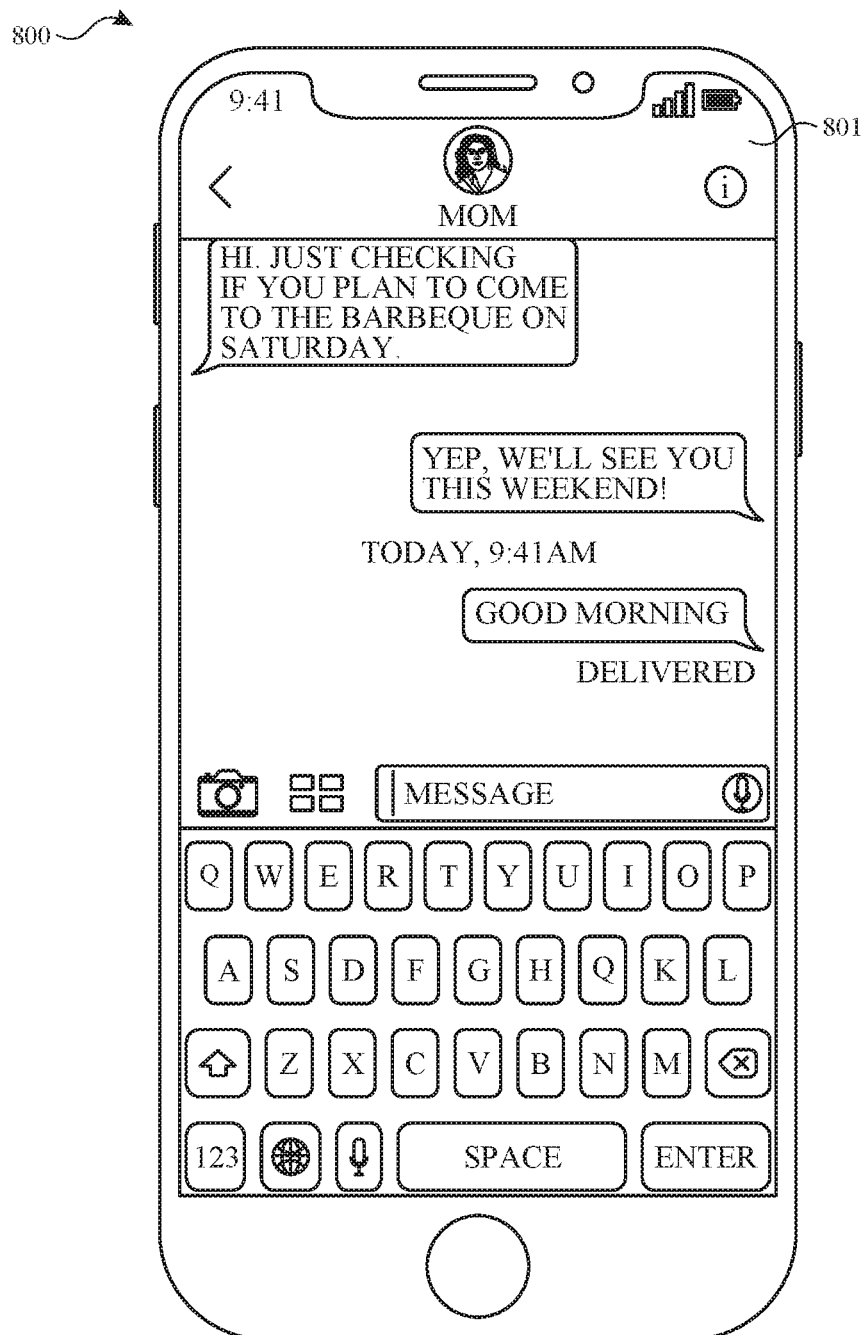
Figure 8A:
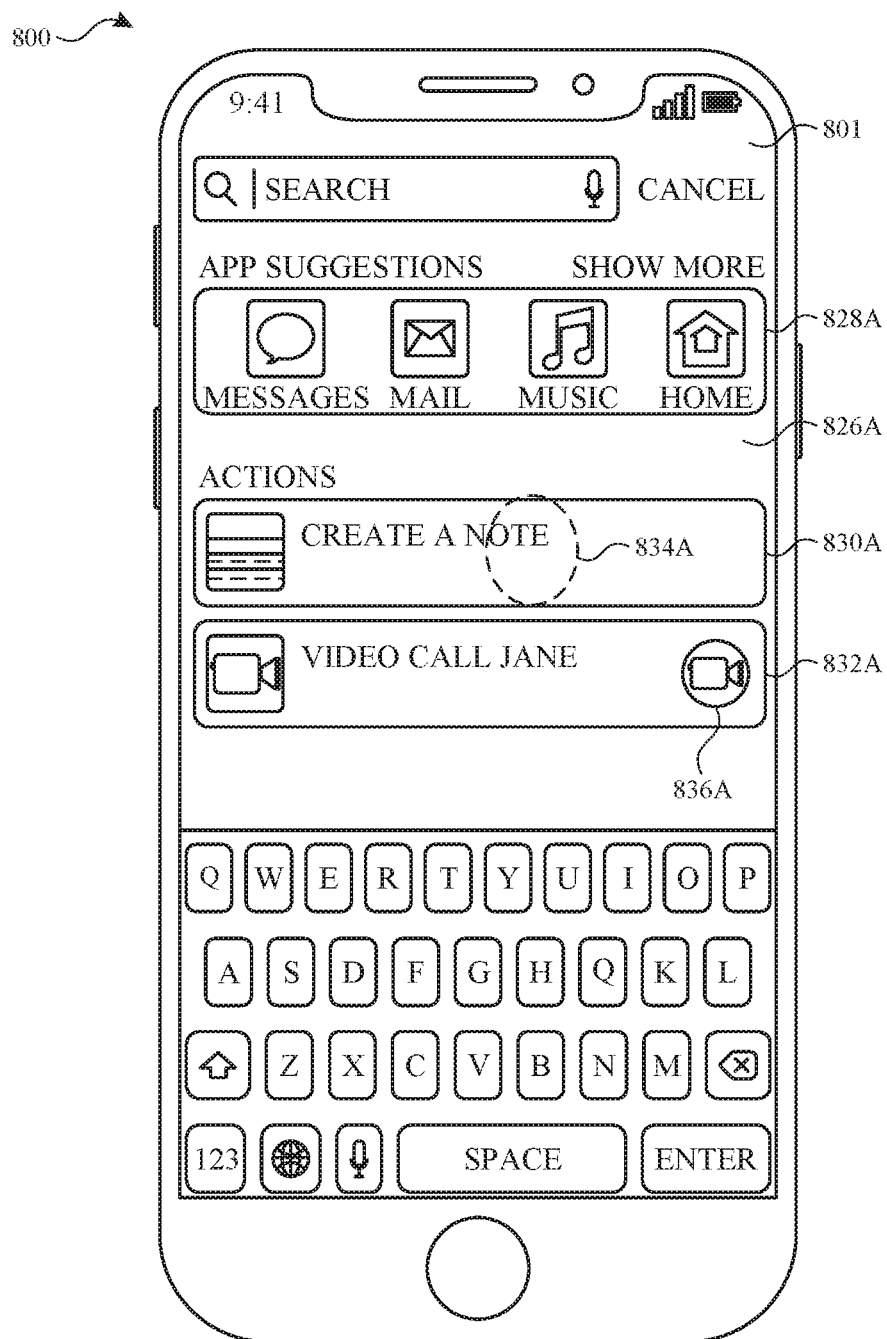
Figure 8A:
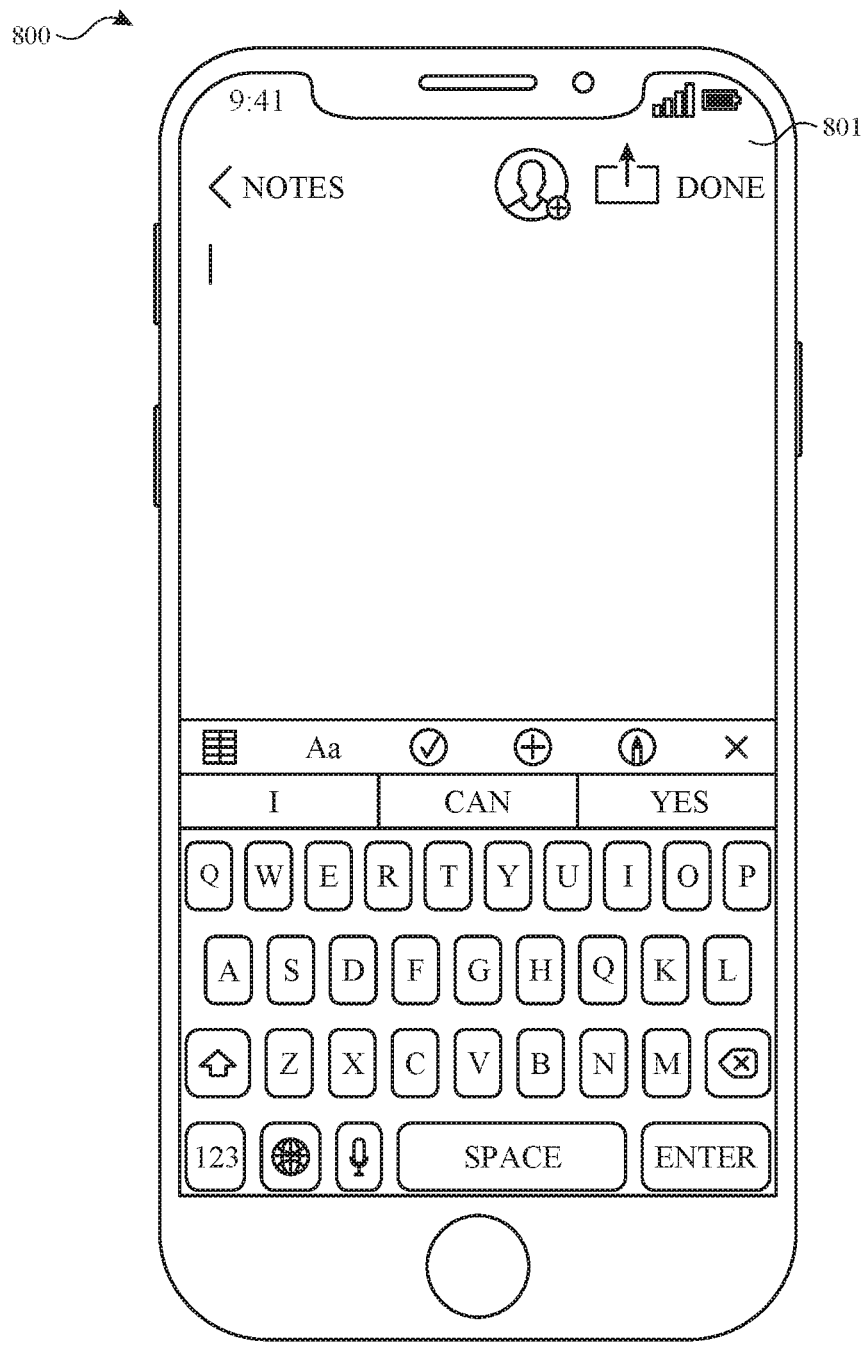
Figure 8A:
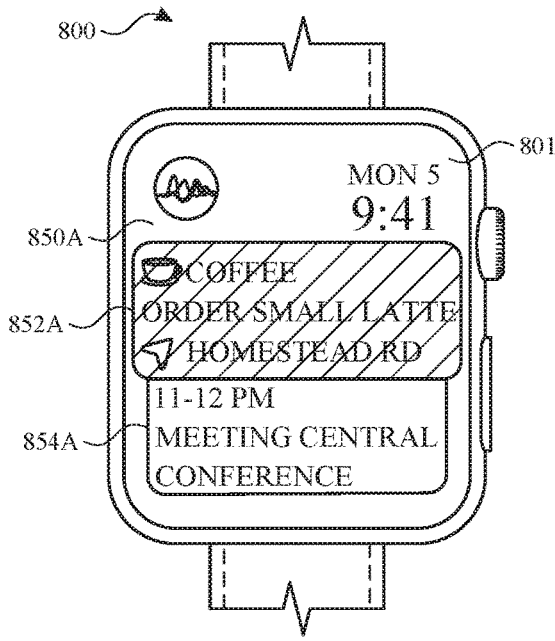
Figure 8A:
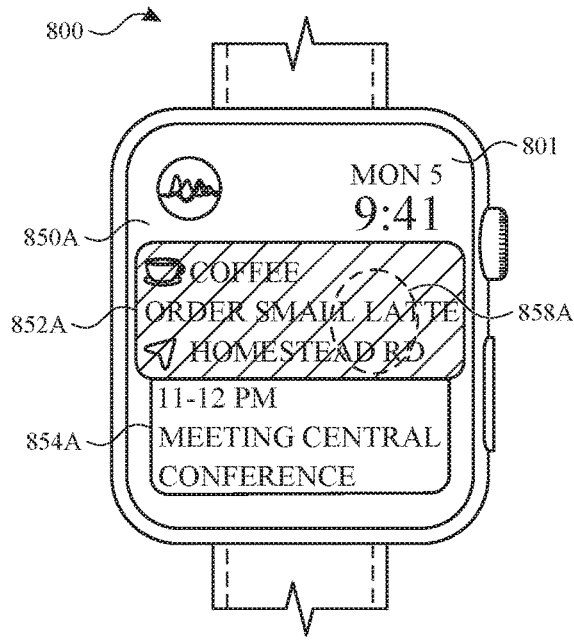
Figure 8A:
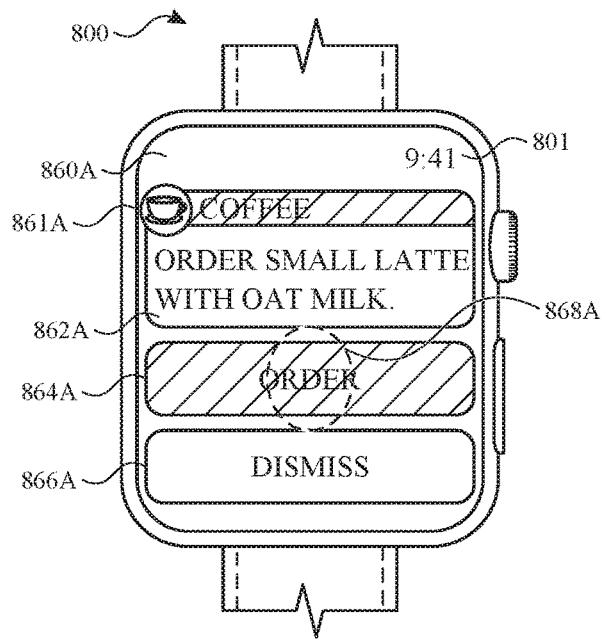
Figure 8A:
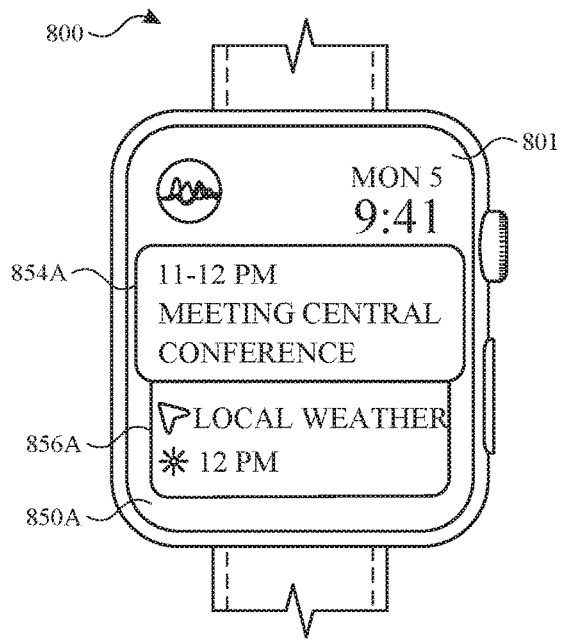

While displaying the messaging interface 817A, the electronic device 800 detects selection of a send affordance 820A. For example, as shown in FIG. 8Y, the selection is a tap gesture 822A on the send affordance 820A. In FIG. 8Z, in response to detecting the tap gesture 822A, the electronic device 800 sends the preloaded message (e.g., "Good Morning") to the recipient "Mom". By preloading parameters in this manner, a user may open an application using a suggestion affordance and perform a task with fewer inputs than would otherwise be possible. In the aforementioned example, for instance, the user sent a text message without having to select a recipient or input a message for the recipient.

In some examples, an application may be opened without preloaded parameters. In FIG. 8AA, the electronic device 800 displays, on display 801, a search screen interface, such as the search screen interface 826A. The search screen interface 826A includes suggested applications 282A and suggestion affordances 830A, 832A. As shown, the suggestion affordance 830A is associated with a notes application and suggestion affordance 832A is associated with a video telephony application. Further, suggestion affordance 830A is associated with a task for opening the notes application. In some examples, tasks corresponding to the notes application may not correspond to a task category, and accordingly the suggestion affordance 830A does not include a glyph. Suggestion affordance 832A is associated with a task for initiating a video call (e.g., Skype call) and accordingly includes a video glyph 836A indicating that the task is associated with video call functionality.

While displaying the search screen interface 826A, the electronic device 800 detects selection of the suggestion affordance 834A. For example, as shown in FIG. 8AA, the selection is a tap gesture 834A on the suggestion affordance 834A. In FIG. 8AB, in response to detecting the tap gesture 834A, the electronic device 800 opens the notes application associated with the suggestion affordance 830A.

In some examples, the manner in which an electronic device displays interfaces, as described herein, depends on a type of the electronic device. In some examples, for instance, electronic device 800 may be implemented as a device with a relatively small display such that interfaces, such as lock screen interface 804 or search screen interface 866, may not be practical for display. Accordingly, in some examples, electronic device 800 may display alternative interfaces to those previously described.

With reference to FIG. 8AC, for instance, the electronic device 800 displays, on display 801, home screen interface 850A. Home screen interface 850A includes a suggestion affordance 852A and a notification 854A. As shown, the suggestion affordance 852A is associated with an application named "Coffee" and the notification 854A is a calendar notification associated with a calendar application indicating that the user has an upcoming event ("Meeting").

It will be appreciated that while home screen interface 850A is shown as including suggestion affordance 852A, in some examples, home screen interface 850A includes multiple suggestion affordances 852A. For instance, in response to a user input, such as a swipe gesture (e.g., upward swipe gesture, downward swipe gesture), the electronic device can display (e.g., reveal) one or more additional suggestion affordances.

While displaying home screen interface 850A, the electronic device 800 detects selection of suggestion affordance 852A. For example, as shown in FIG. 8AD, the selection is a tap gesture 858A on the suggestion affordance 852A. As will be described in more detail below, in response to detecting tap gesture 858A, the electronic device 800 displays a confirmation interface, such as confirmation interface 820. Confirmation interface 820 includes application indicator 861A, task indicator 862A, confirmation affordance 864A, and cancel affordance 866A. In some examples, application indicator 861A indicates the application associated with the task. Application indicator 861A may include a name of the application (e.g., "Coffee") and/or an icon associated with the application. Task indicator 862A indicates a task associated with the application and one or more parameters associated with the task (small, latte, oat milk).

In some examples, in response to selection of the cancel affordance 866A, the electronic device 800 ceases display of the confirmation interface 860A. In some examples, while displaying the confirmation interface 860A, the electronic device 800 detects selection of the confirmation affordance 864A. For example, as shown in FIG. 8AE, the selection is a tap gesture 868A on the confirmation affordance 864A. In response to detecting tap gesture 868A, the electronic device 800 selectively performs the task. If the task is a task of a first type, the electronic device 800 performs the task without further user input, and optionally, replaces display of the confirmation interface 860A with home screen interface 850A as shown in FIG. 8AF. Because the task associated with suggestion affordance 852A was performed, suggestion interface 852A is not displayed in home screen interface 850A. If the task is a task of a second type, the electronic device 800 may request user confirmation of the task prior to performing the task, as described.

Figure 9A:
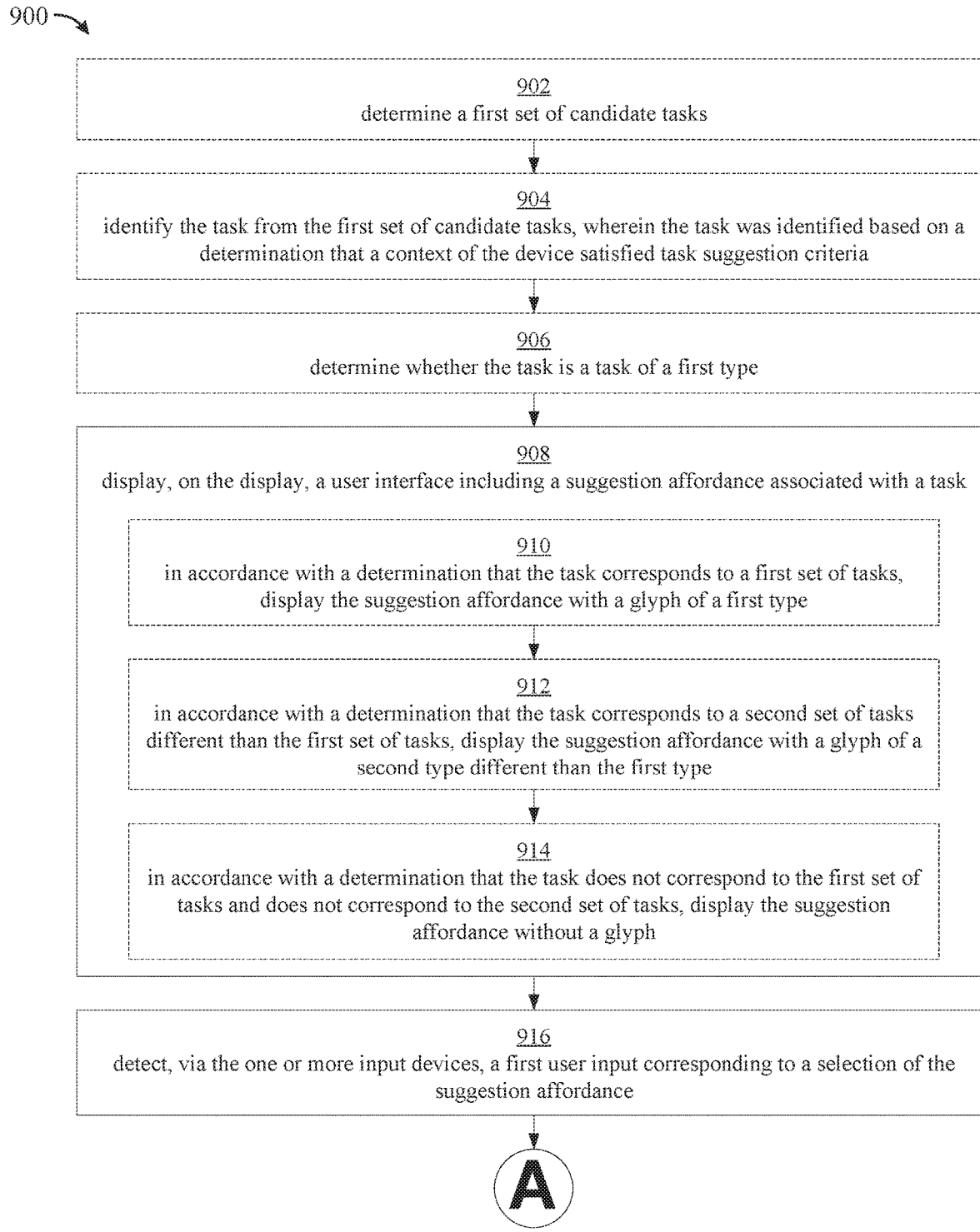

FIGS. 9A-9B is a flow diagram illustrating method 900 for providing suggestions in accordance with some embodiments. Method 900 is performed at a device (e.g., device 104, device 122, device 200, device 600, device 700, device 800) with a display, one or more input devices (e.g., a touchscreen, a mic, a camera), and a wireless communication radio (e.g., a Bluetooth connection, WiFi connection, a mobile broadband connection such as a 4G LTE connection). In some embodiments, the display is a touch-sensitive display. In some embodiments, the display is not a touch sensitive display. In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 900 are, optionally, combined, the orders of some operations are, optionally, changed, and some operations are, optionally, omitted.

As described below, displaying a user interface including a suggestion affordance and selectively requiring confirmation to perform a task in response to selection of the suggestion affordance provides a user with an easily recognizable and intuitive approach for performing tasks on the electronic device, thereby reducing the number of user inputs otherwise needed to perform such tasks. Thus, displaying user interfaces in this manner enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the electronic device determines a first set of candidate tasks (902) and identifies a task from the first set of candidate tasks (904). In some examples, the task is identified based on a determination that a context of the electronic device satisfies task suggestion criteria.

In some examples, prior to displaying, on the display, a user interface, the electronic device determines, based on a first context of the electronic device (e.g., context data describing previous use of the electronic device), whether context criteria (e.g., task suggestion criteria) has been satisfied. In some examples, the electronic device determines whether task suggestions satisfy a confidence threshold for display of the suggestions. In some examples, in accordance with a determination that the context criteria have been satisfied (e.g., one or more task suggestions meet the confidence threshold), the electronic device determines a first set of candidate tasks. In some examples, the electronic device determines, based on a second context of the electronic device, whether heuristic criteria have been satisfied. In some examples, the second context of the electronic device is indicative of previous use of the device and/or context data associated with the user (e.g., contacts, calendar, location). In some examples, determining whether the heuristic criteria have been met includes determining whether a set of conditions for a heuristic task suggestion have been met such that the heuristic task suggestion is provided in lieu of a suggested task. In some examples, the electronic device determines whether the context criteria have been satisfied and then determines whether the heuristic criteria have been satisfied. In some examples, the electronic device determines whether the heuristic criteria have been satisfied and then determines whether the context criteria have been satisfied. In some examples, the electronic device concurrently determines whether the context criteria and the heuristic criteria have been satisfied. In some examples, in accordance with a determination that the heuristic criteria have been satisfied, the electronic device determines a second set of candidate tasks different from the first set of candidate tasks and identifies a task from the second set of candidate tasks. In some examples, in accordance with a determination that the heuristic criteria have not been satisfied and the context criteria have been satisfied, the electronic device identifies a task from the first set of candidate tasks. In some examples, in accordance with a determination that the heuristic criteria have not been satisfied and the context criteria have not been satisfied, the electronic device forgoes determining the first set of candidate tasks and forgoes determining the second set of candidate tasks.

Providing heuristic task suggestions in this manner allows the electronic device to provide task suggestions based on user-specific context data in addition to context data of the electronic device, for instance, according to respective sets of conditions as set forth below. This allows the electronic device to provide a user with an salient task suggestions for performing tasks on the electronic device, thereby reducing the number of user inputs otherwise needed to perform such tasks. Thus, providing heuristic task suggestions in this manner enhances the operability of the device and makes use of the electronic device more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the electronic device determines whether the task is a task of a first type (906). In some examples, determining whether the task is a task of a first type includes determining whether the task is a background task (e.g., a task that may be performed without user confirmation and/or additional user input).

In some examples, determining whether the task is a task of a first type includes determining whether one or more parameters associated with the task are valid. In some examples, parameters of a task are valid when each parameter required for a task is assigned a value within an allowable range or set of values for the parameter and, optionally, each optional parameter for a task has a value within an allowable range or set for the parameter, or is not assigned a value.

In some examples, the electronic device (104, 200, 600, 700, 800) displays, on a display of the electronic device, a user interface (804, 810, 866, 826A, 850A) including a suggestion affordance (806, 870, 872, 874, 834A, 854A) associated with a task (908). In some examples, the user interface is a lock screen interface (804, 810). In some examples, the user interface is a search screen interface (866, 826A). In some examples, the user interface is a digital assistant interface for dialog between a user and a digital assistant. In some examples, the suggestion affordance is an affordance that corresponds to a task suggestion provided by the electronic device, and in some instances, a digital assistant of the electronic device. In some examples, the suggestion is task-specific and/or parameter-specific. In some examples, task suggestions are provided based on context of the electronic device (e.g., location, WiFi connectivity, WiFi network identifier (e.g., SSID), usage history, time/day, headphones connectivity, etc.). In some examples, task suggestions are visually distinguishable from other notifications displayed by the electronic device in the user interface.

Providing task suggestions based on context of the electronic device allows the electronic device to provide salient task suggestions according to a user's previous usage of the electronic device and/or a current state of the electronic device. As a result, the number of inputs and amount of time needed to perform tasks on the electronic device are reduced, accelerating user interaction with the electronic device. This in turn reduces power usage and improves battery life of the device.

In some examples, displaying, on the display, a user interface including a suggestion affordance associated with a task includes: in accordance with the task being a task of the first type, displaying the suggestion affordance with a glyph, and in accordance with the task being a task of the second type, displaying the suggestion affordance without a glyph. In some examples, the glyph is indicative of a type of the task (e.g., background vs. non-background, whether task requires user confirmation). In some examples, the glyph is an arrow indicating the task is requiring user confirmation. In some examples, the glyph is a dollar sign (or other currency symbol) indicating that the task is a transaction. In some examples, the glyph is circumscribed by a circle.

In some examples, displaying, on the display, a user interface including a suggestion affordance associated with a task includes, in accordance with a determination that the task corresponds to a first set of tasks, displaying the suggestion affordance with a glyph of a first type (910). In some examples, the set of tasks is a category of tasks. Categories of tasks include message tasks, telephony tasks, video telephony tasks, and media tasks in some examples. In some examples, each set of tasks corresponds to one or more respective first party applications. In some examples, each set of tasks additionally includes tasks corresponding to one or more third party applications. In some examples, if the task is a task corresponding to a particular category of tasks, a suggestion affordance corresponding to the task includes a glyph identifying the category (876, 878, 880, 836A). In some examples, displaying, on the display, a user interface including a suggestion affordance associated with a task further includes, in accordance with a determination that the task corresponds to a second set of tasks different than the first set of tasks, displaying the suggestion affordance with a glyph of a second type different than the first type (912). In some examples, displaying, on the display, a user interface including a suggestion affordance associated with a task further includes, in accordance a determination that the task does not correspond to the first set of tasks and does not correspond to the second set of tasks, displaying the suggestion affordance (830A) without a glyph. In some examples, if the task does not correspond to one or more predetermined categories of tasks, the suggestion affordance corresponding to the task is displayed without a glyph (914).

In some examples, the user interface (804, 810) includes a notification (808). The notification may be a notification for an event, such as receipt of a text message. In some examples, the suggestion affordance (806) is displayed in a first manner and the notification (808) is displayed in a second manner different than the first manner. For instance, in some examples, the suggestion affordance and notification correspond to different colors, color schemes, and/or patterns. In some examples, the suggestion affordance and notification have different shapes and/or sizes.

Displaying notifications and suggestion affordances in different manners, as described herein, allows a user to easily distinguish notifications and suggestion affordances on a display of the electronic device, thereby reducing the amount of time needed to perform tasks. Reducing time in this manner enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, displaying a user interface includes, in accordance with a determination that the electronic device is in a locked state, displaying the suggestion affordance in a first visual state. In some examples, if the device is locked, the electronic device displays a reduced amount of information corresponding to the suggestion affordance. In some examples, displaying a user interface further includes, in accordance with a determination that the electronic device is not in a locked state, displaying the suggestion affordance in a second visual state different than the first visual state. In some examples, if the device is unlocked, the electronic device displays content corresponding to the suggestion affordance. Content displayed in this manner includes but is not limited to a name and/or icon of an application associated with the suggestion affordance, one or more parameters associated with task of the suggestion affordance, and, optionally a glyph indicating a category of the task of the suggestion affordance.

In some examples, the electronic device detects, via one or more input devices, a first user input (816, 834A, 858A) corresponding to a selection of the suggestion affordance (916). In some examples, the suggestion affordance is selected using a touch input, a gesture, or a combination thereof. In some examples, the suggestion affordance is selected using a voice input. In some examples, the touch input is an input of a first type, such as a press of a relatively short duration or low intensity.

In some examples, in response to detecting the first user input (918), the electronic device, in accordance with a determination that the task is a task of a first type, performs the task (920). In some examples, performing the task includes causing the task to be performed by another electronic device. In some examples, the electronic device is a device of a first type (e.g., smart watch) and causes the task to be performed on a device of a second type (e.g., mobile phone).

In some examples, further in response to detecting the first user input (918), the electronic device, in accordance with a determination that the task is a task of a second type different than the first type, displays a confirmation interface (820, 898, 860A) including a confirmation affordance (922). In some examples, a task of the second type is a task that requires user confirmation and/or additional information from the user prior to performance of the task, such as a task corresponding to a transaction. In some examples, a task of the second type is a task to be performed by a device of a particular type, such as a smart watch. In some examples, the confirmation interface is displayed concurrently with the user interface. The confirmation interface may, for instance, be overlaid on the user interface. In some examples, the confirmation interface is displayed over a first portion of the user interface and a second portion of the user interface is visually obscured (e.g., darkened, blurred).

Selectively requiring confirmation to perform a task in response to selection of a suggestion affordance allows the electronic device to quickly perform tasks of a first type and confirm user intent prior to performing tasks of a second type. As a result, the user is provided with an intuitive and reliable approach for quickly and reliably performing tasks on the electronic device, thereby reducing the number of user inputs otherwise needed to perform such tasks and accelerating task performance. Such benefits in turn reduce the amount of time needed to perform tasks and make the usage of the electronic device more efficient, which, additionally, reduces power usage and improves battery life of the device by enabling the user to use the device more quickly and efficiently.

In some examples, while displaying the confirmation interface (926), the electronic device detects a second user input (836, 810A, 868A) corresponding to a selection of the confirmation affordance (824, 802A, 864A) (928). In some examples, the confirmation affordance is selected using a touch input, a gesture, or a combination thereof. In some examples, the confirmation affordance is selected using a voice input. In some examples, in response to detecting the second user input, the electronic device performs the task (930). In some examples, while performing the task, the electronic device displays a first progress indicator (840, 812A) to indicate that the electronic device is performing the task. In some examples, if the electronic device successfully performs the task, the electronic device displays a second progress indicator (842, 814A) to indicate that the task was successfully performed. In some examples, following performance of a task and/or display of the second progress indicator, the electronic device displays an interface including one or more visual objects specified by the application (e.g., a message or image stating "Thank you for your order"). In some examples, if the electronic device does not successfully perform the task, the electronic device provides a natural-language output to the user indicating the task was not performed successfully (e.g., "There was a problem. Try again," and, optionally, displays an affordance (846) by which the user can initiate an additional attempt at performance of the task.

In some examples, the confirmation interface includes an application affordance (828, 850). In some examples, the application affordance is an affordance that indicates (e.g., identifies) an application and/or task associated with the suggestion affordance. In some examples, the application affordance is any portion of the confirmation interface other than the confirmation affordance and/or cancel affordance. In some examples, the electronic device detects a third user input corresponding to a selection of the application affordance (932). In some examples, the application affordance is selected using a touch input, a gesture, or a combination thereof. In some examples, the application affordance is selected using a voice input. In some examples, in response to detecting the third user input, the electronic device executes (e.g., launches, initiates) an application associated with the task (934). In some examples, the user selects a displayed icon and/or name of an application to launch the application corresponding to the task of the selection affordance. In some examples, the application is, optionally, preloaded with one or more parameters (e.g., subject and/or body of an email).

In some examples, the suggestion affordance includes a visual indication of a parameter affecting performance of the task. In some examples, the suggestion affordance corresponds to a task to be performed using one or more specified parameters (e.g., order particular coffee size and type using a Starbucks app, send text with a specific message). In some examples, executing the application associated with the task includes preloading the application with the parameter. In some examples, the application is executed such that parameters of the task are entered on behalf of the user (e.g., order already in cart and user need only indicate intent to order, message inserted into message composition field and user need only indicate intent to send).

In some examples, the confirmation interface includes a cancel affordance. In some examples, the electronic device detects a fourth user input corresponding to a selection of the cancel affordance. In some examples, the cancel affordance is selected using a touch input, a gesture, or a combination thereof. In some examples, the cancel affordance is selected using a voice input. In some examples, in response to detecting the fourth user input, the electronic device forgoes performing the task. In some examples, the electronic device further ceases to display the confirmation interface in response to detecting the fourth user input.

In some examples, the first user input is an input of a first type. In some examples, the electronic device, while displaying the user interface, detects a user input of a second type corresponding to a selection of the suggestion affordance. In some examples, the suggestion affordance is selected using a touch input, a gesture, or a combination thereof. In some examples, the suggestion affordance is selected using a voice input. In some examples, the touch input is an input of a second type, such as a press of a relatively long duration or high intensity. In some examples, the input of the second type is different than the input of the first type. In some examples, in response to detecting the user input of the second type, the electronic device displays the confirmation interface.

Note that details of the processes described above with respect to method 900 (e.g., FIGS. 9A-9B) are also applicable in an analogous manner to the methods described below. For example, method 900 optionally includes one or more of the characteristics of the various methods described with reference to methods 1100, 1300, 1500, 1700, and 1900.

The operations in the methods described above are, optionally, implemented by running one or more functional modules in an information processing apparatus such as general purpose processors (e.g., as described with respect to FIGS. 2A, 4, and 6A) or application specific chips. Further, the operations described above with reference to FIGS. 8A-8AF are, optionally, implemented by components depicted in FIGS. 2A-B. For example, displaying operation 908, detecting operation 916, performing operation 920, and displaying operation 922 are, optionally, implemented by event sorter 270, event recognizer 280, and event handler 290. Event monitor 271 in event sorter 270 detects a contact on touch-sensitive surface 604 (FIG. 6A), and event dispatcher module 274 delivers the event information to application 236-1 (FIG. 2B). A respective event recognizer 280 of application 236-1 compares the event information to respective event definitions 286, and determines whether a first contact at a first location on the touch-sensitive surface corresponds to a predefined event or sub-event, such as selection of an object on a user interface. When a respective predefined event or sub-event is detected, event recognizer 280 activates an event handler 290 associated with the detection of the event or sub-event. Event handler 290 optionally utilizes or calls data updater 276 or object updater 277 to update the application internal state 292. In some embodiments, event handler 290 accesses a respective GUI updater 278 to update what is displayed by the application. Similarly, it would be clear to a person having ordinary skill in the art how other processes can be implemented based on the components depicted in FIGS. 2A-2B.

FIGS. 10A-10AJ illustrate exemplary user interfaces for providing voice shortcuts on an electronic device (e.g., device 104, device 122, device 200, device 600, or device 700), in accordance with some embodiments. The user interfaces in these figures are used to illustrate the processes described below, including the processes in FIGS. 11A-B.

Generally, user interfaces described with reference to FIGS. 10A-10AJ may be employed such that a user can associate tasks with respective user-specific phrases. These phrases may in turn be used to cause the electronic device to perform the associated tasks.

FIG. 10A illustrates an electronic device 1000 (e.g., device 104, device 122, device 200, device 600, or device 700). In the non-limiting exemplary embodiment illustrated in FIGS. 10A-10AJ, electronic device 1000 is a smartphone. In other embodiments, electronic device 1000 can be a different type of electronic device, such as a wearable device (e.g., a smartwatch). In some examples, electronic device 1000 has a display 1001, one or more input devices (e.g., touchscreen of display 1001, a button, a microphone), and a wireless communication radio. In some examples, the electronic device 1000 includes a plurality of cameras. In some examples, the electronic device includes only one camera. In some examples, the electronic device includes one or more biometric sensors (e.g., biometric sensor 1003) which, optionally, include a camera, such as an infrared camera, a thermographic camera, or a combination thereof.

In FIG. 10A, the electronic device 1000 displays, on display 1001, a settings interface 1004. The settings interface 1004 includes a candidate task portion 1006 and additional tasks affordance 1014. The candidate task portion 1006 includes candidate task affordances 1008, 1010, and 1012. In some examples, in response to selection of the additional tasks affordance 1014, the electronic device 1000 displays a global tasks interface, such as the global task interface 1018A, as described with respect to FIG. 10S below.

Figure 10B:
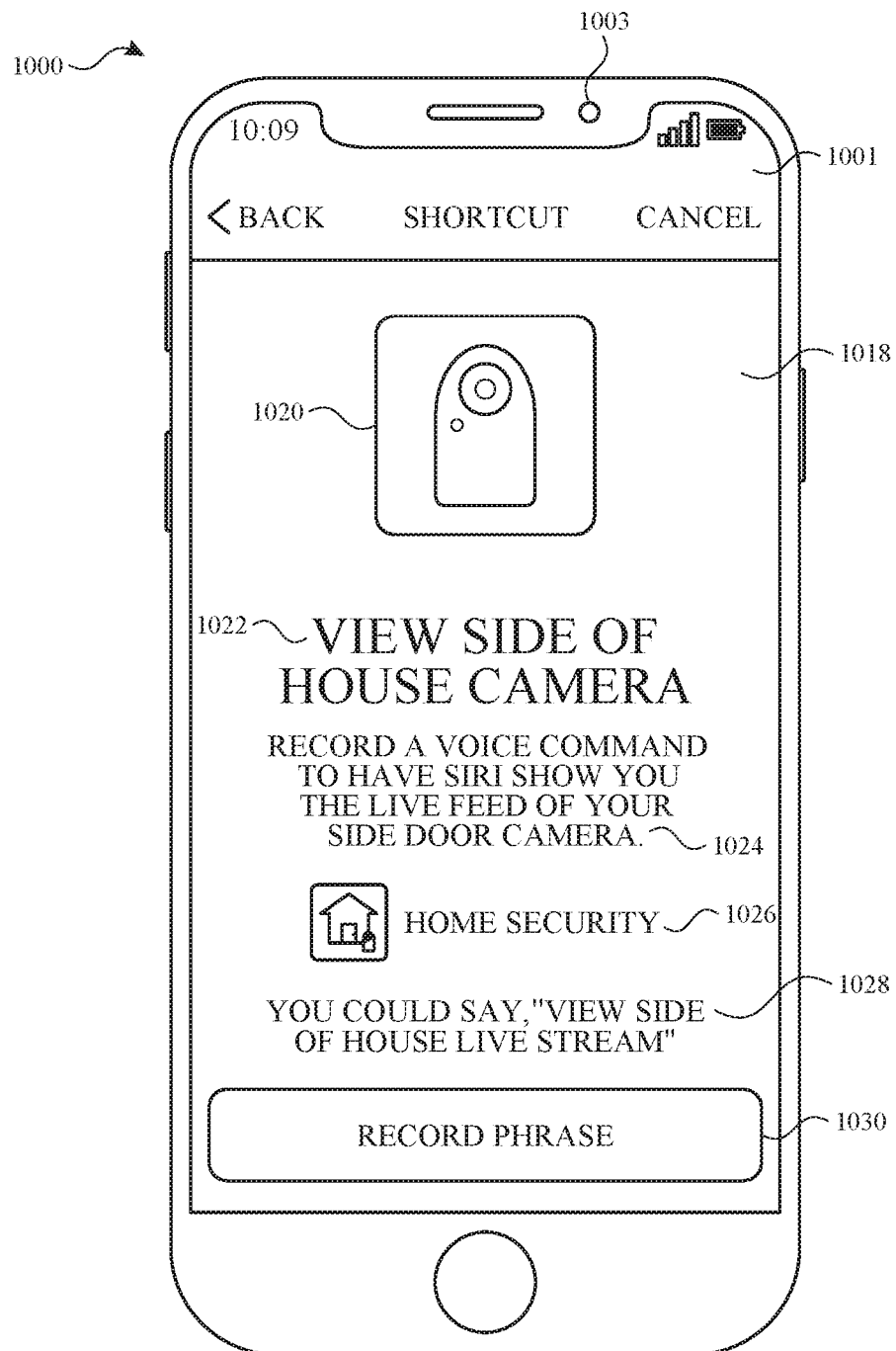

In some examples, in response to selection of a candidate task affordance, the electronic device 1000 displays a task-specific interface. The task-specific interface is associated with a task of the candidate task affordance in some examples. By way of example, while displaying the settings interface 1004, the electronic device 1000 detects selection of the candidate task affordance 1008. In some examples, the selection is a tap gesture 1016 on the candidate task affordance 1008. As shown in FIG. 10B, in response to detecting tap gesture 1016, the electronic device 1000 displays the task-specific interface 1018. The task-specific interface 1018 may be associated with a task of the candidate task affordance 1008 (e.g., View Side of House Camera). In some examples, selecting a candidate task affordance initiates a voice shortcut generation process for a task corresponding to the candidate task affordance. Accordingly, selection of the candidate task affordance 1008 may initiate a voice shortcut generation process for a task of the candidate task affordance 1008.

Task-specific interface 1018 includes task icon 1020, task indicator 1022, task descriptor 1024, application indicator 1026, candidate phrase 1028, and record affordance 1030. In some examples, task icon 1020 includes an icon or image corresponding to the task. In some examples, task indicator 1022 indicates a name and/or type of the task. In some examples, task descriptor 1024 includes a description of the task and/or indicates that a user may record a command or phrase to be linked with the task. In some examples, application indicator 1026 identifies an application corresponding to the task. The application indicator 1026 may, for instance, include a name of the application and/or an icon associated with the application. Candidate phrase 1028 includes a suggested phrase that the user may elect to associate with the task.

Figure 10C:
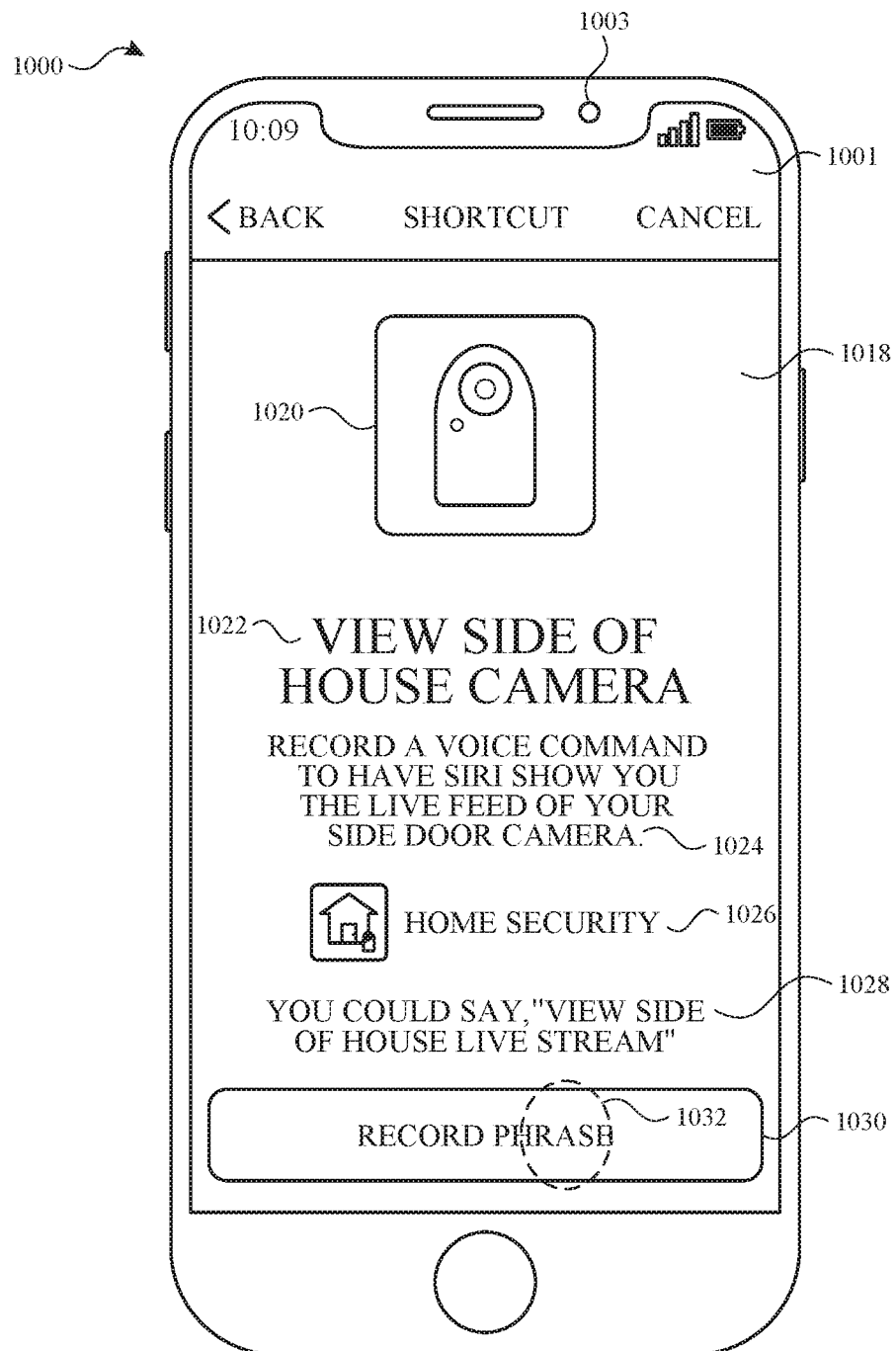

While displaying the task-specific interface 1018, the electronic device 1000 detects selection of the record affordance 1030. As shown in FIG. 10C, selection of the record affordance 1030 is a tap gesture 1032. In response to selection of the record affordance 1030, the electronic device displays (e.g., replaces display of the task-specific interface 1018 with), on the display 1001, a record interface 1034.

Figure 10D:
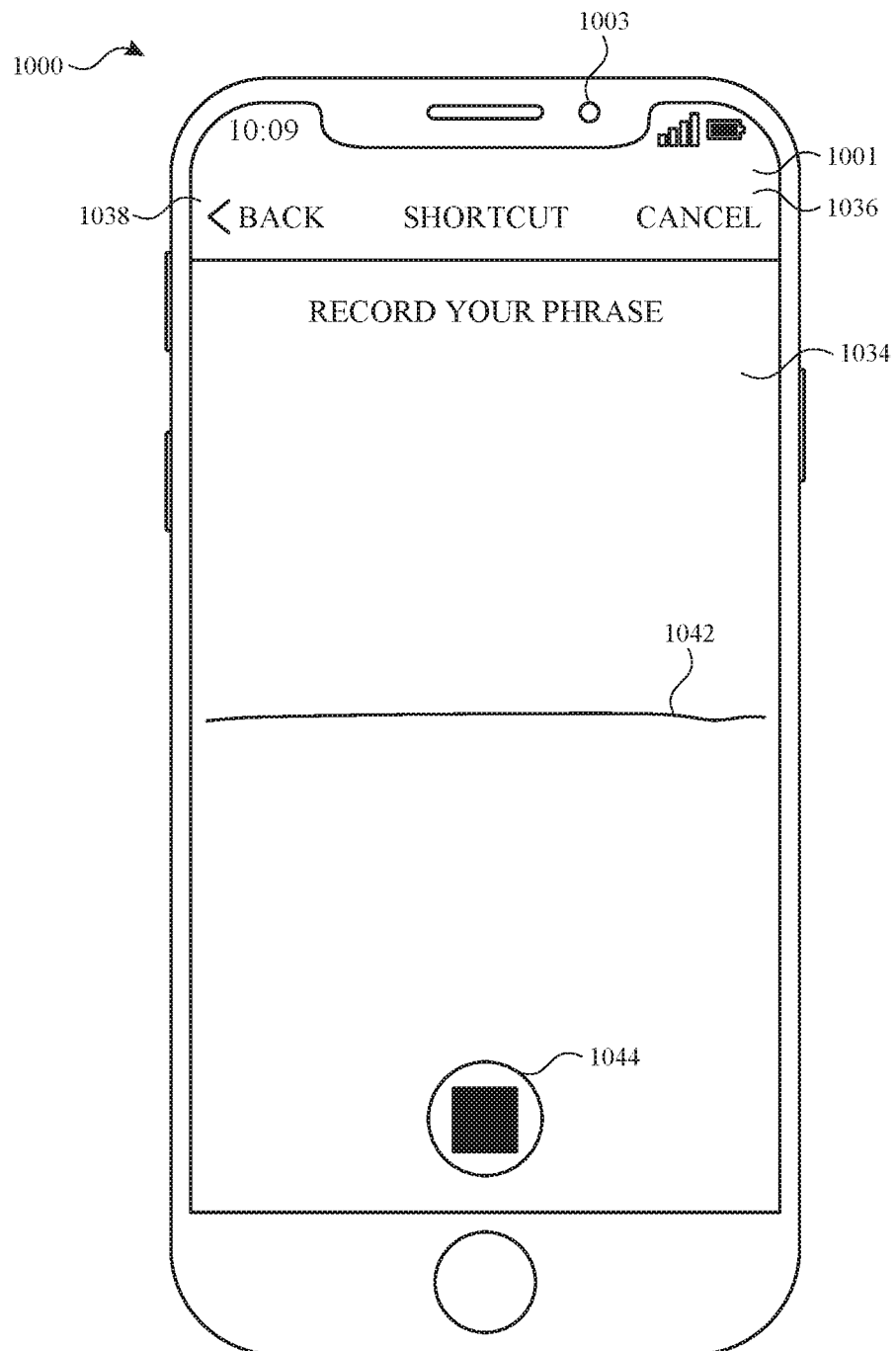

With reference to FIG. 10D, record interface 1034 includes cancel affordance 1036, return affordance 1038, preview 1042, and stop affordance 1044. In some examples, in response to selection of the cancel affordance 1036, the electronic device ceases display of the record interface 1034 and, optionally, terminates the voice shortcut generation process. In some examples, in response to selection of the return affordance, the electronic device displays (e.g., replaces display of record interface 1038 with) task-specific interface 1018.

In some examples, while displaying the record interface 1034, the electronic device 1000 receives, using an audio input device (e.g., microphone) of the electronic device 1000, a natural-language speech input from a user. In some examples, while receiving the natural-language speech input, the electronic device 1000 provides a live preview of the natural-language speech input, such as the live preview 1042. As shown in FIG. 10D, the live preview 1042 is, in some examples, a visual waveform indicative of one or more auditory characteristics of the natural-language speech input.

Figure 10E:
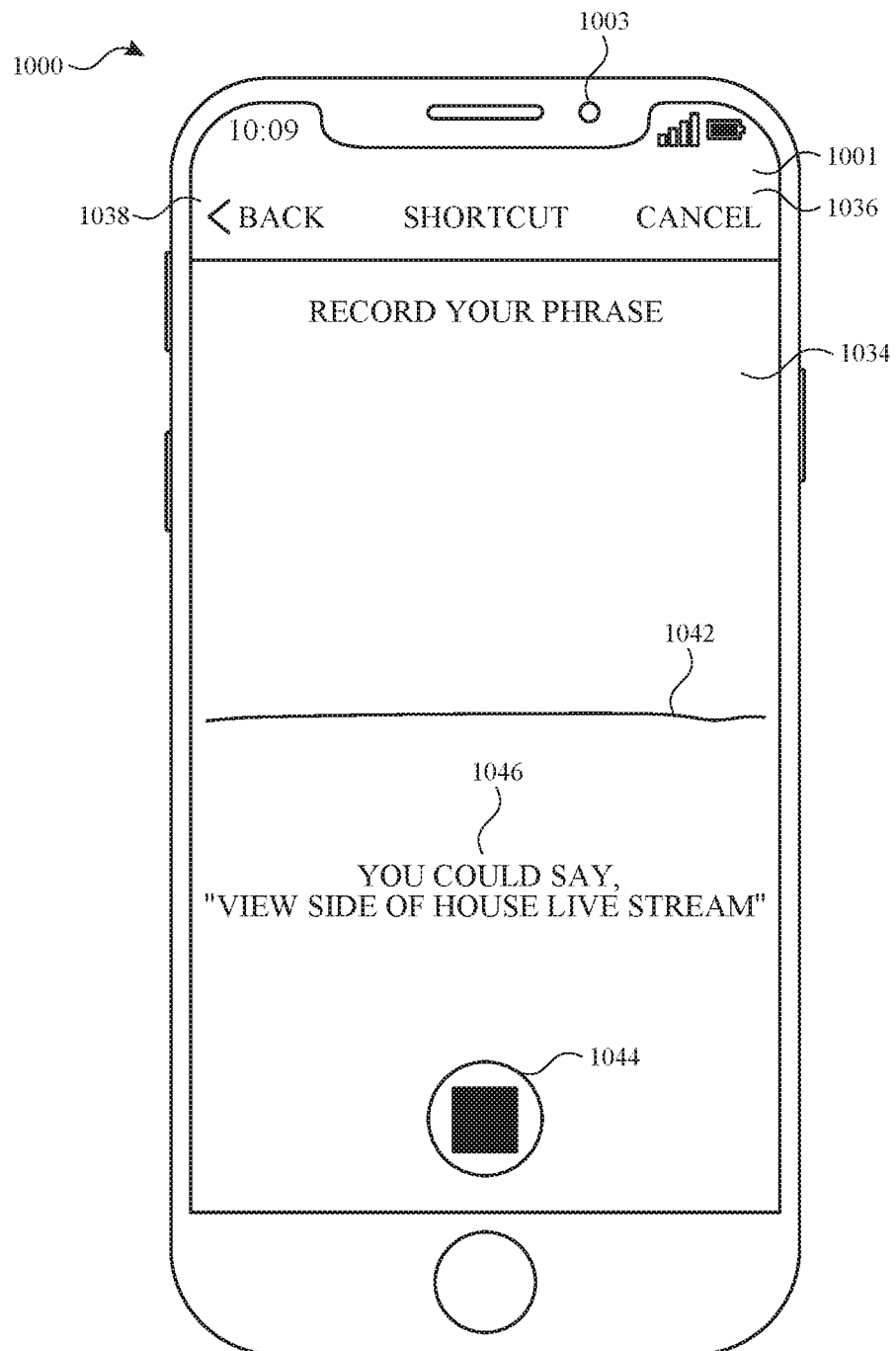

With reference to FIG. 10E, if after initially displaying the record interface 1034, the user does not provide a natural-language speech input for a predetermined amount of time, the electronic device 1000 can, optionally, display a prompt to the user including a candidate phrase, such as the candidate phrase 1046 (e.g., "View Side of House Live Stream"). In some examples, the candidate phrase 1046 is the same as the candidate phrase 1028 (FIG. 10D). In other examples, the candidate phrase 1046 is different than the candidate phrase 1028.

Figure 10F:
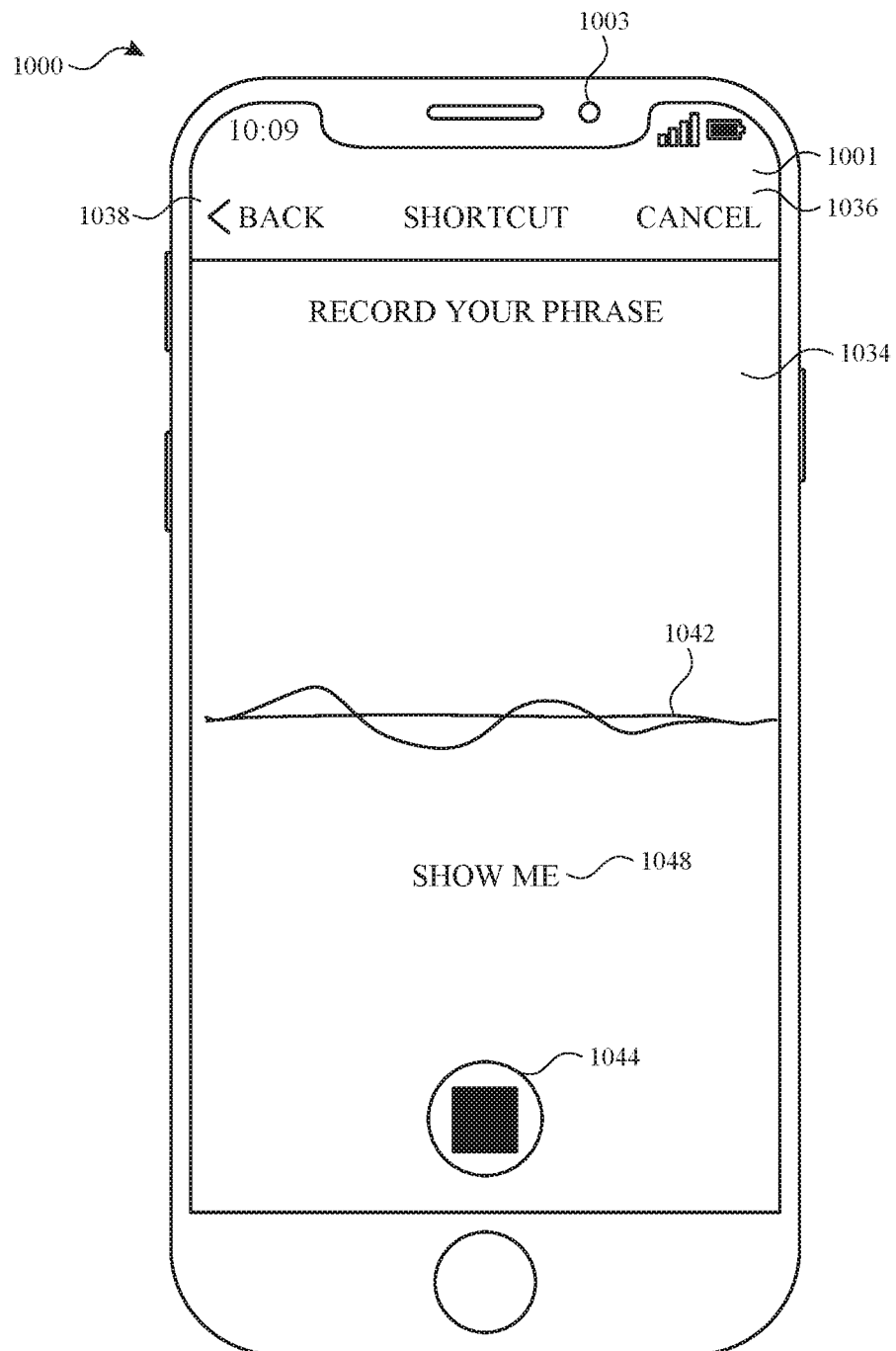
Figure 10G:
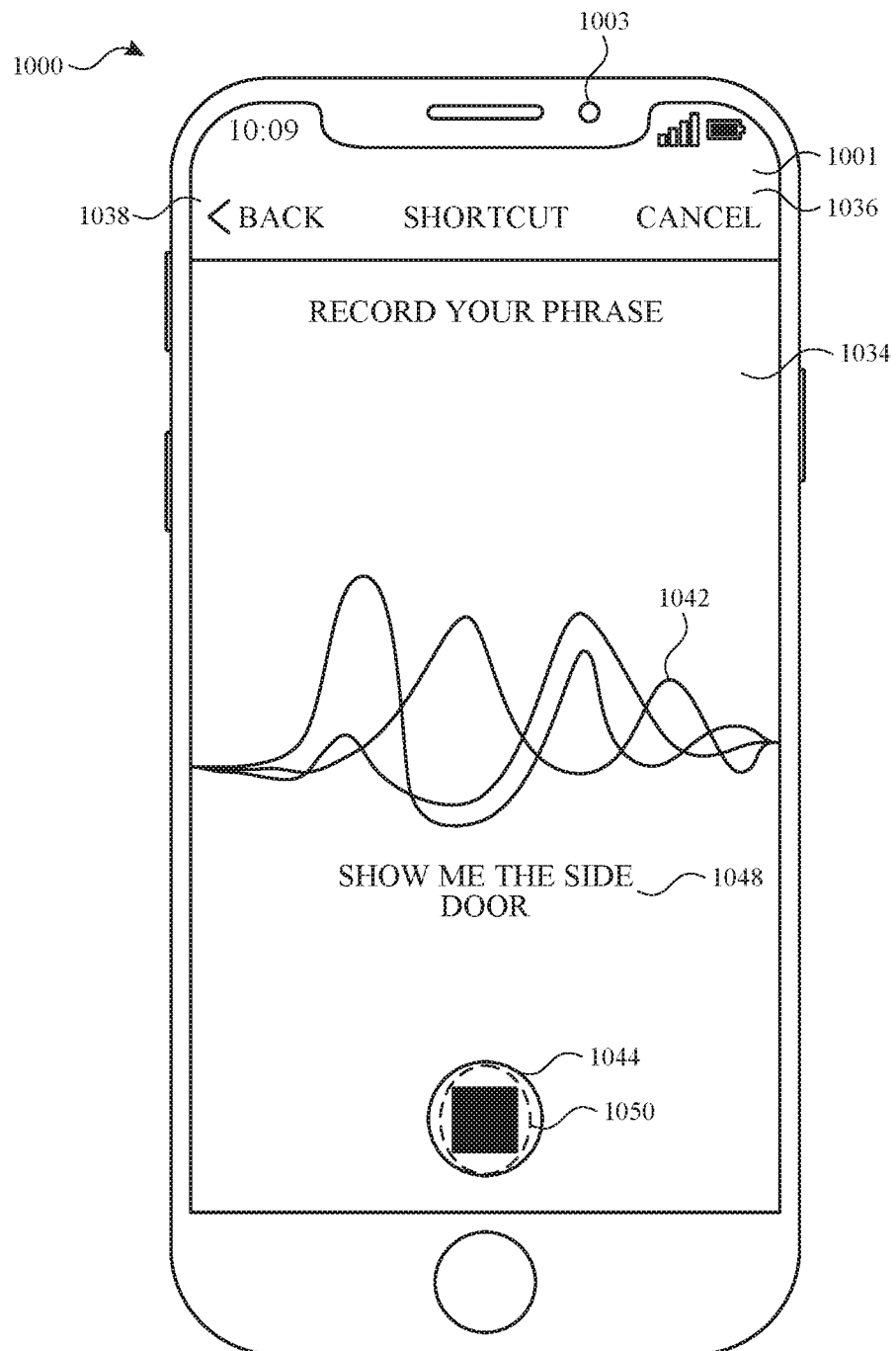

In some examples, while receiving the natural-language speech input, the electronic device 1000 performs speech-to-text translation (e.g., natural-language speech processing) on the natural-language speech input to provide a candidate phrase 1048. As shown in FIGS. 10F-G, because the speech-to-text translation is performed while the natural-language speech input is received, the candidate phrase 1048 may be iteratively and/or continuously updated while the natural-language speech input is received.

In some examples, the electronic device 1000 ensures that the candidate phrase is different than one or more predetermined phrases (e.g., "call 911"). By way of example, the electronic device 1000 determines whether a similarity between the candidate phrase and each of the one or more predetermined phrases exceeds a similarity threshold. If the similarity threshold is not met, the electronic device 1000 will notify the user that the provided candidate phrase is not sufficient and/or not permitted. The electronic device 1000 further may request that the user provide another natural-language speech input.

Figure 10H:
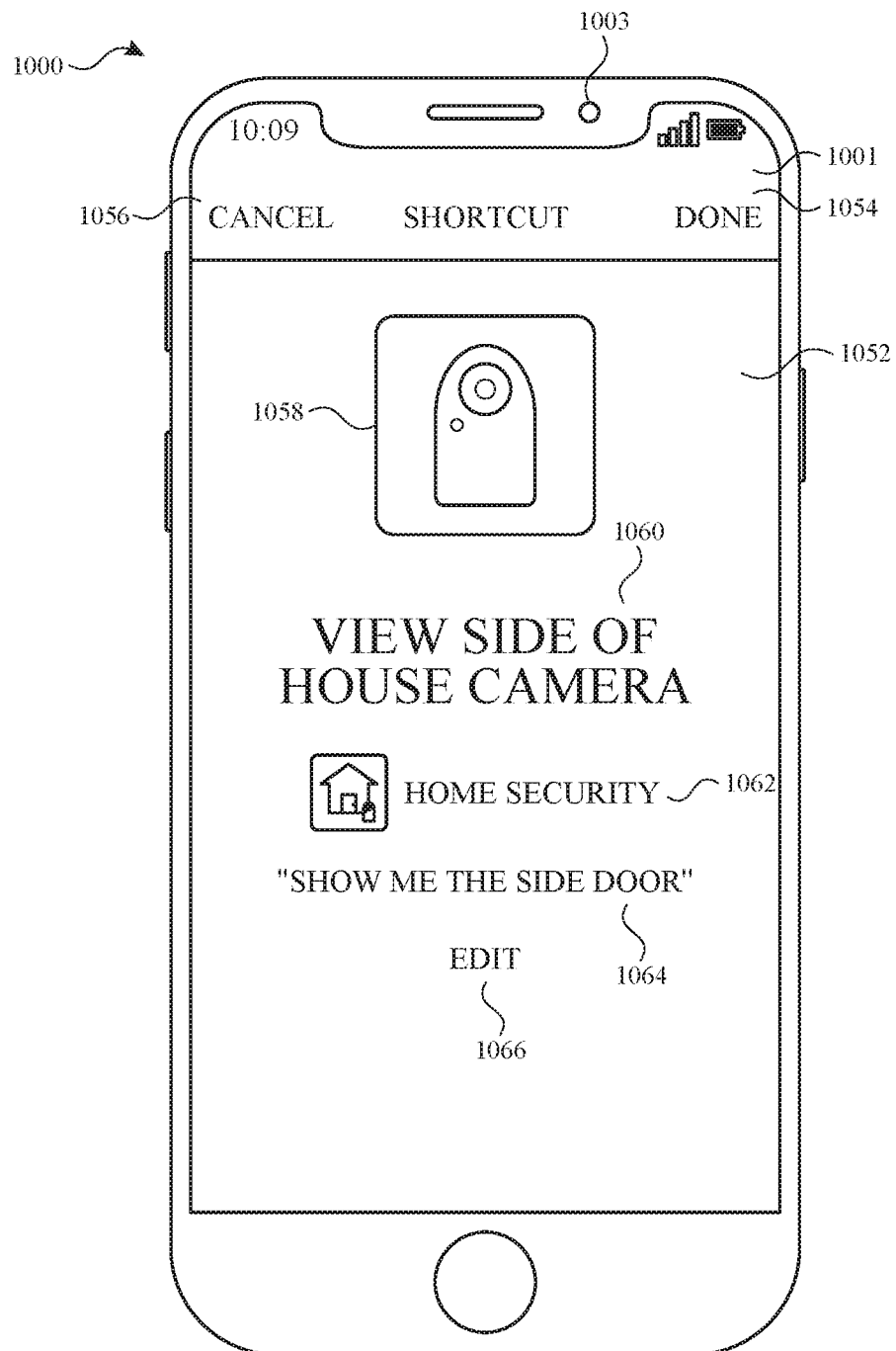

While displaying the record interface 1034, the electronic device 1000 detects selection of the stop affordance 1044. As shown in FIG. 10G, selection of the stop affordance 1044 is a tap gesture 1050. In response to selection of the stop affordance 1044, the electronic device 1000 displays (e.g., replaces display of the record interface 1034 with), on the display 1001, a completion interface 1052, as shown in FIG. 10H.

The completion interface 1052 includes a completion affordance 1054, cancel affordance 1056, task icon 1058, task indicator 1060, application indicator 1062, candidate phrase 1064, and edit affordance 1066. In some examples, in response to selection of the cancel affordance 1056, the electronic device 1000 ceases display of the completion interface 1052 and, optionally, terminates the voice shortcut generation process. In some examples, task icon 1058 includes an icon or image corresponding to the task. In some examples, task indicator 1060 indicates a name and/or type of the task. In some examples, application indicator 1062 identifies an application corresponding to the task. The application indicator may, for instance, include a name of the application and/or an icon associated with the application. Candidate phrase 1028 is a suggested phrase that the user may elect to associate with the task.

Figure 10I:
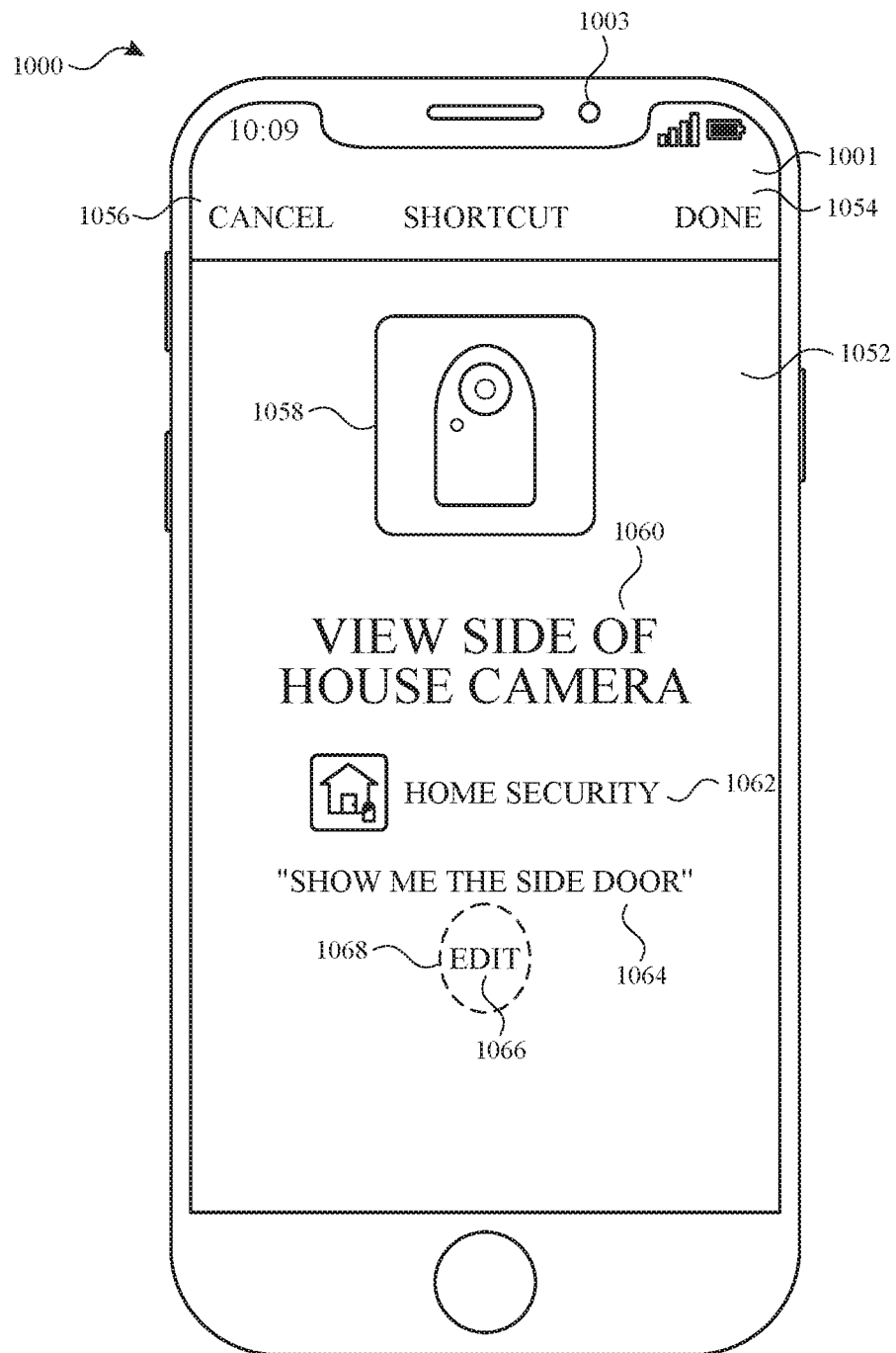
Figure 10J:
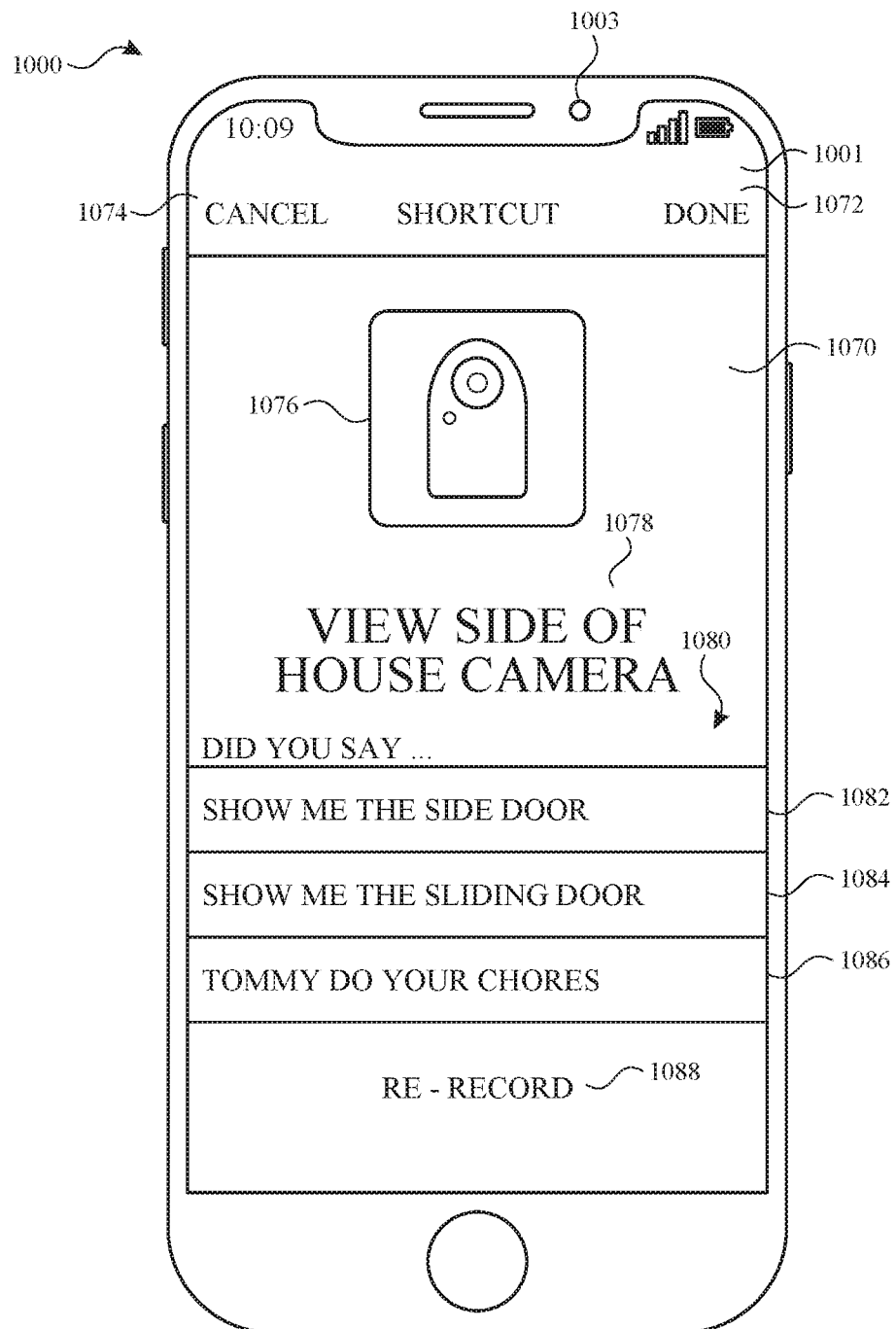

In some examples, while displaying the completion interface 1052, the electronic device 1000 detects selection of the edit affordance 1066. As shown in FIG. 10I, selection of the edit affordance 1066 is a tap gesture 1068. In response to selection of the edit affordance 1068, the electronic device 1000 displays (e.g., replaces display of the completion interface 1052 with), on the display 1001, an edit interface 1070 as shown in FIG. 10J.

The edit interface 1070 includes completion affordance 1072, cancel affordance 1074, task icon 1076, task indicator 1078, candidate phrase ranking 1080 and re-record affordance 1088. In some examples, in response to selection of the cancel affordance 1056, the electronic device 1000 ceases display of the edit interface 1070 and, optionally, terminates the voice shortcut generation process. In some examples, task icon 1076 includes an icon or image corresponding to the task. In some examples, task indicator 1078 indicates a name and/or type of the task.

As described, in some examples, the electronic device 1000 provides a candidate phrase (e.g., candidate phrase 1048) based on a natural-language speech input provided by a user. In some examples, providing the candidate phrase in this manner includes generating a plurality of candidate phrases (e.g., candidate phrases 1082, 1084, 1086) and selecting a candidate phrase associated with a highest score (e.g., text representation confidence score). In some examples, candidate phrase ranking 1080 includes a plurality of candidate phrases generated by the electronic device 1000 prior to selecting the candidate phrase associated with the highest score. In some examples, candidate phrase ranking 1080 includes a set (e.g., 3) of top ranking candidate phrases which are, optionally, listed according to the respective score of each candidate phrase. As illustrated in FIG. 10J, for instance, candidate phrase ranking 1080 includes candidate phrases 1082, 1084, and 1086. Candidate phrase 1082 may correspond to candidate phrase 1064 in some examples.

Figure 10K:
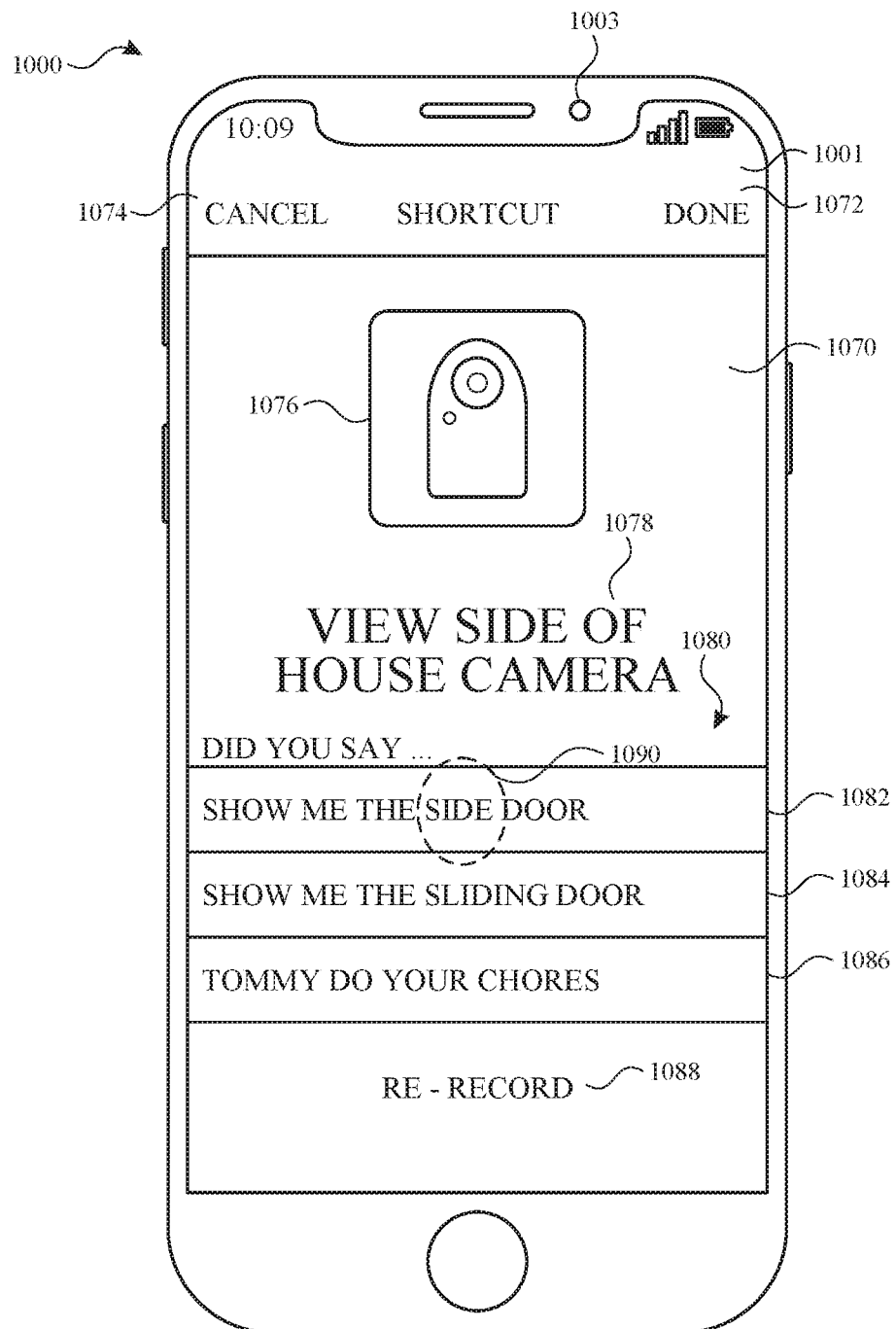

In some examples, the user may select a new (or same) candidate phrase from candidate phrases 1082, 1084, 1086 of the candidate phrase ranking 1080. As illustrated in FIG. 10K, for example, the electronic device 1000 detects selection of candidate phrase 1080 while displaying the edit interface 1070. Selection of the candidate phrase 1080 is a tap gesture 1090. In some examples, in response to selection of the candidate phrase 1080, the electronic device 1000 selects the candidate phrase 1080 as the new (or same) candidate phrase. In some examples, the electronic device selects the candidate phrase 1080 as the new (or same)

candidate phrase in response to selection of both the candidate phrase 1080 and completion affordance 1072.

In some examples, the candidate phrase ranking may not include a phrase intended or preferred by a user. Accordingly, in some examples, in response to selection of the re-record affordance 1088, the electronic device 1000 displays (e.g., replaces display of the edit interface 1070 with) a record interface, such as the record interface 1034, to allow a user can provide a new natural-language speech input, as described.

Figure 10L:
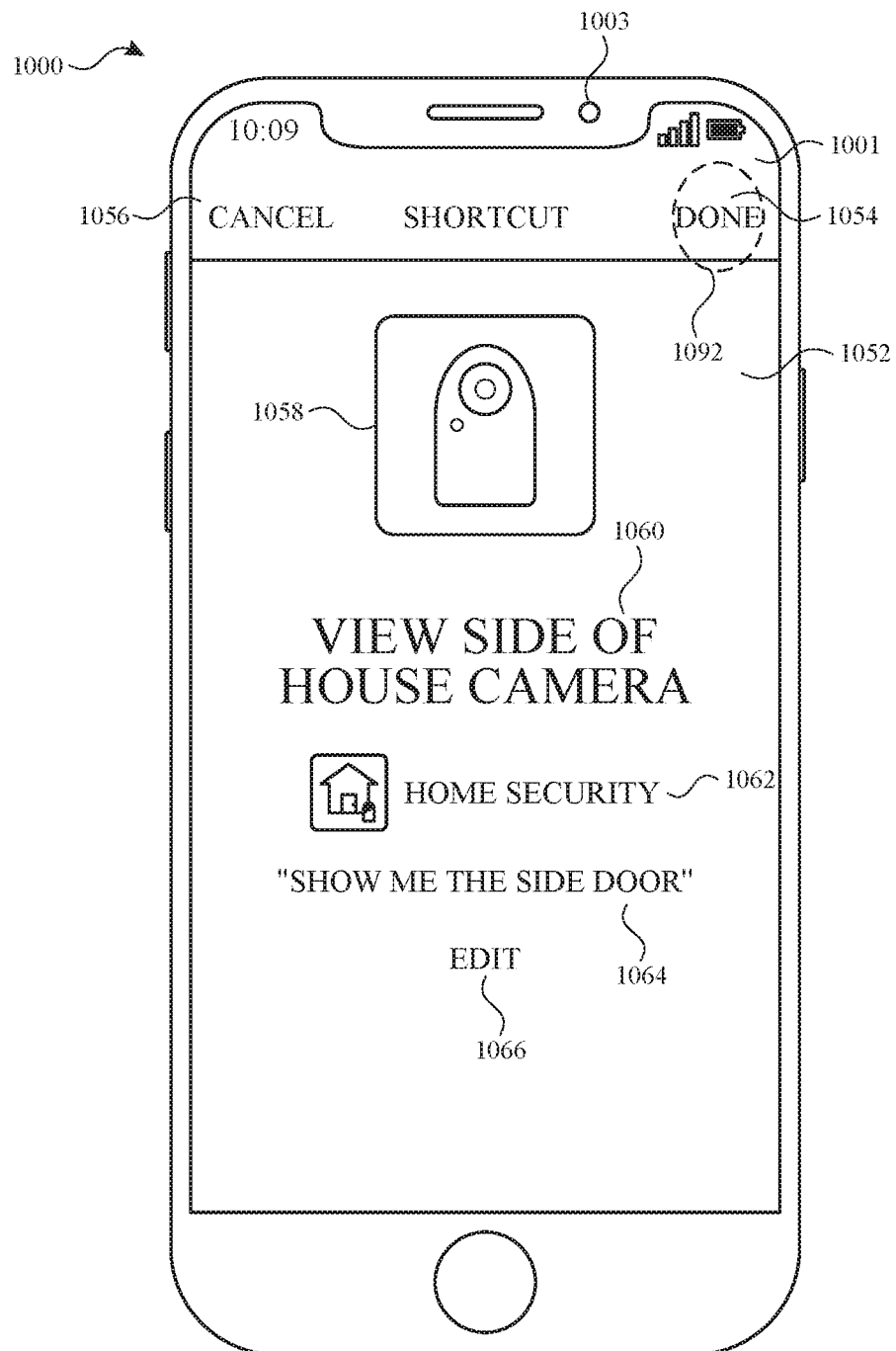
Figure 10M:
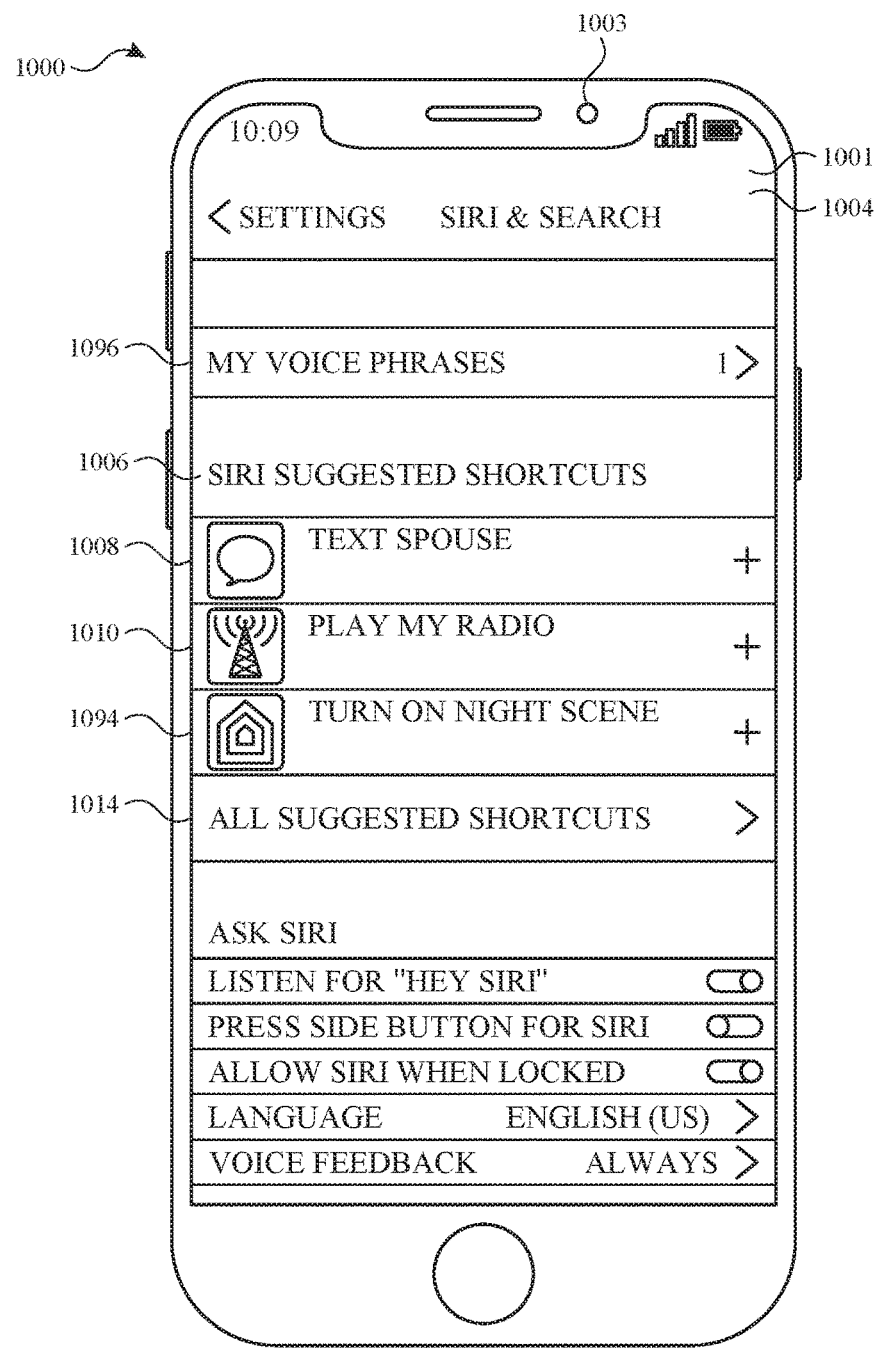

In some examples, while displaying the completion interface 1052, the electronic device 1000 detects selection of the completion affordance 1054. As shown in FIG. 10L, selection of the completion affordance 1054 is a tap gesture 1092. In response to selection of the completion affordance 1054, the electronic device 1000 associates the candidate phrase with the task of the candidate task affordance 1008. By associating the candidate phrase with the task in this manner, the user may provide (e.g., speak) the candidate phrase to a digital assistant of the electronic device to cause the device to perform the task associated with the candidate phrase. Candidate phrases associated with respective tasks may be referred to as voice shortcuts herein. In some examples, further in response to selection of the completion affordance 1054, the electronic device 1000 displays (e.g., replaces display of the completion interface 1052 with), on the display 1001, the settings interface 1004, as shown in FIG. 10M.

In some examples, because the task of the candidate task affordance 1008 is assigned to a task, the candidate task affordance 1008 is not included in the candidate task portion 1006. In some examples, the candidate task portion 1006 instead includes a candidate task suggestion 1094 such that the candidate task portion 1006 includes at least a threshold number of candidate task affordances.

Figure 10N:
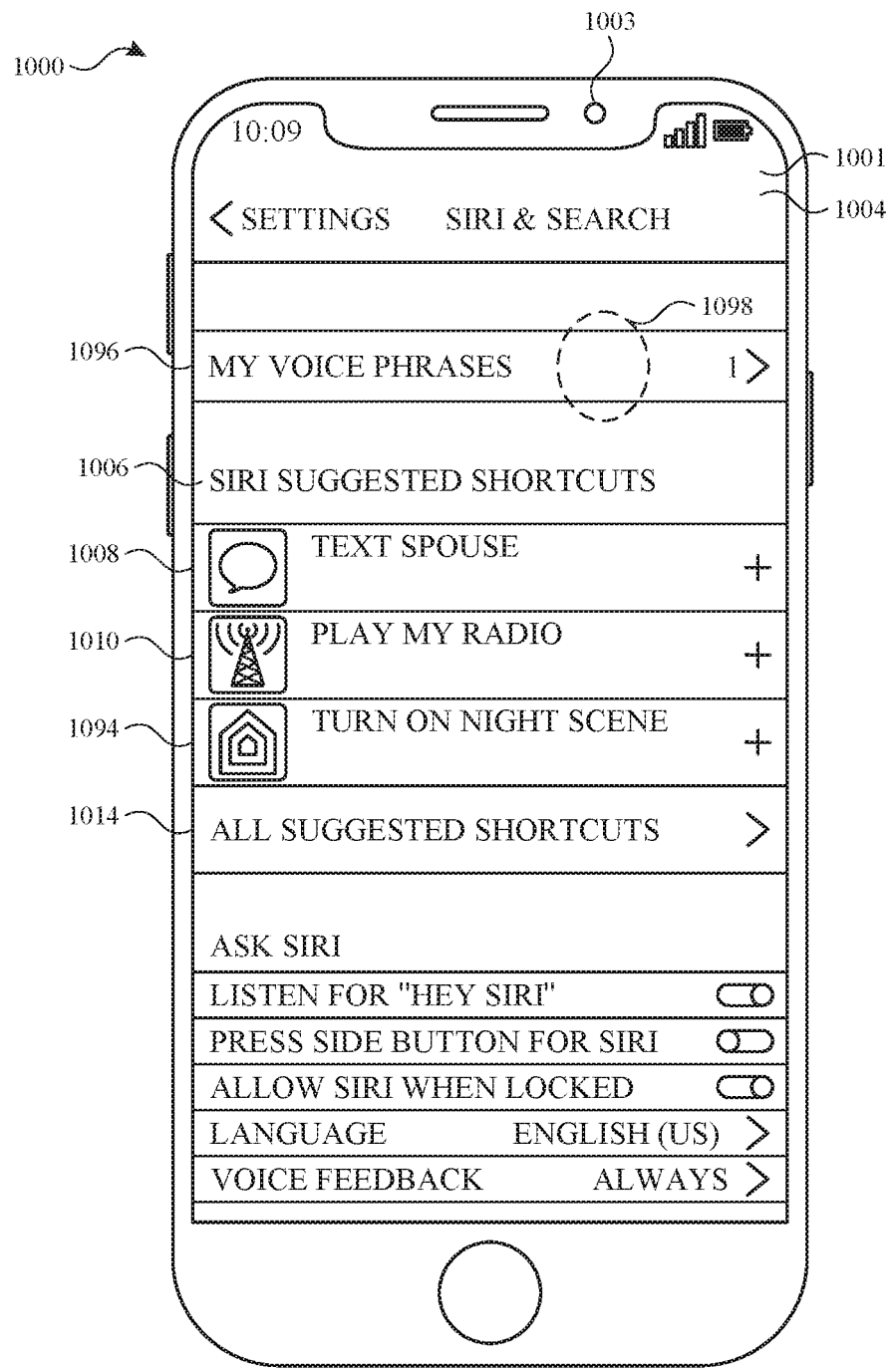
Figure 10O:
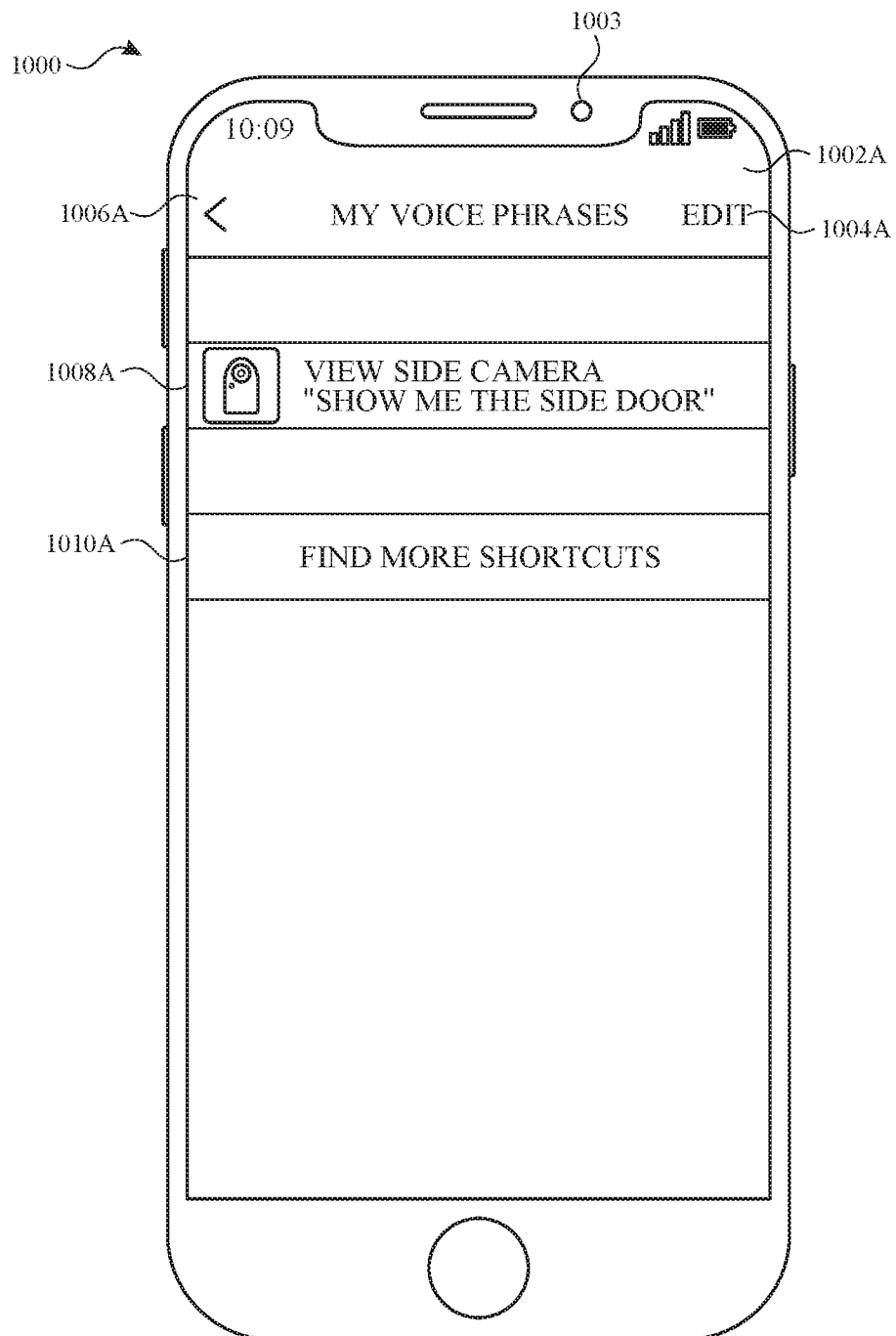

In some examples, if one or more candidate task affordances are associated with a respective task, settings interface 1004 includes a user shortcuts affordance 1096. In some examples, while displaying the settings interface 1004, the electronic device 1000 detects selection of the user shortcuts affordance 1096. As shown in FIG. 10N, the selection of the user shortcuts affordance 1096 is a tap gesture 1098. In some examples, in response to selection of the user shortcuts affordance 1096, the electronic device 1000 displays (e.g., replaces display of the settings interface 1004 with), on the display 1001, the user shortcuts interface 1002A, as shown in FIG. 10O.

The user shortcuts interface 1002A includes edit affordance 1004A, return affordance 1006A, shortcut affordance 1008A, and additional tasks affordance 1010A. In some examples, in response to selection of the return affordance 1006A, the electronic device 1000 displays settings interface 1004 (FIG. 10N). In some examples, in response to selection of edit affordance 1004A, the electronic device 1000 displays an interface by which the voice shortcut associated with shortcut affordance 1008A may be deleted. In some examples, in response to selection of additional tasks affordance 1010A, the electronic device 1000 displays an interface including one or more candidate task affordances, such as the global task interface 1018A of FIG. 10S, described in further detail below.

Figure 10P:
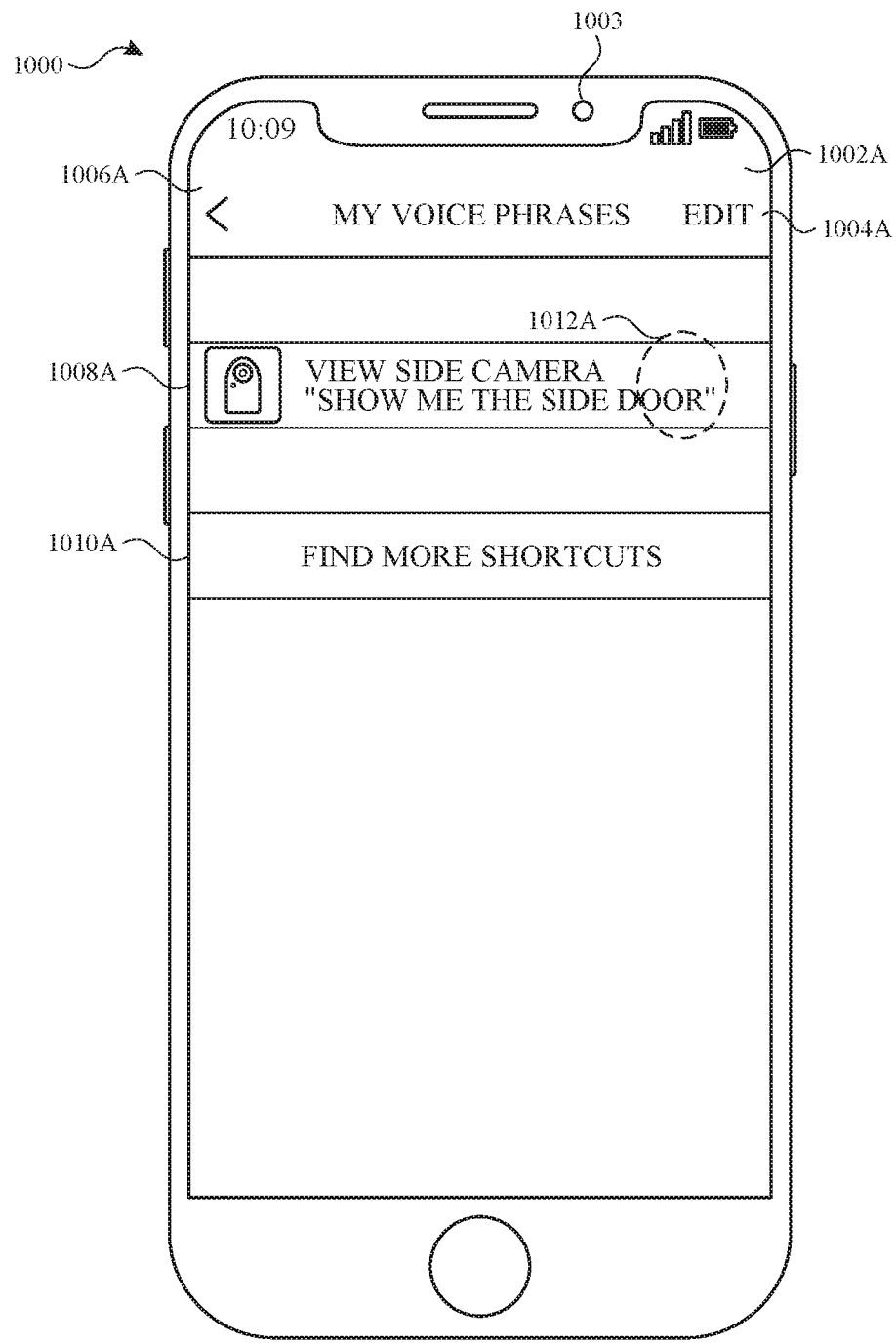
Figure 10Q:
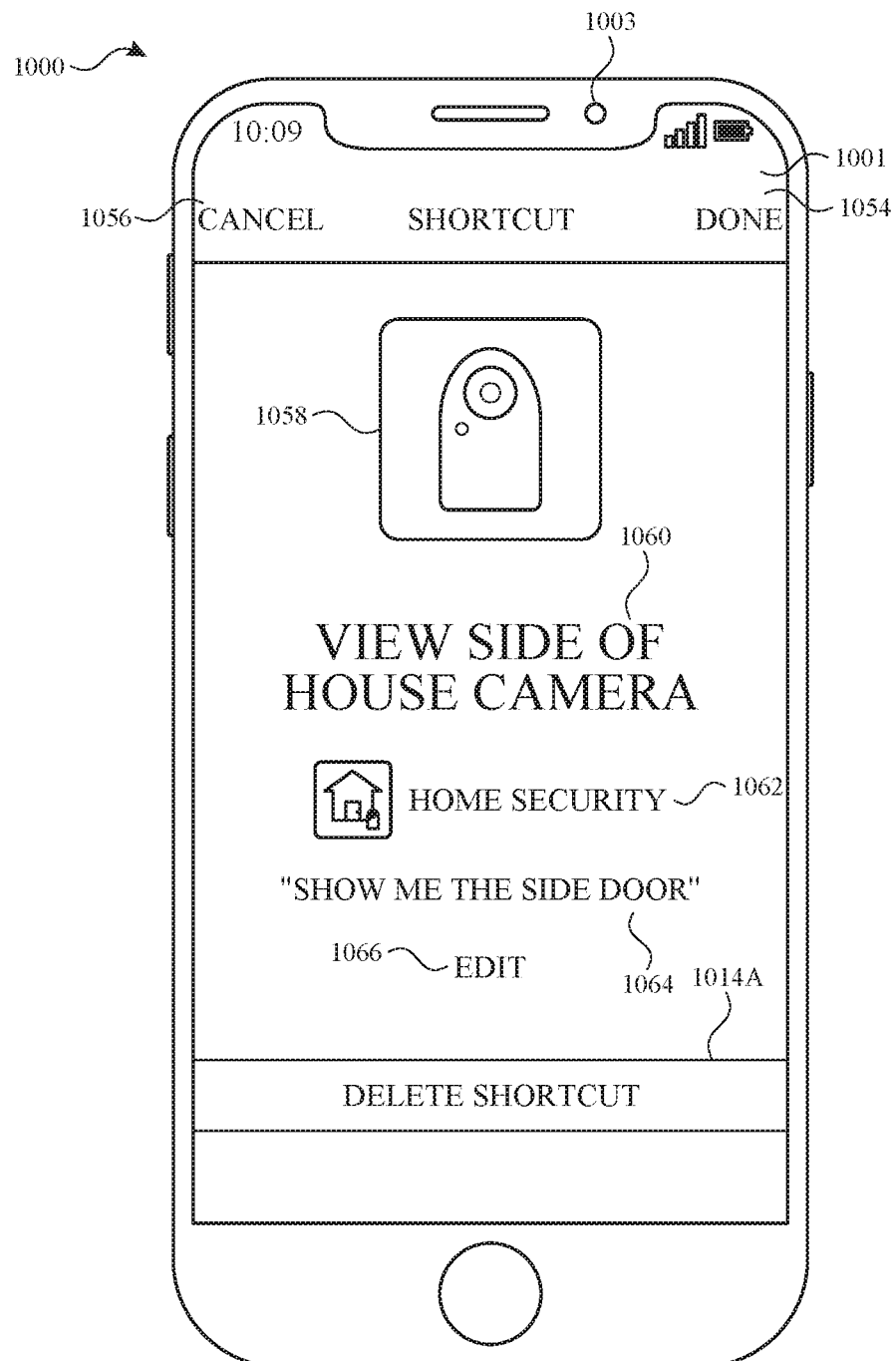

In some examples, while displaying the user shortcuts interface 1002A, the electronic device 1000 detects selection of shortcut affordance 1008A. As shown in FIG. 10P, the selection of the shortcut affordance 1008A is a tap gesture 1004A. In some examples, in response to selection of the shortcut affordance 1008A, the electronic device 1000 displays (e.g., replaces display of the user shortcuts interface 1002A with), on the display 1001, the completion interface 1054 for the shortcut affordance 1008A, as shown in FIG. 10Q. Completion interface 1054 may include a delete affordance 1014A. In response to selection of the delete affordance 1014A, the electronic device 1000 deletes the voice shortcut associated with the task. Deleting a shortcut in this manner may include disassociating the voice shortcut from the task such that providing the voice shortcut to a digital assistant of the electronic device 1000 does not cause the electronic device 1000 to perform the task.

Figure 10R:
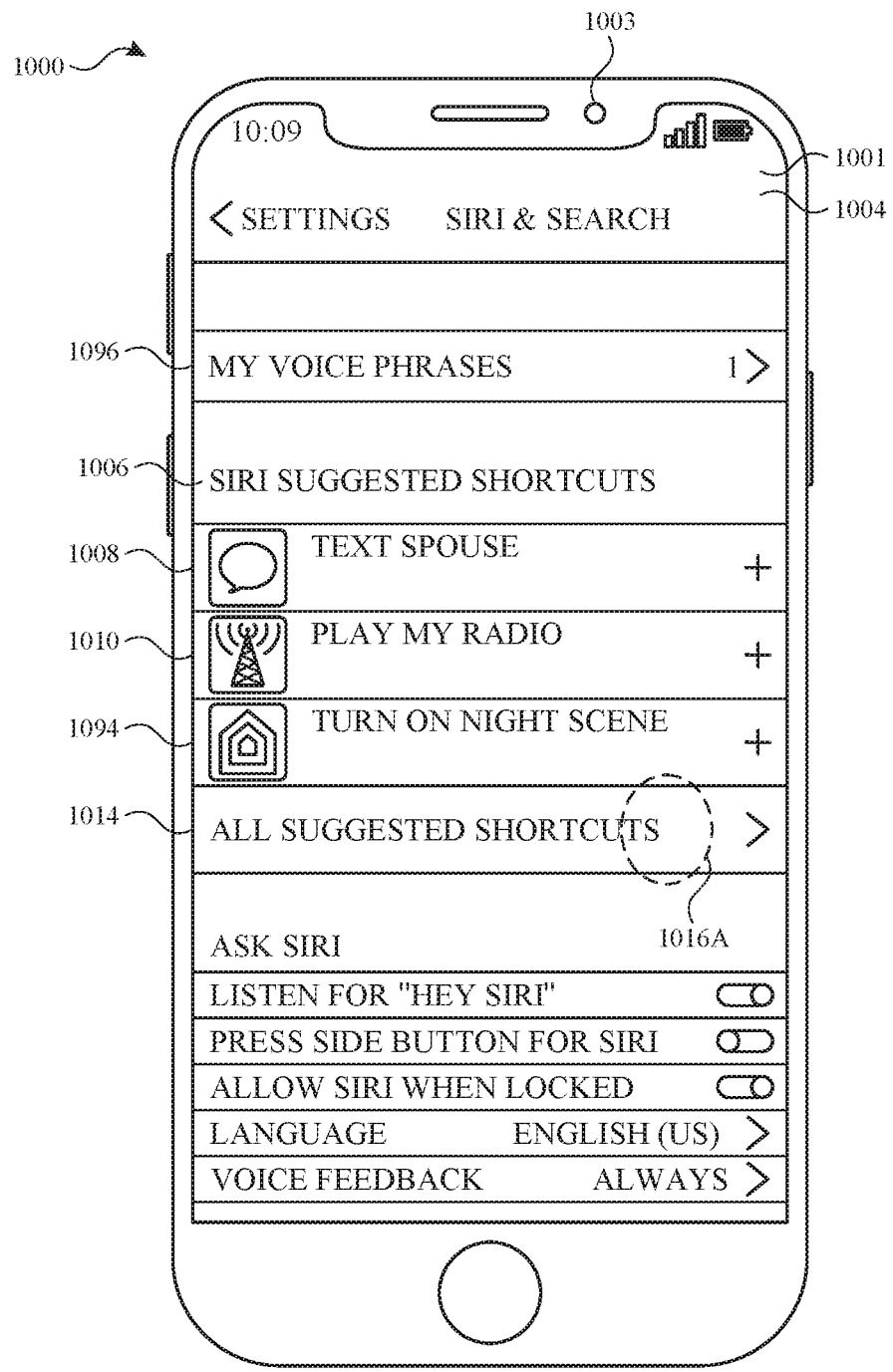
Figure 10S:
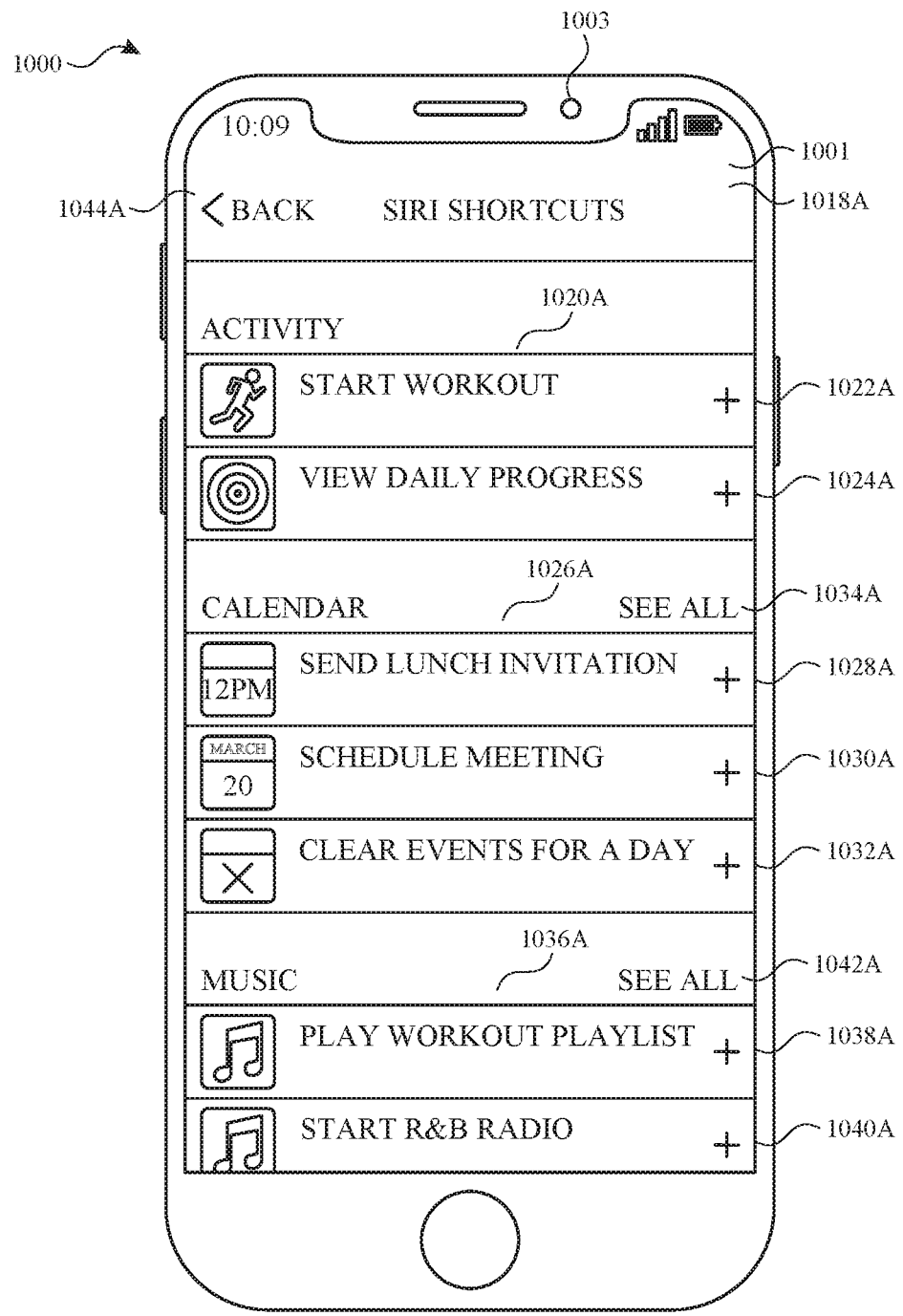

In some examples, while displaying the settings interface 1004, the electronic device 1000 detects selection of the additional tasks affordance 1014. As shown in FIG. 10R, the selection of the additional tasks affordance 1014 is a tap gesture 1016A. In some examples, in response to selection of the shortcut affordance 1014, the electronic device 1000 displays (e.g., replaces display of the settings interface 1004 with), on the display 1001, global task interface 1018A, as shown in FIG. 10S.

Global task interface 1018A includes, for each of a plurality of applications, a respective set of candidate task affordances. By way of example, global task interface 1018A includes a set of candidate task affordances 1020A associated with an activity application, a set of candidate task affordances 1026A associated with a calendar application, and a set of candidate task affordances 1036A associated with a music application. The set of candidate task affordances 1020A can, optionally, include a "Start Workout" candidate task affordance 1022A and a "View Daily Progress" candidate task affordance 1024A. The set of candidate task affordances 1026A can, optionally, include a "Send Lunch invitation" candidate task affordance 1028A, a "Schedule Meeting" candidate task affordance 1030A, and a "Clear Events for a Day" candidate task affordance 1032A. The set of candidate task affordances 1036A can, optionally, include a "Play Workout Playlist" candidate task affordance 1038A and a "Start R&B Radio" candidate task affordance 1040A.

Figure 10T:
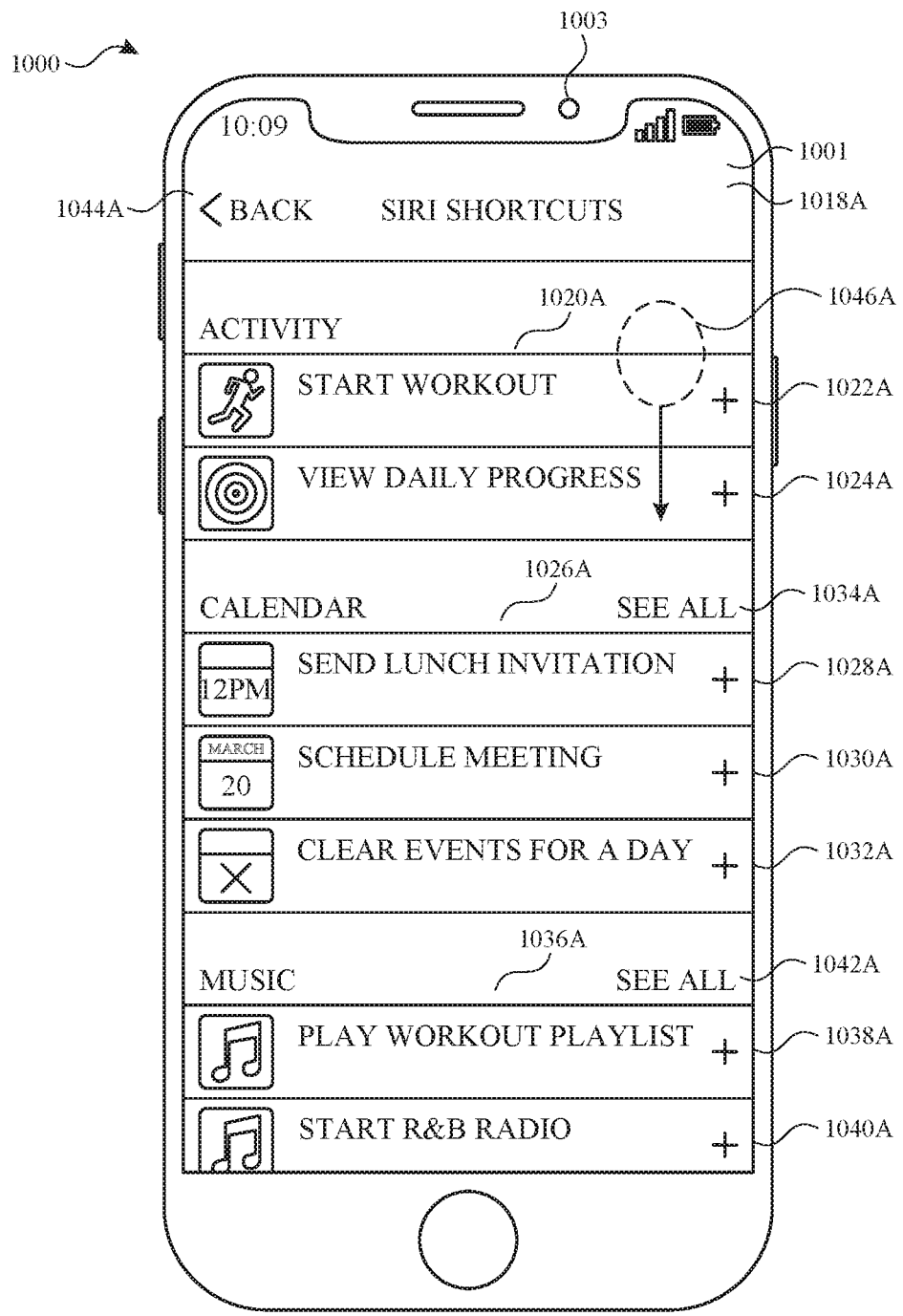
Figure 10U:
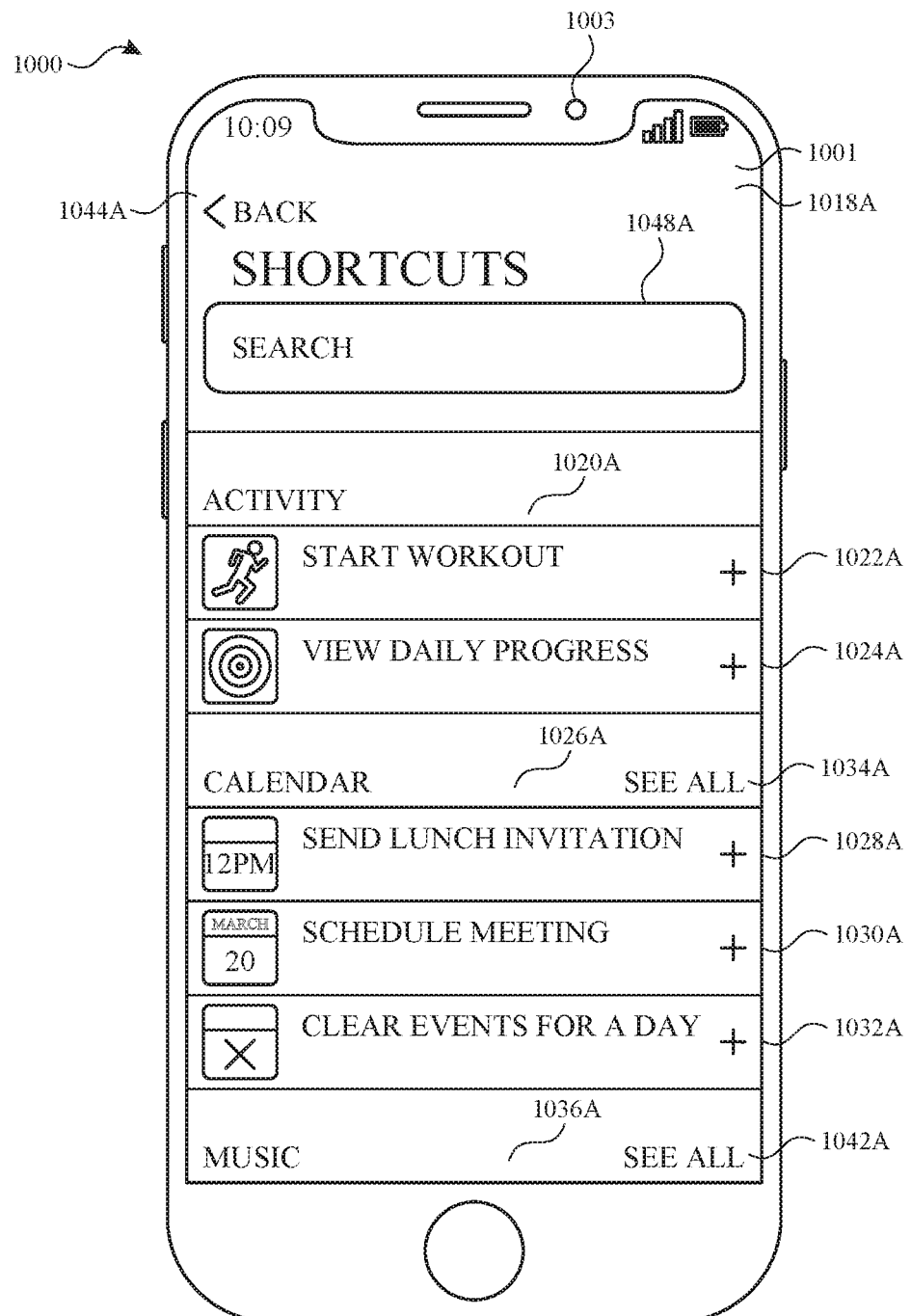

In some examples, candidate task affordances of the global task interface 1018A are searchable. By way of example, while displaying the global task interface 1018A, the electronic device detects a swipe gesture on the display 1001, such as the swipe gesture 1046A of FIG. 10T. In response to the swipe gesture 1046A, the electronic device slides the global task interface 1018A in a downward direction to display (e.g., reveal) a search field 1048A that may be used to search candidate task affordances of the global task interface 1018A, as shown in FIG. 10U.

Figure 10V:
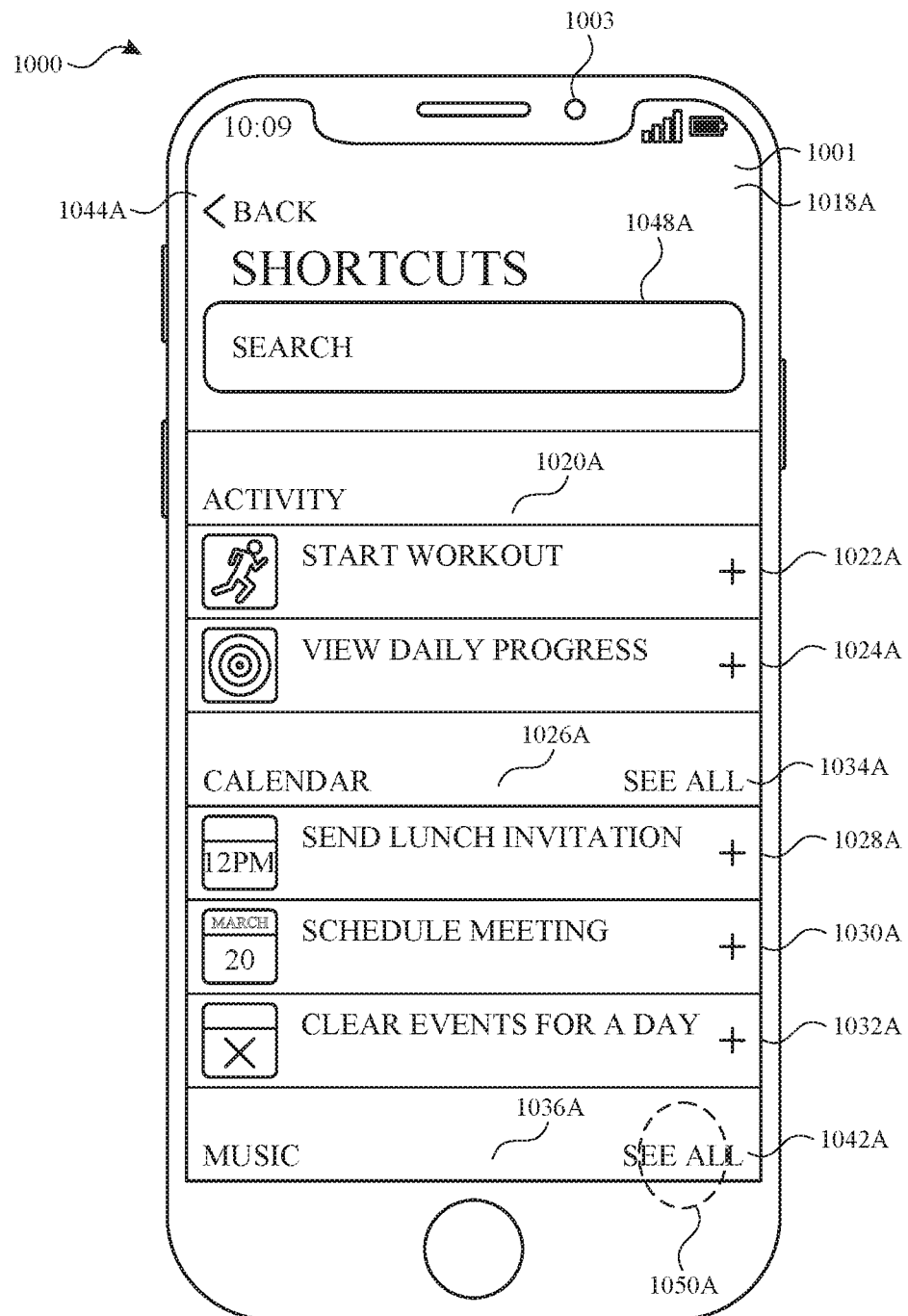
Figure 10W:
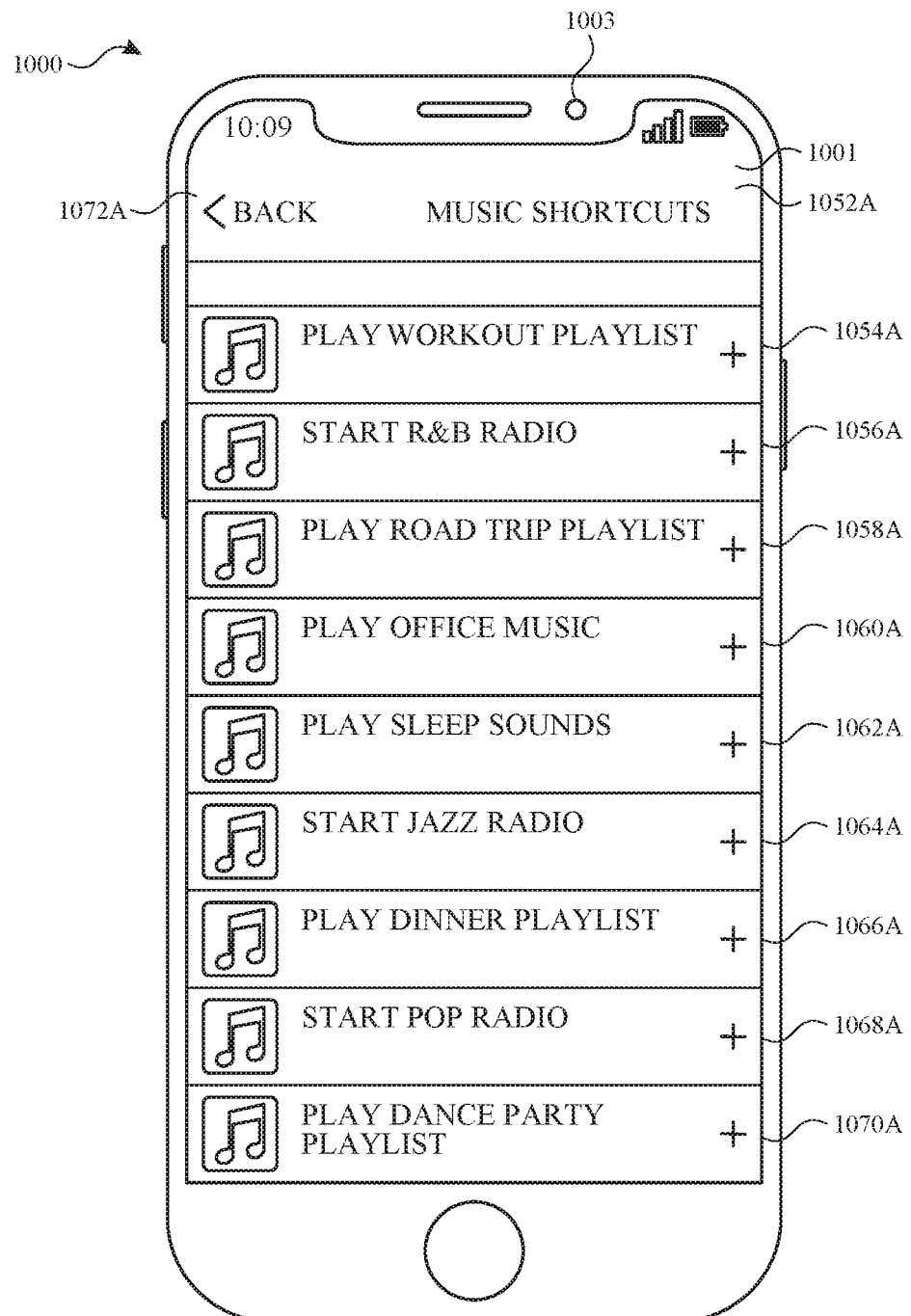

In some examples, each set of candidate task affordances displayed by the electronic device 1000 may be a subset of all available candidate task affordances for a respective application. Accordingly, the user may select an application task list affordance, such as application-specific task list affordances 1034A, 1042A, to reveal one or more additional candidate task affordances for an application corresponding to the application task list affordance. For example, while displaying the global task interface 1018A, the electronic device 1000 detects selection of application task list affordance 1042A. As shown in FIG. 10V, the selection of application task list affordance 1042A is a tap gesture 1050A. In some examples, in response to selection of the application task list affordance 1042A, the electronic device 1000 displays (e.g., replaces display of the global task interface 1018A with), on the display 1001, application task interface 1052A, as shown in FIG. 10W. As shown, application task interface 1052A includes a return affordance, which when selected, causes the electronic device 1000 to display the global task interface 1018A, and candidate task affordances 1054A-1070A.

Figure 10X:
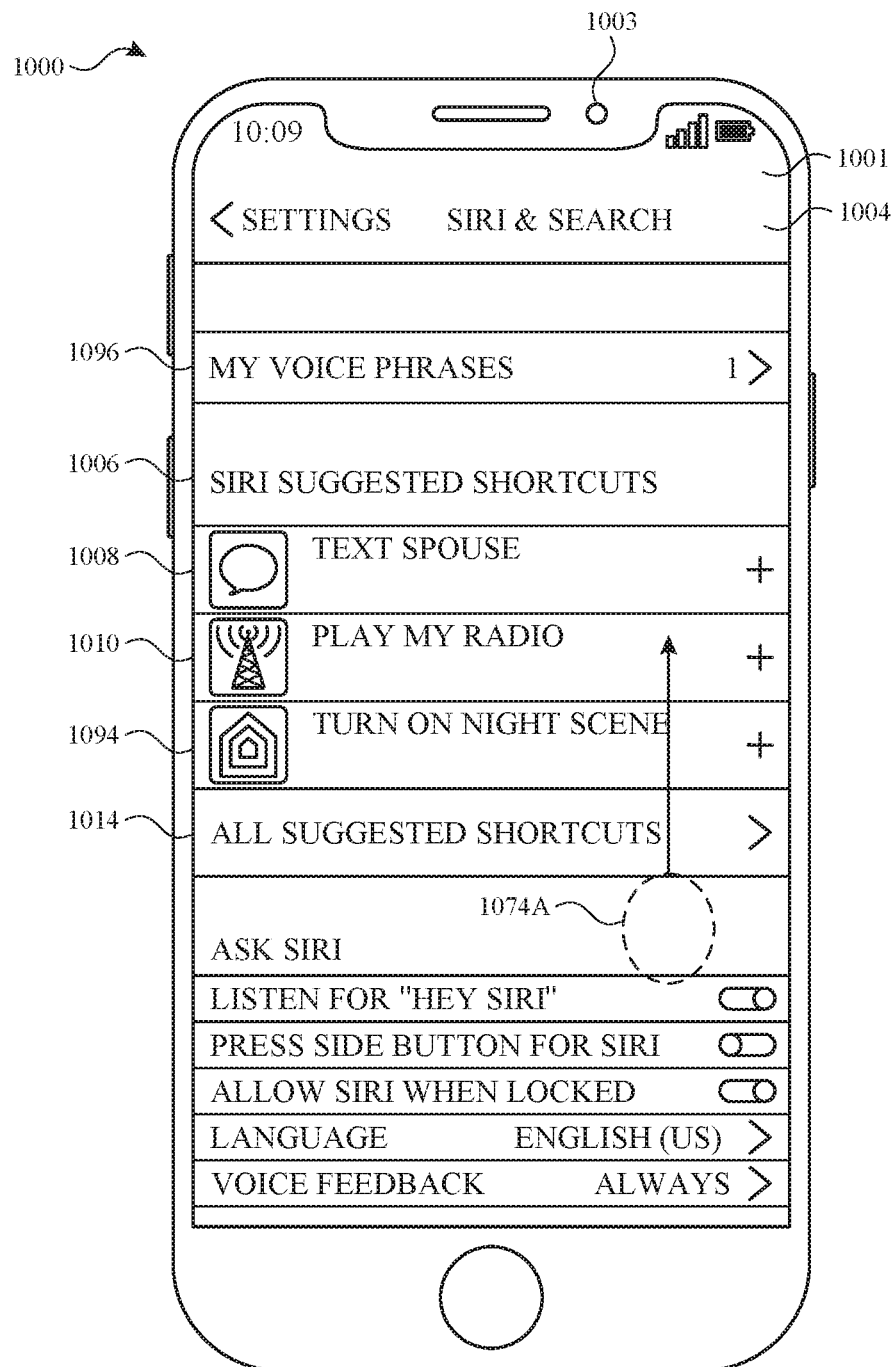
Figure 10Y:
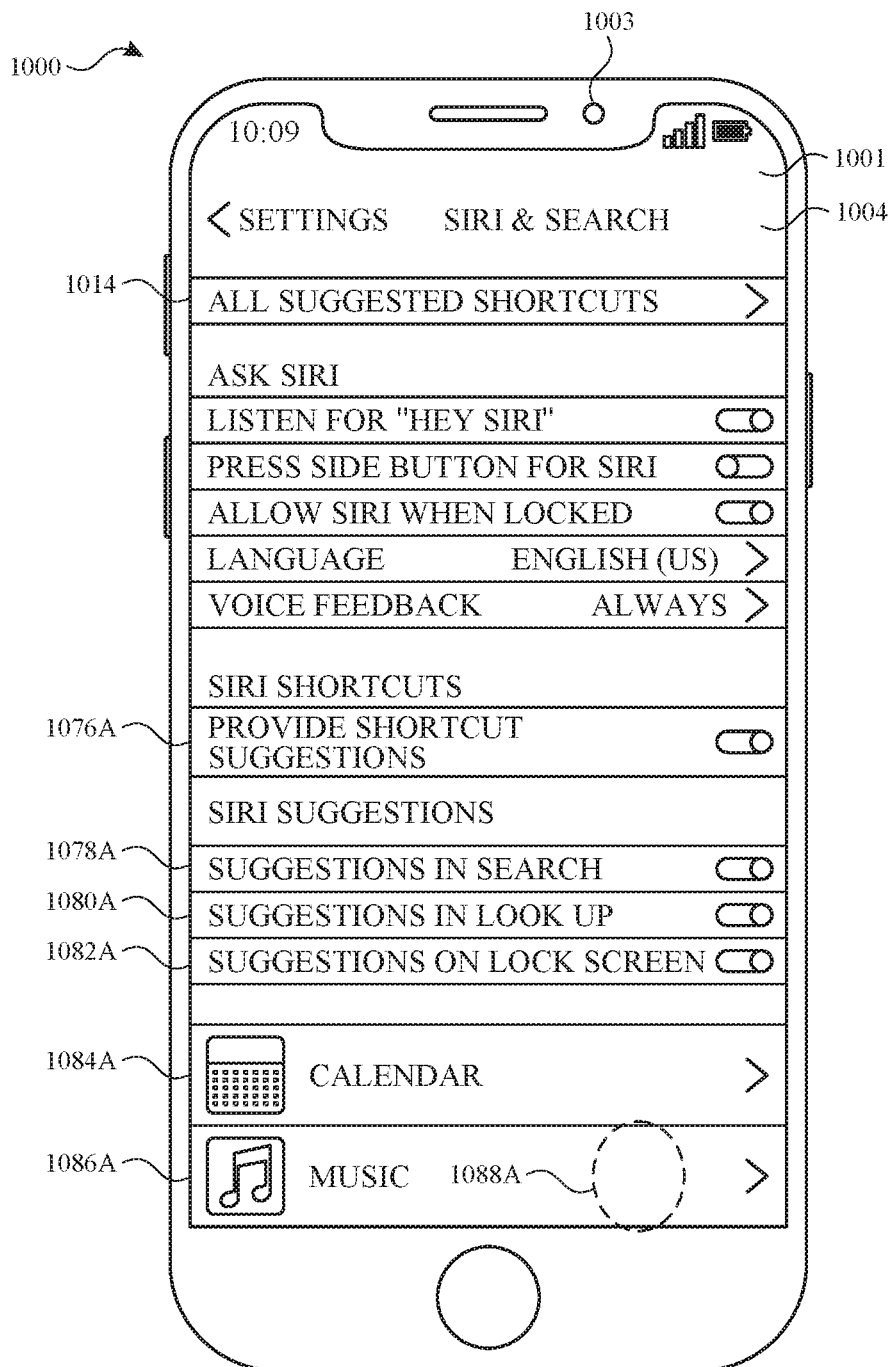

In some examples, while displaying the settings interface 1004, the electronic device 1000 detects a swipe gesture on the display 1001, such as the swipe gesture 1074A of FIG. 10X. As shown in FIG. 10Y, in response to the swipe gesture 1074A, the electronic device 1000 slides the settings interface 1004 in an upward direction to display (e.g., reveal) various settings. The settings, when enabled, adjust the manner in which candidate task affordances and suggestion affordances, such as those described with reference to FIG. 8A-8AF, are displayed by the electronic device 1000. For example, settings interface 1004 includes a shortcut enablement setting 1076A, which, when enabled, allows the electronic device 1000 to display candidate task affordances, as described herein. As another example, settings interface 1004 includes a search suggestion enablement setting 1078A, which, when enabled, allows the electronic device 1000 to display suggestion affordances on a search screen interface. As another example, settings interface 1004 includes a lookup suggestion enablement setting 1080A, which, when enabled, allows the electronic device 1000 to display suggestion affordances on lookup result screen interface. As yet another example, settings interface 1004 includes a lock screen suggestion enablement setting 1082A, which, when enabled, allows the electronic device 1000 to display suggestion affordances on a lock screen interface.

Figure 10Z:
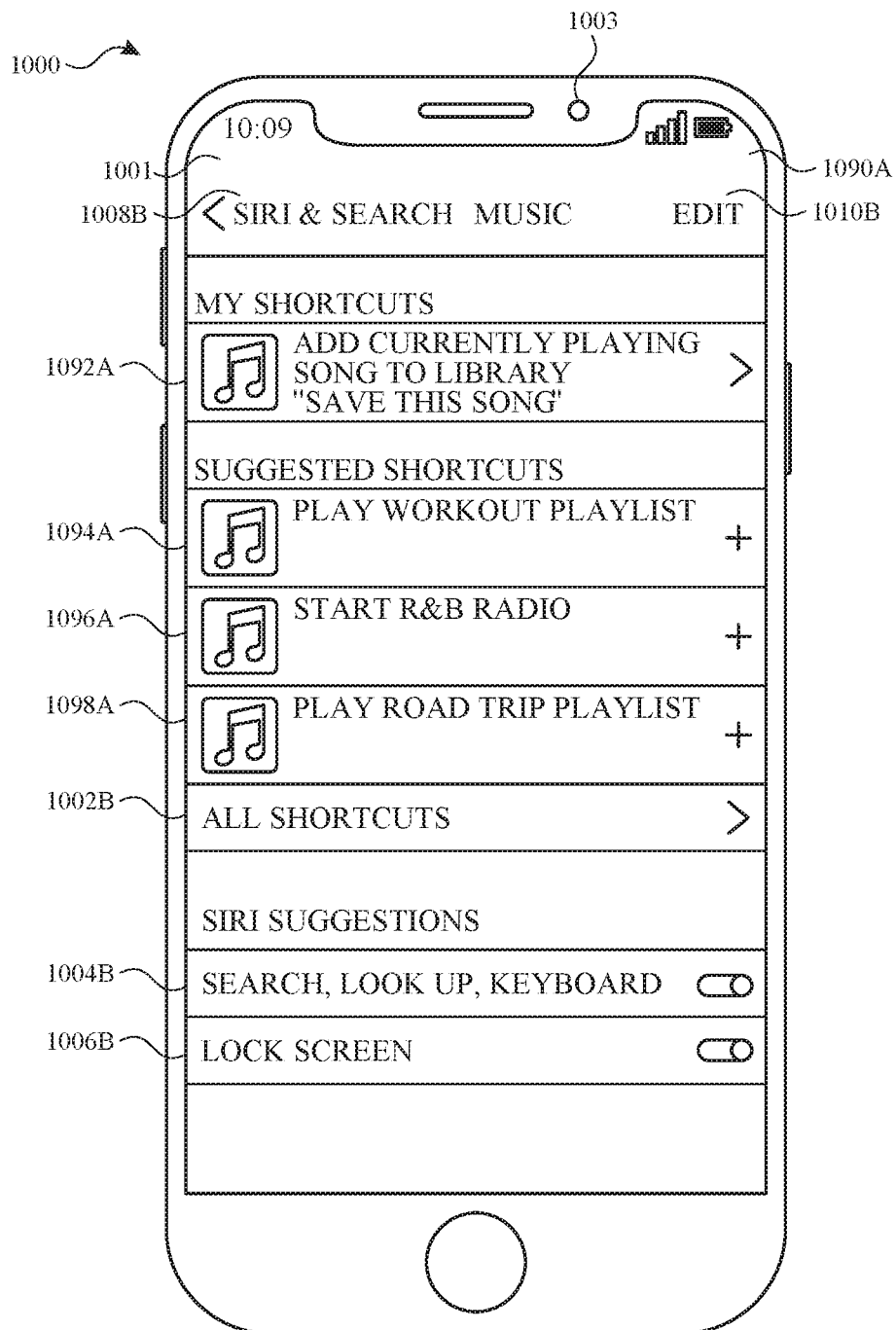
Figure 10A:
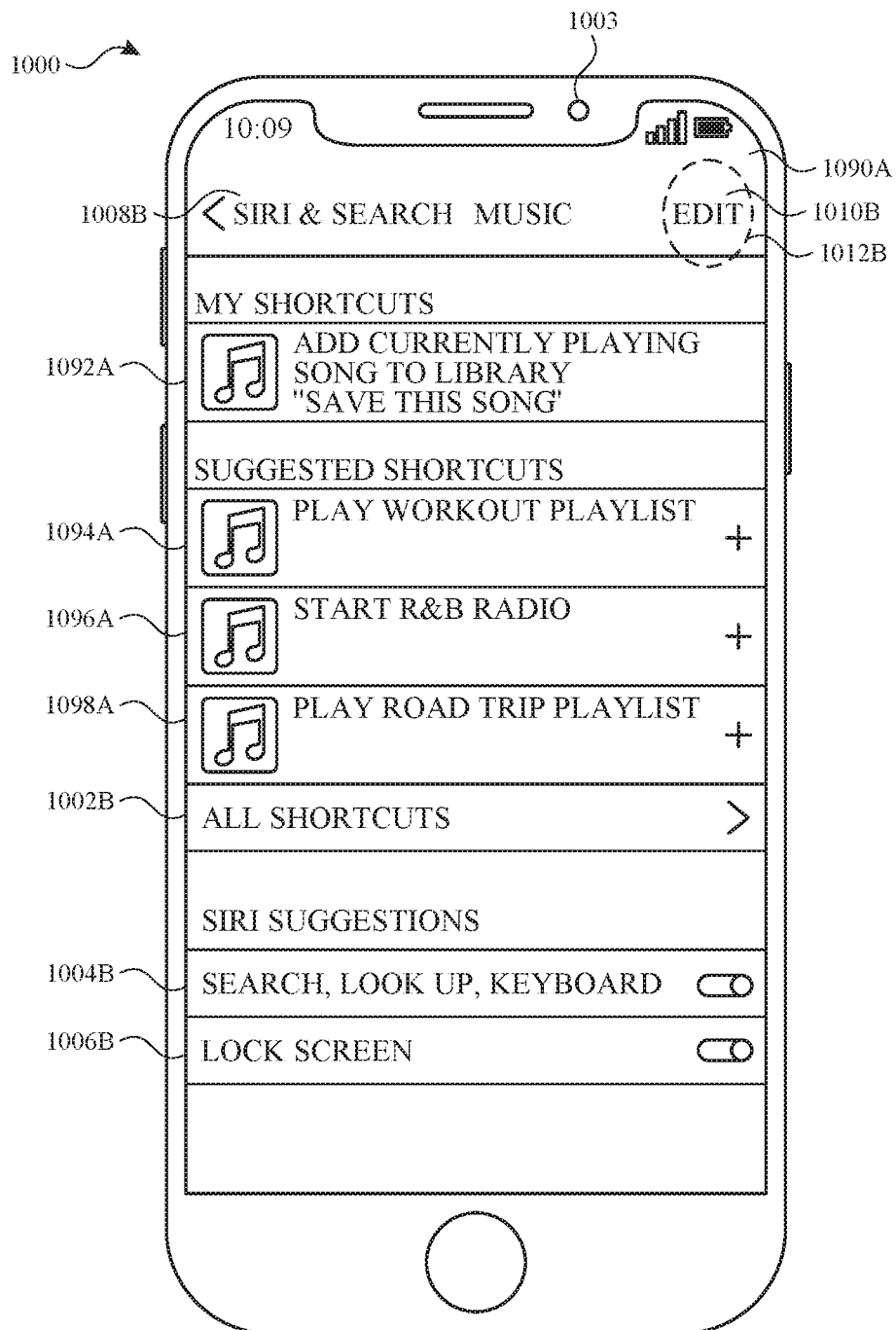
Figure 10A:
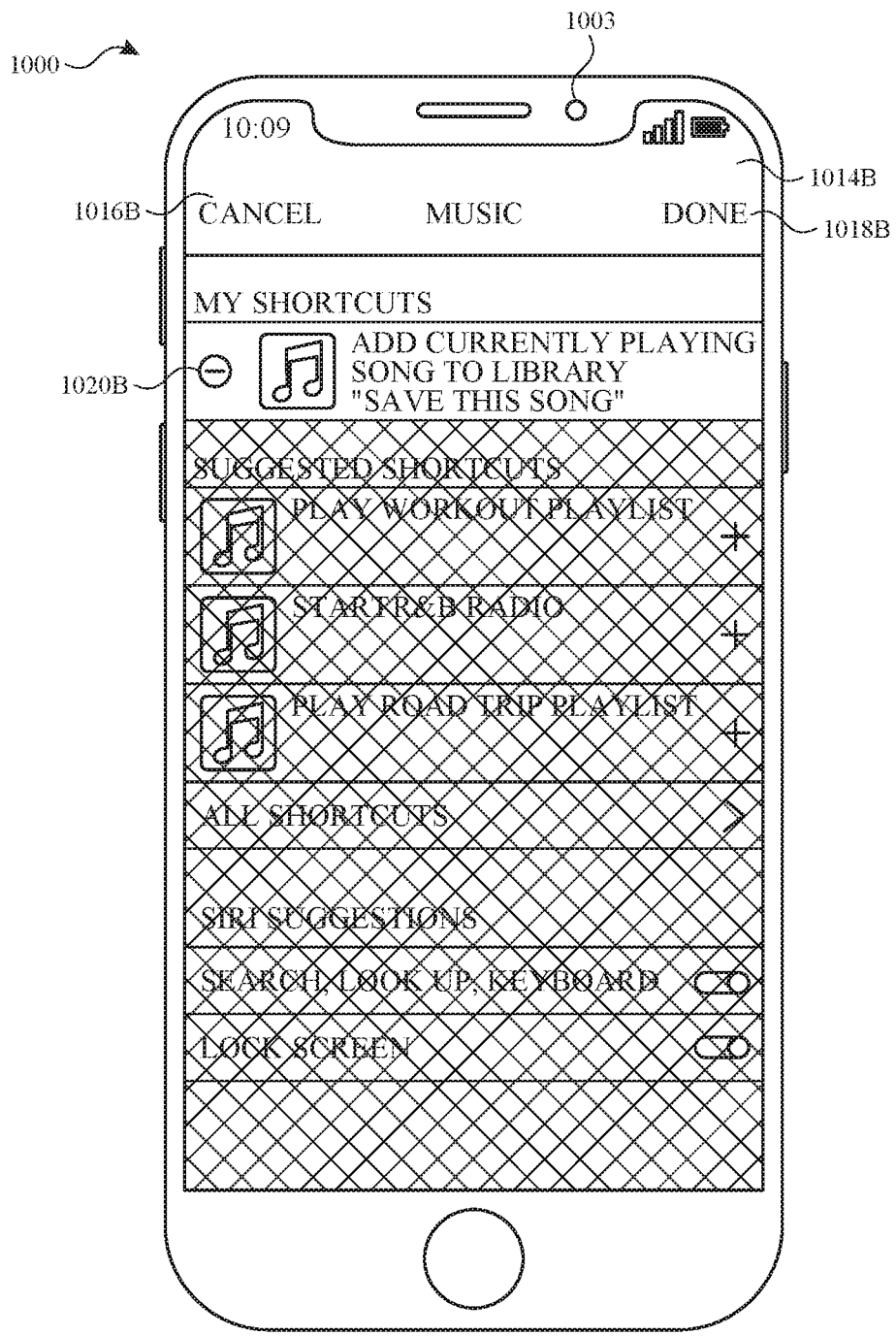
Figure 10A:
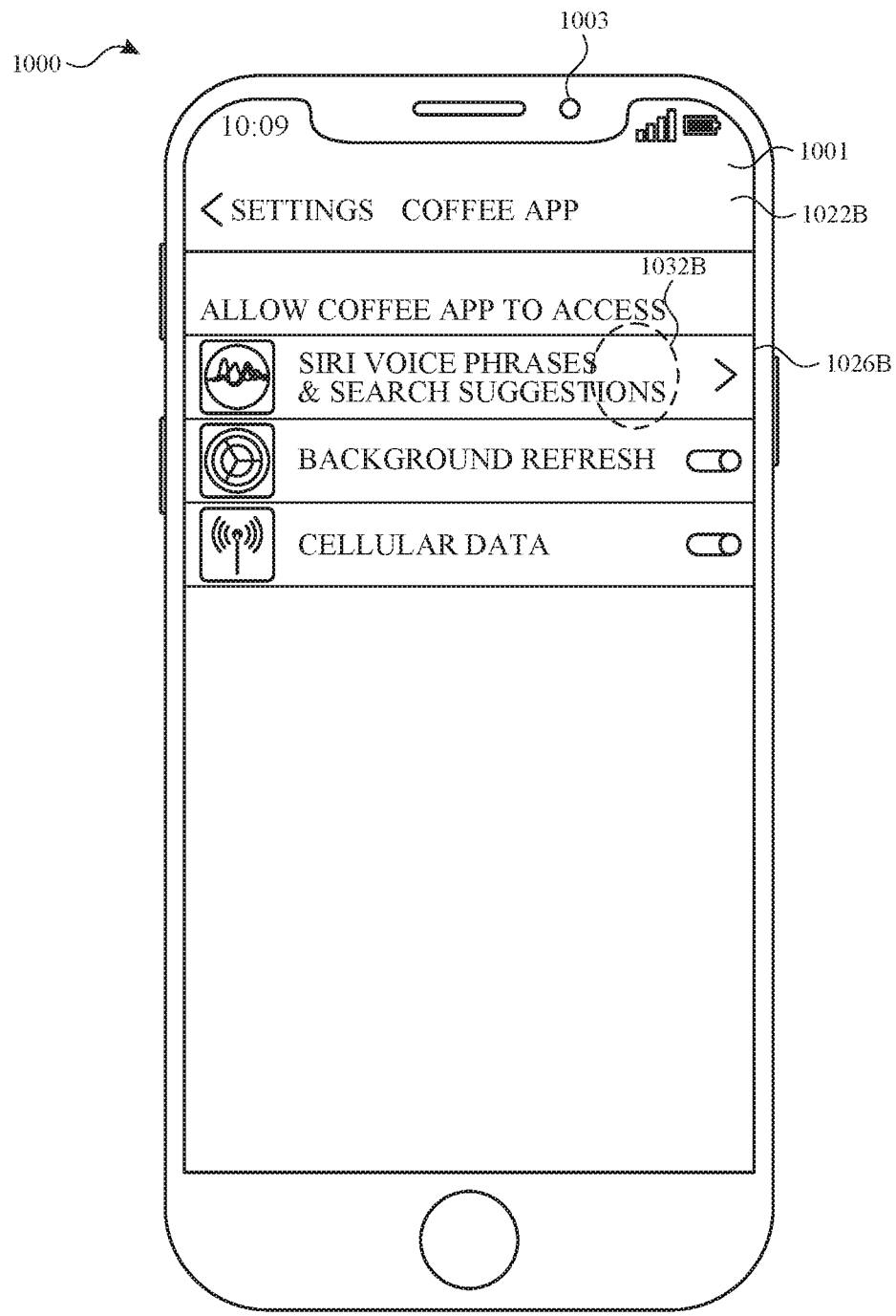
Figure 10A:
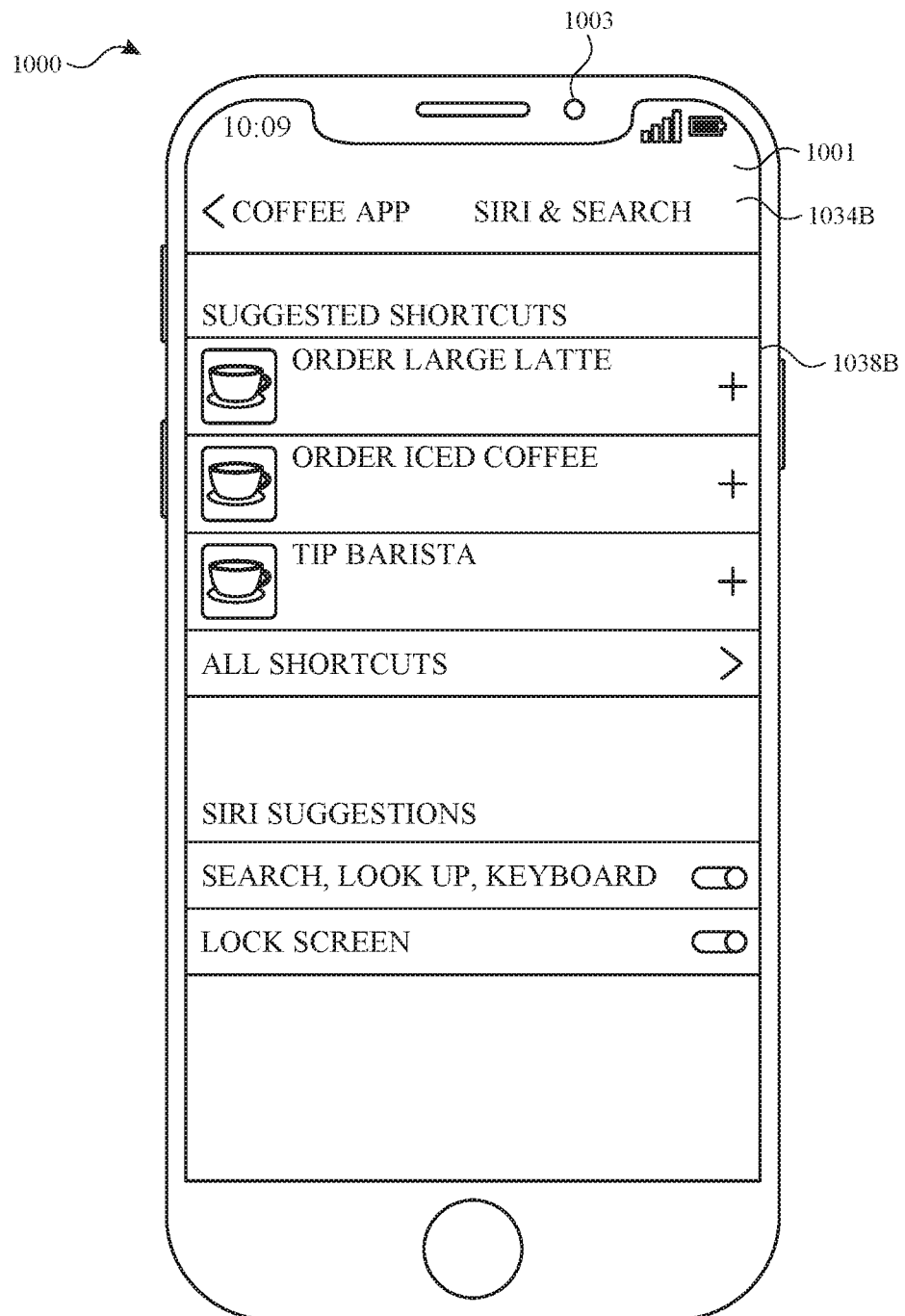
Figure 10A:
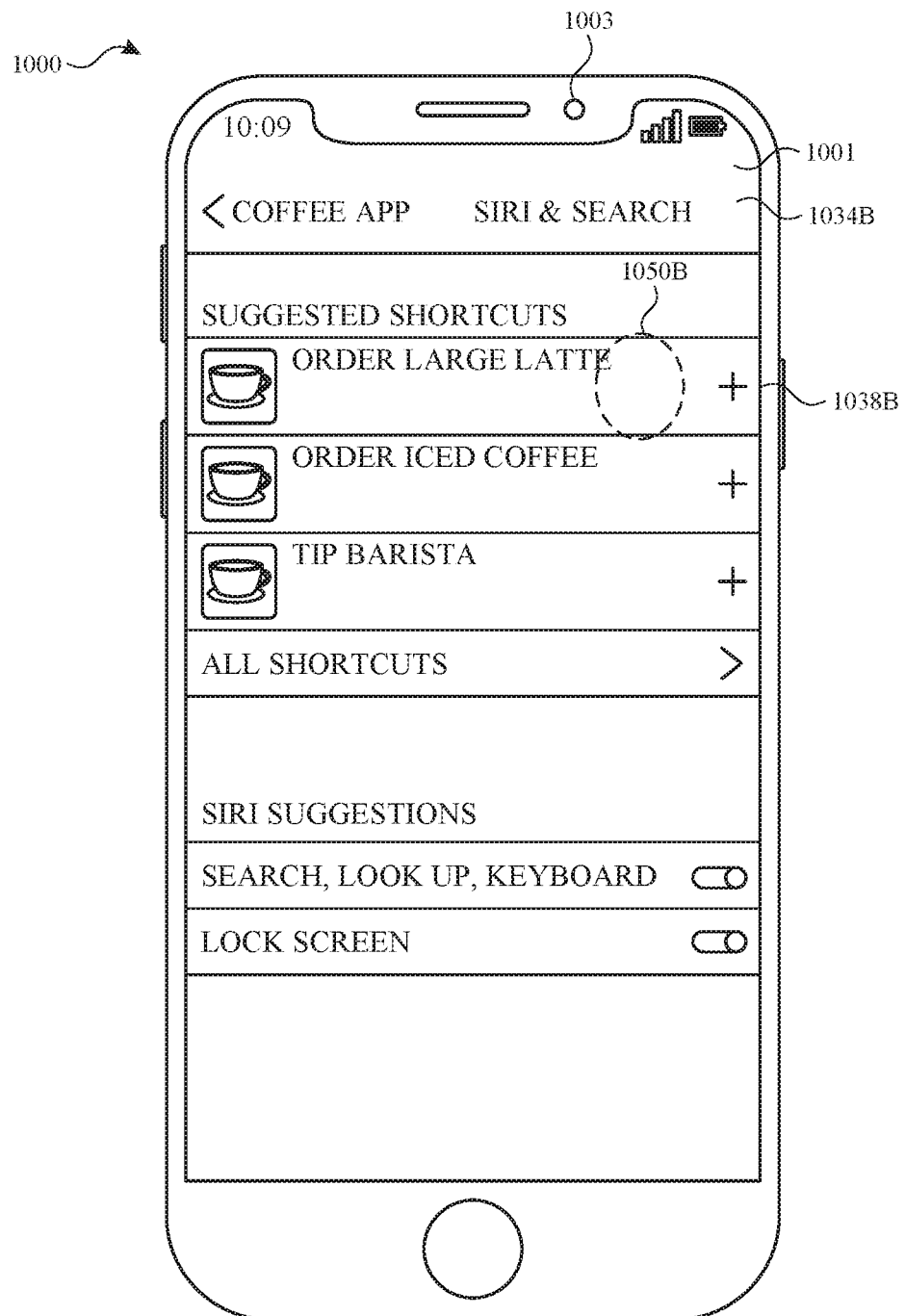
Figure 10A:
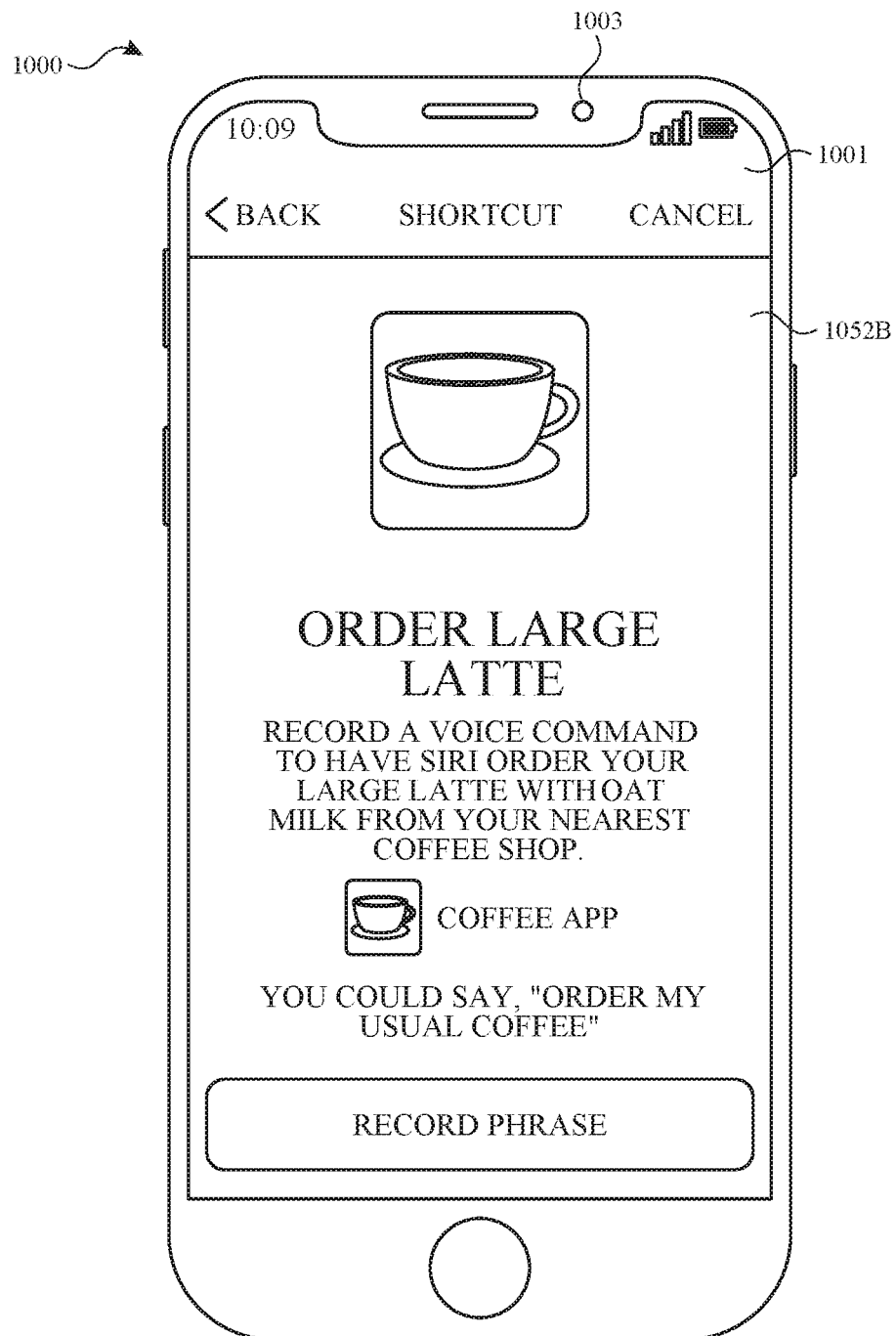
Figure 10A:
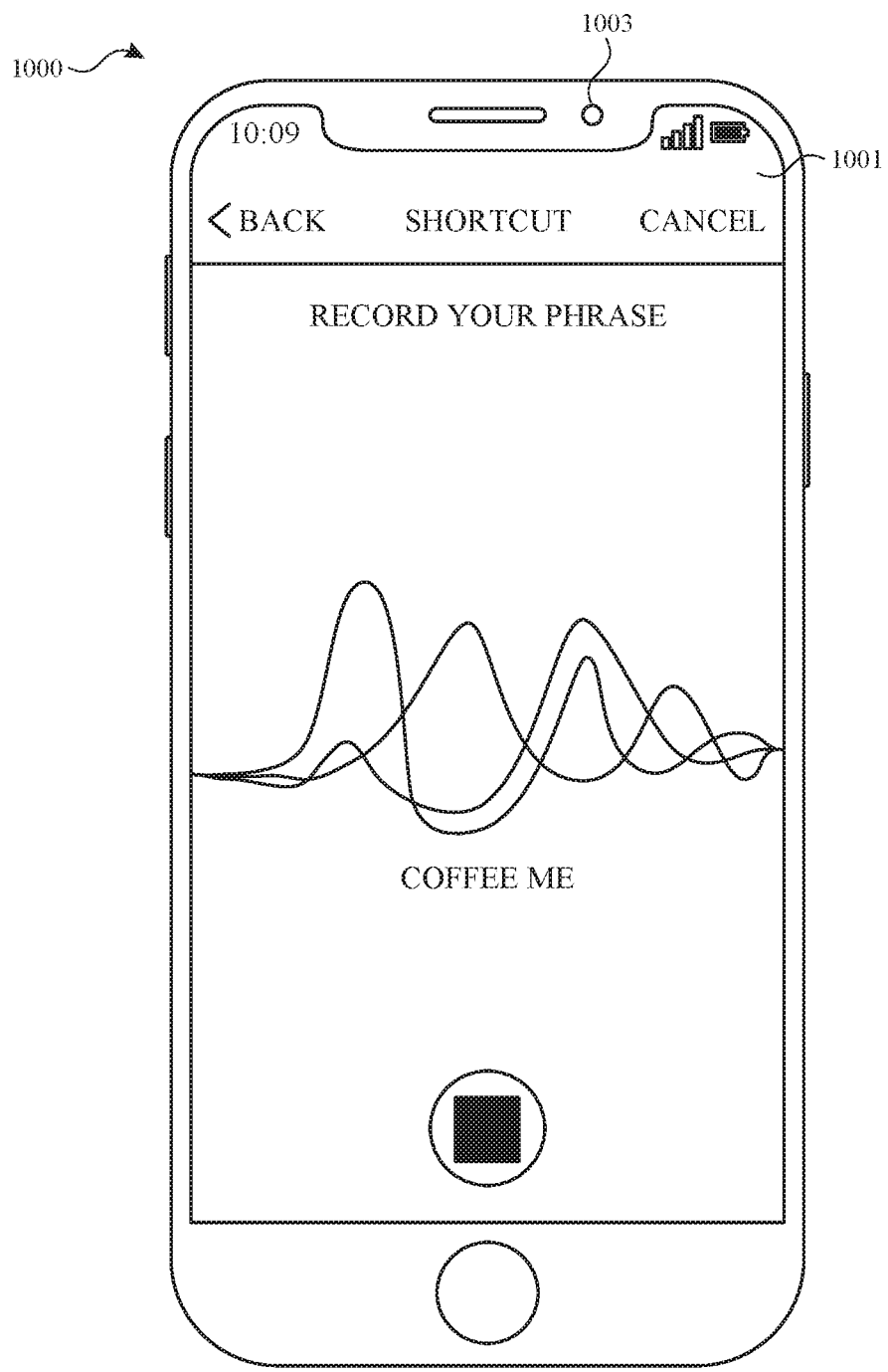
Figure 10A:
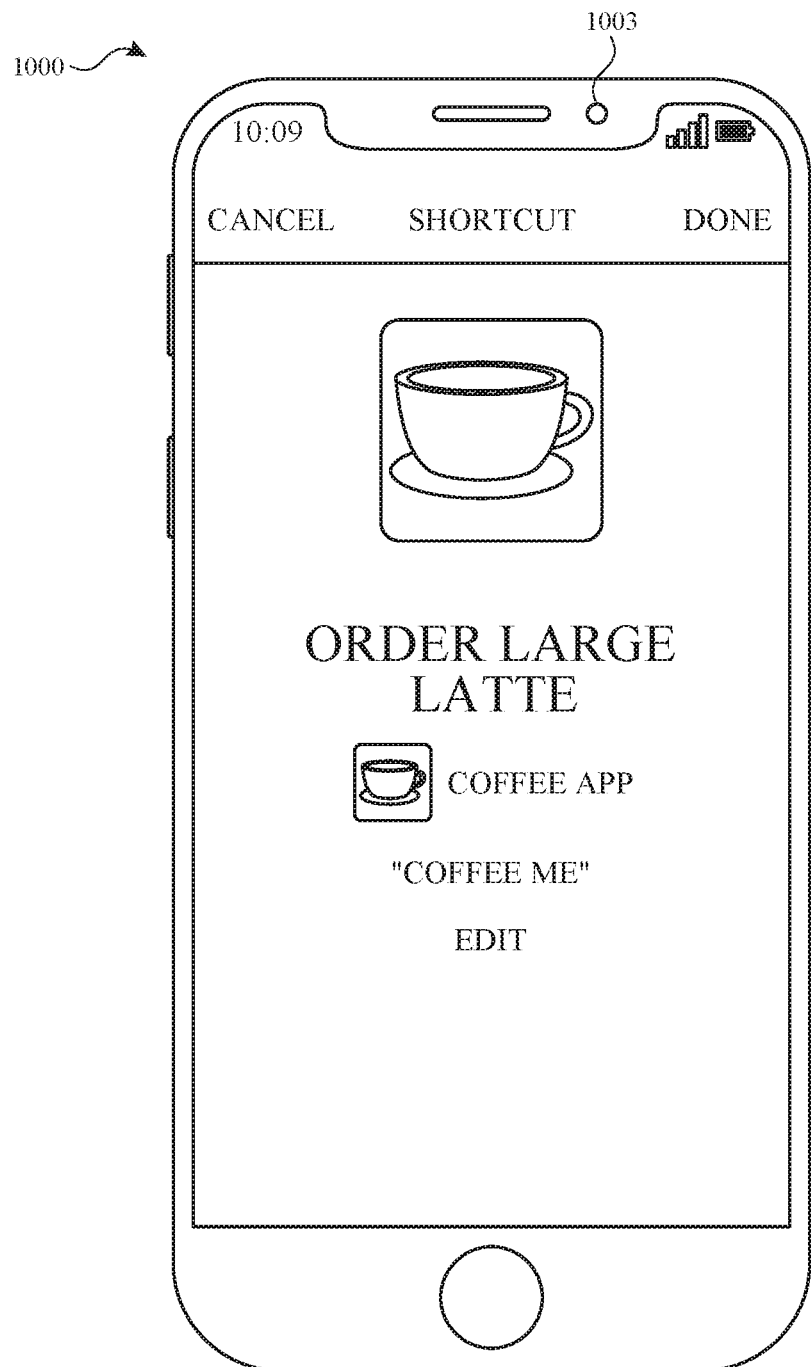
Figure 10A:
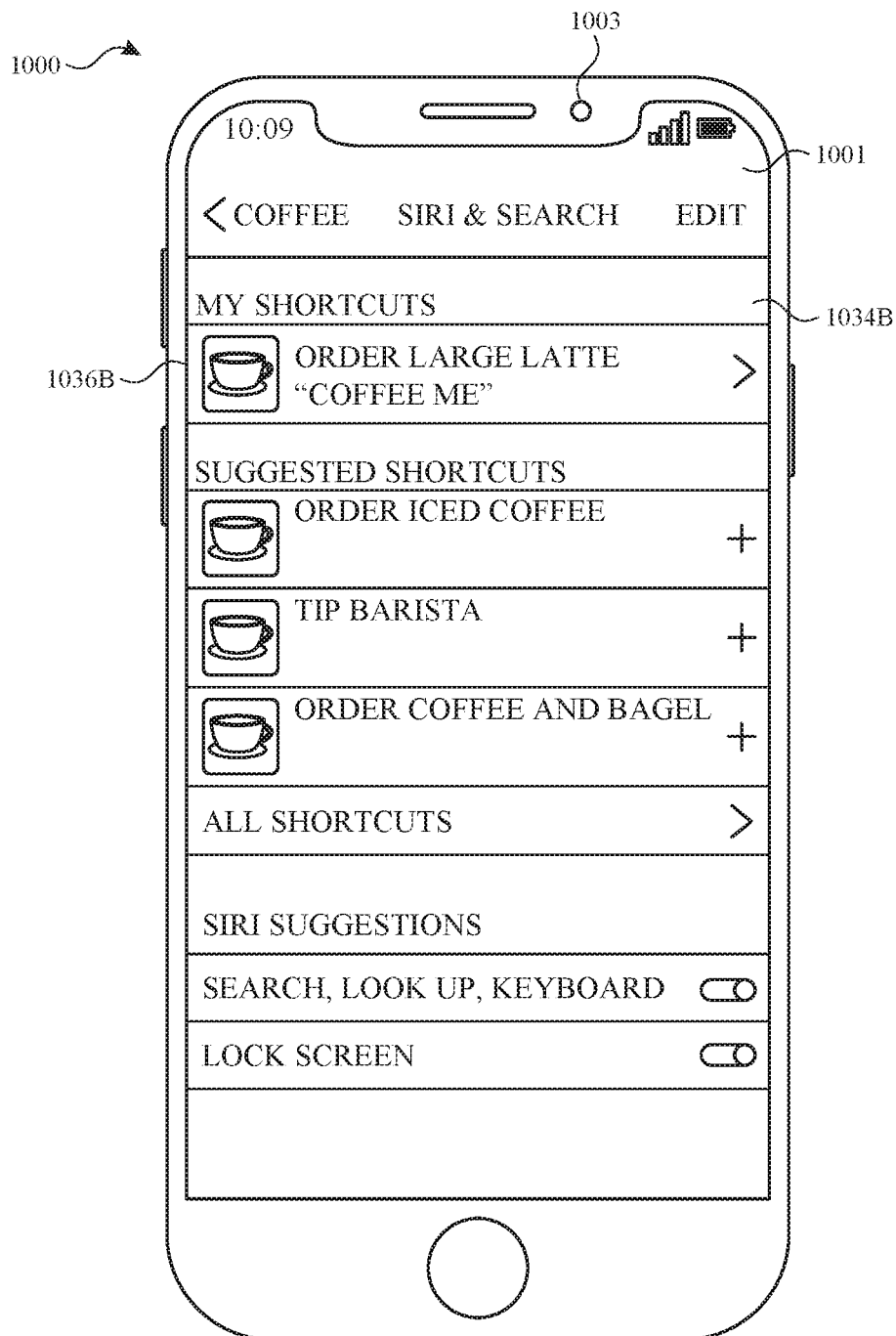
Figure 10A:
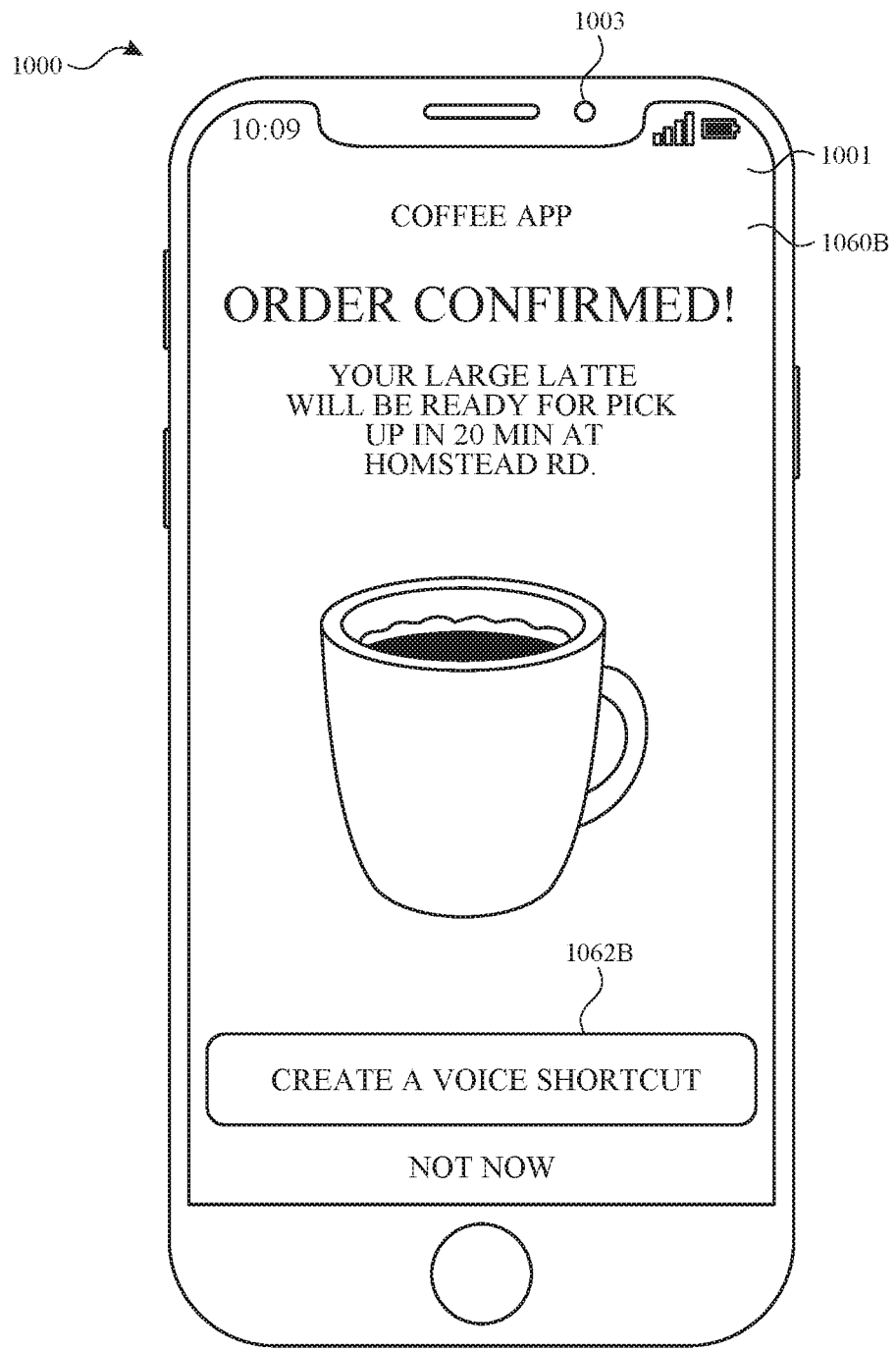

Settings interface 1004 further includes application affordances 1084A and 1086A, each of which is associated with a respective application. In some examples, while displaying the settings interface 1004, the electronic device 1000 detects selection of the application affordance 1086A. As shown in FIG. 10Y, the selection of the application affordance 1086A is a tap gesture 1088A. In some examples, in response to selection of the application affordance 1086A, the electronic device 1000 displays (e.g., replaces display of the settings interface 1004 with), on the display 1001, application settings interface 1090A, as shown in FIG. 10Z.

In some examples, application settings interface 1090A includes application user shortcut affordance 1092A, which may correspond to a voice shortcut previously generated by the user, for instance, using a voice shortcut generation process described herein. Application settings interface 1090A further may include candidate task affordances 1094A-1098A, each of which may correspond to a respective task associated with the application of application settings interface 1090A. In some examples, application settings interface 1090A further includes application task list affordance 1002B. In some examples, in response to selection of application task list affordance 1002B, the electronic device 1000 displays (e.g., replaces display of the application settings interface 1090A with), on the display 1001, an application task interface, such as the application task interface 1052A (FIG. 10W). In some examples, application settings interface 1090A further includes application suggestion enablement setting 1004B, which, when enabled, allows the electronic device 1000 to display suggestion affordances associated with the application on a search screen interface, look up result screen interface and/or keyboard interface. In some examples, application settings interface 1090A further includes application suggestion enablement setting 1006B, which, when enabled, allows the electronic device 1000 to display suggestion affordances associated with the application on a lock screen interface.

In some examples, application settings interface 1090A further includes edit affordance 1010B. In some examples, while application settings interface 1090A, the electronic device 1000 detects selection of the edit affordance 1010B. As shown in FIG. 10AA, the selection of the edit affordance 1010B is a tap gesture 1012B. In some examples, in response to selection of the edit affordance 1010B, the electronic device 1000 displays (e.g., replaces display of the application settings interface 1090A with), on the display 1001, application-specific edit interface 1014B, as shown in FIG. 10AB. In some examples, the application-specific edit interface 1014B is displayed over a first portion of the application settings interface 1090A and a second portion of the application settings interface 1090A is visually obscured (e.g., darkened, blurred).

In some examples, displaying the application settings interface 1090A includes displaying a selection affordance (e.g., selection affordance 1020B) for each application user shortcut affordance (e.g., application user shortcut affordance 1092A) of the application settings interface 1090A. In an example operation, the electronic device 1000 detects selection of the selection affordance 1020B, indicating a selection of corresponding application user shortcut affordance 1092A and an intent by the user to delete application user shortcut affordance 1092A. In some examples, a user may confirm deletion by selecting confirmation affordance 1018B, or forgo deletion by selecting cancel affordance 1016B.

In FIG. 10AC, the electronic device 1000 displays an application permissions interface 1022B for a particular application. The application permissions interface 1022 includes a suggestions permissions affordance 1026B. While displaying the application permissions interface 1022, the electronic device 1000 detects selection of the suggestions permissions affordance 1026B. As shown in FIG. 10AC, the selection of the suggestions permissions affordance 1026B is a tap gesture 1032B. In some examples, in response to selection of the suggestions permissions affordance 1026B, the electronic device 1000 displays (e.g., replaces display of the application-specific permissions interface 1022B with), on the display 1001, an application settings interface, such as the application settings interface 1034B of FIG. 10AD.

In some examples, a voice shortcut generation process may be initiated using an application-specific settings interface. Accordingly, in some examples, application settings interface 1034B may include a candidate task affordance 1038B. In some examples, while displaying the application settings interface 1034B, the electronic device 1000 detects selection of the candidate task affordance 1038B. As shown in FIG. 10AE, selection of the candidate task affordance 1038B is a tap gesture 1050B. In response to selection of the candidate suggestion affordance 1038B, the electronic device 1000 displays a task-specific interface 1054B associated with a task of the candidate task affordance 1038B, as illustrated in FIG. 10AF.

With reference to FIGS. AF-AH, a user may thereafter generate a voice shortcut by providing a natural-language speech input (e.g., "Coffee Me") to the electronic device, and in turn the electronic device provides a candidate phrase for association with the task (e.g., order large latte with oat milk from nearby coffee shop) of the candidate task affordance 1038B, as described. Once a voice shortcut for the task has been generated, the electronic device 1000 displays application settings interface 1034B. As illustrated in FIG. 10AI, application settings interface 1034B includes an application user shortcut affordance 1036B. In some examples, in response to selection of the application-specific user shortcut affordance 1036B, the electronic device displays voice shortcuts associated with tasks of the application.

In some examples, a voice shortcut generation process may be initiated using an application interface, such as a third party application interface. As illustrated in FIG. 10AJ, for instance, a user may complete a task using an application (e.g., order coffee). In response, the application may display a task completion interface 1060B including candidate task suggestion affordance 1062B. In some examples, in response to selection of candidate task suggestion affordance 1062B, the electronic device initiates a voice shortcut generation process.

Figure 11A:
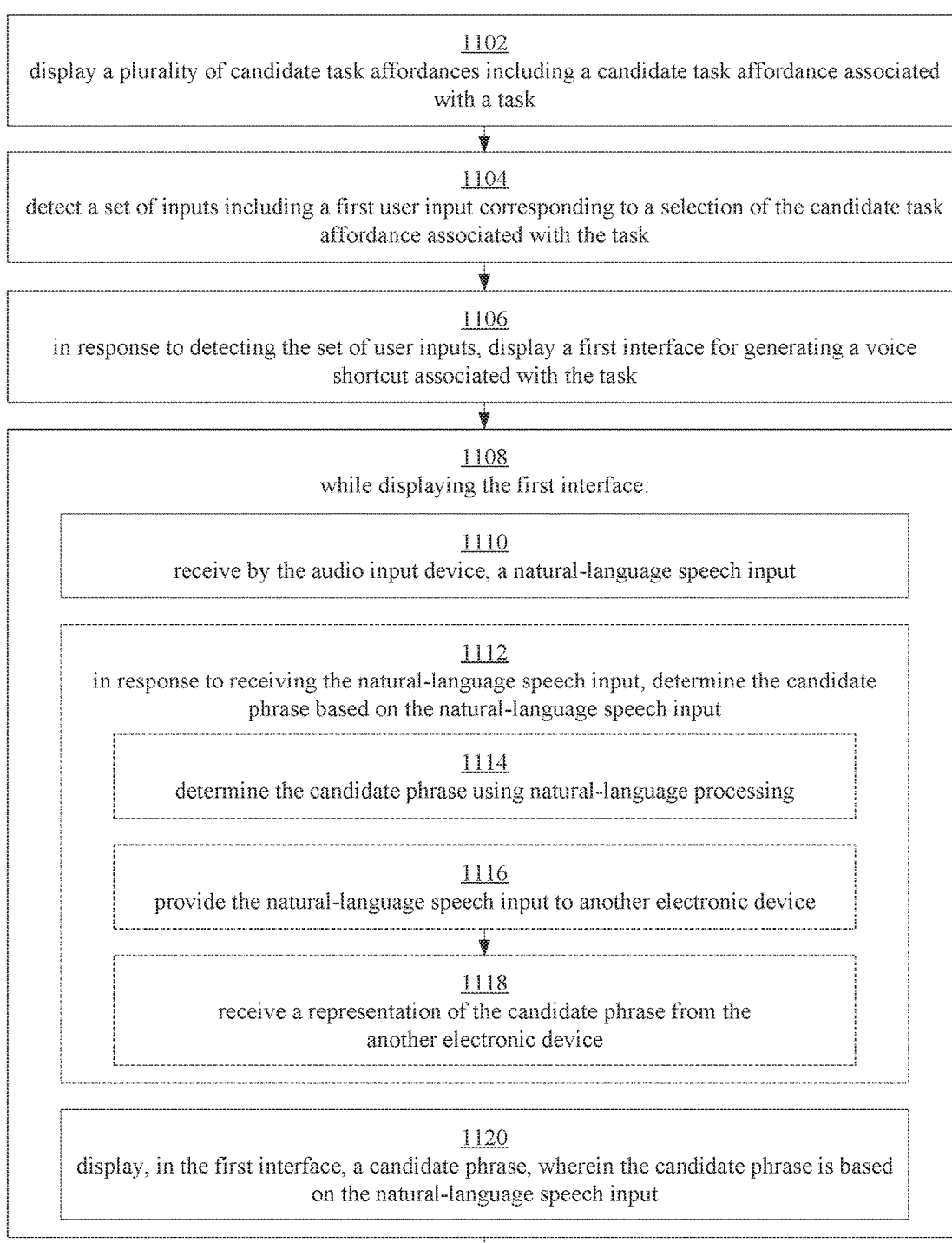
FIGS. 11A-11B are a flow diagram illustrating a method of providing voice shortcuts, according to various examples.
Figure 11B:
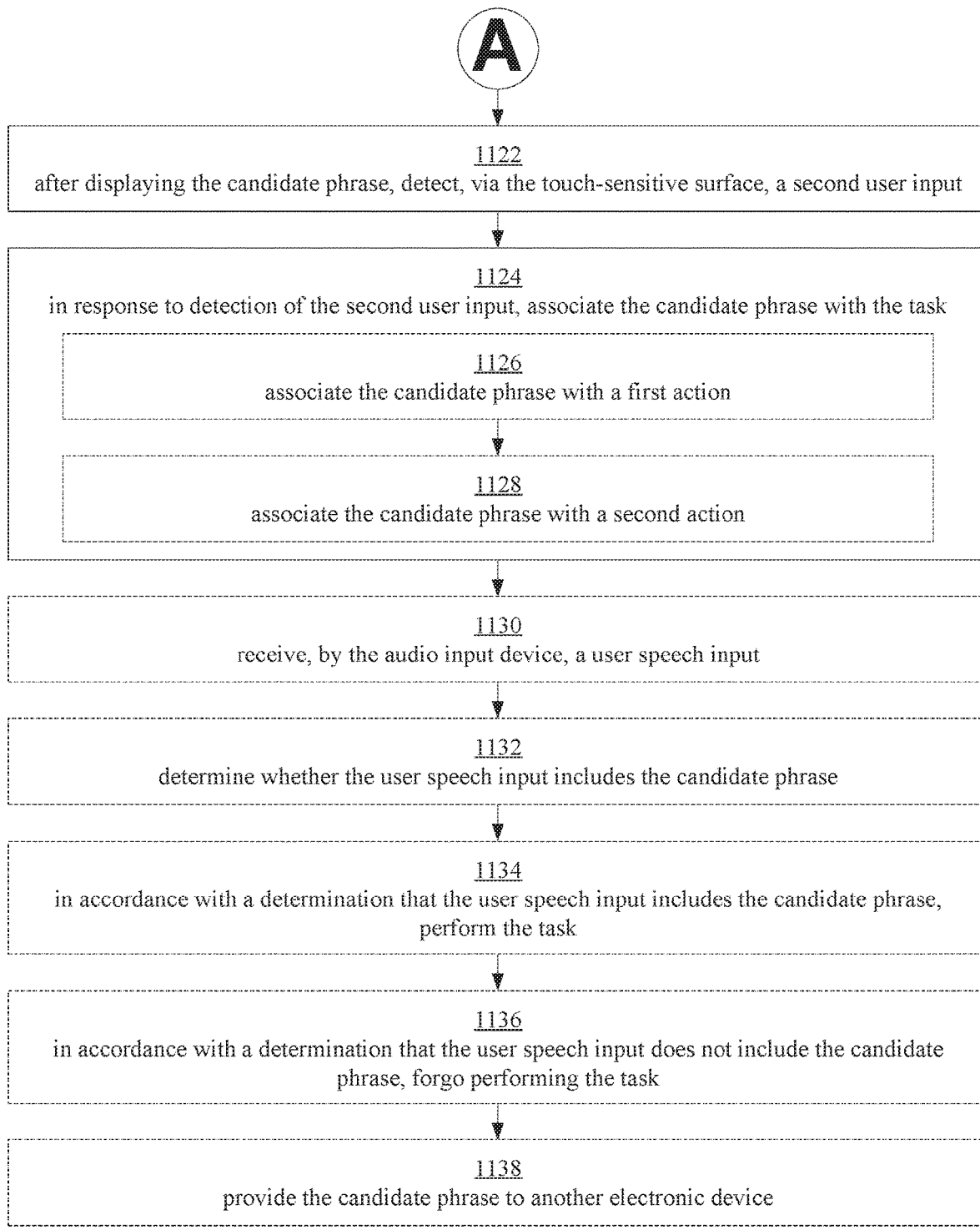

FIGS. 11A-11B is a flow diagram illustrating a method for providing voice shortcuts in accordance with some embodiments. Method 1100 is performed at a device (e.g., device 104, device 122, device 200, device 600, device 700, device 1000) with a display, one or more input devices (e.g., a touchscreen, a mic, a camera), and a wireless communication radio (e.g., a Bluetooth connection, WiFi connection, a mobile broadband connection such as a 4G LTE connection). In some embodiments, the display is a touch-sensitive display. In some embodiments, the display is not a touch sensitive display. In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 1100 are, optionally, combined, the orders of some operations are, optionally, changed, and some operations are, optionally, omitted.

As described below, providing candidate phrases based on a natural-language speech input and associating candidate phrases with respective tasks allows a user to accurately and efficiently generate user-specific voice shortcuts that can be used to perform tasks on the electronic device. For example, allowing a user to associate voice shortcuts with tasks in this manner allows a user to visually confirm that a desired voice shortcut has been selected and assigned to the correct task, thereby reducing the likelihood of an incorrect or unwanted association. Thus, providing candidate phrases in the manner described provides for more efficient use of the electronic device (e.g., by helping the user to provide proper inputs and reducing user mistakes when operating/interacting with the device), which, additionally, reduces power usage and improves battery life of the device by enabling the user to use the device more quickly and efficiently.

In some examples, the electronic device (104, 200, 600, 700, 1000) displays a plurality of candidate task affordances (1008, 1010, 1012, 1038B, 2006) including a candidate task affordance (1008, 1038B, 2006) associated with a task (1102). In some examples, the plurality of tasks are displayed in a settings interface or an application interface. In some examples, each task of the plurality of tasks is a task suggested, for instance, based on context of the electronic device.

In some examples, the electronic device displays a plurality of candidate task affordances including a candidate task affordance associated with a task includes displaying an application interface (1034B, 2060) including the plurality of candidate task affordances. In some examples, the application interface is an interface of a third party application (1062B) including one or more affordances (corresponding to a respective one or more candidate tasks) that the user can select to cause display of the first user interface and thereby create a voice shortcut for the selected task. In some examples, the first user interface (1018, 2066) is overlaid on the application interface. In some examples, the first user interface is overlaid over a portion of the application interface. In some examples, the first user interface is overlaid over the entirety of the application interface. In some examples, the one or more affordances correspond to one or more respective tasks and are displayed in response to completion of the one or more tasks.

In some examples, the electronic device detects a set of inputs (1016, 1032) including a first user input (1016, 2064) corresponding to a selection of the candidate task affordance associated with the task (1104).

In some examples, the electronic device, in response to the first user input, displays a fourth interface (1018, 2066) associated with the task. In some examples, the fourth user interface is an initial task-specific interface for generating a voice shortcut. In some examples, the interface specifies the task to associate with the voice shortcut (1022) and further includes an indication of the relevant application (e.g., name of application) (1026) and/or an icon associated with (e.g., donated by) the application (1020, 1026). In some examples, the interface includes a cancel affordance. In response to selection of the cancel affordance, the electronic device returns to an immediately prior interface. In some examples, the interface includes a record affordance (1030, 2074). In response to selection of the record affordance, the electronic device records a speech input while displaying a voice record interface (1034, 2078). In some examples, the fourth interface includes a first suggested voice shortcut phrase (1028). In some examples, the electronic device displays a suggested voice shortcut that a user may adopt as the voice shortcut for the relevant task.

In some examples, in response to detecting the set of user inputs, the electronic device displays a first interface (1034, 2072) for generating a voice shortcut associated with the task (1106). In some examples, the first interface is a voice record interface. In some examples, the voice record interface includes a prompt (1046) for the user to record a phrase that will be used as the voice shortcut for initiating a task. In some examples, the voice record interface includes a live preview (1042, 2082) of a natural-language speech input provided by the user. In some examples, the live preview is an audio waveform.

In some examples, while displaying the first interface (1108), the electronic device receives (e.g., samples, obtains, captures), by the audio input device, a natural-language speech input (1110). In some examples, the natural-language speech input is a phrase spoken by a user of the device. In some examples, the electronic device receives a speech input for a predetermined of time and/or until a user selects a stop affordance (1044, 2084).

In some examples, while receiving the natural-language speech input, the electronic device provides (e.g., displays) a live (e.g., real-time) preview of the natural-language speech input. In some examples, the live preview is a waveform of the natural-language input and/or a real-time display of a speech-to-text translation of the natural-language input. In some examples, the live preview of the natural-language speech input is a visual waveform of the natural-language speech input.

In some examples, in response to receiving the natural-language speech input, the electronic device determines the candidate phrase based on the natural-language speech input. In some examples, determining the candidate phrase based on the natural-language speech input includes determining the candidate phrase using natural-language processing. In some examples, while the user provides the natural-language speech input, the electronic device uses natural-language processing to translate the natural-language speech input to text.

In some examples, determining the candidate phrase based on the natural-language speech input includes providing the natural-language speech input to another electronic device and receiving a representation of the candidate phrase (e.g., text representation, vector representation) from the another electronic device. In some examples, the electronic device provides the natural-language speech input and/or a representation of the NL speech input to a server and the server returns one or more candidate phrases.

In some examples, determining the candidate phrase based on the natural-language speech input includes determining whether the natural-language speech input satisfies phrase similarity criteria. In accordance with a determination that the natural-language speech input satisfies the phrase similarity criteria, the electronic device indicates (e.g., displays an indication) that the natural-language speech input satisfies the similarity criteria. In some examples, the electronic device ensures that the natural-language speech input is different than one or more predetermined phrases (e.g., "call 911"). In some examples, the electronic device ensures that the natural-language speech input is sufficiently different than the one or more predetermined phrases. By way of example, the electronic device may ensure that a similarity of a representation of the natural-language speech input and each of the one or more predetermined phrases does not exceed a similarity threshold. In some examples, if the natural-language speech input does not satisfy the similarity criteria, the electronic device will notify the user that the provided speech input is not sufficient and/or not permitted. The electronic device further may request that the user provide a new natural-language speech input. In some examples, the electronic device further compares the natural-language input to phrases associated with one or more stored voice shortcuts. In some examples, the electronic device instructs the user to provide a new natural-language speech input and/or requests confirmation that the user intends for the natural-language speech input to replace one or more other similarly phrased voice shortcuts. In some examples, replaced voice shortcuts are deleted.

In some examples, the electronic device, while displaying the first interface (1034, *), determines whether the natural-language speech input has been received within a threshold amount of time. In some examples, the electronic device, in accordance with a determination that the natural-language speech input has not been received within the threshold amount of time, displays, on the first interface, a second suggested voice shortcut phrase (1046) ("You could say something like 'Show me side camera'"). In some examples, the suggested voice shortcut provided on the first interface (1034) is the same as the suggested voice shortcut provided on the second interface (1028**). In some examples, the suggested voice shortcuts of the first and second interfaces are different.

In some examples, further while displaying the first interface, the electronic device displays, in the first interface (1034), a candidate phrase (1046), wherein the candidate phrase is based on the natural-language speech input (1120). In some examples, the candidate phrase is a speech-to-text translation of the natural-language speech input and is displayed while the natural-language input is received by the electronic device. In some examples, the electronic device displays the candidate phrase in response to the natural-language input and/or translates the natural-language speech input to text in real-time. Accordingly, in some examples, the electronic device continuously updates display of the candidate phrase while the natural-language is received by the electronic device.

In some examples, after displaying the candidate phrase, the electronic device detects, via the touch-sensitive surface, a second user input (1092, 2004A) (1122). In some examples, the second user input is a selection of a completion affordance (1072, 2092). In some examples, the second user input is selection of an affordance, such as a confirmation affordance of a completion interface (1054, ***).

In some examples, in response to detection of the second user input, the electronic device associates the candidate phrase with the task (1124). In some examples, the electronic device generates a voice shortcut such that recitation of the candidate phrase by the user to the digital assistant results in performance of the task.

In some examples, associating the candidate phrase with the task includes associating the candidate phrase with a first action and associating the candidate phrase with a second action. In some examples, a voice shortcut corresponds to a multiple tasks. In some examples the combination of tasks is suggested by the digital assistant and a user may assign a phrase to initiate performance of the combination of tasks. By way of example, the voice shortcut "secure house" may correspond to tasks for turning off lights and locking doors.

In some examples, the electronic device receives, by the audio input device, a user speech input (e.g., natural-language speech input). In some examples, the electronic device determines whether the user speech input includes the candidate phrase. In some examples, the electronic device, in accordance with a determination that the user speech input includes the candidate phrase, performs the task. In some examples, the electronic device, in accordance with a determination that the user speech input does not include the candidate phrase, forgoes performing the task.

In some examples, the electronic device, after associating the candidate phrase with the task, displays a second interface including an edit affordance. In some examples, the electronic device displays the second interface at the end of the voice shortcut generation process. In some examples, the user may navigate to the voice shortcut in an interface (1004A) listing one or more stored voice shortcuts (1008A) and select the voice shortcut to cause display of the second interface. In some examples, the second user interface (1054, 2090) includes a textual representation of the task (1060, 2098), an indication of the task (1058), the candidate phrase (1064, 2002A), an edit affordance (1066) which when selected causes display of candidate shortcuts, a cancel affordance (1056, 2094) which when selected causes the device to cancel the voice shortcut generation process, and a completion affordance (1054, 2092 which when selected causes the electronic device to associate the candidate phrase with the task or maintain association of the candidate phrase with the task if already associated.

In some examples, the electronic device detects a third user input indicating a selection of the edit affordance (1068). In some examples, the electronic device, in response to detecting the third user input, displays a plurality of candidate phrase affordances (1082, 1084, 1086) including a first candidate phrase affordance corresponding to the candidate phrase and a second candidate phrase affordance corresponding to another candidate phrase. In some examples, the another candidate phrase is based on the natural-language speech input. In some examples, the electronic device, in response to selection of the edit affordance, displays an edit interface (1070) including a plurality of candidate phrases. In some examples, a user may select one of the candidate phrases to associate with the task. In some examples, each of the plurality of candidate phrases are speech-to-text candidates generated, based on the natural-language speech input, using one or more NLP methodologies. In some examples, the NL speech input is provided to another device (e.g., back-end server), which returns one or more of the candidate phrases to the electronic device. In some examples, candidate phrases are generated on both the electronic device and a backend server, and the electronic device selects one or more of the "best" candidate phrases (e.g., candidate phrases associated with highest respective confidence scores).

In some examples, the electronic device, detects another set of inputs (1090, 1092) including a fourth user input indicating a selection of the second candidate phrase affordance. In some examples, the electronic device, in response to detecting the another set of inputs, associates the another candidate phrase with the task. In some examples, a user selects a new candidate phrase to associate with the task such that providing the new candidate phrase causes performance of the task. In some examples, associating a new candidate task causes the electronic device to disassociate the previously associated candidate phrase from the task.

In some examples, the electronic device, after associating the candidate phrase with the task, detects a fifth input (1092, 2004A). In some examples, the electronic device, in response to detecting the fifth user input, displays another plurality of candidate task affordances, wherein the another plurality of candidate task affordances does not include the candidate task affordance associated with the task. In some examples, after creating a voice shortcut, the electronic device displays a settings interface (1004) listing candidate tasks suggested by the digital assistant and/or one or more applications. In some examples, if a task was previously suggested and a user created a shortcut for the task, the task is removed from the list of suggested tasks.

In some examples, the electronic device provides the candidate phrase to another electronic device. In some examples, the generated voice shortcut is provided to a backend server for subsequent speech input matching. In some examples, the generated voice shortcut and the associated task are provided to the backend server. In some examples, inputs are provided from the electronic device to the backend server and the backend server determines whether the input corresponds to a voice shortcut. If the backend server determines the input corresponds to a voice shortcut, the electronic device performs the task. In some examples, providing each of the shortcut and the task to the server in this manner further allows for subsequent performance of the task on other electronic devices using the same shortcut.

Note that details of the processes described above with respect to method 1100 (e.g., FIGS. 11A-11B) are also applicable in an analogous manner to the methods described below. For example, method 1100 optionally includes one or more of the characteristics of the various methods described with reference to methods 900, 1300, 1500, 1700, and 1900. For example, providing voice shortcuts as described in method 1200 can be applied to generate voice shortcuts for use as described in method 1300. For brevity, these details are not repeated below.

The operations in the methods described above are, optionally, implemented by running one or more functional modules in an information processing apparatus such as general purpose processors (e.g., as described with respect to FIGS. 2A, 4, and 6A) or application specific chips. Further, the operations described above with reference to FIGS. 10A-10AJ are, optionally, implemented by components depicted in FIGS. 2A-B. For example, displaying operation 1102, detecting operation 1104, displaying operation 1106, receiving operation 1110, displaying operation 1120, detecting operation 1122, and associating operation 1124 are, optionally, implemented by event sorter 270, event recognizer 280, and event handler 290. Event monitor 271 in event sorter 270 detects a contact on touch-sensitive surface 604 (FIG. 6A), and event dispatcher module 274 delivers the event information to application 236-1 (FIG. 2B). A respective event recognizer 280 of application 236-1 compares the event information to respective event definitions 286, and determines whether a first contact at a first location on the touch-sensitive surface corresponds to a predefined event or sub-event, such as selection of an object on a user interface. When a respective predefined event or sub-event is detected, event recognizer 280 activates an event handler 290 associated with the detection of the event or sub-event. Event handler 290 optionally utilizes or calls data updater 276 or object updater 277 to update the application internal state 292. In some embodiments, event handler 290 accesses a respective GUI updater 278 to update what is displayed by the application. Similarly, it would be clear to a person having ordinary skill in the art how other processes can be implemented based on the components depicted in FIGS. 2A-2B.

Figure 12:
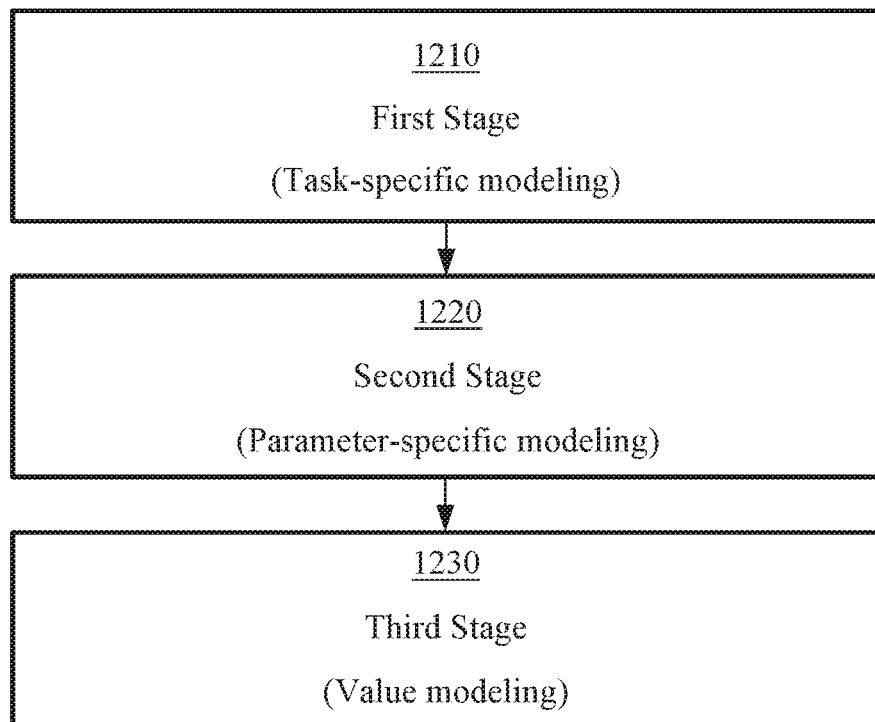
FIG. 12 is a block diagram illustrating a task suggestion system, according to various examples.

FIG. 12 is a block diagram illustrating a task suggestion system 1200, according to various examples. FIG. 12 is also used to illustrate one or more of the processes described below, including the method 1300 of FIG. 13.

FIG. 12 illustrates a task suggestion system 1200 that may, for instance, be implemented on an electronic device described herein, including but not limited to devices 104, 200, 400, and 600 (FIGS. 1, 2A, 4, and 6A-B). It will be appreciated that while the task suggestion system 1200 is described herein as being implemented on a mobile device, the task suggestion system 1200 may be implemented on a device of any type, such as a phone, laptop computer, desktop computer, tablet, wearable device (e.g., smart watch), set-top box, television, home automation device (e.g., thermostat), or any combination or subcombination thereof.

Generally, the task suggestion system 1200 provides task suggestions based on context data of an electronic device. Task suggestions provided by the task suggestion system 1200 may in turn be used to provide suggestion affordances, such as those described with respect to FIGS. 8A-8AF. In some examples, the task suggestion system 1200 is implemented as a probability model. The model may include one or more stages, including but not limited to the first stage 1210, second stage 1220, and third stage 1230, each of which is described in further detail below. In some examples, one or more of first stage 1210, second stage 1220, and third stage 1230 may be combined into a single stage and/or split into multiple stages. By way of example, in an alternative implementation, the task suggestion system 1200 may include a first stage and a second stage, where the first stage implements the functionality of both first stage 1210 and second stage 1220.

In some examples, context data of the electronic device is indicative of a state or context of the electronic device. By way of example, context data may indicate various characteristics of the electronic device during a time at which a particular task was performed. For instance, for each task performed by the electronic device, context data may indicate a location of the electronic device, whether the electronic device was connected to a network (e.g., WiFi network), whether the electronic device was connected to one or more other devices (e.g., headphones), and/or a time, date, and/or weekday at which the task was performed. If the electronic device was connected to a network or device during performance of the task, the context data may further indicate a name and/or type of the network or device, respectively. Context data further may indicate whether a suggestion affordance associated with a task was previously presented to a user and the manner in which the user responded to the suggestion affordance. For instance, the context data may indicate whether the user ignored the task suggestion or used the task suggestion to perform a corresponding task.

In some examples, the electronic device receives context data from applications during operation of the electronic device. In some examples, an application provides context data for a task while performing a task or after performing a task. Context data provided in this manner may be indicative of a task and, optionally, one or more parameters associated with the task. In some examples, context data provided by an application further includes data indicative of the state of the electronic device while the task was performed, described above (e.g., location of the electronic device, whether the electronic device was connected to a network, etc.). In other examples, context data provided by an application does not include data indicative of the state of the electronic device while the task was performed, and in response to receipt of context data from an application, the electronic device obtains data indicative of the state of the electronic device.

In some examples, context data is provided by applications using any of a plurality of context data donation mechanisms. In at least one example, context data is received from applications in response to an API call which causes an application to return information regarding execution of the application. By way of example, a word processing application (e.g., Notes, Word) may return an identifier (e.g., numerical ID, name) of a word processing document accessed by a user. As another example, a media playback application (e.g., Music, Spotify) may return an identifier of a current media item (e.g., song), album, playlist, collection, and one or more media items suggested by the media playback application for the user.

In some examples, context data is received from applications in response to an API call which causes an application to provide a data structure indicating (e.g., identifying) a task performed by an application. The data structure may, for instance, include values for one or more parameters associated with the task. In some examples, the data structure is implemented as an intent object data structure. Additional exemplary description of operation with intent object data structures can be found in U.S. patent application Ser. No. 15/269,728, "APPLICATION INTEGRATION WITH A DIGITAL ASSISTANT," filed Sep. 18, 2016, which is hereby incorporated by reference in its entirety.

In some examples, context data is received from applications in response to an API call which causes an application to provide an application-specific (e.g., third-party application) data structure indicating a task performed by an application. The application-specific data structure may, for instance, include values for one or more parameters associated with the task. The application-specific data structure can, optionally, further indicate which parameter values of the task may be specified when providing task suggestions as well as which combinations of parameter values. Thus, while a task having M parameters may have as many as $2^M-1$ permitted combinations of parameters, an application-specific data structure may explicitly reduce the number of permitted combinations. In some examples, the application-specific data structure indicates whether the task is a background task or a task requiring confirmation, as previously described with respect to FIGS. 8A-8AF.

In some examples, context data is provided by an application each time a task is performed on the electronic device. Context data may, for instance, be provided while the task is performed or after the task is performed. For instance, in some examples, the electronic device detects that an application has been closed, and in response, employs one or more context data donation mechanisms to request context data from the application.

In some examples, context data is selectively provided based on types of tasks. By way of example, context data may be provided in response to a user sending a text message or placing a call, but not in response to a user navigating to a web page using a browser or unlocking the electronic device. In some examples, context data is selectively provided based on context of the electronic device. For instance, context data may not be provided if a charge level of a battery of the electronic device is below a threshold charge level.

In some examples, each type of context data (e.g., location of the electronic device, whether the electronic device is connected to a network, etc.) is associated with a respective context weight. The context weights may be used, for instance, to influence the manner in which context data is used to determine probabilities. As an example, types of context determined to be stronger predictors of user behavior may be associated with relatively large weights and/or types of context determined to be weaker predictors of user behavior may be associated with relatively small weights. By way of example, tasks performed by a user when the electronic device is at a particular location may be a better indicator of user behavior than tasks performed by a user on a particular a weekday. Accordingly, location context data may be associated with a relatively large weight and weekday context data may be associated with a relatively small weight. As another example, whether a user selected a suggestion affordance for a task may be associated with a relatively large weight as such context data may strongly indicate whether the user is likely to select subsequent suggestion affordances for the task.

In some examples, context weights are determined by the electronic device. In other examples, weights are determined by another device using aggregated data. For instance, in some examples, anonymized context data may be provided by the electronic device and/or one or more other devices to a data aggregation server. In turn, the data aggregation server may determine which types of context data are more discriminative and/or stronger predictors of user behavior. In some examples, the data aggregation server employs one or more machine learning techniques to determine which types of context data are relatively discriminative and/or stronger predictors of user behavior. Based on the determination, the data aggregation server may determine a weight for each type of context data and provide the weights to the electronic device. In some examples, a user may elect to forgo (e.g., opt out of) providing anonymized data to another device for determining context weights.

By ensuring that context data used by the data aggregation server is anonymized, privacy of users of electronic devices may be preserved. Anonymizing context data may include removing names of users, specific locations recorded by the electronic device, names of WiFi networks, and any other user-specific information. Anonymized context data may, for instance, specify that a user performed a certain task 20% of the time when at a same location, but not specify which task or location.

In an example operation, the first stage 1210 performs task-specific modeling based on context data of the electronic device. In some examples, performing task-specific modeling includes determining one or more probabilities (e.g., task probabilities) for each of a plurality of tasks (e.g., one or more tasks previously performed by the electronic device and/or one or more tasks that may be performed by the electronic device). Each task probability determined in this manner indicates a likelihood that a user will perform a task given a context of the electronic device.

In some examples, determining task probabilities in this manner includes generating and/or updating one or more histograms based on the context data. First stage 1210 may, for instance, generate a respective set of histograms for each task indicating probabilities that a user performs tasks given various contexts of the electronic device. In some examples, each histogram associated with a task corresponds to a single type of context. As an example, a first histogram associated with a task for enabling a thermostat may be a location context histogram. The location context histogram may indicate, for each of a plurality of locations in which the user has previously enabled a thermostat, a probability that a user enables a thermostat when at the location. A second histogram associated with the task for enabling a thermostat may be a WiFi context histogram. The WiFi context histogram may indicate, for each of a plurality of WiFi networks to which the electronic device has previously been connected, a probability that a user enables a thermostat when the electronic device is connected to the WiFi network. It will be appreciated that context data of the electronic device may include any number of types of context. Accordingly, a task may be associated with any number of histograms.

In some examples, to determine a task probability for a task given a particular context, first stage 1210 may determine a respective probability for each context type given the context (e.g., as indicated by each histogram associated with the task) and determine the task probability based on the probabilities for the context types.

In some examples, determining task probabilities further may include adjusting context data using context weights. As described, each context type may be associated with a weight. Accordingly, prior to determining a task probability based on context probabilities, each context probability may be adjusted (e.g., multiplied) by a corresponding context weight.

In some examples, task probabilities provided by first stage 1210 are parameter-independent. That is, task probabilities may be determined (e.g., histograms generated) for each task without consideration of specific parameter values used to perform the task. As an example, the first stage 1210 can determine a probability of a user sending a text message given a particular context (e.g., at a particular time), but may forgo determining probabilities directed to the recipient of the text message or the contents (e.g., text, image) of the text message. As another example, the first stage 1210 can determine a probability that a user will enable a thermostat when arriving at home, but forgo determining any probabilities directed to temperature thresholds of the thermostat.

In some examples, first stage 1210 updates context data in response to performance of a task. In some examples, updating context data in this manner includes updating one or more histograms for the task performed.

Generally, the second stage 1220 performs parameter-specific modeling based on context data of the electronic device. In some examples, performing parameter-specific modeling includes determining probabilities (e.g., parameter probabilities) for a set of parameters that indicate the likelihood a user selects a particular value for each parameter of the set of parameters given a task (e.g., tasks previously performed by the electronic device). Parameter probabilities may indicate a likelihood that a user selects a particular value for a single parameter (and no other values) and/or may indicate a likelihood that a user selects particular values for multiple (e.g., a combination) of parameters.

For example, during operation, second stage 1220 provides a set of tasks based on the context data. In some examples, to provide the set of tasks, the second stage 1220 identifies a plurality of tasks and ranks the tasks according to their respective task probabilities. In some examples, the second stage 1220 identifies one or more tasks previously performed by the electronic device. The second stage 1220 may omit types of tasks that are determined to occur at a frequency exceeding a frequency threshold in some examples.

Thereafter, the second stage 1220 determines which of the identified tasks are associated with the N (e.g., N=10) highest respective task probabilities (as determined by first stage 1210) and provides the N tasks associated with the N highest ranking task probabilities as the set of tasks. In some examples, determining which of the identified tasks are associated with the N highest task probabilities includes determining which tasks are associated with the N highest task probabilities given any context of the electronic device. In other examples, determining which of the identified tasks are associated with the N highest task probabilities includes determining which tasks are associated with the N highest task probabilities for a current context of the electronic device.

In some examples, once second stage 1220 has identified a set of tasks, second stage 1220 determines parameter probabilities for each task of the set of tasks based on the context data. In some examples, second stage 1220 determines parameter probabilities using a subset of the context data of the electronic device. As an example, the second stage 1220 may determine parameter probabilities using context data received within a threshold amount of time (e.g., prior 30 days). As another example, second stage 1220 may determine parameter probabilities for a given task using context data corresponding to the most recent N (e.g., N=100) instances in which each task of the set of tasks was performed. For instance, in an example in which second stage 1220 determines parameter probabilities for a task directed to sending a text message, the second stage 1220 determines parameter probabilities for the task using context data corresponding to the last N instances in which the electronic device sent a text message.

In some examples, determining parameter probabilities includes generating and/or updating one or more histograms based on the context, for instance, in real-time. Second stage 1220 may, for instance, generate a respective set of histograms for each task indicating probabilities that a user selects a particular parameter value for a parameter given the task. In some examples, each histogram associated with a task corresponds to a single parameter. Thus, each histogram may represent a distribution of values for a parameter used to perform a task over time.

In some examples, the second stage 1220 determines parameter probabilities based on a current context of the electronic device. This may, for instance, reduce computational complexity required to provide parameter probabilities. By way of example, during operation, the second stage 1220 may determine that the electronic device is at a particular location. As a result, in determining parameter probabilities, the second stage 1220 may determine probabilities for parameter values that were previously used when the device was at the determined location.

In an example operation, the second stage 1220 may determine, based on context data, probabilities for one or more parameter values that may be used to send a text message. The second stage 1220 may, for instance, determine based on context data (e.g., prior use of the electronic device) that there is a 20% that the recipient of a text message is a first contact and a 30% chance that the recipient of the text message is a second contact. The second stage 1220 further may determine that there is a 40% chance that the text message includes a first payload (e.g., string, image) and a 55% chance that the text message includes a second payload. In some examples, the second stage 1220 may further determine probabilities for one or more combinations of parameters values. The second stage 1220 may determine that there is a 20% chance that the recipient of the text message is the first contact and that the text message includes the first payload. The second stage 1220 may further determine that there is a 15% chance that the recipient of the text message is the first contact and that the text message includes the second payload. It will be appreciated that this example is not intended to be limiting and second stage 1220 can determine probabilities for any number and/or combination of parameter values.

In some examples, second stage 1220 determines parameter probabilities periodically (e.g., every 7.5 minutes) and/or in response to an event, such as a change in context of the electronic device. By way of example, probabilities may be determined in response to a change in location or environment of the electronic device (e.g., the electronic device being moved from a house to a car), a change in charge level of the battery of the electronic device, a change in configuration of the electronic device (e.g., installation or deletion of an application), and/or a change in connectivity of the electronic device (e.g., connecting or disconnecting from a network).

In some examples, once task probabilities and parameter probabilities have been determined by the first stage 1210 and second stage 1220, respectively, third stage 1230, optionally, adjusts one or more probabilities. In some examples, third stage 1230 adjusts task probabilities. Task probabilities may be adjusted, for instance, based on a type of the task associated with the task probability. Additionally or alternatively, in some examples, third stage 1230 adjusts (e.g., increases, decreases) parameter probabilities. As an example, parameter probabilities associated with a relatively high number of parameters (e.g., 3 or more) may be increased and/or parameter probabilities of tasks having a relatively low number of parameters (e.g., 2 or less) may be decreased. As another example, parameter probabilities for parameters of a first type may be increased and/or parameter probabilities for parameters of a second type not having the one or more particular types of parameters specified may be decreased. In particular, parameter probabilities for relatively discriminative parameter types, such as strings, may be increased, and/or parameter probabilities for relatively non-discriminative parameter types, such as Booleans, may be decreased. As yet another example, parameter probabilities for parameters having relatively high entropy (e.g., variation of values) as indicated by context data may be increased and/or parameter probabilities parameters having relatively low entropy as indicated by context data may be decreased.

Once probabilities have been adjusted, the third stage 1220 determines a task probability and parameter probability for each task. In some examples, the third stage 1220 identifies a highest parameter probability for each task. In other examples, the third stage 1220 identifies several parameter probabilities for a task. In some examples, for the purposes of providing task suggestions, as set forth below, a task having multiple parameter probabilities may be treated as a separate task for each parameter probability (e.g., a task with a first set of parameter values is considered distinct from the task with a second set of parameter values). As described, each parameter probability may correspond to a single parameter value and/or may correspond to multiple parameter values.

In some examples, after probabilities have (optionally) been adjusted, the third stage 1230 determines, for each task, whether the task satisfies suggestion criteria based on a task probability and a parameter probability associated with the task.

In some examples, determining whether a task satisfies suggestion criteria includes providing a joint probability for a task based on a task probability and a parameter probability for the task and determining whether the joint probability exceeds a probability threshold. In some examples, a joint probability is provided by multiplying a task probability and a parameter probability. In some examples, if third stage 1230 determines that a joint probability exceeds the probability threshold, the third stage 1230 determines that the task associated with the joint probability satisfies suggestion criteria.

In some examples, once third stage 1230 has determined (e.g., identified) tasks that satisfy suggestion criteria, third stage 1230 provides the tasks (and corresponding parameter values) associated with the tasks as task suggestions. In some examples, third stage 1230 provides all tasks satisfying the suggestion criteria as task suggestions. In other examples, third stage 1230 provides a subset of the tasks satisfying the suggestion criteria as task suggestions. The third stage 1230 may, for instance, provide the task associated with the respective highest joint probability as a task suggestion.

In turn, the electronic device determines, for each of the task suggestions, whether to display a suggestion affordance corresponding to the task suggestion. In some examples, this includes determining whether the task suggestion satisfies first suggestion criteria and/or second suggestion criteria. In some examples, determining whether a task suggestion satisfies first suggestion criteria and/or second suggestion criteria includes determining whether a joint probability associated with the task suggestion satisfies first and second display thresholds, respectively.

If, for instance, a joint probability for a task suggestion satisfies the first display threshold, a suggestion affordance corresponding to the task suggestion is displayed in a first user interface (e.g., search screen interface 866 of FIG. 8N). If a joint probability corresponding to a task suggestion satisfies a second display threshold, a suggestion affordance corresponding to the task suggestion is additionally or alternatively be displayed in a second user interface (e.g., lock screen interface 810 of FIG. 8B). In some examples, the first display threshold is the same as the probability threshold. In some examples, the second display threshold is greater than the first display threshold.

If a user subsequently selects a suggestion affordance, the electronic device selectively performs a task in response to selection of the suggestion affordance, as described with reference to FIGS. 8A-8AF. If the task is a background task (e.g., a task that does not require user confirmation), the electronic device performs the task, as described. If the task not a background task (e.g., the task requires user confirmation and/or additional user input prior to task performance), the electronic device displays an interface requesting confirmation and/or additional input from the user. In some examples, a user may confirm performance of a task by selecting a confirmation affordance of the confirmation interface.

In some examples, display of suggestion affordances may be modified in response to a change in context of the electronic device (e.g., change in location of electronic device, user connects device to or disconnects device from headphones). By way of example, in response to a change in context, the electronic device may cease display of one or more displayed suggestion affordances, display one or more new suggestion affordances, and/or display suggestion affordances in a new order. Modifying display of suggestion affordances in this manner may include determining a new set of suggestions using the current context of the electronic device (e.g., in response to detecting a change in the context of the electronic device) and displaying one or more suggestion affordances for those task suggestions satisfying suggestion criteria and/or display criteria, as described (recall that in some examples, only a top scoring task suggestion is used for display of a suggestion affordance). Modifying display of suggestion affordances may further include ceasing display of suggestion affordances for task suggestions not satisfying the suggestion criteria and/or the display criteria in accordance with the context. In some examples, suggestion affordances are displayed in an order corresponding to context of the electronic device, and/or a ranking of respective joint probabilities associated with the suggestion affordances. Accordingly, a change in context of the electronic device may cause the electronic device to change an order in which suggestion affordances are displayed.

In some examples, determining whether a task satisfies suggestion criteria further includes determining whether heuristic criteria have been met. For example, the third stage 1230 (or any other stage of the task suggestion system 1200) may determine whether one or more sets of predetermined conditions have been met. If so, the third stage 1230 provides a task suggestion for a task corresponding to each of the sets of predetermined conditions that have been met (e.g., heuristic task suggestion). By way of example, the electronic device may determine, based on a location of a user and a calendar of a user, that the user is going to be late to a meeting (e.g., the user will not be able to arrive on time). Accordingly, the electronic device may provide a heuristic task suggestion for the user to send a text message to the organizer of the meeting that the user will be late. The electronic device may in turn display a suggestion affordance corresponding to the heuristic task suggestion.

In some examples, task suggestions provided in this manner have a joint probability of 100%, such that the task suggestions always satisfy thresholds for display. In some examples, task suggestions provided in this manner may have a joint probability of less than 100% if a user has failed to select a same type of task suggestion previously displayed by the electronic device. Thus, joint probabilities of task suggestions provided in this manner may increase or decrease (e.g., decay) according to user behavior.

In some examples, suggestion affordances for heuristic task suggestions are displayed in combination with suggestion affordances for task suggestions. In other examples, suggestion affordances for heuristic task suggestions are not displayed in combination with suggestion affordances for task suggestions. For instance, in some examples, display of a suggestion affordance for a heuristic task suggestion overrides (e.g., precludes) display of a suggestion affordance for a task suggestion.

In some examples, only a single set of predetermined conditions may be met at a given time such that only a single heuristic task suggestion is provided at any given time. Because, in some examples, heuristic task suggestions are provided based on a set of conditions (e.g., set of hard-coded rules) in addition to context data, heuristic task suggestions may allow the electronic device to provide task suggestions for tasks not previously provided by the electronic device.

The following table sets forth various sets of exemplary predetermined conditions that may be used to provide heuristic task suggestions. It will be appreciated that the sets are not intended to be limiting. Additionally, the table sets forth conditions that cause the electronic device to cease display of a suggestion affordance corresponding to a heuristic task suggestion. In some examples, the electronic device ceases display of the suggestion affordance in response to all of the conditions being met. In some examples, the electronic device ceases display of the suggestion affordance in response to any number of the conditions being met.

| Conditions for Suggestion | Suggested Task | Condition(s) to Withdraw |
|---|---|---|
| Movie ticket added to digital wallet on device and/or user is located at theater | Enable a do not disturb mode on the electronic device (the suggestion affordance may be displayed a predetermined amount of time before the event) | Do not disturb mode is enabled; user does not select the affordance within a predetermined amount of time; the user has ignored same or similar suggestions a threshold number of times |
| User calendar indicates that user appears to be at risk of being late to an event | Initiate call or send predetermined message to relevant contact (e.g., meeting organizer); a message may optionally indicate an estimated time of arrival for the user | User has contacted the relevant contact (e.g., call, message); user has ignored same or similar suggestions a threshold number of times; the user is at the location of the event |
| User misses call from a contact of a particular type (e.g., contact frequently called) | Call contact corresponding to missed call. | User has contacted the contact; user has ignored same or similar suggestions a threshold number of times; the user is at the location of the event |
| User calendar indicates that the user has an upcoming | Reserve ride-booking for user using the location of | User is determined to be traveling to destination; |

-continued

| Conditions for Suggestion | Suggested Task | Condition(s) to Withdraw |
| --- | --- | --- |
| event at a particular address, and the user has previously used a ride-booking application (e.g., Lyft) | the user as a pickup location and specified address as the destination | user has contacted ride-booking service (e.g., driver) |
| Current day is the birthday of a user contact | Initiate call or send predetermined message to relevant contact | User has contacted the contact; user has ignored same or similar suggestions a threshold number of times; window has elapsed (e.g., date has changed) |
| User calendar indicates that the user has an upcoming event and the description of the event in the calendar includes at least a threshold amount of information (e.g., address, phone number, notes, etc.) | Open Calendar application | user has ignored same or similar suggestions a threshold number of times; window has elapsed (e.g., date has changed) |
| User as an upcoming flight (e.g., as indicated by calendar application, traveling application, electronic passport application) | Reserve ride-booking for user using the location of the user as a pickup location and the relevant airport as the destination | User books ride; user contacts ride-booking service; user is determined to be traveling to airport |
| URL is copied by user using copy function (e.g., onto device clipboard) | Open URL in browser | User accesses URL; user pastes URL into browser; user has copied other content |
| User calendar indicates user has an upcoming meeting, the calendar entry includes a telephone number for calling into the meeting, and/or the user is not located at a specified location of the meeting | Call telephone number in calendar entry | User initiates phone call; event time has passed; user has ignored same or similar suggestions a threshold number of times |
| User calendar indicates user has unusually early meeting (e.g., scheduled time is earlier than normal events for user) | Generate alarm a predetermined amount of time prior to event. | User sets alarm for earlier time than normal; user has ignored same or similar suggestions a threshold number of times |
| Potential event detected in messaging application (e.g., using natural-language processing) | Generate calendar entry for detected event | Predetermined amount of time has elapsed after event detected |
| User calendar indicates user has an event and/or user is located at a location associated with the event | Enable a do not disturb mode on the electronic device (the suggestion affordance may be displayed a predetermined amount of time before the event) | User calls contact associated with event; event time has passed; user has ignored same or similar suggestions a threshold number of times |
| Event is determined to be at an event of one or more predetermined types (e.g., movie, meal, meeting) | Enable a do not disturb mode on the electronic device (the suggestion affordance may be displayed a predetermined amount of time before the event) | Do not disturb mode is enabled; user ignores suggestion affordance for a predetermined amount of time; user has ignored same or similar suggestions a threshold number of times; event time passes |
| Predetermined (e.g., favorite) contact of user is attending event of user | Enable a do not disturb mode on the electronic device (the suggestion affordance may be displayed a predetermined amount of time before the event) | Do not disturb mode is enabled; user ignores suggestion affordance for a predetermined amount of time; user has ignored same or similar suggestions a threshold number of times; event time passes |
| Telephone number is copied by user using copy function (e.g., onto device clipboard) | Call phone number | User called telephone number; use pasted telephone number into phone application, user has copied other content |
| User is currently at a gym location and previously has been at the gym location | Start workout | User has starts other workout; user has ignored same or similar suggestions |

| Conditions for Suggestion | Suggested Task | Condition(s) to Withdraw |
|---|---|---|
| and started a workout a threshold number of times | | a threshold number of times (may represent after predetermined amount of time (e.g., 10 days)); |
| A user has been paired with a driver on a ride-booking application | Call driver | User is determined to be in car (e.g., traveling to destination) |
| User calendar indicates the user has an upcoming flight | Download media (e.g., music, videos) to device for offline access | User downloads media; user has ignored same or similar suggestions a. threshold number of times |
| User calendar indicates entry for upcoming event includes an attachment | Open attachment | user has ignored same or similar suggestions a threshold number of times |
| User is at a particular location and previously has played music at the location a threshold number of times; optionally headphones are connected to device | Present playlist for playback | User does not have required subscription; headphones not connected; user plays music; user has ignored same or similar suggestions a threshold number of times (may represent after predetermined amount of time (e.g., 10 days)) |

Figure 13:
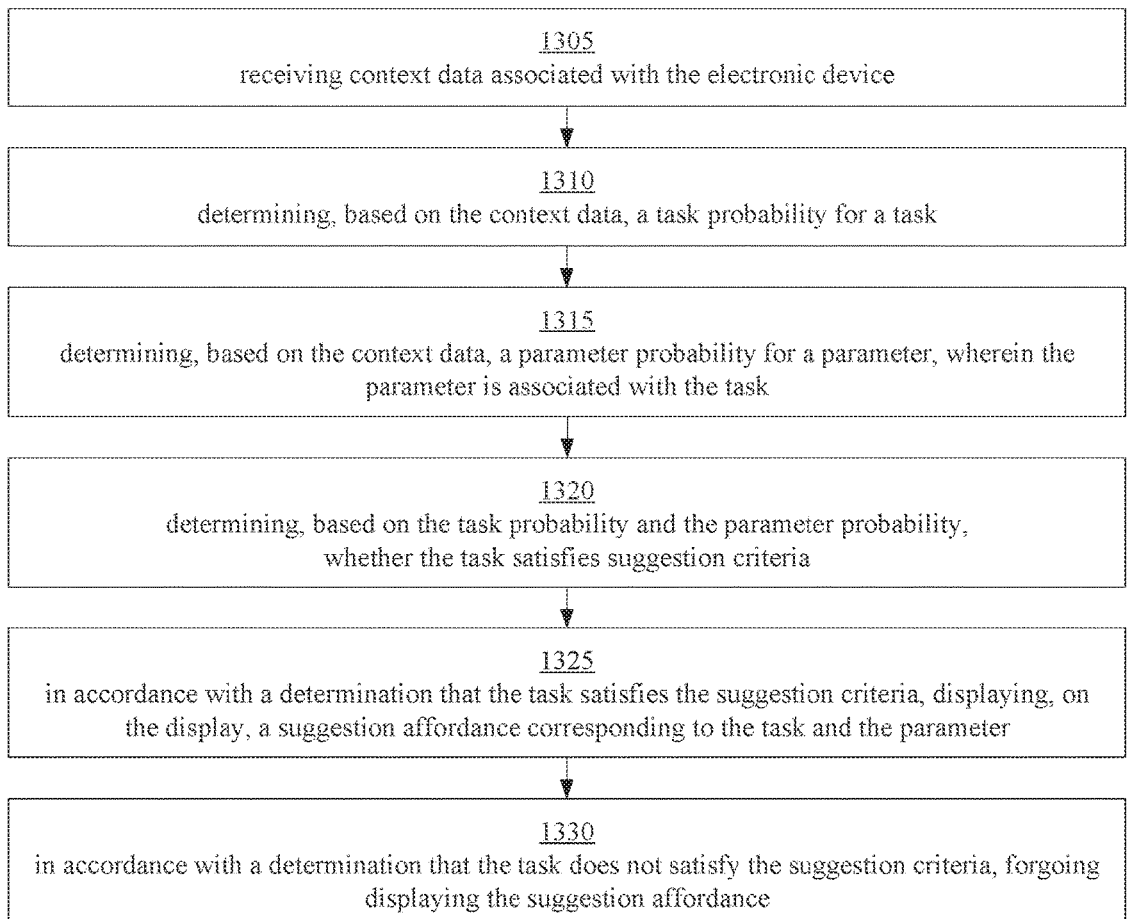
FIG. 13 is a flow diagram illustrating a method for providing suggestions, according to various examples.

FIG. 13 illustrates method 1300 for providing suggestions, according to various examples. Method 1300 is performed, for example, using one or more electronic devices implementing a task suggestion system, such as the task suggestion system 1200 of FIG. 12. In some examples, method 1300 is performed using a client-server system (e.g., system 100), and the blocks of method 1300 are divided up in any manner between the server (e.g., DA server 106) and a client device. In other examples, the blocks of method 1300 are divided up between the server and multiple client devices (e.g., a mobile phone and a smart watch). Thus, while portions of method 1300 are described herein as being performed by particular devices of a client-server system, it will be appreciated that method 1300 is not so limited. In other examples, method 1300 is performed using only a client device (e.g., user device 104) or only multiple client devices. In method 1300, some blocks are, optionally, combined, the order of some blocks is, optionally, changed, and some blocks are, optionally, omitted. In some examples, additional steps may be performed in combination with the method 1300.

As described below, selectively providing suggestion affordances associated with tasks, as described herein, allows a user to efficiently and conveniently perform tasks relevant to the user on the electronic device. By way of example, suggestion affordances displayed by the electronic device can correspond to tasks identified based on context data of the electronic device, such as context data indicative of prior use of the electronic device by the user. Thus, selectively providing suggestions in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

In some examples, the electronic device includes one or more of a keyboard, mouse, microphone, display, and touch-sensitive surface. In some examples, the display is a touch-sensitive display. In other examples, the display is not a touch-sensitive display.

At block 1305, the electronic device (e.g., device 104, 200, 400, 600, or another device implementing the task suggestion system 1200) receives context data associated with the electronic device. In some examples, receiving the context data includes determining a context of the electronic device while performing the task (e.g., determine a location of the device, whether the device is connected to WiFi network, etc.). In some examples, context data is indicative of a state of the electronic device given one or more conditions. In some examples, context data is indicative of various contextual aspects of the electronic device when each of a plurality of tasks was performed. In some examples, context data indicates a location of context data indicates a location of the electronic device, whether the device is connected to a network (e.g., WiFi network), and if so, a name (e.g., SSID) of the network, a time and/or day at which the task was performed, and whether headphones were connected. In some examples, determining a context of the electronic device includes determining a location of the electronic device, determining whether the electronic device is connected to a network, determining a time of day, or any combination thereof. In some examples, if a task has been previously presented to the user as a suggested task (e.g., using a suggestion affordance), the context data indicates the manner in which the user responded to the suggestion (e.g., whether the user interacted with the suggestion, deleted the suggestion, ignored the suggestion, etc.).

In some examples, each type of context data is assigned a score according to a respective weight (e.g., using dot multiplication). In some examples, the respective magnitudes of weights utilized in this manner are determined by a server using anonymized, aggregated data such that data is utilized in a privacy preserving manner.

In some examples, context data is obtained from applications during use of the electronic device, for instance, using a number of data donation mechanisms. In some examples, context data is obtained from applications using an API call which causes an application to indicate what the user was doing at the time of the API call (e.g., if user is in a "notes" app, call returns an ID of the note and/or a name of the note). In some examples, receiving context data includes receiving a data structure (e.g., standardized intent object, third-party application intent object) corresponding to the task and one or more parameters associated with the task. In some examples, context data is obtained from applications using an API call which causes an application to donate a standardized data structure indicating a task performed by the application. In some examples, the data structure is an intent object. In some examples, context data is obtained from applications using an application-specific (e.g., third-party application) data structure indicating a task performed by the application. In some examples, the third-party data structure further indicates which parameters of a task may be predicted together and/or whether a task is a background task (e.g., a task that does not require additional input prior to performance of the task). In some examples, applications donate context data each time a user performs a task. In some examples, applications selectively donate context data, for instance, based on context of the electronic device (e.g., an application may forgo providing context data if a battery charge level of the device is below a threshold).

At block 1310, the electronic device determines, based on the context data, a task probability for a task. In some examples, using context data, the electronic device employs a multi-stage model to provide suggestions. In some examples, at the first stage (1210) of the model, the electronic device determines a probability for each of a plurality of tasks indicating the likelihood that the user performs the task given particular context. In some examples, determining a task probability for a task includes generating, for each of a plurality of types of context, a histogram corresponding to the task based on the context data. In some examples, identifying task probabilities includes providing (e.g., generating) one or more histograms using the data provided by applications during use of the electronic device. In some examples, the histograms provided in this manner indicate patterns of user behavior. By way of example, each of the histograms may indicate a probability that a user takes a particular action given a particular context (e.g., a user selects a particular music app at an 80% rate when connecting to a particular WiFi network)). In some examples, the task probability is parameter-independent. That is, in some examples, the electronic device determines the task probability using context data associated with tasks irrespective of the parameters used to perform the tasks. In some examples, the task probability determined in this manner are parameter-specific.

At block 1315, the electronic device determines, based on the context data, a parameter probability for a parameter, wherein the parameter is associated with the task. In some examples, at the second stage (1220) of the model, the electronic device determines a probability (e.g., conditional probability) for each a plurality of tasks indicating a likelihood that a user uses particular parameters for each task. In some examples, determining, based on the context data, a parameter probability for a parameter includes determining a current context of the electronic device and determining the parameter probability based on the current context of the electronic device (e.g., determining context of the electronic device and determining the parameter probability in accordance with the context of the electronic device (e.g., determine a location of the electronic device and determine the parameter probability with respect to the determined location)). In some examples, the electronic device maintains a list of the most recent N number (e.g., 100) of tasks for each task type. The electronic device may, for instance, track which parameters were previously used to perform each of the immediately previous N tasks. In some examples, the electronic device tracks only particular types of tasks (e.g., does not track easily accessible functions so as to ensure that suggestions ultimately provided by the electronic device are relatively highly discriminative and/or accelerating). In some examples, the electronic device identifies a subset of the plurality of tasks evaluated at the first stage (1210), and determines probabilities only for tasks of the subset of tasks. In some examples, the subset identified by the electronic device includes tasks associated with the highest probabilities as determined at the first stage. In some examples, the electronic device computes conditional probabilities using only currently relevant context data (i.e., for context signals currently satisfied by context of the electronic device (e.g., current location of the device and no other locations). In this manner, the computational demands required to implement the second stage of the model are reduced—only highly scoring tasks from the first stage are considered, and only for contextual signals that currently apply. Accordingly, usage of the device may be more efficient, thereby reducing the amount of time and power required to provide task suggestions. In some examples, the electronic device determines probabilities in this manner periodically. In some examples, the electronic device determines probabilities in this manner in response to particular events (e.g., deletion of an application on the electronic device).

Determining probabilities (e.g., task probabilities, parameter probabilities) based on context of the electronic device ensures that task suggestions provided by the electronic device, as described herein, are provided based on previous usage of the electronic device by a user. This in turn ensures that the user is provided with salient task suggestions that correspond to typical usage of the electronic device and, as a result, provided with suggestions that have a relatively high likelihood of accelerating user behavior. Thus, providing suggestions in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

At block 1320, the electronic device determines, based on the task probability and the parameter probability, whether the task satisfies suggestion criteria. In some examples, at the third stage (1230) of the model, the electronic device determines whether any of the identified tasks, given the context data and current context of the electronic device, satisfy a probabilistic threshold such that the electronic device should provide one or more of the tasks as a suggestion. In some examples, if more than one task satisfies the threshold, the electronic device selects only the highest scoring task. In some examples, tasks are scored using each of the probabilities of the first and second stages. In some examples, determining probabilities in this manner includes multiplying the probabilities. By way of example, the electronic device may multiply the probability for a task (i.e., as determined using the first stage of the model) with each of the probabilities for the task given respective parameters or combinations of parameters (i.e., as determined using the second stage of the model. In some examples, additional scoring adjustments are implemented to adjust probabilities. Such adjustments are based on a number of parameters (e.g., a higher number of parameters results in a higher score), parameter types (e.g., more discriminative parameters, such as a string, as opposed to a Boolean, result in a higher score), and parameter entropy over the course of event history as indicated by the context data (e.g., higher entropy (i.e., higher variation) results in a higher score). In some examples, different thresholds are used for display on different interfaces of the electronic device. If a first threshold is satisfied, the electronic device may display a suggestion on a search user interface (866), and if a second threshold is satisfied, the electronic device may additionally or alternatively display the suggestion on a locked screen interface (810).

At block 1325, in accordance with a determination that the task satisfies the suggestion criteria, the electronic device displays, on a display of the electronic device, a suggestion affordance corresponding to the task and the parameter. In some examples, if the probabilistic threshold is satisfied, the electronic device displays one or more suggestion affordances on the display. In some examples, suggestion affordances can be displayed in a number of interfaces—lock screen UI (810), search screen UI (866), and/or digital assistant UI (1604). In some examples, displaying the suggestion affordance corresponding to the task and the parameter includes, in accordance with a determination that the task satisfies a first set of suggestion criteria (e.g., first probabilistic threshold), displaying the suggestion affordance on a first user interface ((810), and in accordance with a determination that the task satisfies a second set of suggestion criteria (e.g., second probabilistic threshold), displaying the suggestion affordance on a second user interface different from the first user interface (866, 1604).

At block 1330, in accordance with a determination that the task does not satisfy the suggestion criteria, the electronic device forgoes displaying the suggestion affordance.

In some examples, the task probability is a first task probability, the task is a first task, the parameter probability is a first parameter, and the parameter is a first parameter. In some examples, the electronic device determines, based on the context data, a second task probability for a second task, determines, based on the context data, a parameter probability for a second parameter, the second parameter associated with the second task, and determines, based on the second task probability and the second parameter probability, whether the second task satisfies the suggestion criteria.

In some examples, the selection affordance is a first selection affordance and determining whether the task satisfies suggestion criteria includes determining whether heuristic criteria have been satisfied. In some examples, in accordance with a determination that the heuristic criteria has been satisfied, the electronic device displays a second selection affordance corresponding to another task. In some examples, suggestions may be overridden according to one or more heuristics. In some examples, each heuristic is a rule (e.g., scripted and/or hard-coded rule) indicating a set of conditions that, when satisfied, cause the electronic device to specifies a suggestion corresponding to the conditions. In some examples, each heuristic suggestion is considered to have a maximum probability (e.g., 100%) such that the heuristic is automatically considered as the best result, regardless of any other suggestions evaluated by the electronic device. In some examples, probabilities of heuristics decay if a user is presented with a suggestion for the heuristic and the user declines to perform a task associated with the suggestion. In some examples, heuristics are configured such that no two set of conditions can be simultaneously satisfied. In some examples, heuristics are suggestions of tasks that have not been performed by the electronic device and/or rely on context of the electronic device (e.g., text meeting organizer that user will be late based on traffic conditions).

In some examples, after displaying the suggestion affordance, the electronic device detects a first user input corresponding to a selection of the suggestion affordance, and in response to detecting the first user input, selectively performs the task. In some examples, the suggestion affordance (806) is selected using a touch input (816), a gesture, or a combination thereof. In some examples, the suggestion affordance is selected using a voice input. In some examples, in response to selection of the suggestion affordance, the electronic device automatically performs the task, the electronic device launches an application associated with the task, and/or a the electronic device displays user interface by which the user can confirm performance of the task. In some examples, selectively performing the task includes, in accordance with a determination that the task is a task of a first type, performing the task, and in accordance with a determination that the task is a task of a second type, displaying a confirmation interface (820) including a confirmation affordance (824).

The operations described above with reference to FIG. 13 are optionally implemented by components depicted in FIGS. 1-4, 6A-B, and 7A-C. For example, the operations of method 1900 may be implemented by any device (or component thereof) described herein, including but not limited to, devices 104, 200, 400, 600 and 1200. It would be clear to a person having ordinary skill in the art how other processes are implemented based on the components depicted in FIGS. 1-4, 6A-B, and 7A-C.

Figure 14:
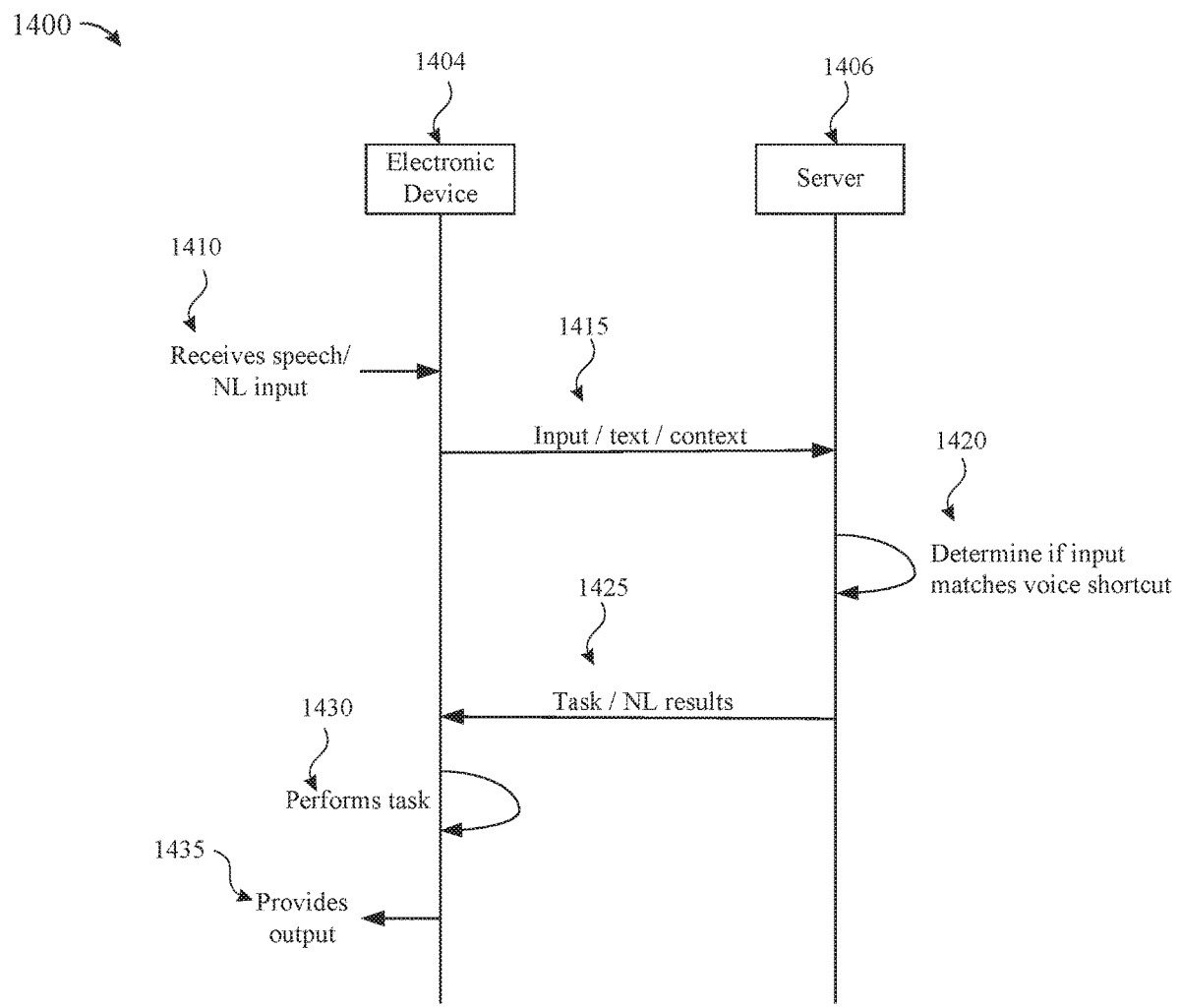
FIG. 14 illustrates an exemplary sequence of operations for performing a task in a privacy preserving manner, according to various examples.

FIG. 14 illustrates a sequence 1400 for performing a task, according to various examples. FIG. 14 is also used to illustrate one or more of the processes described below, including the method 1500 of FIG. 15. In some examples, one or more operations of the sequence 1400 are, optionally, combined, the order of operations is, optionally, changed, and/or some operations are, optionally, omitted. In some examples, additional operations may be performed in combination with the sequence 1400. Further, the use of "sequence" is not intended to require a particular order of interactions unless otherwise indicated.

As described herein, operations of the sequence 1400 can be performed using electronic device 1404 and server 1406. The electronic device 1404 may be any of devices 104, 200, 400, and 600 (FIGS. 1, 2A, 4, and 6A-B), and the server 1406 may be DA server 106 (FIG. 1). It will be appreciated that in some examples, operations of the sequence 1400 may be performed using one or more alternative or additional devices. By way of example, one or more operations of the sequence 1400 described as being performed by the electronic device 1404 may be performed using multiple electronic devices.

Generally, operations of the process 1400 may be implemented to perform a task, for instance, in response to a natural-language speech input. As described in further detail below, a natural-language speech input may be provided to an electronic device, and in particular to a digital assistant of an electronic device. In response, a determination is made as to whether the natural-language speech input includes a predetermined phrase (e.g., voice shortcut). The determination may be made by the electronic device and/or another device. If the natural-language speech input is determined to include a predetermined phrase, the electronic device performs a task associated with the predetermined phrase. If not, the natural-language speech input is processed using natural-language processing to determine a task associated with the natural-language speech input, and the electronic device performs the task determined using natural-language processing.

At operation 1410, the electronic device 1404 receives (e.g., via a microphone) a natural-language speech input. In some examples, the electronic device 1404 receives a natural-language speech input indicative of a request directed to the digital assistant of the electronic device 1404. The natural-language speech input may, for instance, include a voice trigger that may, for instance, activate the digital assistant. In some examples, the natural-language speech input can include any request that can be directed to the digital assistant. By way of example, the natural-language input "Get me directions to Starbucks," may request that the digital assistant of the electronic device 1404 provide driving directions from a location of the electronic device to a nearest Starbucks location.

In some examples, the natural-language speech input is received from another device, such as a device communicatively coupled to the electronic device (e.g., smart watch). In some examples, the natural-language speech input is provided over an ad-hoc connection between the electronic device and the other device. In other examples, the natural-language speech input is provided over a multi-hop network, such as the Internet.

In some examples, the natural-language speech input includes a predetermined phrase (e.g., voice shortcut), such as those described with reference to FIG. 10A-10AF. As described, a predetermined phrase may be associated with one or more tasks that, when provided to a digital assistant of the electronic device, cause the electronic device to perform one or more tasks associated with the phrase.

At operation 1415, the electronic device 1404 provides the natural-language speech input to the server 1406. In some examples, providing the natural-language speech input to the server 1406 includes providing a representation (e.g., text representation, spatial representation, audio representation) of the natural-language speech input to the server 1406. A text representation, for instance, may be provided using a speech-to-text processing module, such as the STT processing module 730 in some examples.

At operation 1420, the server 1406 receives the natural-language speech input from the electronic device 1404 and determines whether the natural-language speech input satisfies voice shortcut criteria. In some examples, determining whether the natural-language speech input satisfies voice shortcut criteria includes determining whether the natural-language speech input, or a text representation of the natural-language speech input, matches any of one or more predetermined phrases (e.g., voice shortcuts) associated with a user of the electronic device. In some examples, determining whether the natural-language speech input matches predetermined phrases includes determining whether the natural-language speech input exactly matches one or more predetermined phrases. In other examples, determining whether the natural-language speech input matches predetermined phrases includes determining whether a similarity between the natural-language speech input and each predetermined phrase exceeds a similarity threshold.

If the server 1406 determines that the natural-language speech input satisfies voice shortcut criteria (e.g., the server 1406 determines the natural-language speech input matches a predetermined phrase), the server 1406 identifies a task associated with the matching predetermined phrase. In some examples, identifying a task in this manner includes determining values for one or more parameters of the task. By way of example, for a phrase "Coffee Time" corresponding to a task for ordering a coffee, the server 1406 may determine a size of the coffee, a type of the coffee, and/or a manner of payment for the transaction. Parameter values may be specified by the user (e.g., upon associating the phrase with the task), determined based on context of the electronic device (e.g., a location of the electronic device) and/or assigned default parameter values.

If the server 1406 determines that the natural-language speech input does not satisfy voice shortcut criteria, the server 1406, optionally, processes the natural-language speech input (or a textual representation thereof) using a natural language processing module, such as the natural language processing module 732. In some examples, the electronic device 1404 provides an audio representation of the natural-language speech input, and processing the natural-language speech input using natural-language speech processing to determine a task includes providing one or more candidate text representations (e.g., text strings) of the natural-language speech input, for instance, using the STT processing module 730. Each of the candidate text representations may be associated with a speech recognition confidence score, and the candidate text representations may be ranked accordingly. In other examples, the electronic device 1404 provides a text representation of the natural-language speech input, and the text representation is provided as a candidate text representation, where n=1. Text representations provided as candidate text representations in this manner may be assigned a maximum speech recognition confidence score, or any other speech recognition confidence score.

Determining the task may further includes providing one or more candidate intents based on the n-best (e.g., highest ranked) candidate text representations, for instance, using the natural language processing module 732. Each of the candidate intents may be associated with an intent confidence score, and the candidate intents may be ranked accordingly. In some examples, multiple candidate intents are identified for each candidate text representation. Further, in some examples, a structured query (partial or complete) is generated for each candidate intent. Thereafter, candidate tasks are determined based on the m-best (e.g., highest ranked) candidate intents, for instance, using the task flow processing module 736. In some examples, the candidate tasks are identified based on the structured query for each of the m-best (e.g., highest ranked) candidate intents. By way of example, as described, the structured queries may be implemented according to one or more task flows, such as task flows 754, to determine tasks associated with the candidate intents. A joint score may be assigned to each candidate task, for instance, based on confidence scores and/or context of the electronic device, and the task with the highest score may be selected as the task.

At operation 1425, the electronic device 1404 receives a task from the server 1406. As described, the task may have been a task associated with one or more predetermined phrases of the user, or may have been identified using natural-language processing. In some examples, the electronic device further receives one or more parameter values to be used in performing the received task.

At operation 1430, the electronic device performs the task, and optionally, at operation 1435 provides an output (e.g., natural-language output) indicating whether the task was performed successfully. The output may be provided by the digital assistant of the electronic device in some examples.

In some examples, performing the task includes causing another device to perform the task. The electronic device may, for instance, determine that the task is better suited for performance on another device and/or determine that the task must be performed on another device (e.g., the electronic device does not have a display and cannot perform a task requiring display of an interface). Accordingly, the electronic device may provide the task to another device and/or cause the other device to perform the task.

In some examples, performing the task includes causing a third-party application to perform a task. By way of example, the voice shortcut "Close garage" may cause a third-party home automation application to close a garage door. In some examples, the third-party application provides a response indicating whether performance of the task was successful.

In some examples, the output provided by the digital assistant of the third-party device is based on a response provided by an application. By way of example, a response provided by an application may include a natural-language expression, such as "The garage door was successfully closed." The electronic device, and in particular the digital assistant of the electronic device, may receive the response and provide a natural-language output based on the natural-language expression of the response. The natural-language output may be an audio output in some examples. For instance, the electronic device may provide a natural-language output reciting "Home Automation says 'The garage door was successfully closed.'" Responses provided by applications in this manner may indicate whether tasks were successfully performed and/or provide other information to a user (e.g., current bus times in response to a request for a bus schedule).

In some examples, performing the task provided by the server 1406 includes performing multiple tasks. By way of example, performing a task may include causing a first application to perform a first task and causing a second application to perform a second task different from the first task.

While description is made herein with respect to the natural-language speech input being provided to the server 1406 (operation 1415), in some examples, the electronic device determines whether the natural-language speech input satisfies voice shortcut criteria in lieu of, or in parallel to, the server 1406.

Figure 15:
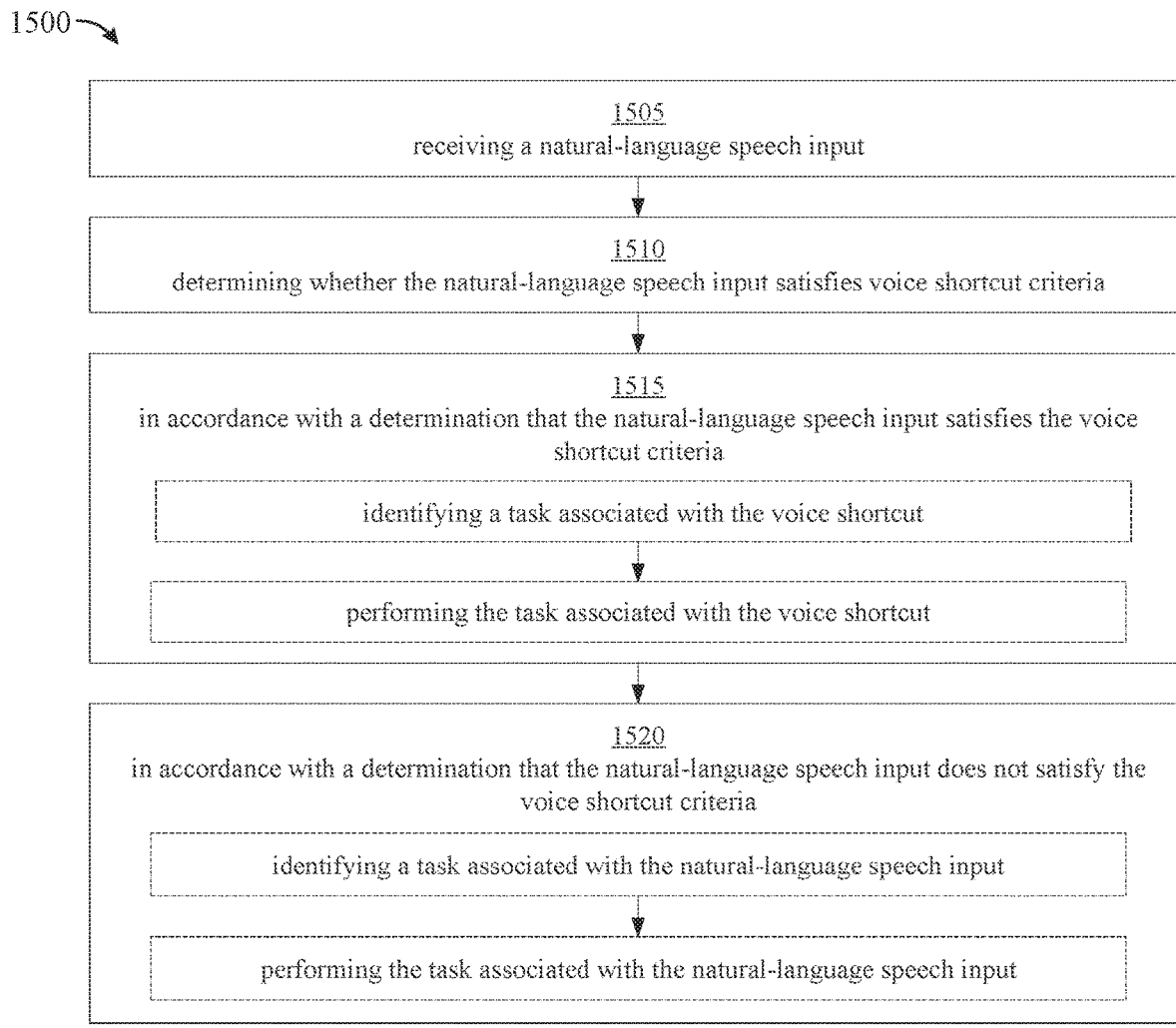
FIG. 15 is a flow diagram illustrating a method of performing tasks, according to various examples.

FIG. 15 illustrates method 1500 for performing a task, according to various examples. Method 1500 is performed, for example, using one or more electronic devices implementing a digital assistant. In some examples, method 1500 is performed using a client-server system (e.g., system 100), and the blocks of method 1500 are divided up in any manner between the server (e.g., DA server 106) and a client device. In other examples, the blocks of method 1500 are divided up between the server and multiple client devices (e.g., a mobile phone and a smart watch). Thus, while portions of method 1500 are described herein as being performed by particular devices of a client-server system, it will be appreciated that method 1500 is not so limited. In other examples, method 1500 is performed using only a client device (e.g., user device 104) or only multiple client devices. In method 1500, some blocks are, optionally, combined, the order of some blocks is, optionally, changed, and some blocks are, optionally, omitted. In some examples, additional steps may be performed in combination with the method 1500.

As described below, performing tasks in response to natural-language speech inputs (e.g., voice shortcuts), as described herein, provides an intuitive and efficient approach for performing tasks on the electronic device. By way of example, one or more tasks may be performed in response to a natural-language speech input without any additional input from the user. Accordingly, performing tasks in response to natural-language speech inputs in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

In some examples, the electronic device includes one or more of a keyboard, mouse, microphone, display, and touch-sensitive surface. In some examples, the display is a touch-sensitive display. In other examples, the display is not a touch-sensitive display.

At block 1505, the electronic device receives a natural-language speech input (e.g., spoken utterance, 1606) (1410). In some examples, receiving a natural-language speech input includes receiving a representation of the natural-language speech input from a second electronic device (e.g., smart watch). In some examples, receiving a representation of the natural-language speech input from a second electronic device includes receiving the representation of the natural-language speech input over a multi-hop network. In some examples, the representation is received from a remote device, for instance, over a WiFi connection and/or the Internet. In some examples, the natural-language speech input includes a voice trigger (e.g., "Hey Siri").

At block 1510, the electronic device determines whether the natural-language speech input satisfies voice shortcut criteria. In some examples, the electronic device determines whether the natural-language speech input matches one or more voice shortcuts associated with a user of the electronic device. In some examples, determining whether a match exists in this manner includes determining whether a match exists locally and/or remotely. For example, in some instances the electronic device determines whether a match exists. In another example, the electronic device provides the natural-language speech input, or a representation thereof, to a backend server (1406) (1415), and the backend server determines if a match exists (1420). In some examples, determining whether the natural-language speech input satisfies voice shortcut criteria includes providing a representation (e.g., textual representation, spatial representation, audio representation) of the natural-language speech input to another electronic device (e.g., backend server, such as a backend natural-language processing server) and receiving, from the another electronic device, at least one of a voice shortcut or a task (1425). In some examples, both the electronic device and the backend server determine if a match exists and the electronic device evaluates both results to determine if a match exists.

At block 1515, in accordance with a determination that the natural-language speech input satisfies the voice shortcut criteria (e.g., if the natural-language speech input matches a voice shortcut), the electronic device identifies a task associated with the voice shortcut and performs the task associated with the voice shortcut (e.g., either the electronic device or another device (e.g., backend server) determines a task associated with the voice shortcut) (1430). In some examples, performing the task associated with the voice shortcut includes causing a first application to perform a first task and causing a second application to perform a second task different than the first task. In some examples, if the electronic device determines that a match exists between the natural-language speech input and a voice shortcut, the electronic device identifies a task associated with the voice shortcut and performs the task. In some examples, a voice shortcut is associated with a plurality of tasks (e.g., a sequence of tasks) and the electronic device performs each of the plurality of tasks. In some examples, performing the task associated with the voice shortcut includes determining whether the task associated with the voice shortcut is a task of a first type; in accordance with a determination that the voice shortcut is a task of the first type, performing the task using the electronic device; and in accordance with a determination that the voice shortcut is a task of a second type different than the first type, causing the task to be performed using a third electronic device. In some examples, the electronic device determines whether the task is a task of a first type by determining whether the task may be performed by the electronic device or another device.

At block 1520, in accordance with a determination that the natural-language speech input does not satisfy the voice shortcut criteria (e.g., if the natural-language speech input does not match a voice shortcut), the electronic device identifies a task associated with the natural-language speech input and performs the task associated with the natural-language speech input (1430). In some examples, the electronic device performs natural-language processing to determine an intent and/or task. In some examples, a backend server performs natural-language processing and provides the task to the electronic device. In some examples, a task that is not a task of the first type is a task that is "better suited" for another device and/or cannot be performed by the electronic device. By way of example, a user may provide the voice shortcut "Play Game of Thrones" to the phone, and the phone, in turn, cause a TV to perform the task for the voice shortcut.

Performing natural-language processing on a natural-language speech input in the event that the speech input does not satisfy voice shortcut criteria ensures that commands provided to the electronic device by a user are handled even if the speech input does not correspond to a voice shortcut. In this manner, the electronic device may handle a broader range of commands and/or intents specified by a user. Accordingly, performing tasks in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

In some examples, the electronic device provides a natural-language output indicating whether the task was successful (1435) (1616, 1630, 1662, 1676). In some examples, performing the task includes causing a third-party application to perform the task and providing the providing the natural-language output includes receiving a response from a third-party application and generating the natural-language output based on the response received from the third-party. In some examples, when a task is performed using a third-party application, the third-party application provides a response indicating whether the task was successful. In some examples, the response explicitly indicates that the task was successfully performed or failed. In some examples, the response includes requested information (e.g., the task was to retrieve a bus schedule in response to a request for the same) (1688) and the return of the requested information implicitly indicates that the task was successful. In some examples, the natural-language output is an audio speech output. In some examples, the electronic device, and in particular, the digital assistant of the electronic device, generates a natural-language input based on the response of the application and provides the generated natural-language output to the user.

The operations described above with reference to FIG. 15 are optionally implemented by components depicted in FIGS. 1-4, 6A-B, and 7A-C. For example, the operations of method 1900 may be implemented by any device (or component thereof) described herein, including but not limited to, devices 104, 200, 400, 600 and 1400. It would be clear to a person having ordinary skill in the art how other processes are implemented based on the components depicted in FIGS. 1-4, 6A-B, and 7A-C.

Figure 16A:
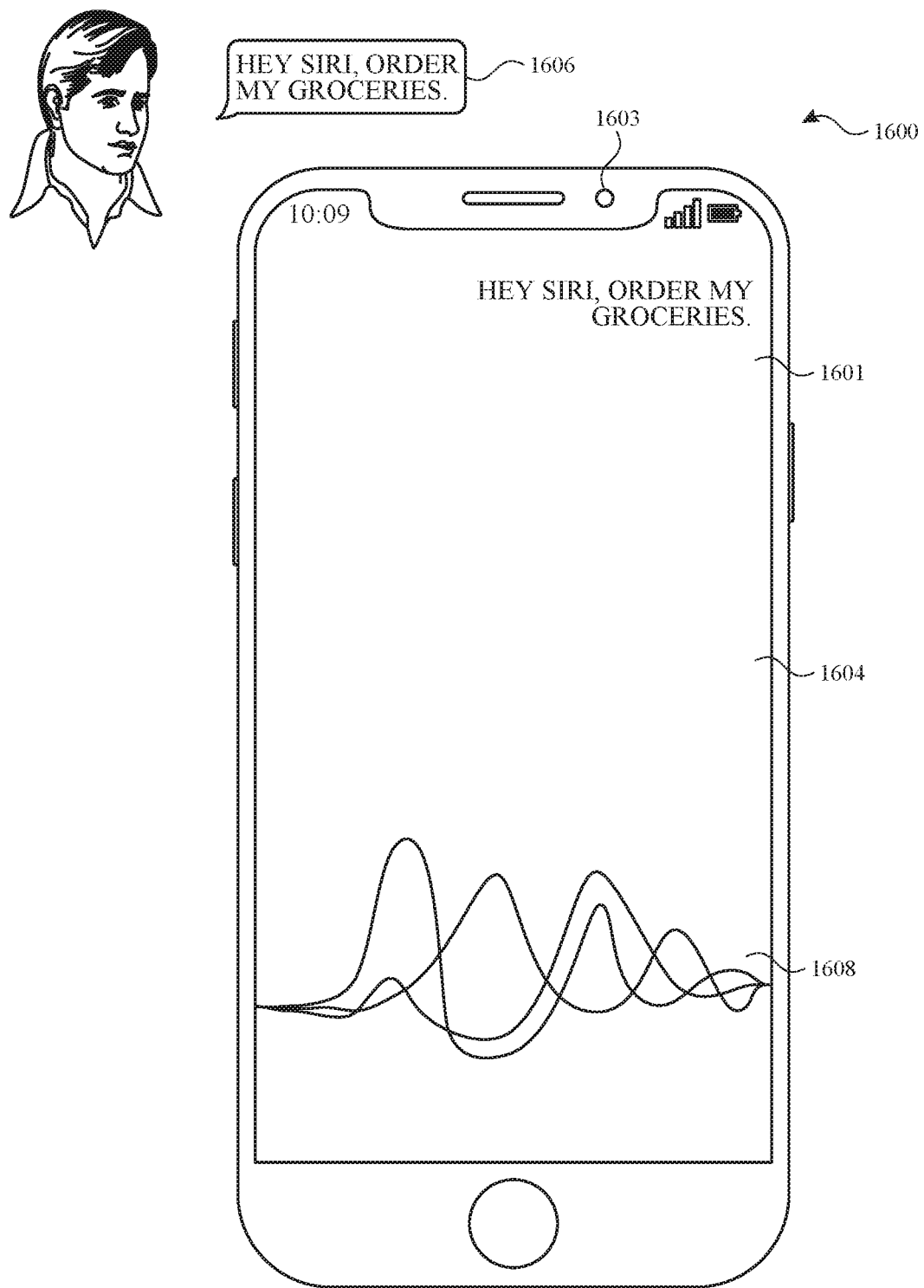
FIGS. 16A-16S illustrate exemplary user interfaces for performing a task using a digital assistant, according to various examples.
Figure 16B:
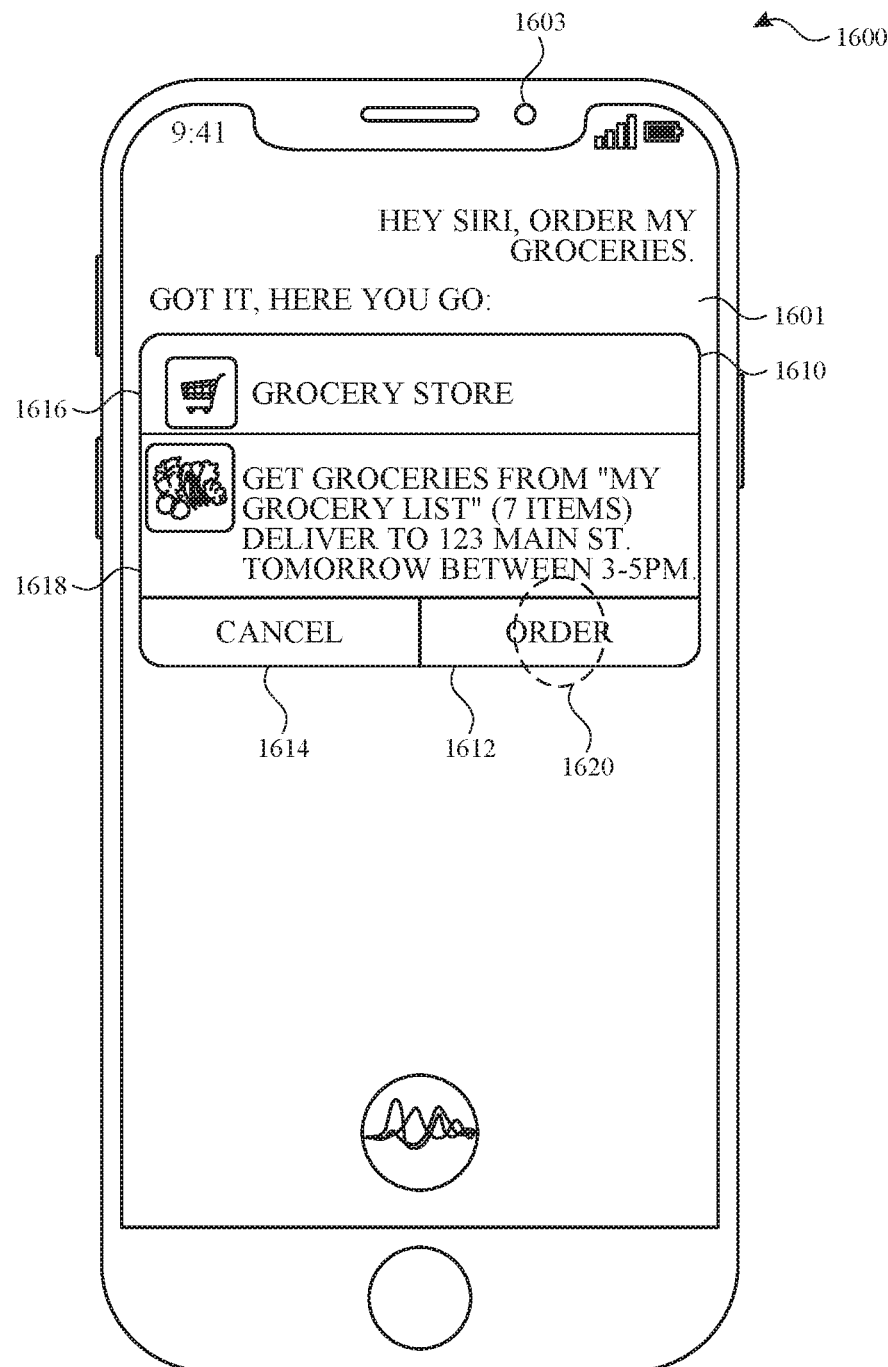
Figure 16C:
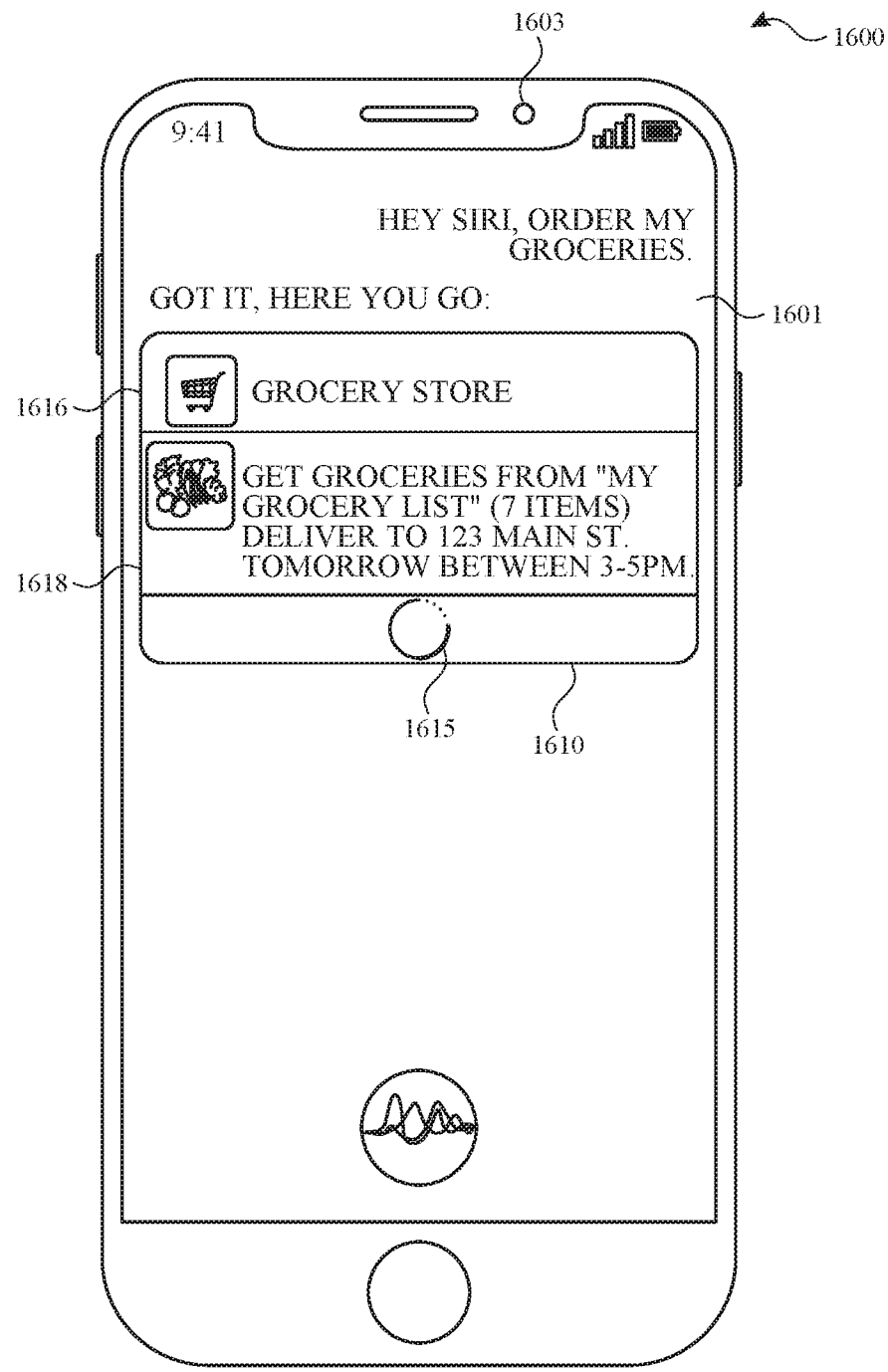
Figure 16D:
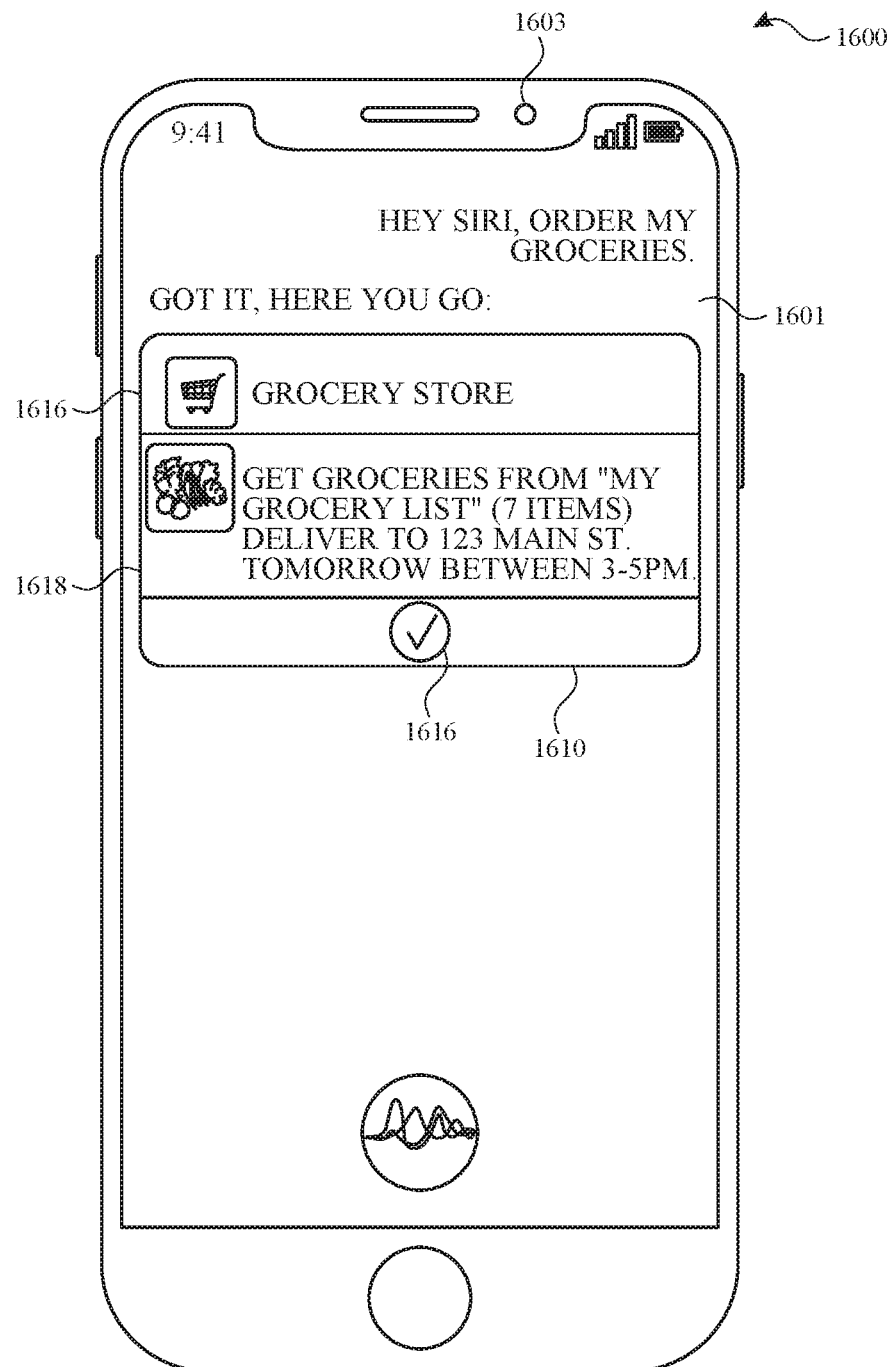
Figure 16E:
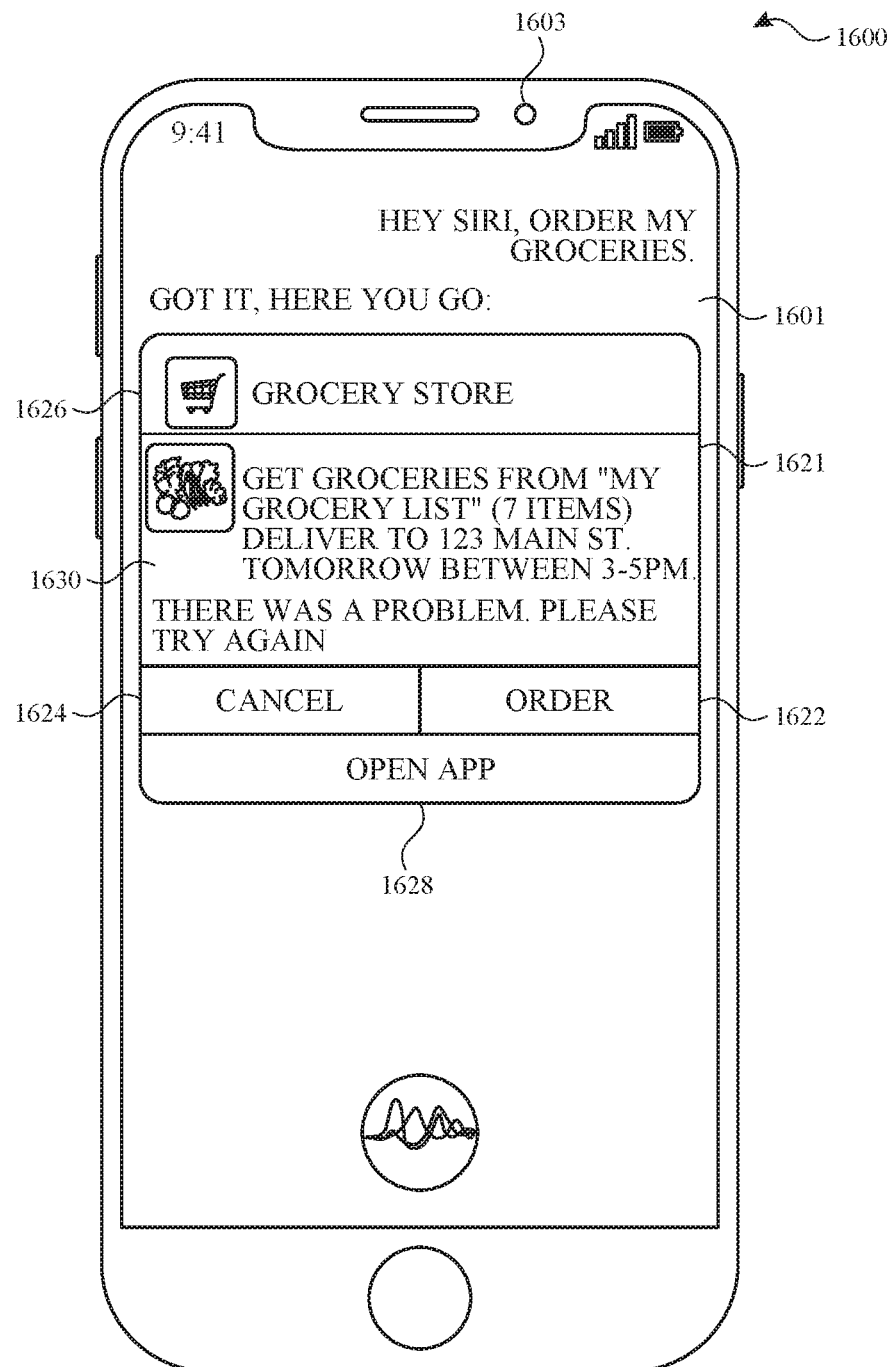
Figure 16F:
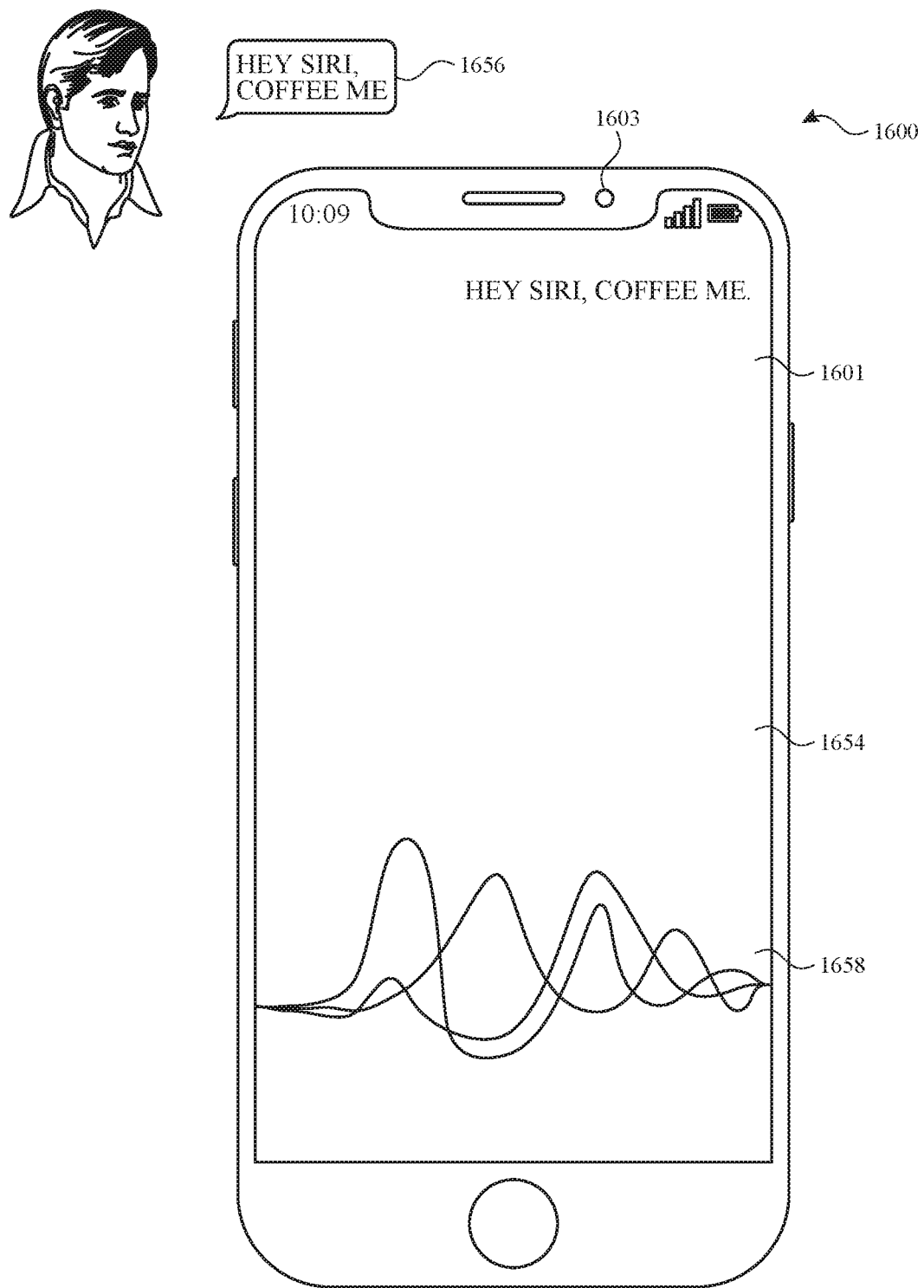
Figure 16G:
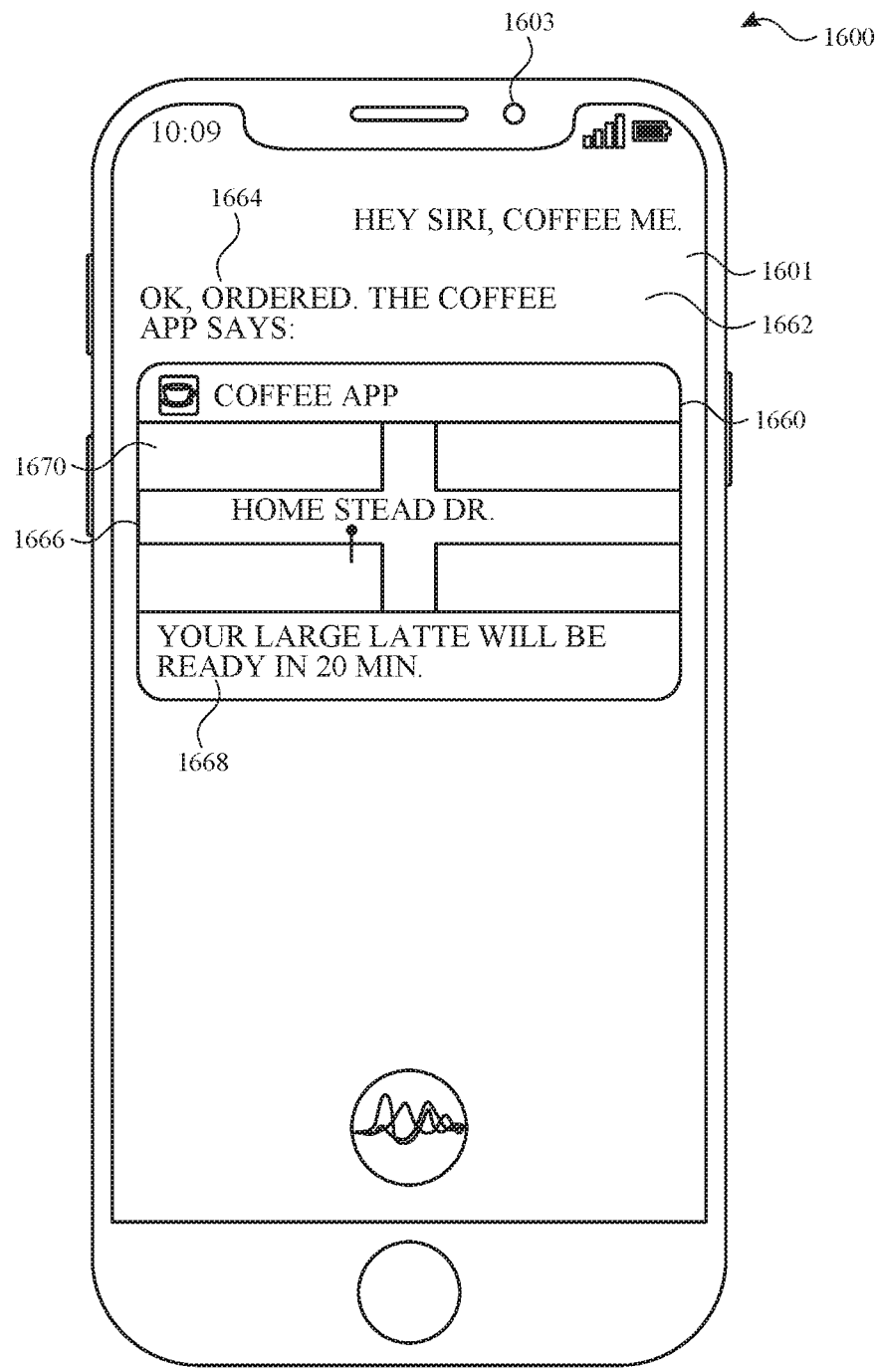
Figure 16H:
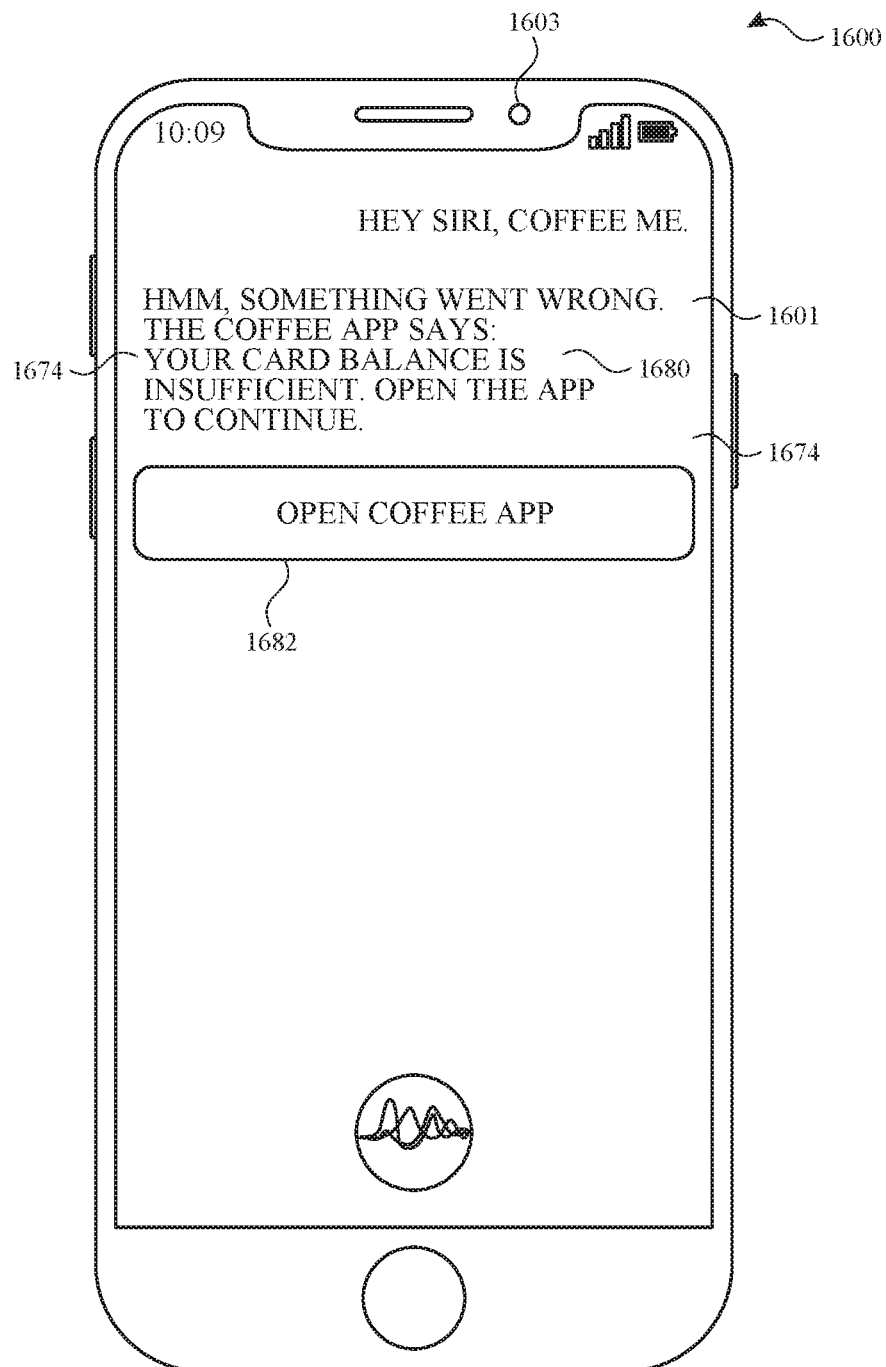
Figure 16I:
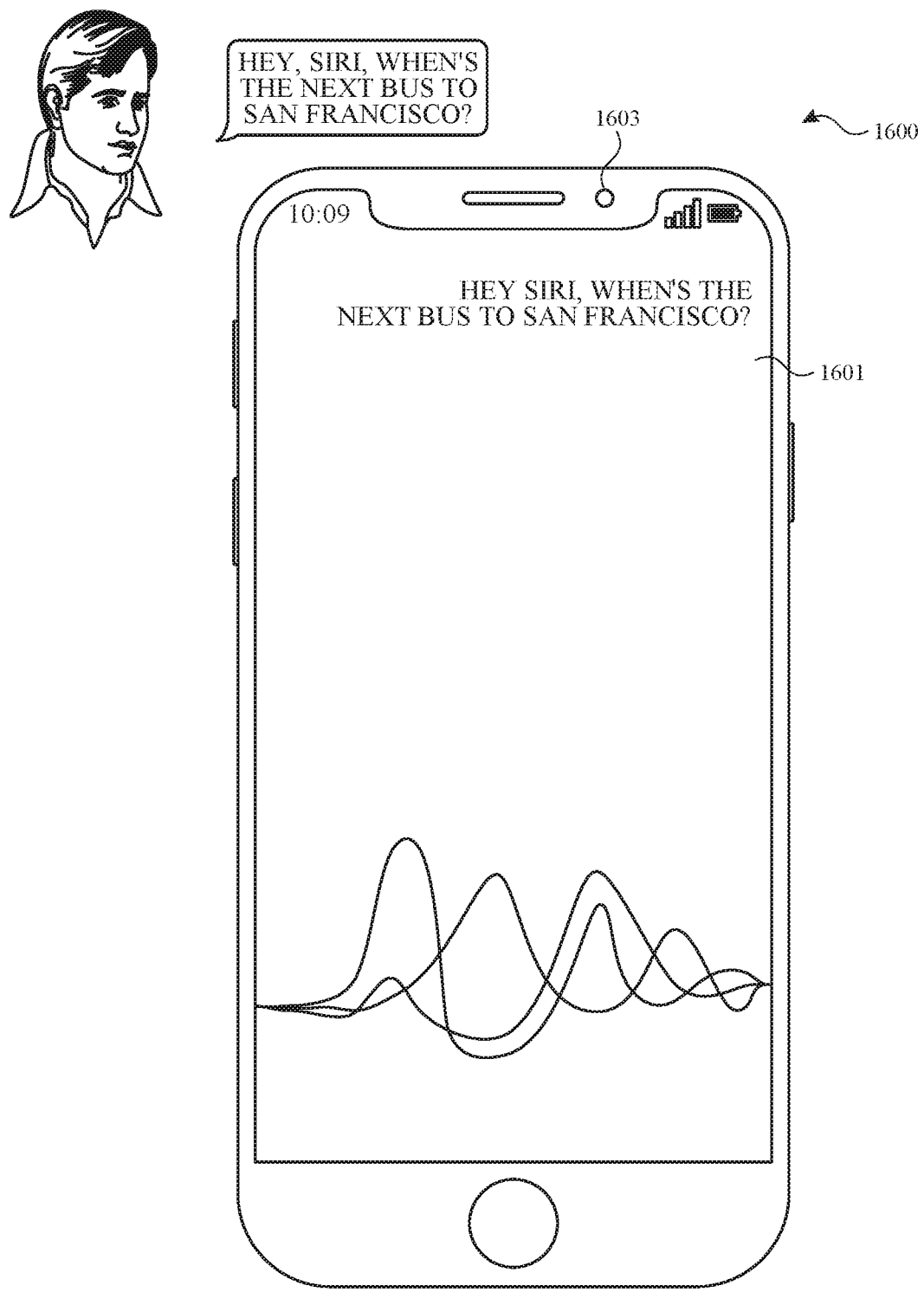
Figure 16J:
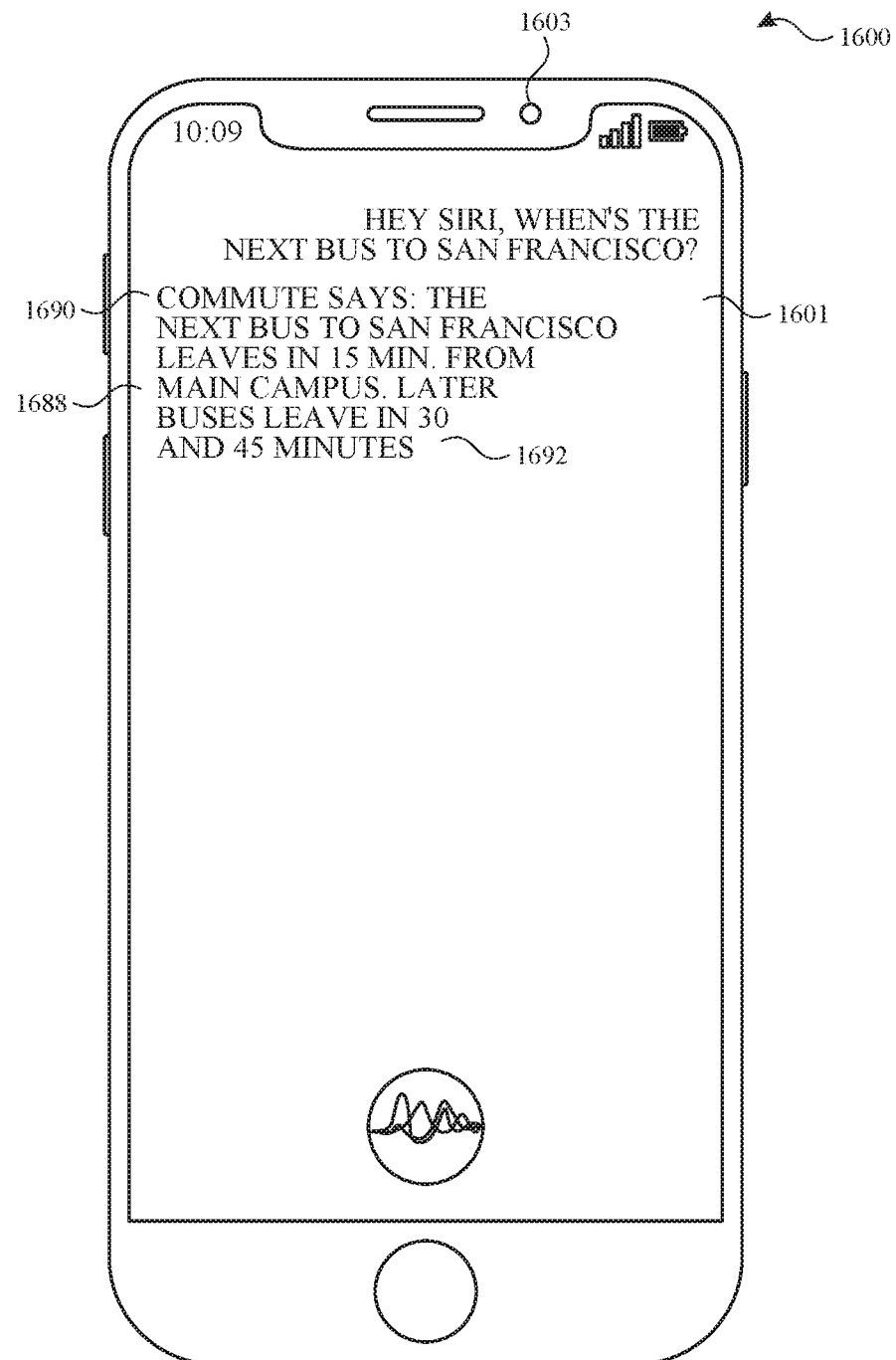
Figure 16K:
Figure 16L:
Figure 16Q:
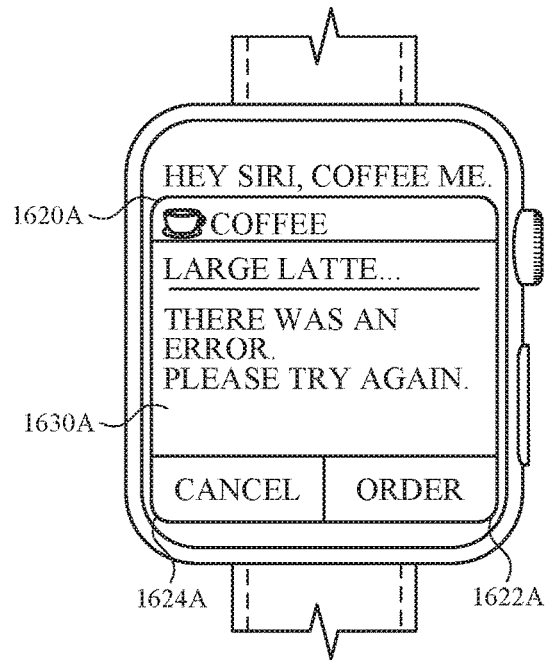
Figure 16R:
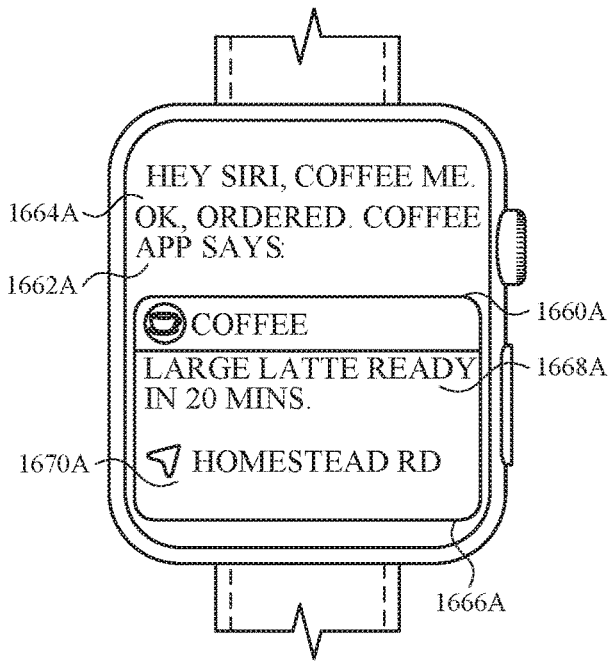
Figure 16S:
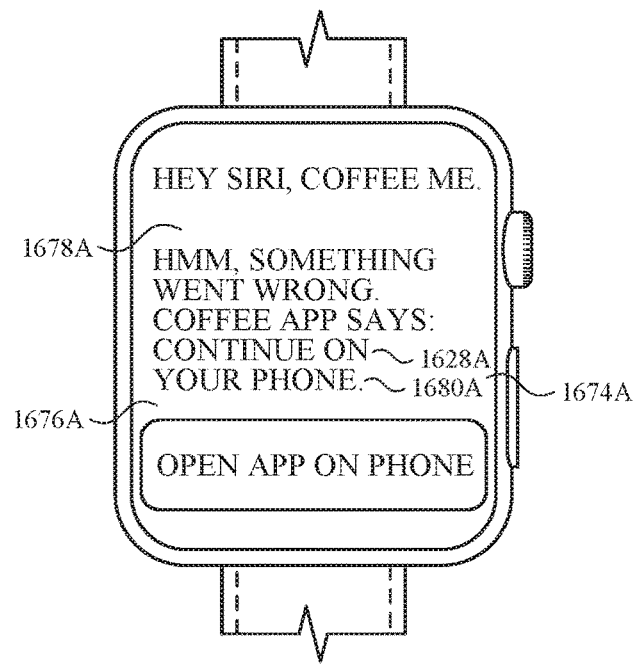

FIGS. 16A-16S illustrate exemplary user interfaces for performing a task on an electronic device (e.g., device 104, device 122, device 200, device 600, or device 700), in accordance with some embodiments. The user interfaces in these figures are used to illustrate the processes described below, including the processes in FIG. 17.

FIG. 16A illustrates an electronic device 1600 (e.g., device 104, device 122, device 200, device 600, or device 700). In the non-limiting exemplary embodiment illustrated in FIGS. 16A-16S, electronic device 1600 is a smartphone. In other embodiments, electronic device 1600 can be a different type of electronic device, such as a wearable device (e.g., a smartwatch). In some examples, electronic device 1600 has a display 1601, one or more input devices (e.g., touchscreen of display 1601, a button, a microphone), and a wireless communication radio. In some examples, the electronic device 1600 includes a plurality of cameras. In some examples, the electronic device includes only one camera. In some examples, the electronic device includes one or more biometric sensors (e.g., biometric sensor 1603) which, optionally, include a camera, such as an infrared camera, a thermographic camera, or a combination thereof.

In FIG. 16A, the electronic device 1600 displays, on display 1601, a digital assistant interface (e.g., conversational interface), such as the digital assistant interface 1604. While displaying the digital assistant interface 1604, the electronic device 1600 receives (e.g., obtains, captures) a natural-language input 1606 (e.g., "Hey Siri, order my groceries."). In some examples, the natural-language input 1606 is a natural-language speech input received, for instance, using an input device of the electronic device (e.g., microphone). As shown in FIG. 16A, in some examples in which the natural-language input 1606 is a natural-language speech input, the digital assistant interface optionally includes a preview 1608 (e.g., live preview) of the natural-language input 1606.

In some examples, in response to the natural-language input, the electronic device 1600 performs a task. By way of example, as described with reference to FIG. 14, the electronic device 1600 may determine whether the natural-language input matches a predetermined phrase, and if so, perform a task corresponding to the phrase. If the task does not corresponding to the phrase, natural-language processing may be used to determine a task associated with the natural-language input, and the electronic device 1600 may perform the task.

In some examples, prior to performing the task, the electronic device requests confirmation of the task from a user. For instance, as illustrated in FIG. 16B, once the electronic device 1600 identifies a task corresponding to the natural-language input, the electronic device 1600 can display a confirmation interface, such as the confirmation interface 1610. The confirmation interface 1610 includes a confirmation affordance 1612, a cancel affordance 1614, and an application affordance 1616. The confirmation interface further may include content 1618 associated with the task. In some examples, selection of the cancel affordance 1614 causes the electronic device 1600 to cease display of the confirmation interface 1610 and/or forgo performing the identified task. In some examples, selection of the application affordance 1616 causes the electronic device 1600 to open an application associated with the task. As described, opening the application in this manner may cause the application to be preloaded with one or more parameters associated with the task. Content 1618 may include information directed to the task, such as one or more parameters to be used to perform the task. As illustrated in FIG. 16B, for instance, content 1618 may specify that the task is directed to ordering a set of grocery items included in the group "My Grocery List", the number of items to be ordered, a delivery address, and a time window in which the delivery is to be made. Optionally, confirmation interface 1610 includes an icon (e.g., image, GIF) associated with the application of the task to help a user more readily identify the application performing the task.

In some examples, in response to selection of the confirmation affordance 1612, for instance by user input 1620, the electronic device 1600 performs the task. As illustrated in FIG. 16C, in some examples, while the electronic device is performing the task, the electronic device 1600, optionally, displays a progress indicator 1615, indicating that the task is being performed. In some examples, display of the progress indicator 1615 replaces display of the confirmation affordance 1612 and the cancel affordance 1614.

Once task has been performed, the electronic device 1600 provides an output indicating whether the task was performed successfully. In the example of FIG. 16D, the task is performed successfully, and as a result, the electronic device 1600 displays a success indicator 1617, indicating that the task was successfully performed. In some examples, display of the success indicator 1617 replaces display of the progress indicator 1615.

In the example of FIG. 16E, the task is not performed successfully, and as a result, the electronic device displays failure interface 1621. The failure interface 1621 includes a retry affordance 1622, a cancel affordance 1624, and application affordances 1626, 1628. The failure interface further includes content 1630. In some examples, selection of the retry affordance 1622 causes the electronic device 1600 to perform the task again. In some examples, selection of the cancel affordance causes the electronic device 1600 to cease display of the failure interface 1620. In some examples, selection of either the application affordance 1626 or application affordance 1628 causes the electronic device 1600 to open an application associated with the task. As described, opening the application in this manner may cause the application to be preloaded with one or more parameters associated with the task. Content 1630 may include information directed to the task, such as one or more parameters used to perform the task. In some examples, content 1630 is the same content as content 1618. In some examples, content 1630 is different than content 1618. Content 1630 may, for example, indicate that the electronic device failed to perform the task successfully (e.g., "There was a problem. Please try again.").

In some examples, performing a task may include causing an application to perform the task, and optionally, receive a response from the application indicating whether the task was performed successfully. In some examples, as illustrated in FIGS. 16F-16L below, the response provided by an application includes a natural-language expression that may in turn be used by the electronic device 1600 to indicate whether a task was successfully performed and/or provide additional information, from the application, to a user.

With reference to FIG. 16F, the electronic device 1600 displays, on display 1601, a digital assistant interface (e.g., conversational interface), such as the digital assistant interface 1654. While displaying the digital assistant interface 1654, the electronic device 1600 receives (e.g., obtains, captures) a natural-language input 1656 (e.g., "Hey Siri, coffee me."). In some examples, the natural-language input is a natural-language speech input received, for instance, using an input device of the electronic device (e.g., microphone). As shown in FIG. 16F, in some examples in which the natural-language input is a natural-language speech input, the digital assistant interface optionally includes a preview 1658 (e.g., live preview) of the natural-language input.

In response to the natural-language input 1656, the electronic device 1600 performs a task, as described (recall that the electronic device may confirm performance of the task with a user in some examples). For instance, if the natural-language input corresponds to (e.g., includes) a predetermined phrase, the electronic device 1600 can perform a task associated with the phrase, or if the natural-language input does not correspond to a predetermined phrase, the electronic device 1600 can perform a task associated with the natural-language input as determined by natural-language processing.

In some examples, once the task has been performed, the electronic device 1600 receives a response from an application used to perform the task and, based on the response, provides an output indicating whether the task was performed successfully. In the example of FIG. 16G, the task is performed successfully. Accordingly, the electronic device 1600 displays success interface 1660. Success interface 1660 includes output 1662, which in turn includes digital assistant response 1664 and application response 1666, and application affordance 1670. In some examples, application response 1666 is at least a portion of a response provided by the application following performance of the task. In some examples, application response 1666 includes content and/or one or more natural-language expressions. As illustrated in FIG. 16G, for instance, application response 1666 includes natural-language expression 1668 (e.g., "Your latte will be ready in 20 min.") indicating that the task was performed successfully and/or providing information related to the task. Content of application response, such as content 1670, may include any type of content, such as images, videos, and/or interactive content (e.g., an interactive map). In this manner, an application may specify additional information related to the task. In some examples, digital assistant response 1664 indicates whether a task was performed successfully (e.g., "OK ordered."). In some examples, the digital assistant response 1664 may, for instance, be used to clarify for a user that the application response 1666 includes information provided by the application (e.g., "The Coffee App says"). In some examples, selection of the content 1670 causes the electronic device 1600 to open the application associated with the task. As described, opening the application in this manner may cause the application to be preloaded with one or more parameters associated with the task.

In the example of FIG. 16H, the task is not performed successfully (e.g., the electronic device 1600 failed to perform the task). Accordingly, the electronic device displays failure interface 1674. Failure interface 1674 includes output 1676, which in turn includes digital assistant response 1678 and application response 1680, and application affordance 1682. In some examples, application response 1680 is at least a portion of a response provided by the application following performance of the task. In some examples, application response 1680 includes content and/or one or more natural-language expressions. As illustrated in FIG. 16H, for instance, application response 1680 includes natural-language expression 1682 (e.g., "Your card balance is insufficient. Open the app to continue.") indicating that the task was not performed successfully and/or further providing additional information related to the task. In some examples, digital assistant response 1664 indicates whether a task was performed successfully (e.g., "Something went wrong."). In some examples, the digital assistant response 1664 may, for instance, be used to clarify for a user that the application response 1666 includes information provided by the application (e.g., "The Coffee App says"). In some examples, selection of application affordance 1682 causes the electronic device 1600 to open the application associated with the task. As described, opening the application in this manner may cause the application to be preloaded with one or more parameters associated with the task.

In some examples, providing responses received from applications in this manner allows a digital assistant to provide communication between an application and a user without requiring the user to open the application. For instance, in some examples, a user may request information from an electronic device that the user may otherwise have to open an application to retrieve.

With reference to FIG. 16I for example, a user may provide a natural-language input to the electronic device 1600 requesting information pertaining to a bus schedule. In turn, the electronic device 1600 may cause an application corresponding to the task to retrieve the information and return the information in a response, as illustrated in FIG. 16J. As described, the output provided by the electronic device 1600 (e.g., output 1688) may include a digital assistant response and an application response, such as the digital assistant response 1690 and application response 1692.

In some examples, a user may exit from a digital assistant interface prior to a time at which the electronic device 1600 provides an output corresponding to a task. Accordingly, in some examples, outputs provided by the electronic device 1600 may be displayed on a lock screen interface. With reference to FIGS. 16K-L, the electronic device 1600 may display outputs corresponding to tasks on a lock screen interface when the electronic device 1600 is either in a locked state (FIG. 16K) or an unlocked state (FIG. 16L), respectively. As described, the electronic device 1600 may forgo displaying content when the electronic device 1600 is in the locked state.

In some examples, the manner in which an electronic device displays interfaces, as described herein, depends on a type of the electronic device. In some examples, for instance, electronic device 1600 may be implemented as a device with a relatively small display such that interfaces, such as digital assistant interface 1604 or digital assistant interface 1654, may not be practical for display. Accordingly, in some examples, electronic device 1600 may display alternative interfaces to those previously described.

With reference to FIG. 16M, for instance, the electronic device 1600 displays, on display 1601, a digital assistant interface (e.g., conversational interface), such as the digital assistant interface 1604A. While displaying the digital assistant interface 1604A, the electronic device 1600 receives (e.g., obtains, captures) a natural-language input 1606A (e.g., "Hey Siri, coffee me."). In some examples, the natural-language input 1606A is a natural-language speech input received, for instance, using an input device of the electronic device (e.g., microphone). As shown in FIG. 16M, in some examples in which the natural-language input 1608A is a natural-language speech input, the digital assistant interface optionally includes a preview 1608A (e.g., live preview) of the natural-language input 1606A.

In FIG. 16N, in response to the natural-language input 1606A, the electronic device 1600 displays a confirmation interface 1610A requesting confirmation of a task associated with the natural-language input 1606A. The confirmation interface 1610A includes a confirmation affordance 1612A and a cancel affordance 1614A. The confirmation interface further may include content 1618A associated with the task. In some examples, selection of the cancel affordance 1614A causes the electronic device 1600 to cease display of the confirmation interface 1610A and/or forgo performing the identified task (recall that in some examples performing a task may include causing another device to perform the task). Content 1618A may include information directed to the task, such as one or more parameters to be used to perform the task. As illustrated in FIG. 16B, for instance, content 1618A may specify that the task is directed to ordering a large latte coffee from a place of business located on Homestead Rd.

In some examples, in response to selection of the confirmation affordance 1612A, for instance by user input 1620A, the electronic device 1600 performs the task. As illustrated in FIG. 16O, in some examples, while the electronic device 1600 is performing the task, the electronic device 1600 displays a progress indicator 1614A, indicating that the task is being performed. In some examples, display of the progress indicator 1615A replaces display of the confirmation affordance 1612A and the cancel affordance 1614A.

Once task has been performed, the electronic device 1600 provides an output indicating whether the task was performed successfully. In the example of FIG. 16P, the task is performed successfully, and as a result, the electronic device 1600 displays a success indicator 1616A, indicating that the task was successfully performed. In some examples, display of the success indicator 1616A replaces display of the progress indicator 1615A.

In the example of FIG. 16Q, the task is not performed successfully, and as a result, the electronic device displays failure interface 1620A. The failure interface 1620A includes a retry affordance 1622 and a cancel affordance 1624A. The failure interface further includes content 1630A. In some examples, selection of the retry affordance 1622A causes the electronic device 1600 to perform the task again. In some examples, selection of the cancel affordance 1624A causes the electronic device 1600 to cease display of the failure interface 1620A. Content 1630A may include information directed to the task, such as one or more parameters used to perform the task. In some examples, content 1630A is the same content as content 1618A. In some examples, content 1630A is different than content 1618A. Content 1630A may, for example, indicate that the electronic device failed to perform the task successfully (e.g., "There was an error. Please try again.").

In the example depicted in FIG. 16R, the electronic device 1600 receives a natural-language input (e.g., "Hey Siri, coffee me."), successfully performs a task corresponding to the natural-language input, and, in response, displays success interface 1660A. Success interface 1660A includes output 1662A, which in turn includes digital assistant response 1664A and application response 1666A. In some examples, application response 1666A is at least a portion of a response provided by the application following performance of the task. In some examples, application response 1666A includes content and/or one or more natural-language expressions. As illustrated in FIG. 16R, for instance, application response 1666A includes natural-language expression 1668A (e.g., "Large latte ready in 20 min.") indicating that the task was performed successfully and/or providing additional information related to the task. Content of the application response, such as content 1670A, may include any type of content, such as images, videos, and/or interactive content (e.g., an interactive map). In this manner, an application may further specify additional information related to a task. In some examples, digital assistant response 1664A indicates whether a task was performed successfully (e.g., "OK ordered."). In some examples, the digital assistant response 1664A may, for instance, be used to clarify for a user that the application response 1666A includes information provided by the application (e.g., "The Coffee App says").

In the example of FIG. 16S, a task is not performed successfully (e.g., the electronic device 1600 failed to perform the task). Accordingly, the electronic device displays failure interface 1674A. Failure interface 1674A includes output 1676A, which in turn includes digital assistant response 1678A and application response 1680A. In some examples, application response 1680A is at least a portion of a response provided by the application following performance of the task. In some examples, application response 1680A includes content and/or one or more natural-language expressions. As illustrated in FIG. 16S, for instance, application response 1680A includes natural-language expression 1682A (e.g., "Continue on your phone.") indicating that the task was not performed successfully and/or further providing additional information related to the task (e.g., that the current device is not capable of opening the application that performed the task). In some examples, digital assistant response 1664A indicates whether a task was performed successfully (e.g., "Hmm, something went wrong."). In some examples, the digital assistant response 1664A may, for instance, be used to clarify that the application response 1666A includes information provided by the application (e.g., "The Coffee App says").

Figure 17:
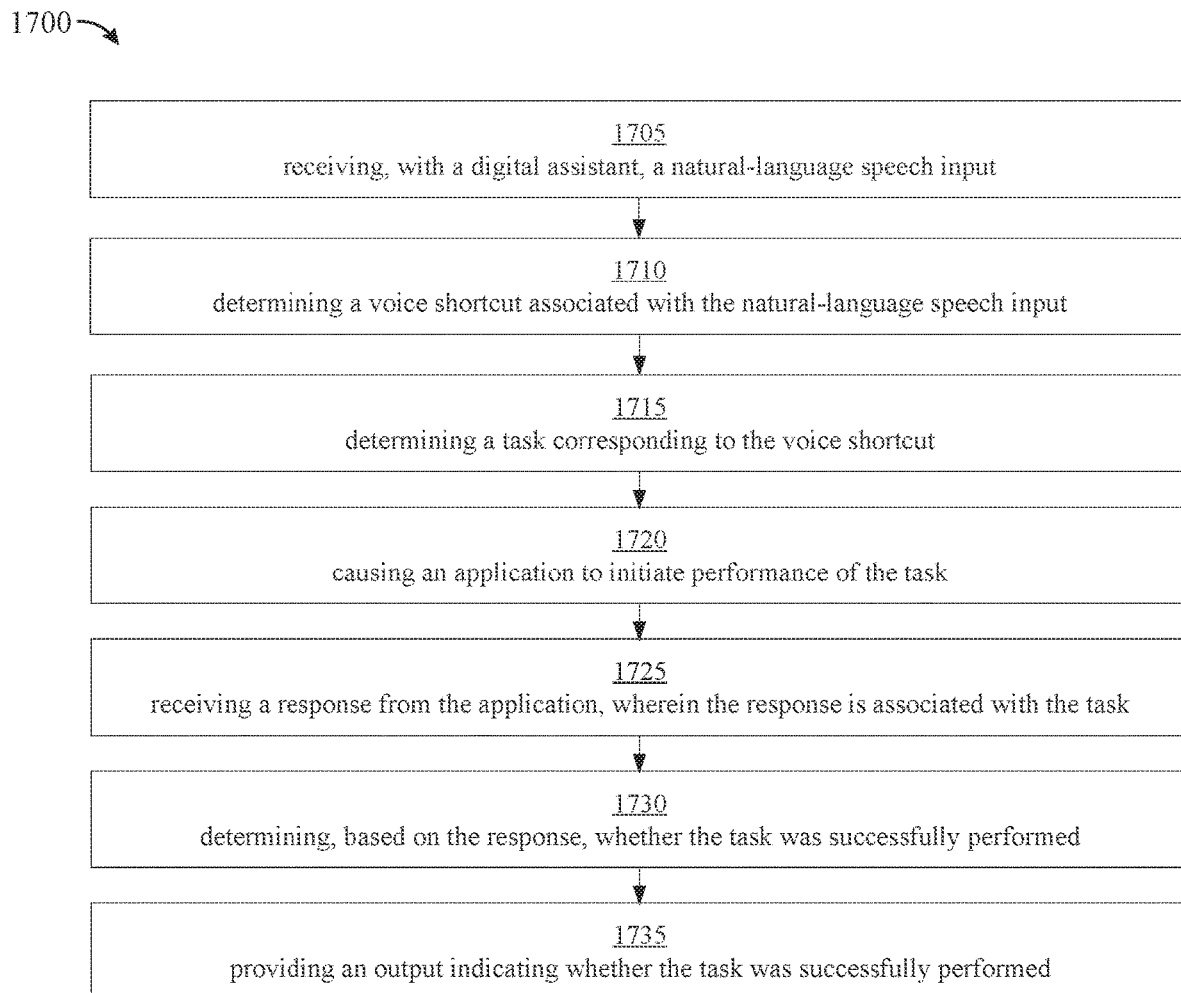
FIG. 17 is a flow diagram illustrating a method of performing a task using a digital assistant, according to various examples.

FIG. 17 illustrates method 1700 for performing a task using a digital assistant, according to various examples. Method 1700 is performed, for example, using one or more electronic devices implementing the digital assistant. In some examples, method 1700 is performed using a client-server system (e.g., system 100), and the blocks of method 1700 are divided up in any manner between the server (e.g., DA server 106) and a client device. In other examples, the blocks of method 1700 are divided up between the server and multiple client devices (e.g., a mobile phone and a smart watch). Thus, while portions of method 1700 are described herein as being performed by particular devices of a client-server system, it will be appreciated that method 1700 is not so limited. In other examples, method 1700 is performed using only a client device (e.g., user device 104) or only multiple client devices. In method 1700, some blocks are, optionally, combined, the order of some blocks is, optionally, changed, and some blocks are, optionally, omitted. In some examples, additional steps may be performed in combination with the method 1700.

Performing tasks and providing responses from applications as described herein, allows the digital assistant perform tasks and provide task feedback to a user without a need for an application to be opened. Accordingly, a user can interact with an application without opening or otherwise directly accessing the application. As a result, the number of inputs and amount of time needed for the user to operate the electronic device are reduced (e.g., by helping the user to provide proper inputs and reducing user mistakes when operating/interacting with the device), which, additionally, reduces power usage and improves battery life of the device.

In some examples, the electronic device includes one or more of a keyboard, mouse, microphone, display, and touch-sensitive surface. In some examples, the display is a touch-sensitive display. In other examples, the display is not a touch-sensitive display.

At block 1705, the electronic device receives, with a digital assistant, a natural-language speech input (e.g., spoken utterance) (1606).

At block 1710, the electronic device determines a voice shortcut associated with the natural-language speech input.

At block 1715, the electronic device determines a task corresponding to the voice shortcut. In some examples, the task is a request for information from a third-party service. In some examples, the electronic device determines that the natural-language speech input is associated with a voice shortcut and determines a task associated with the voice shortcut.

At block 1720, the electronic device causes an application (e.g., first-party application, third-party application) to initiate performance of the task. In some examples, causing an application (e.g., first-party application, third-party application) to initiate performance of the task includes displaying a task performance animation. In some examples, the task performance animation includes rotating a circle object (1615) to indicate performance of the task is occurring. In some examples, causing an application (e.g., first-party application, third-party application) to initiate performance of the task includes prompting the user to confirm performance of the task. In some examples, once a task has been determined, the electronic device displays a confirmation interface (1610, 1610A) requesting that the user confirm performance of the task. In some examples, the confirmation interface includes an affordance (1612, 1612A) by which the user can confirm and, optionally, further includes a cancel affordance (1614, 1614A) by which the user can cause the electronic device to cease display of the confirmation interface and forgo performing the task.

At block 1725, the electronic device receives a response from the application, wherein the response is associated with the task. In some examples, when a task is performed using an application, such as a third-party application, the application provides a response (1666, 1680, 1692) indicating whether the task was successful. In some examples, the response explicitly indicates that the task was successfully performed or failed. In some examples, the response includes requested information (e.g., the task was to retrieve a bus schedule in response to a request for the same) and the return of the requested information implicitly indicates that the task was successful.

In some examples, after receiving the response, the electronic device displays an application user interface (1660) associated with the application. In some examples, after causing an application to perform a task, the electronic device displays information associated with the application, and optionally, the task. By way of example, for a task of retrieving directions to a particular location, the electronic device displays a map that, when selected, causes execution of the relevant map application. In some examples, one or more aspects of the user interface is specified by the application. In some examples, the user interface is a string, graphic, animation, or a combination thereof. In some examples, an application, such as a third-party application, provides content for display in the application user interface (e.g., a graphic reciting "Thank you" in response to a successful transaction). In some examples, the application user interface includes the output indicating whether the task was successfully performed. In some examples, the application user interface is displayed concurrently with the output.

At block 1730, the electronic device determines, based on the response, whether the task was successfully performed.

At block 1735, the electronic device provides an output indicating whether the task was successfully performed. In some examples, providing an output indicating whether the task was successfully performed includes, in accordance with a determination that the task was performed successfully, displaying an indication that the task was performed successfully and, in accordance with a determination that the task was not performed successfully, displaying an indication that the task was not performed successfully. In some examples, the electronic device displays a symbol (e.g., checkmark for success, "X" for failure) indicating whether the task was successfully performed. In some examples, the electronic device displays a checkmark (1616) to indicate that the task was performed successfully. In some examples, the electronic device displays an "X" indicating that the task failed. In some examples, the electronic device displays a message indicating that the task failed (e.g., "There was a problem. Please try again."). In some examples, the electronic device generates a natural-language output based on the response and provides (e.g., outputs, displays), with the digital assistant, the natural-language output. In some examples, further in accordance with a determination that the task was not performed successfully, the electronic device displays a failure user interface (1620).

In some examples, providing an output includes generating a natural-language output (1662, 1676) based on the response and providing, with the digital assistant, the natural-language output. In some examples, providing (e.g., outputting, displaying) the natural-language output includes providing an audio speech output. In some examples, providing the natural-language output includes displaying the natural-language output. In some examples, the natural-language output includes a reference to the application. In some examples, the natural-language output includes a name or nickname of an application. In some examples, the response includes a natural-language expression and the natural-language output includes the third-party natural language expression (e.g., 1666, "Okay, ordered. Starbucks says 'Your order will be ready in 5 minutes). In some examples, the response includes a natural-language expression (1668, 1682) and the natural-language output includes at least a portion of the natural-language expression. In some examples, the natural-language output indicates that the task was not performed successfully by the application (e.g., "Something went wrong. Starbucks says 'You have insufficient funds.'"). In some examples, the natural-language output indicates that the task was performed successfully by the application.

Providing outputs, as described herein, allows the digital assistant to provide feedback and/or other information from an application, for instance during the course of a dialog (e.g., conversational dialog) between a user and the digital assistant, in an intuitive and flexible manner. By way of example, the digital assistant may provide (e.g., relay) natural-language expressions from an application to the user such that the user can interact with the application without opening or otherwise directly accessing the application. Accordingly, providing natural-language outputs in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

In some examples, the failure user interface includes a retry affordance (1622). In some examples, the electronic device detects a user input corresponding to a selection of the retry affordance and, in response to detecting the user input corresponding to a selection of the retry affordance, causes the application to initiate performance of the task.

In some examples, the failure user interface includes a cancel affordance (1624). In some examples, the electronic device detects a user input corresponding to a selection of the cancel affordance, and in response to the user input corresponding to a selection of the cancel affordance, ceases to display of the failure user interface.

In some examples, the failure user interface includes an application launch affordance (1626, 1628). In some examples, the electronic device detects a user input corresponding to a selection of the application launch affordance and, in response to the user input corresponding to a selection of the application launch affordance, launches (e.g., executes, opens) the application. In some examples, the user selects (1) the application launch affordance or (2) an icon associated with the application to launch the application.

In some examples, further in accordance with a determination that the task was performed successfully, the electronic device displays a task success animation. In some examples, the task success animation includes a shape (e.g., square, circle) being "checked off" (1616).

The operations described above with reference to FIG. 17 are optionally implemented by components depicted in FIGS. 1-4, 6A-B, and 7A-C. For example, the operations of method 1900 may be implemented by any device (or component thereof) described herein, including but not limited to, devices 104, 200, 400, 600 and 1600. It would be clear to a person having ordinary skill in the art how other processes are implemented based on the components depicted in FIGS. 1-4, 6A-B, and 7A-C.

As described with respect to FIG. 12, an electronic device may provide suggestions based on context of the electronic device. In some instances, however, it may be desirable to provide task suggestions using other types of information as well (e.g., user-specific information). By way of example, information indicating a user's progress in a queue (e.g., TV show episode playlist) may be used in combination with context data to provide task suggestions, as described in further detail below.

In an example operation, the electronic device may receive information (e.g., user-specific information) from an application (e.g., media streaming application), such as a set of media items (e.g., content such as songs, videos, albums, playlists) identified by the application for the user. The information may be received, for instance, in response to an API call provided to the application. In some examples, the application is a third-party application (e.g., Netflix). In some examples, the application is a remote application, such as a remote media prediction service communicatively coupled to the electronic device over a network such as the Internet. The information may be received at any time prior to prediction of task suggestions.

In some examples, the set of media items includes media items recommended for the user by the application. Items may be recommended based on prior media items accessed by the user. As an example, an application may recommend a current or next song in a playlist accessed by a user. In another example, an application may recommend items related to previously accessed media items, such as media items sharing a same category as the previously accessed media items. Categories may include, for instance, genre (e.g., hip-hop), decade (e.g., 90's), activity (e.g., study, workout), mood (e.g., happy), holiday (e.g., Christmas).

In some examples, the set of media items is provided as a list of media items. In some examples, the set of media items is provided as a vector. In some examples, the set of media items is provided in combination with playback data describing one or more media items of the set of media items. The playback data can, optionally, specify one or more aspects for playback of the media items. As an example, the playback data can specify a particular time in one or more of the media items (e.g., a time at which a user ceased playback of a media item). As another example, the playback data can specify a language for playback and/or whether subtitles are to be displayed. As yet another example, the playback data can indicate a resolution and/or bitrate for playback of the media item.

While description is made herein with respect to the electronic device receiving a set of media items from an application, it will be appreciated that the electronic device can receive any number of sets of media items from any number of applications. Sets of media items received in the manner described (e.g., in response to an API call) may be received periodically and/or in response to an event. In some examples, the electronic device requests one or more sets of media items prior to selectively providing task suggestions.

In some examples, once the electronic device has received the set of media items, the electronic device determines whether to provide one or more task suggestions based the set of media items and/or context data of the electronic device, as described with reference to FIG. 12.

As an example, in addition to receiving the set of media items, the electronic device receives context data associated with the electronic device, and based on the set of media items and context data, determines one or more tasks. At least one of the one or more tasks may, for instance, correspond to playback of a media item of the set of media items. In some examples, one or more parameters of tasks corresponding to playback of a media item may be based on the playback data. By way of example, the task may correspond to playback of the media item at a particular time.

Thereafter, the electronic device determines whether any of the one or more tasks satisfy suggestion criteria, as described. For each of the one or more tasks satisfying the suggestion criteria, the electronic device provides a task suggestion and displays, on a display of the electronic device, a suggestion affordance corresponding to the task suggestion, as described.

As another example, the electronic device determines a task and selectively modifies the task using the one or more media items. For instance, in addition to receiving the set of media items, the electronic device receives context data and determines a task based on the context data. If the task corresponds to playback of a media item, the task may be modified to include a media item of the set of media items and/or a parameter of a media item of the plurality of media items. In some examples, the task is modified before determining whether the task satisfies suggestion criteria. In some examples, the task is modified after determining whether the task satisfies suggestion criteria.

FIGS. 18A-18D illustrate exemplary user interfaces for providing media item suggestion affordances on an electronic device (e.g., device 104, device 122, device 200, device 600, or device 700), in accordance with some embodiments. The user interfaces in these figures are used to illustrate the processes described below, including the processes in FIG. 19.

Figure 18A:
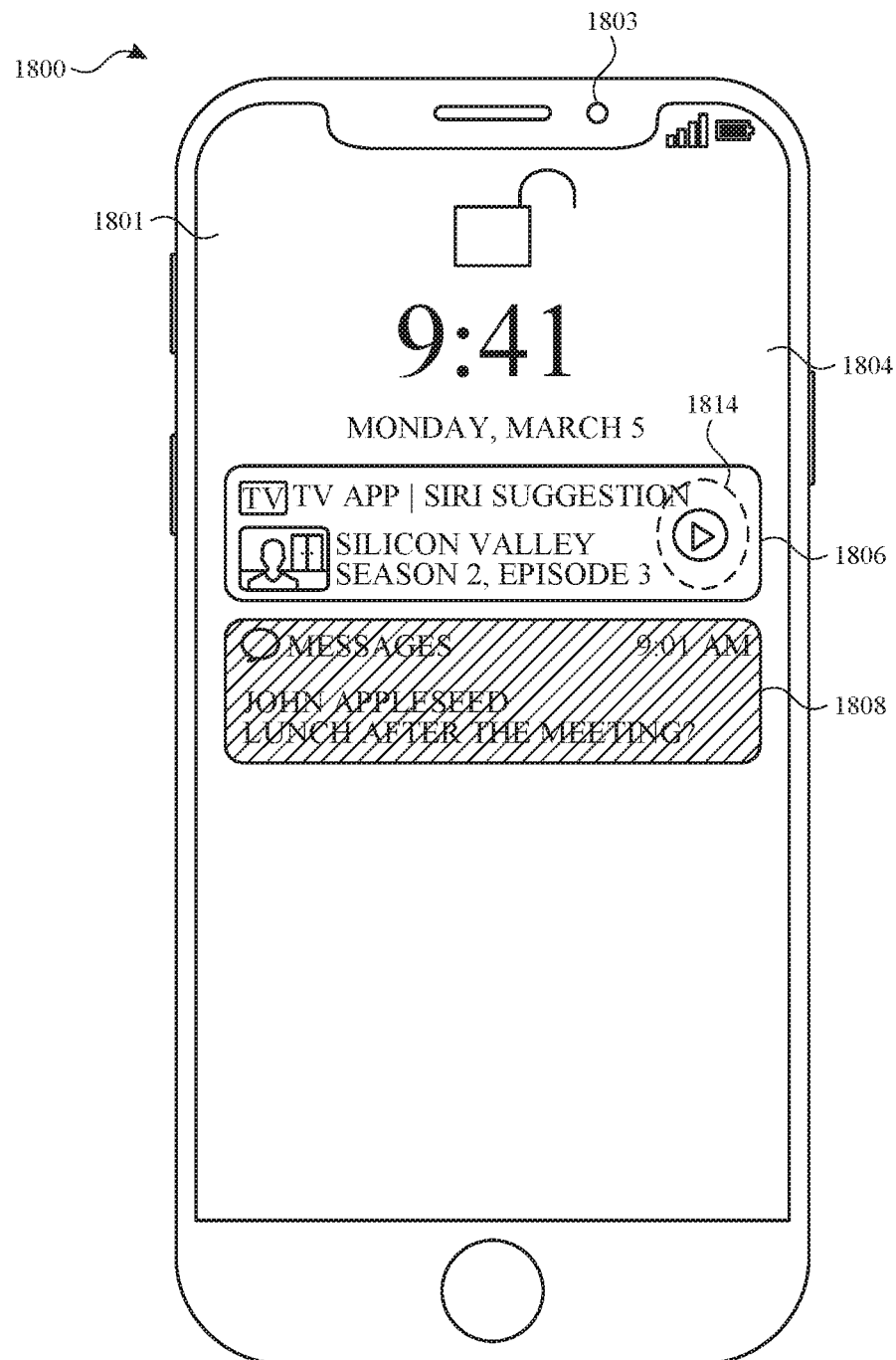
FIGS. 18A-18D illustrate exemplary user interfaces for providing media item suggestions, according to various examples.
Figure 18B:

FIG. 18A illustrates an electronic device 1800 (e.g., device 104, device 122, device 200, device 600, or device 700). In the non-limiting exemplary embodiment illustrated in FIGS. 18A-18D, electronic device 1800 is a smartphone. In other embodiments, electronic device 1800 can be a different type of electronic device, such as a wearable device (e.g., a smartwatch). In some examples, electronic device 1800 has a display 1801, one or more input devices (e.g., touchscreen of display 1801, a button, a microphone), and a wireless communication radio. In some examples, the electronic device 1800 includes a plurality of cameras. In some examples, the electronic device includes only one camera. In some examples, the electronic device includes one or more biometric sensors (e.g., biometric sensor 1803) which, optionally, include a camera, such as an infrared camera, a thermographic camera, or a combination thereof.

In FIG. 18A, the electronic device 1800 displays, on display 1801, a locked screen interface, such as the locked screen interface 1804, while the electronic device is in an unlocked state. The locked screen interface 1804 includes a suggestion affordance 1806 and a notification 1808. In some examples, selection of the selection affordance 1806 causes the electronic device 1800 to selectively perform a task associated with the suggestion affordance, as described with respect to FIGS. 8A-8AF. Suggestion affordance 1806 corresponds to a task for playback of a media item (e.g., Episode 3 of Season 2 of Silicon Valley) in a media playback application (e.g., TV app). In some examples, selection of the notification 1808 causes the electronic device to open an application associated with the notification.

In some examples, in response to selection of the suggestion affordance 1806, for instance by user input 1814, the electronic device 1800 performs the task. As illustrated in FIG. 16B, the electronic device 1800 initiates playback of the media item associated with suggestion affordance 1806 (e.g., Episode 3 of Season 2 of Silicon Valley).

Figure 18C:
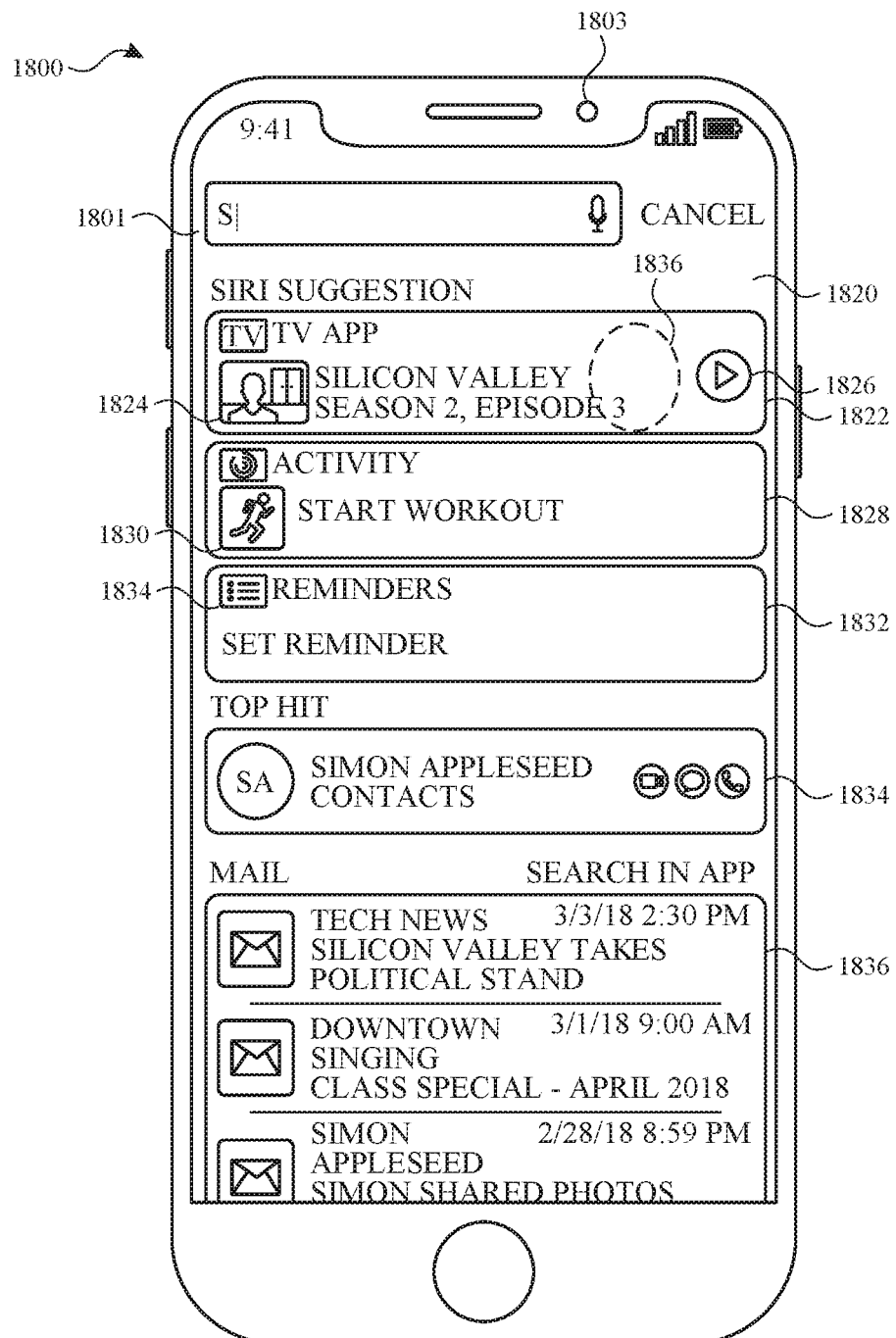

In some examples, suggestion affordances may be displayed on a search screen and/or searchable using a searching function of the electronic device. In FIG. 18C, for example, the electronic device 1800 displays a search interface 1820. While displaying the search interface 1820, in response to entry of a search string (e.g., "S"), the electronic device 1800 returns search results, including suggestion affordances 1822, 1828, 1832, contact results 1834, and mail results 1836. In some examples, suggestion affordances are presented above all other results. Accordingly, suggestion affordances 1822, 1828, and 1832 are presented above contact results 1834 and mail results 1836 in the search interface 1820.

In some examples, suggestion affordances corresponding to tasks for playback of media items are displayed in a manner different than other suggestion affordances. As illustrated in FIG. 18C, for instance, the suggestion affordance 1822 includes media icon 1824 and playback glyph 1826. In some examples, icon 1824 may be relatively large relative to icons of other suggestion affordances (e.g., icon 1830 of suggestion affordance 1828, icon 1834 of suggestion affordance 1832). Icon 1824 further may include an image associated with the media item, such as a video frame. Playback glyph 1826 may indicate that suggestion affordance 1822 corresponds to task corresponding to a media task category.

Figure 18D:
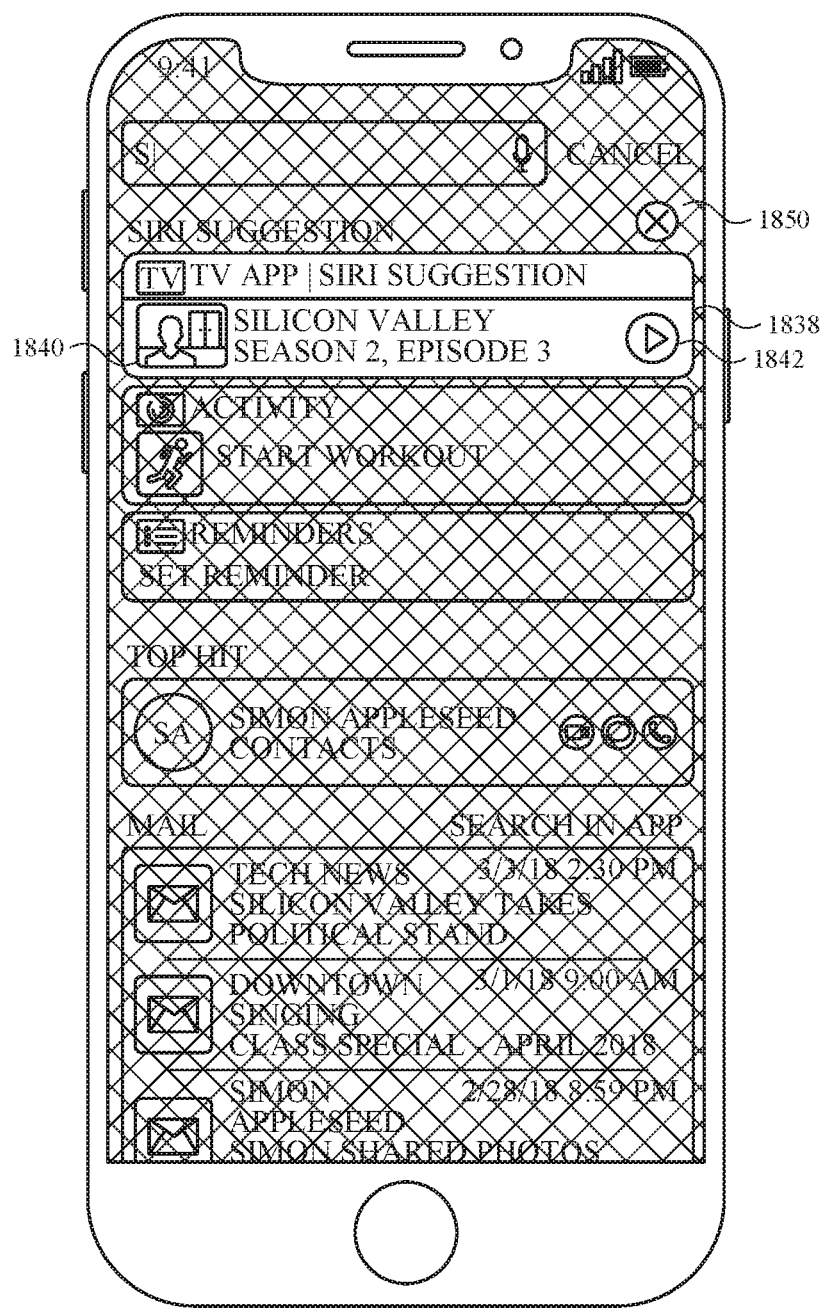

In some examples, in response to selection of the suggestion affordance 1822, for instance by user input 1836, the electronic device 1800 displays an expanded interface 1850 associated with suggestion affordance 1822. In some examples, user input 1836 is a touch input of a predetermined type (e.g., touch input satisfying a threshold intensity or duration). With reference to FIG. 18D, the expanded interface 1850 includes suggestion affordance 1838, which in some examples, corresponds to suggestion interface 1822. In some examples, suggestion affordance 1838 includes an icon 1840 that corresponds to icon 1824 and a playback glyph 1842 that corresponds to icon 1826. In some examples, icon 1840 includes an image associated with the media item, such as a video frame. In some examples icons 1822 and 1840 include a same image. In some examples, icon 1840 of suggestion affordance 1838 is larger than icon 1824. In some examples, display of the expanded view interface 1850 causes one or more portions of the display of the electronic device 1800 to be blurred, darkened, and/or otherwise obscured.

Figure 19:
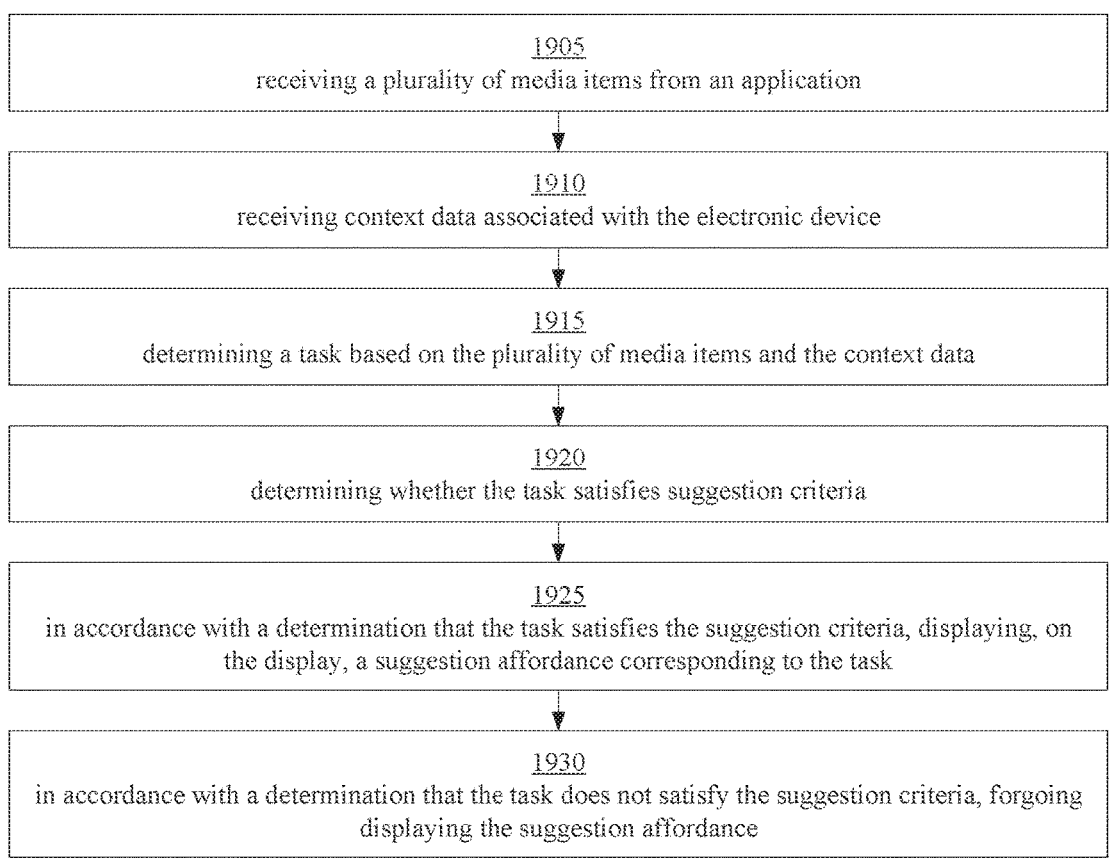
FIG. 19 is a flow diagram illustrating a method of providing media item suggestions, according to various examples.

FIG. 19 illustrates method 1900 for providing media item suggestions, according to various examples. Method 1900 is performed, for example, using one or more electronic devices implementing a digital assistant. In some examples, method 1900 is performed using a client-server system (e.g., system 100), and the blocks of method 1900 are divided up in any manner between the server (e.g., DA server 106) and a client device. In other examples, the blocks of method 1900 are divided up between the server and multiple client devices (e.g., a mobile phone and a smart watch). Thus, while portions of method 1900 are described herein as being performed by particular devices of a client-server system, it will be appreciated that method 1900 is not so limited. In other examples, method 1900 is performed using only a client device (e.g., user device 104) or only multiple client devices. In method 1900, some blocks are, optionally, combined, the order of some blocks is, optionally, changed, and some blocks are, optionally, omitted. In some examples, additional steps may be performed in combination with the method 1900.

As described below, selectively providing suggestion affordances corresponding to tasks, as described herein, allows a user to efficiently and conveniently perform tasks relevant to the user on the electronic device. By way of example, suggestion affordances displayed by the electronic device can correspond to tasks identified based on media consumption and/or determined media preferences of the user. Thus, selectively providing suggestions in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

In some examples, the electronic device includes one or more of a keyboard, mouse, microphone, display, and touch-sensitive surface. In some examples, the display is a touch-sensitive display. In other examples, the display is not a touch-sensitive display.

At block 1905, the electronic device receives a plurality of media items from an application. In some examples, the electronic device requests the plurality of media items from the application (e.g., third-party application) using an API call. In some examples, in response to the API call, the application returns a list (e.g., vector) of upcoming media items recommended by the application for the user. In some examples, media items received in this manner can include albums, songs, TV shows, episodes (or playlists of any combination thereof. In some examples, receiving a plurality of media items from an application includes receiving a vector including the plurality of media items from the application. In some examples, each media item is a container that includes information about a respective media item or set of media items. In some examples, receiving a plurality of media items from an application includes, while displaying another application different from the application, receiving the plurality of media items. In some examples, prior to receiving a plurality of media items from an application, the electronic device requests the plurality of media items from the application. In some examples, media items are requested/received at the time suggestions are predicted. In some examples, media items are requested/received when application is opened and/or closed by user. In some examples, the plurality of media items are received from a remote application (e.g., remote media prediction service). In some examples, the plurality of media items is received prior to an event causing the electronic device to selectively provide a prediction.

At block 1910, the electronic device receives context data associated with the electronic device. In some examples, the electronic device receives context information of the electronic device. Context information received in this manner can include location of the electronic, time of day, day of week, etc.

At block 1915, the electronic device determines a task based on the plurality of media items and the context data. In some examples, the task is a task for playback of a media item of the plurality of media items. In some examples, the task specifies a particular playback time. In some examples, the task can specify that playback of a media item is initiated at a particular point in the media item (e.g., 1:02). In some examples, the electronic device generates a plurality of suggestions, as described. If one or more the suggested tasks correspond to a media item in the requested list, one or more tasks for playback of the respective media items are provided.

Determining tasks (e.g., task probabilities, parameter probabilities) based on context of the electronic device and the plurality of media items ensures that task suggestions provided by the electronic device, as described herein, are provided based not only on previous usage of the electronic device by a user, but also intuitive and relevant predictions as to future behavior in the media domain. This in turn ensures that the user is provided with salient task suggestions that have a relatively high likelihood of accelerating user behavior. Thus, providing suggestions in this manner decreases the number of inputs and amount of time needed for the user to operate the electronic device (e.g., by helping the user to provide proper inputs and reducing user mistakes when operating/interacting with the device), which, additionally, reduces power usage and improves battery life of the device.

At block 1920, the electronic device determines whether the task satisfies suggestion criteria. In some examples, the electronic device determines whether any of the identified tasks, given the context data and current context of the electronic device, satisfy a probabilistic threshold such that the electronic device should provide one or more of the tasks as a suggestion.

At block 1925, in accordance with a determination that the task satisfies the suggestion criteria, the electronic device displays, on a display of the electronic device, a suggestion affordance (1806) corresponding to the task.

At block 1930, in accordance with a determination that the task does not satisfy the suggestion criteria, the electronic device forgoes displaying the suggestion affordance.

In some examples, the task is a first task and the suggestion affordance is a first suggestion affordance. In some examples, the electronic device determines a second task based on the context data, determines whether the second task satisfies suggestion criteria, in accordance with a determination that the second task satisfies the suggestion criteria, displays, on the display, a second suggestion affordance corresponding to the second task, and in accordance with a determination that the second task does not satisfy the suggestion criteria, forgoes displaying the second suggestion affordance.

In some examples, the application is a first application and the task is associated with the first application and the suggestion affordance is associated with a second application different than the first application. In some examples, when generating a suggestion of a task for a media item, the electronic device simulates a replica of the application for the suggestion affordance. In this manner, the electronic device may display playback controls and/or a playlist for the suggestion without overwriting currently playing items and/or queues of the application. In some examples, if the user selects the suggestion, the electronic device will initiate playback of the application using the suggested media item(s).

In some examples, a second electronic device determines, with the application (e.g., a remote media prediction service), one or more media items previously played on the electronic device, and generates the plurality of media items based on the determined one or more media items. In some examples, the electronic device determines one or more media items played back on any number of devices, for instance, associated with a same user. In this manner, media used to make suggestions is consistent across all devices of the user. In some examples, media items are received from a backend server communicatively coupled to the electronic device. In some examples, generating the plurality of media items includes identifying a category of at least one of the one or more media items previously played on the electronic device (e.g., genre, decade, activity, mood, holiday) and identifying a media item associated with the identified category.

The operations described above with reference to FIG. 19 are optionally implemented by components depicted in FIGS. 1-4, 6A-B, and 7A-C. For example, the operations of method 1900 may be implemented by any device (or component thereof) described herein, including but not limited to, devices 104, 200, 400, 600 and 1800. It would be clear to a person having ordinary skill in the art how other processes are implemented based on the components depicted in FIGS. 1-4, 6A-B, and 7A-C.

Figure 20A:
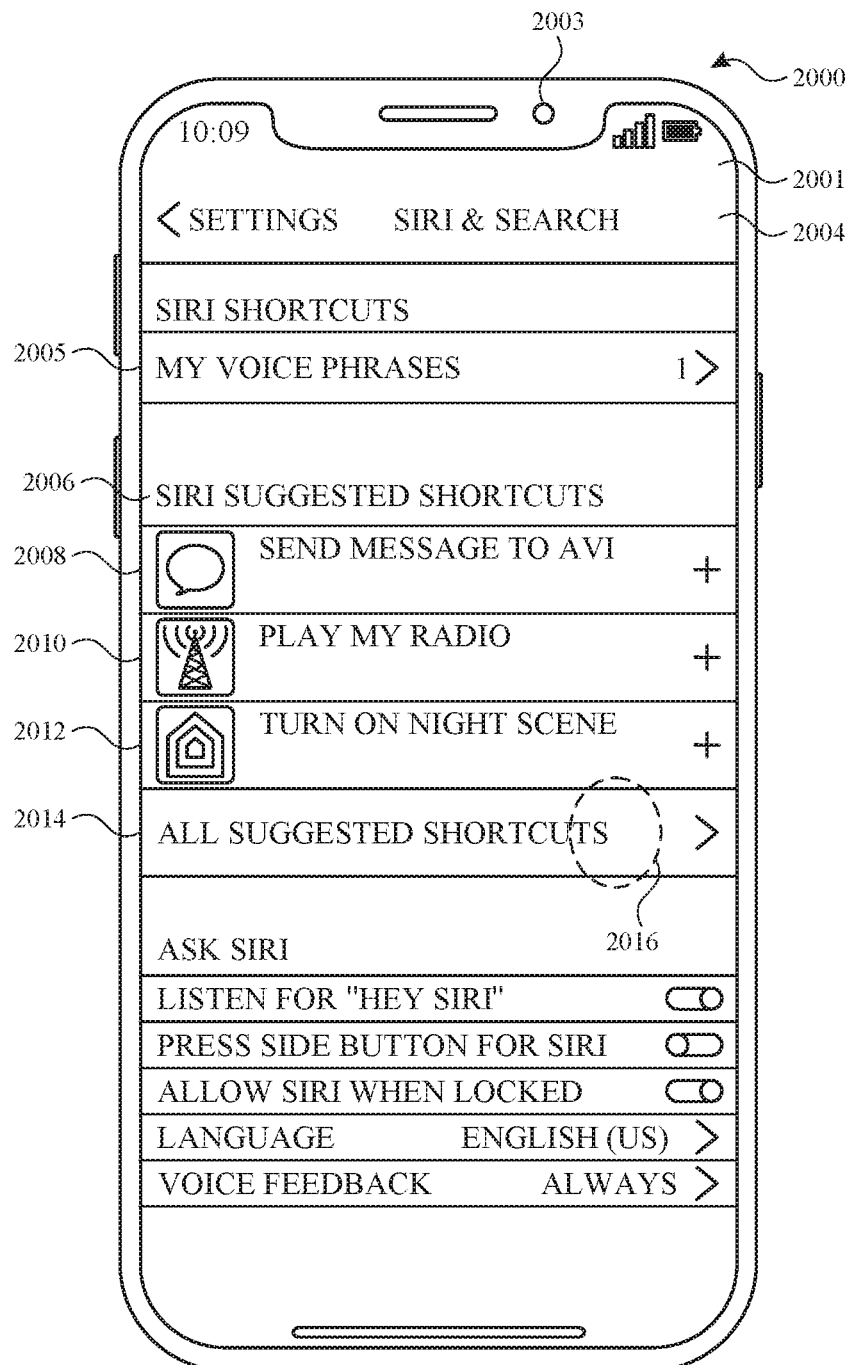
FIGS. 20A-20N illustrate exemplary user interfaces for providing voice shortcuts, according to various examples.
Figure 20B:
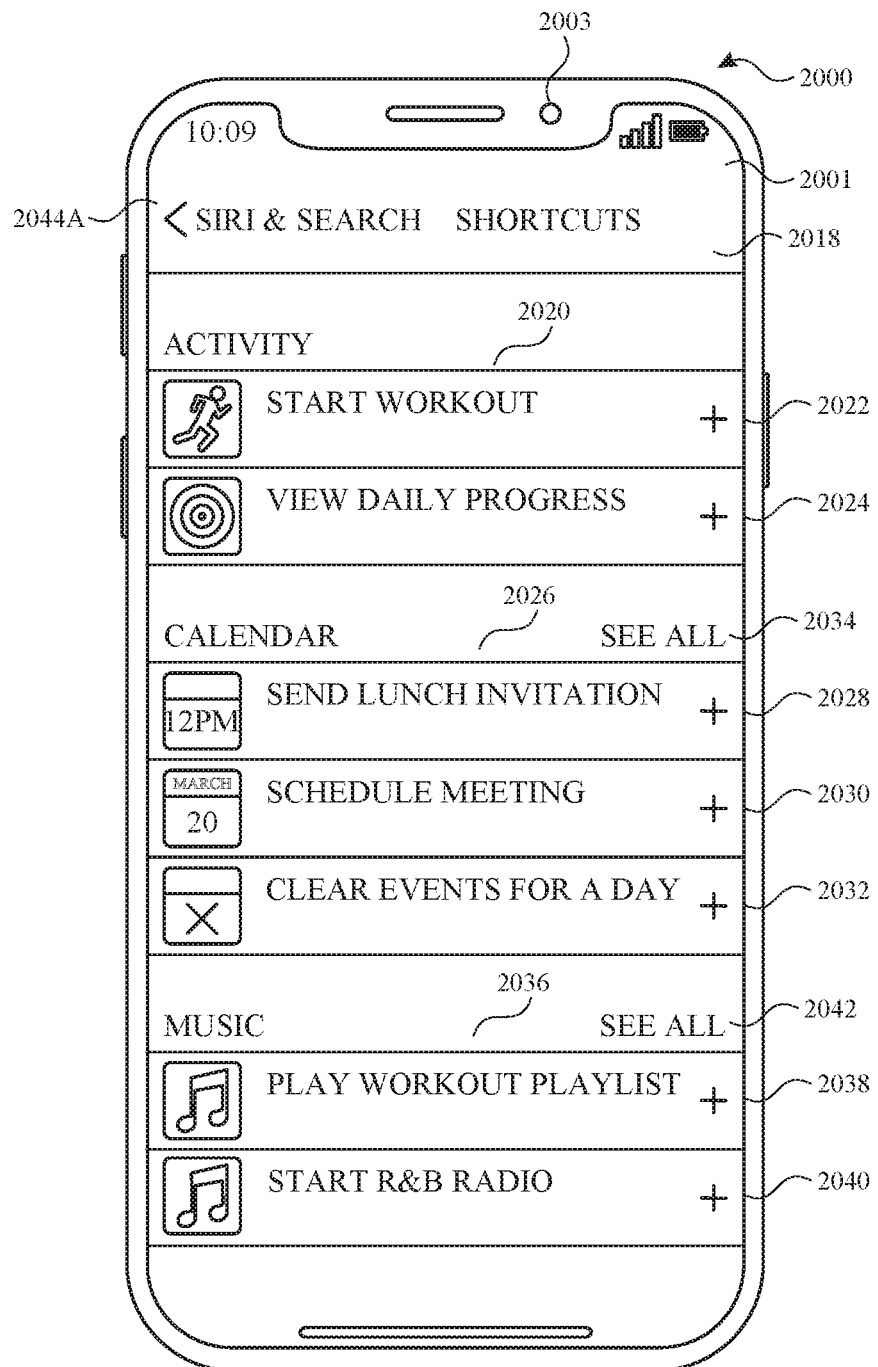
Figure 20C:
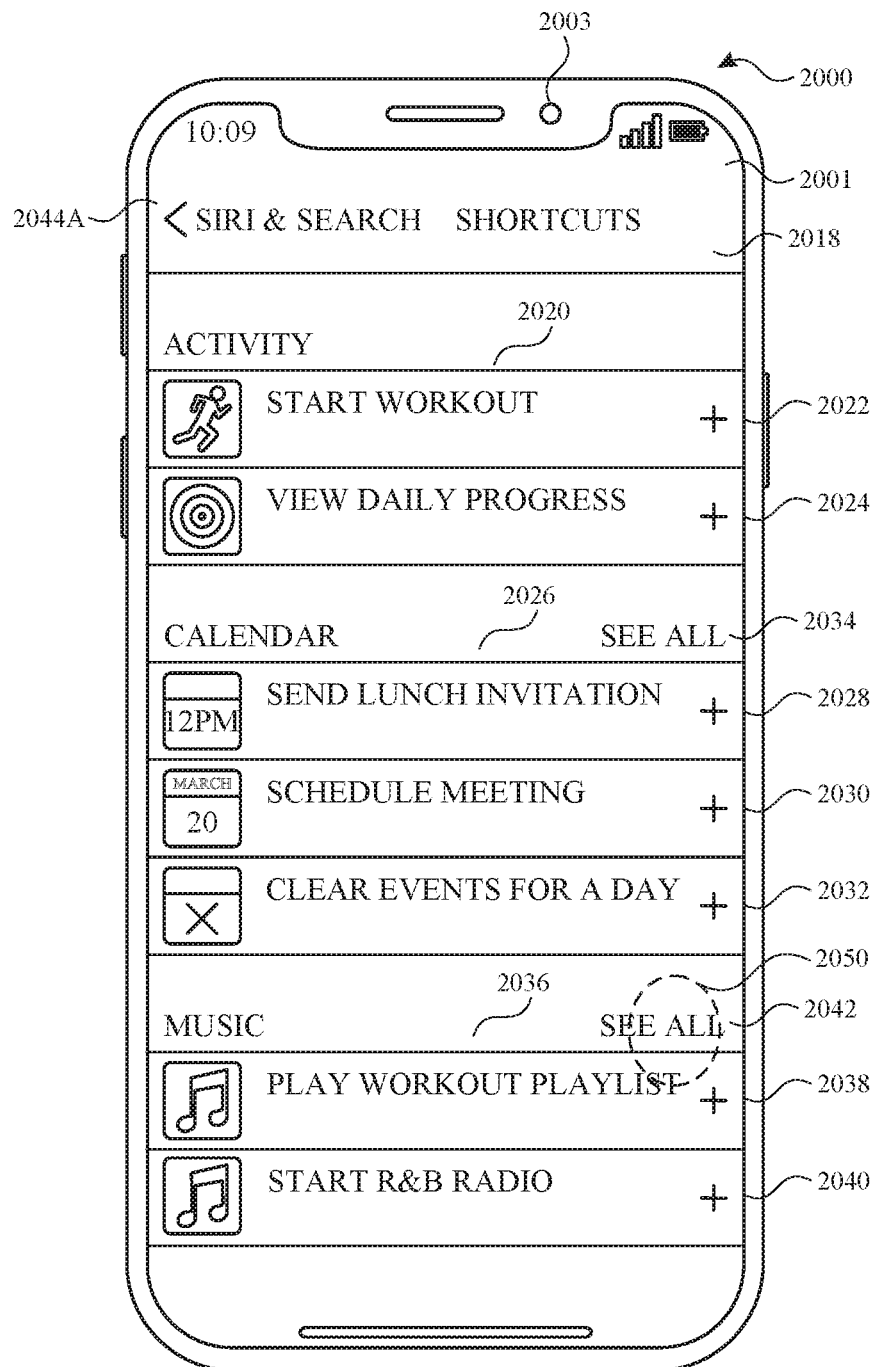
Figure 20D:
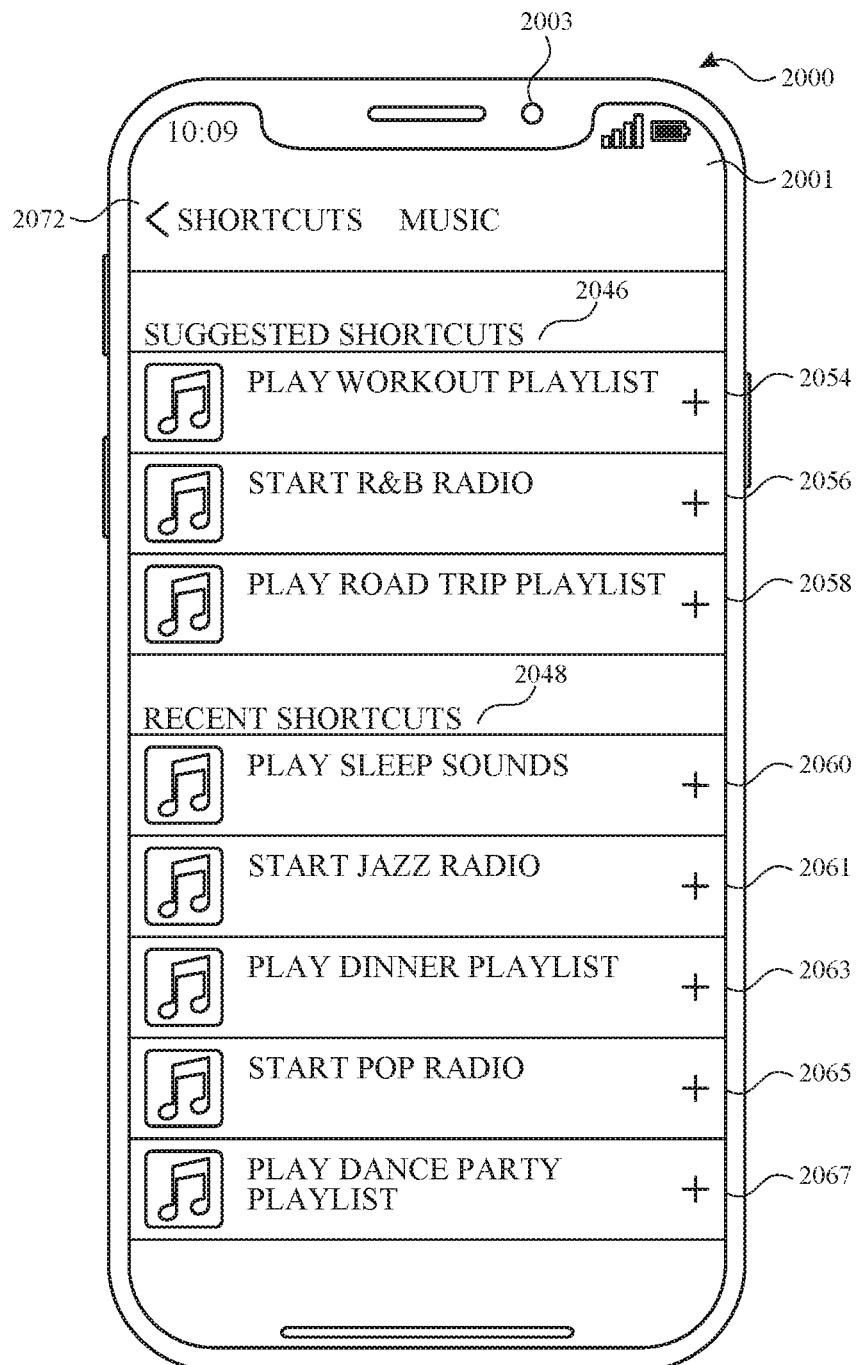
Figure 20E:
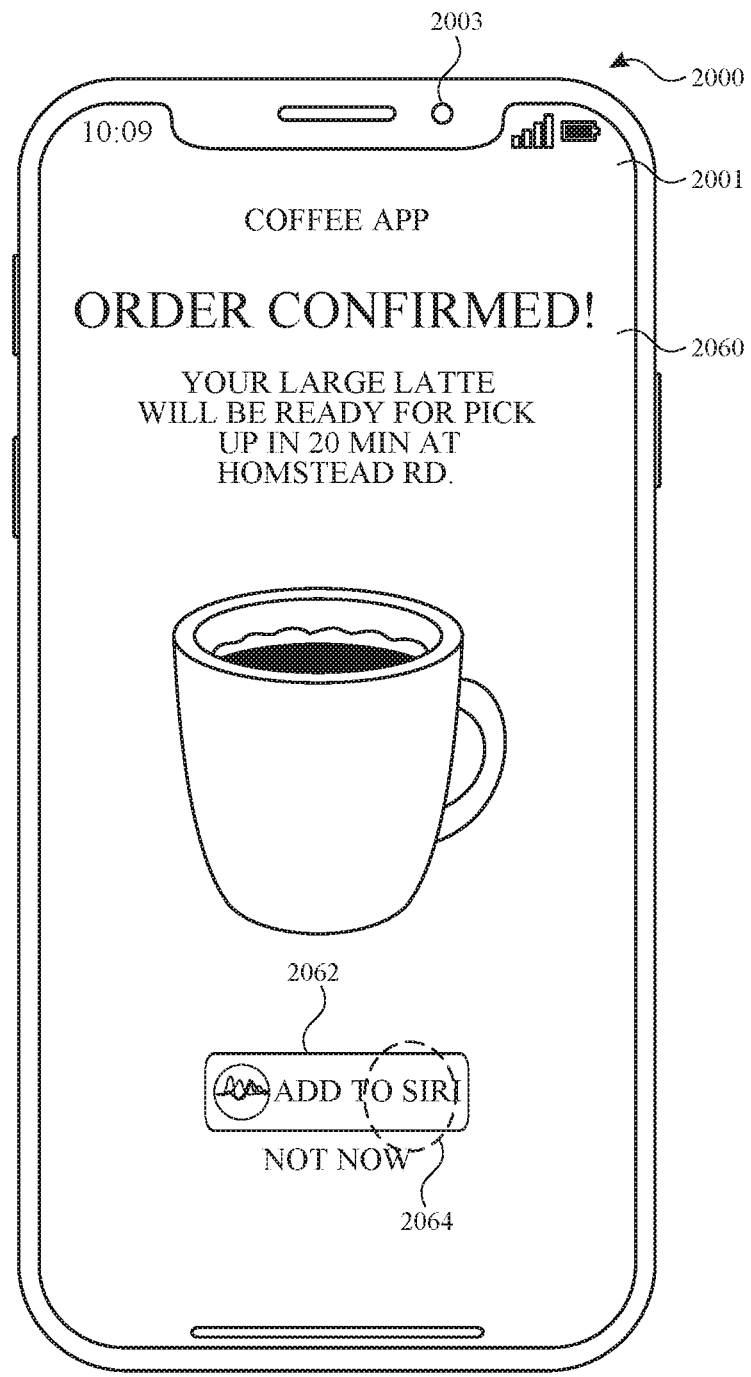
Figure 20F:
Figure 20G:
Figure 20H:
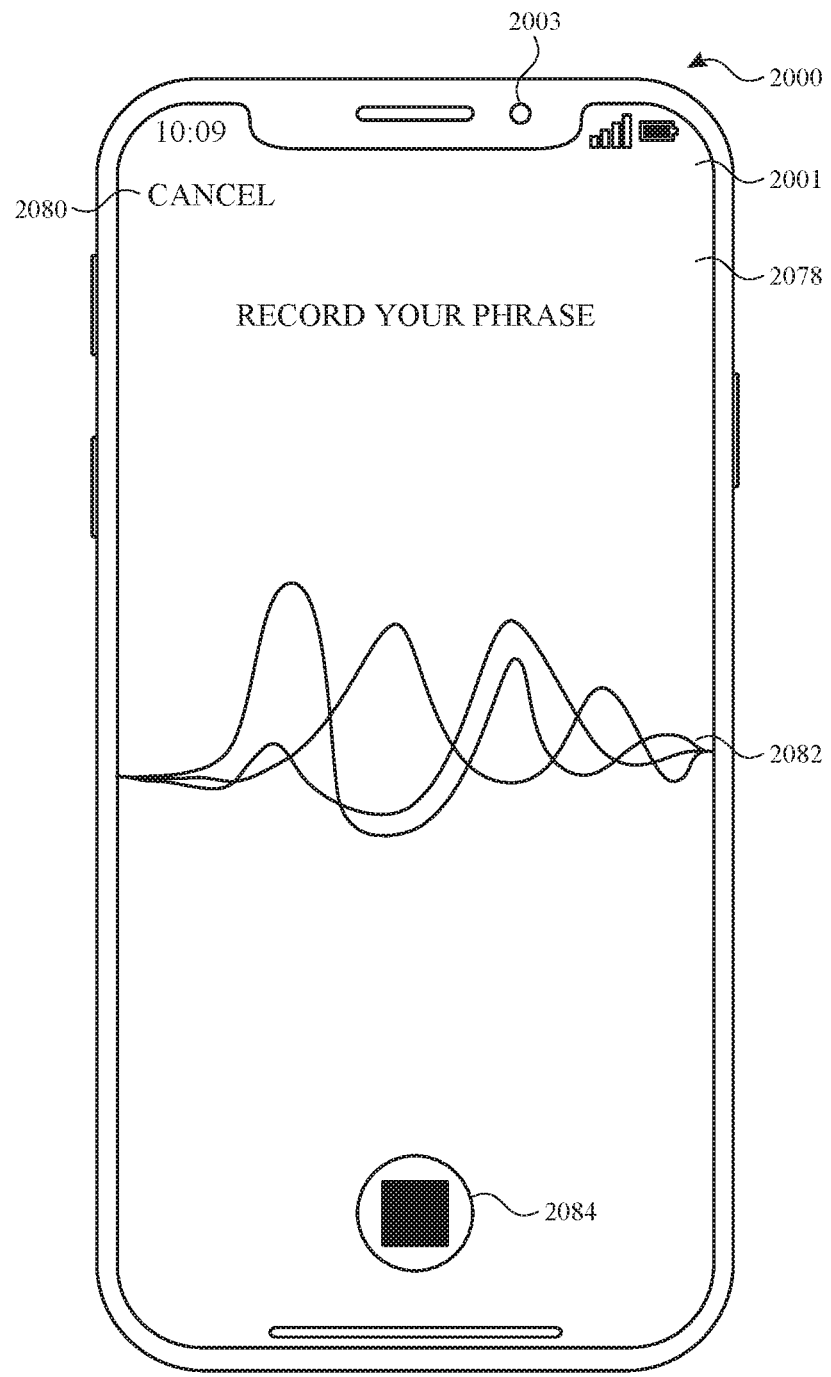
Figure 20I:
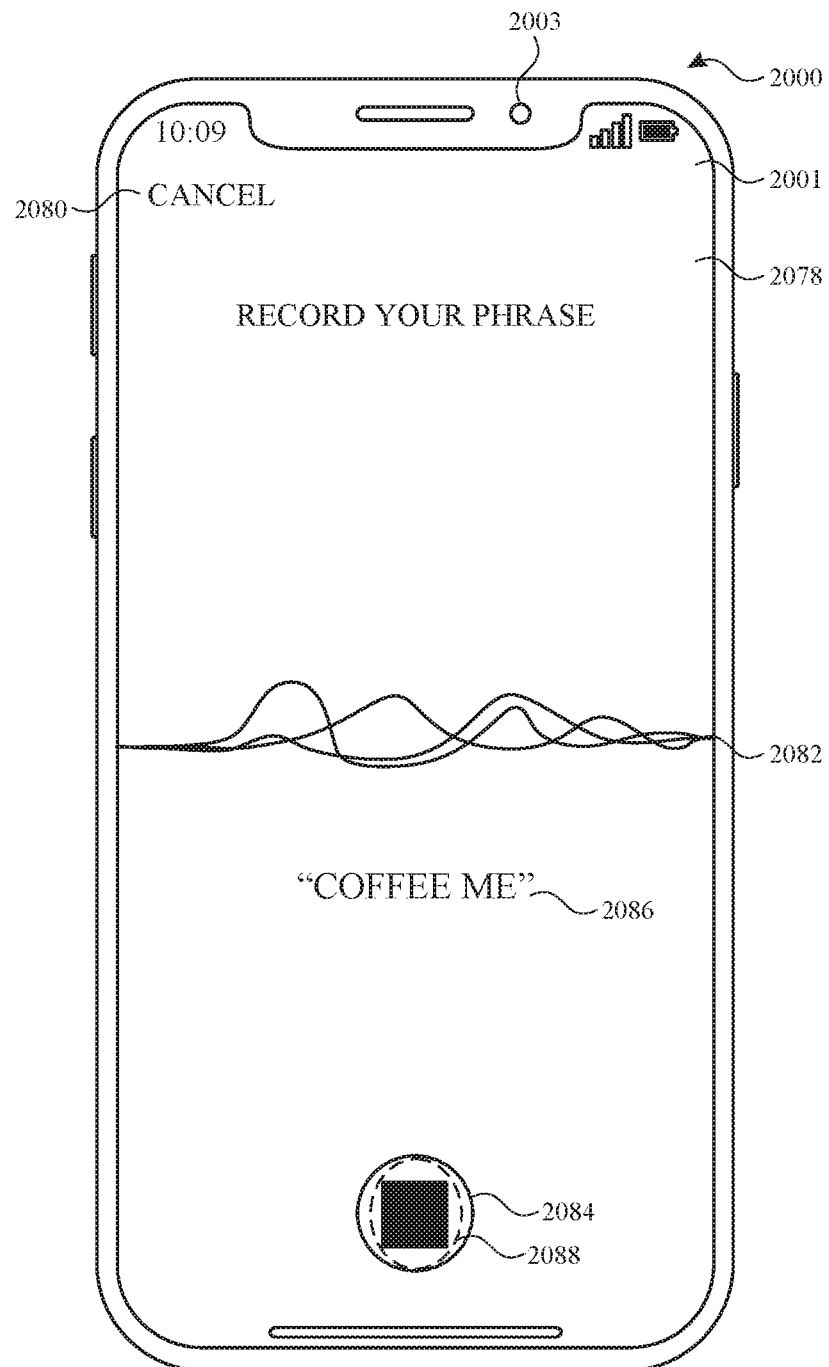
Figure 20J:
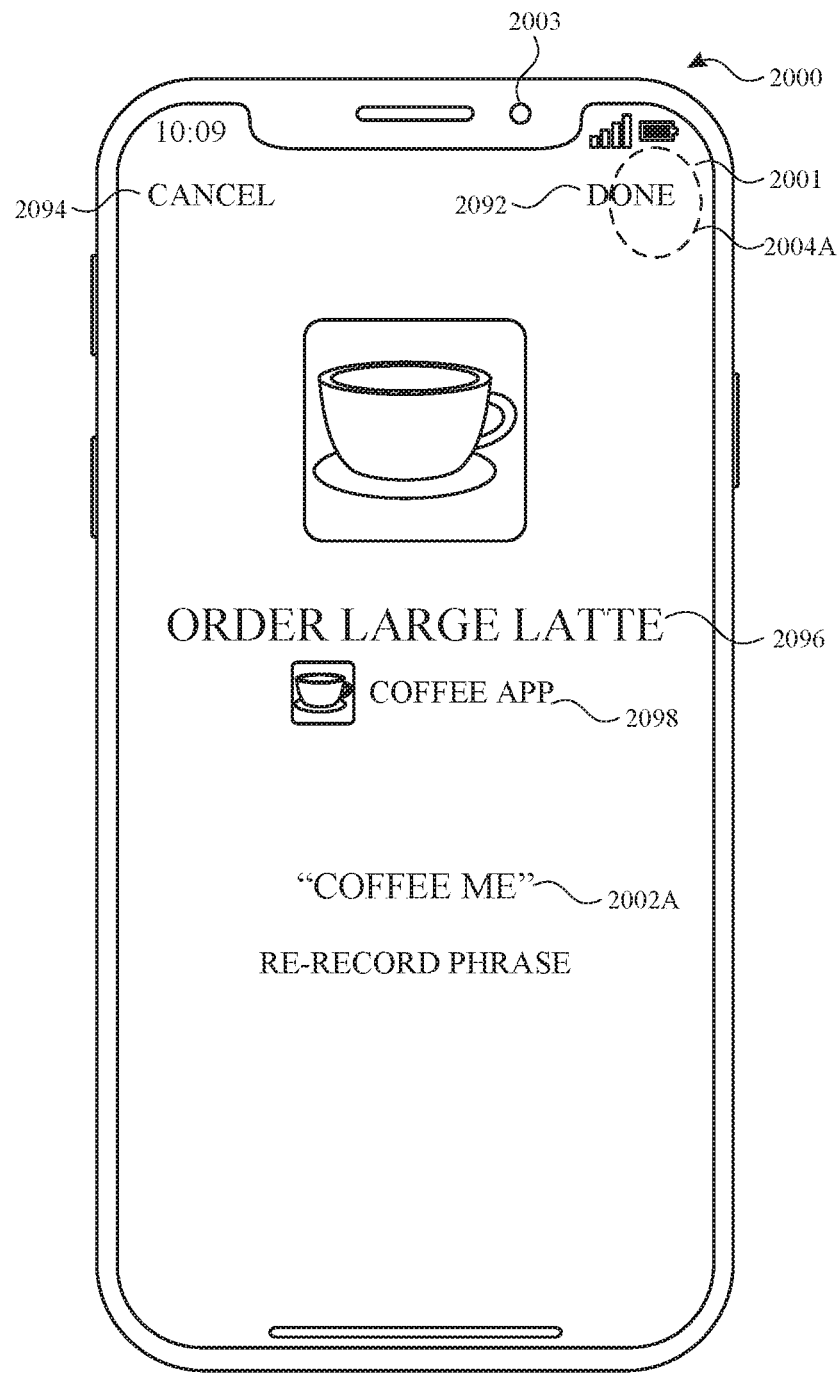
Figure 20K:
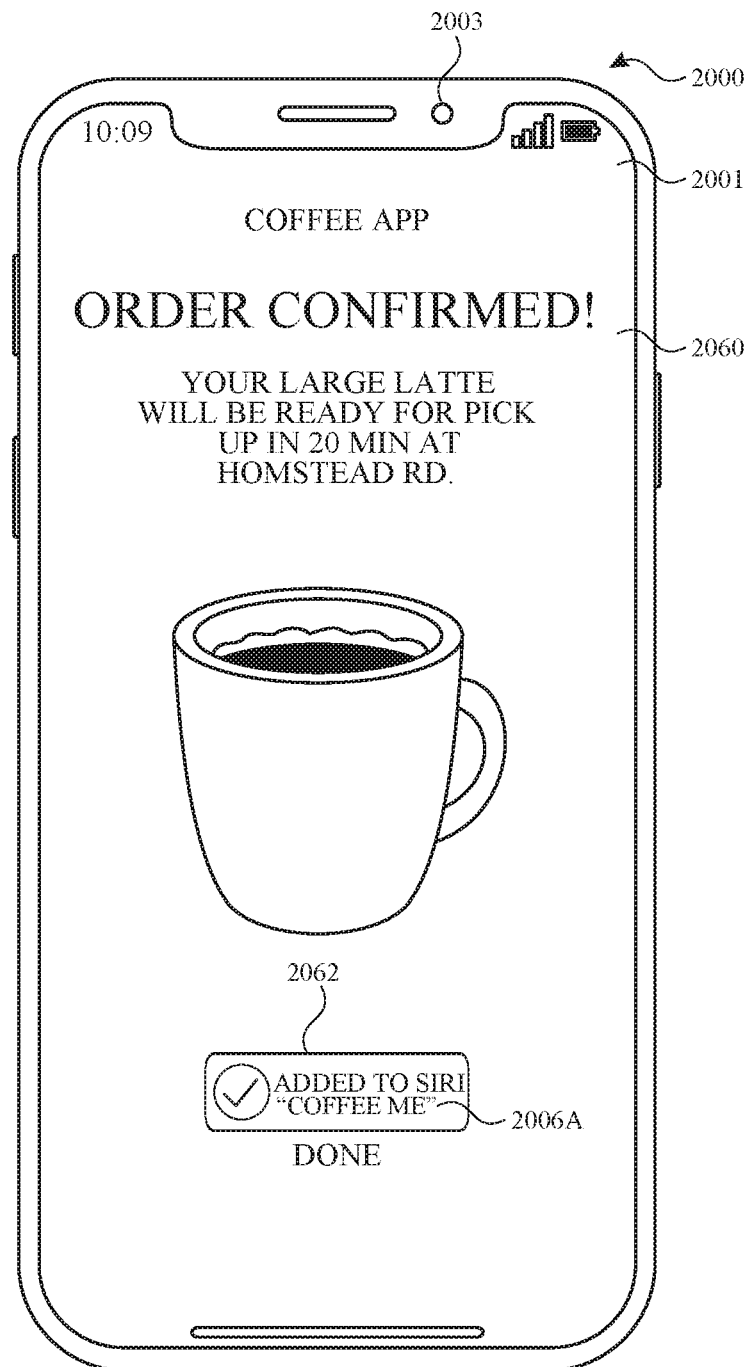
Figure 20L:
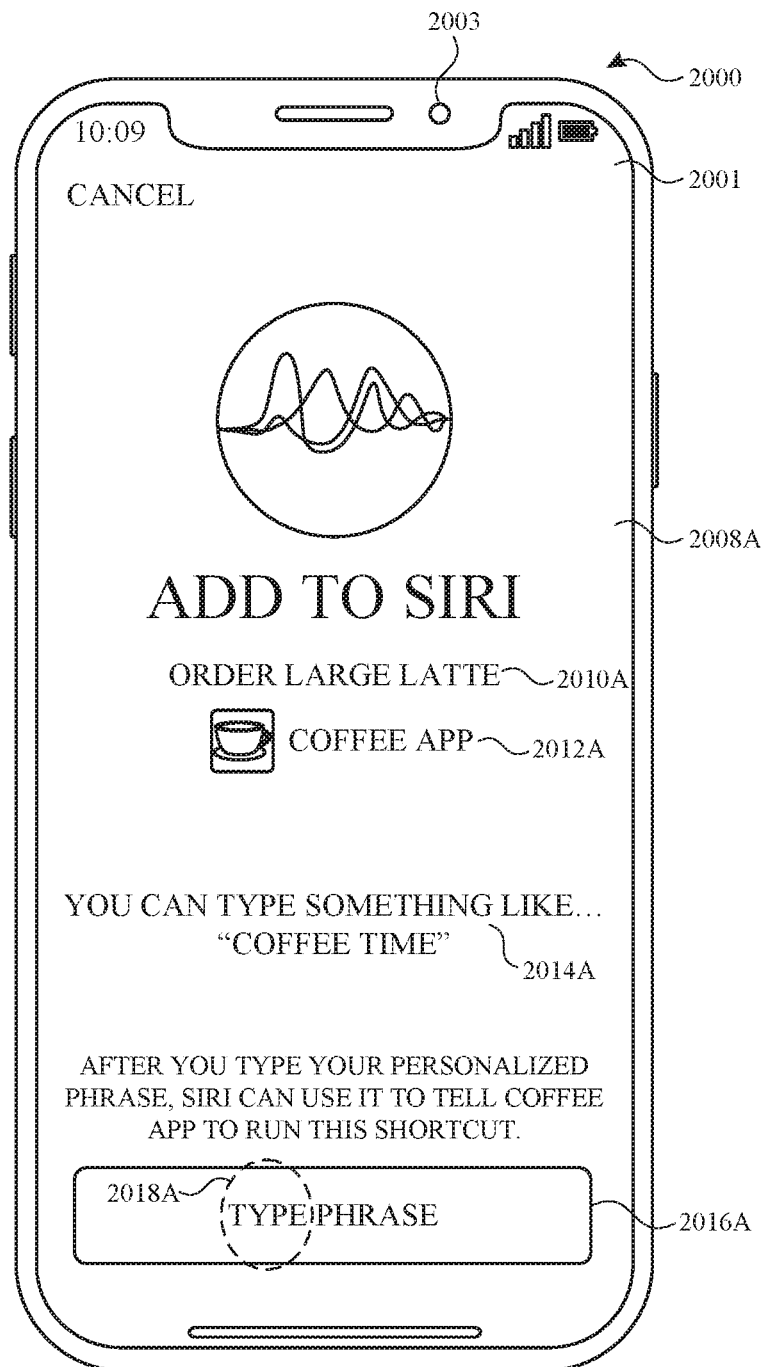
Figure 20M:
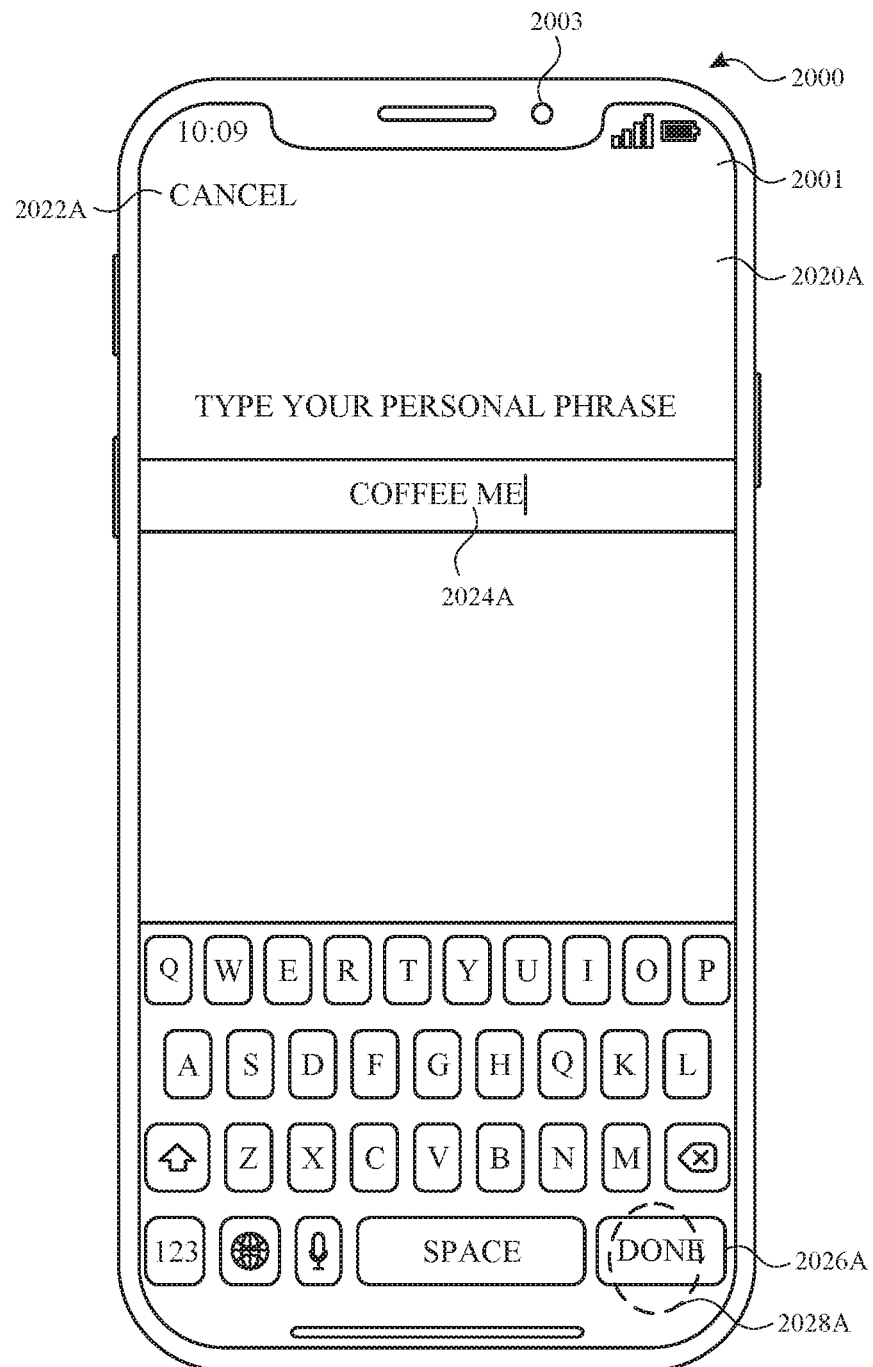
Figure 20N:
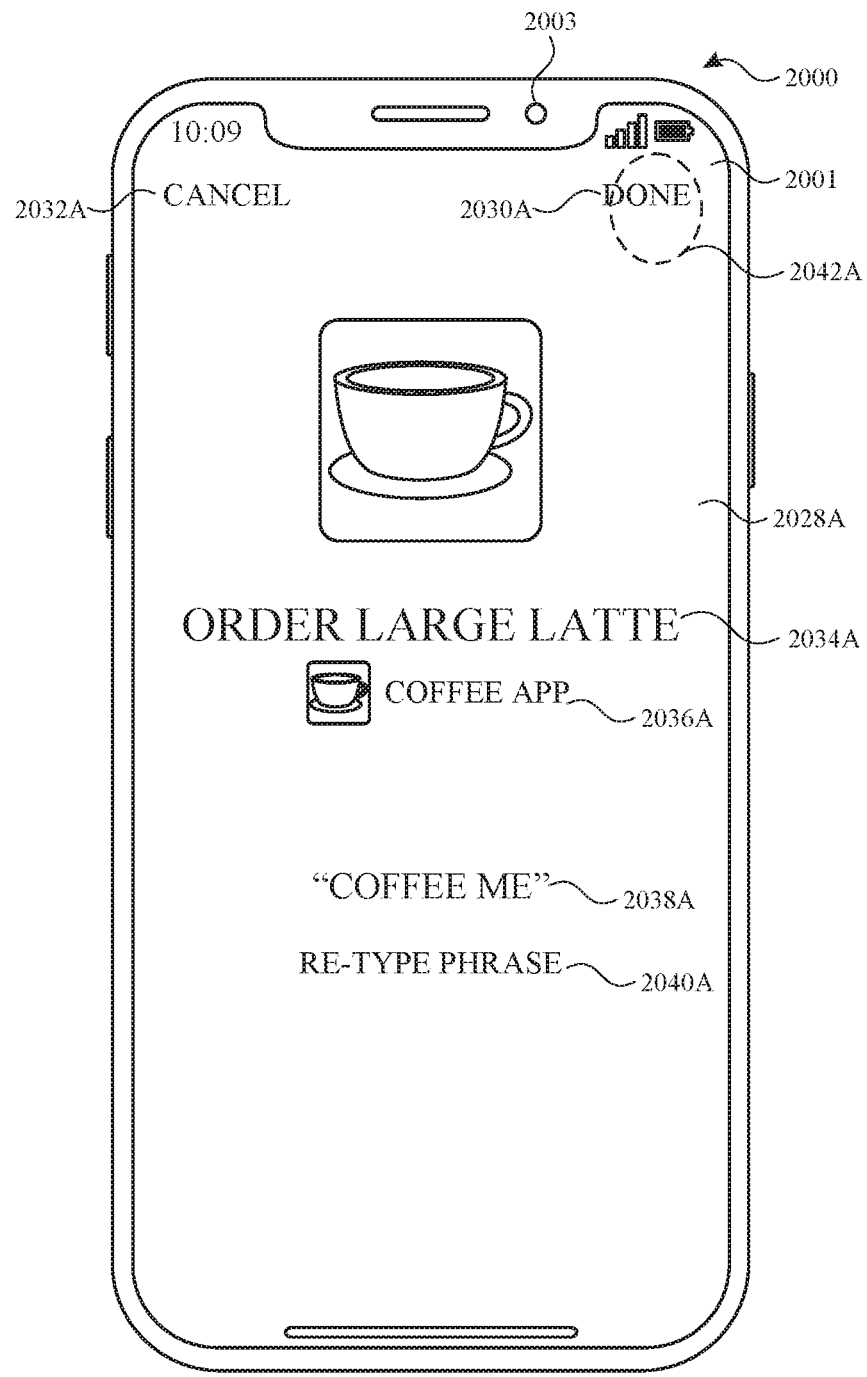

FIGS. 20A-20N illustrate exemplary user interfaces for providing voice shortcuts on an electronic device (e.g., device 104, device 122, device 200, device 600, or device 700), in accordance with some embodiments. The user interfaces in these figures are used to illustrate the processes described below, including the processes in FIGS. 11A-B.

Generally, user interfaces described with reference to FIGS. 20A-20N may be employed such that a user can associate tasks with respective user-specific phrases. These phrases may in turn be used to cause the electronic device to perform the associated tasks.

FIG. 20A illustrates an electronic device 2000 (e.g., device 104, device 122, device 200, device 600, or device 700). In the non-limiting exemplary embodiment illustrated in FIGS. 20A-20N, electronic device 2000 is a smartphone. In other embodiments, electronic device 2000 can be a different type of electronic device, such as a wearable device (e.g., a smartwatch). In some examples, electronic device 2000 has a display 2001, one or more input devices (e.g., touchscreen of display 2001, a button, a microphone), and a wireless communication radio. In some examples, the electronic device 2000 includes a plurality of cameras. In some examples, the electronic device includes only one camera. In some examples, the electronic device includes one or more biometric sensors (e.g., biometric sensor 2003) which, optionally, include a camera, such as an infrared camera, a thermographic camera, or a combination thereof.

In FIG. 20A, the electronic device 2000 displays, on display 2001, a settings interface 2004. The settings interface 2004 includes a candidate task portion 2006 and additional tasks affordance 2014. The candidate task portion 2006 includes candidate task affordances 2008, 2010, and 2012. In some examples, if one or more candidate task affordances are associated with a respective task, settings interface 2004 includes a user shortcuts affordance 2005.

In some examples, while displaying the settings interface 2004, the electronic device 2000 detects selection of the additional tasks affordance 2014. As shown in FIG. 20A, the selection of the additional tasks affordance 2014 is a tap gesture 2016A. In some examples, in response to selection of the shortcut affordance 2014, the electronic device 2000 displays (e.g., replaces display of the settings interface 2004 with), on the display 2001, global task interface 2018, as shown in FIG. 20B.

Global task interface 2018 includes, for each of a plurality of applications, a respective set of candidate task affordances. By way of example, global task interface 2018 includes a set of candidate task affordances 2020 associated with an activity application, a set of candidate task affordances 2026 associated with a calendar application, and a set of candidate task affordances 2036 associated with a music application. The set of candidate task affordances 2020 can, optionally, include a "Start Workout" candidate task affordance 2022 and a "View Daily Progress" candidate task affordance 2024. The set of candidate task affordances 2026 can, optionally, include a "Send Lunch invitation" candidate task affordance 2028, a "Schedule Meeting" candidate task affordance 2030, and a "Clear Events for a Day" candidate task affordance 2032. The set of candidate task affordances 2036 can, optionally, include a "Play Workout Playlist" candidate task affordance 2038 and a "Start R&B Radio" candidate task affordance 2040.

In some examples, each set of candidate task affordances displayed by the electronic device 2000 may be a subset of all available candidate task affordances for a respective application. Accordingly, the user may select an application task list affordance, such as application-specific task list affordances 2034, 2042, to reveal one or more additional candidate task affordances for an application corresponding to the application task list affordance. For example, while displaying the global task interface 2018, the electronic device 2000 detects selection of application task list affordance 2042. As shown in FIG. 20C, the selection of application task list affordance 2042 is a tap gesture 2050.

In some examples, in response to selection of the application task list affordance 2042, the electronic device 2000 displays (e.g., replaces display of the global task interface 2018 with), on the display 2001, application task interface 2052 (for a respective application, e.g., music), as shown in FIG. 20D. As shown, application task interface 2052 includes a return affordance 2072, which when selected, causes the electronic device 2000 to display the global task interface 2018, a set of candidate task affordances 2046 associated with the application of the global task interface 2018, and a set of candidate task affordances 2048 associated with the application of the global task interface 2018.

In some examples, the set of candidate task affordances 2046 corresponds to candidate tasks suggested (e.g., generated), for instance, based on context of the electronic device. For example, the set of candidate task affordances 2046 can, optionally, include a "Play Workout Playlist" candidate task affordance 2054, a "Start R&B Radio" candidate task affordance 2056, and a "Play Road Trip Playlist" candidate task affordance 2058, each of which is suggested and/or ranked accordingly to context of the electronic device 2000.

In some examples, the set of candidate task affordances 2048 corresponds to candidate tasks for recently performed using the respective application. For example, the set of candidate task affordances 2048 can, optionally, include a "Play Sleep Sounds" candidate task affordance 2060, a "Start Jazz Radio" candidate task affordance 2061, a "Play Dinner Playlist" candidate task affordance 2063, a "Start Pop Radio" candidate task affordance 2065, and a "Play Dance Party Playlist" candidate task affordance 2067, each of which is suggested and/or ranked accordingly to tasks recently performed using the music application, and, optionally, one or more other applications.

In some examples, a voice shortcut generation process may be initiated using an application interface, such as a third party application interface. As illustrated in FIG. 20E, for instance, during use of an application, the application may display an application interface 2060 including a candidate task suggestion affordance 2062. In some examples, in response to selection of candidate task suggestion affordance 2062, the electronic device initiates a voice shortcut generation process, as shown below in FIGS. 20F-20K.

For example, in response to selection of the candidate task suggestion affordance 2062, the electronic device displays (e.g., replaces display of the application interface 2060 with), on the display 2001, a task-specific interface. The task-specific interface is associated with a task of the selected candidate task affordance in some examples. The task may be a task available to the user and/or recently performed by the user, for instance, using the application. By way of example, while displaying the application interface 2060, the electronic device 2000 detects selection of the candidate task affordance 2062. In some examples, the selection is a tap gesture 2064 on the candidate task affordance 2062. As shown in FIG. 20F, in response to detecting tap gesture 2064, the electronic device 2000 displays the task-specific interface 2066. The task-specific interface 2066 may be associated with a task of the candidate task affordance 2062 (e.g., Order large latte).

Task-specific interface 2066 includes task indicator 2068, application indicator 2070, candidate phrase 2072, and record affordance 2074. In some examples, task indicator 2068 indicates a name and/or type of the task. In some examples, task indicator 2068 includes a description of the task and/or indicates that a user may record a command or phrase to be linked with the task. In some examples, application indicator 2070 identifies an application corresponding to the task. The application indicator 2070 may, for instance, include a name of the application and/or an icon associated with the application. Candidate phrase 2072 includes a suggested phrase that the user may elect to associate with the task.

While displaying the task-specific interface 2066, the electronic device 2000 detects selection of the record affordance 2074. As shown in FIG. 20G, selection of the record affordance 2074 is a tap gesture 2076. In response to selection of the record affordance 2074, the electronic device displays (e.g., replaces display of the task-specific interface 2066 with), on the display 2001, a record interface 2078.

With reference to FIG. 20H, record interface 2078 includes cancel affordance 2080, preview 2082, and stop affordance 2084. In some examples, in response to selection of the cancel affordance 2080, the electronic device ceases display of the record interface 2078 and, optionally, terminates the voice shortcut generation process, thereafter returning operation to (e.g., displaying) the application.

In some examples, while displaying the record interface 2078, the electronic device 2000 receives, using an audio input device (e.g., microphone) of the electronic device 2000, a natural-language speech input from a user. In some examples, while receiving the natural-language speech input, the electronic device 2000 provides a live preview of the natural-language speech input, such as the live preview 2082. As shown in FIG. 20H, the live preview 2082 is, in some examples, a visual waveform indicative of one or more auditory characteristics of the natural-language speech input.

In some examples, while receiving the natural-language speech input, the electronic device 2000 performs speech-to-text translation (e.g., natural-language speech processing) on the natural-language speech input to provide a candidate phrase 2086. Because the speech-to-text translation is performed while the natural-language speech input is received, the candidate phrase 2086 may be iteratively and/or continuously updated while the natural-language speech input is received.

In some examples, the electronic device 2000 ensures that the candidate phrase is different than one or more predetermined phrases (e.g., "call 911"). By way of example, the electronic device 2000 determines whether a similarity between the candidate phrase and each of the one or more predetermined phrases exceeds a similarity threshold. If the similarity threshold is not met, the electronic device 2000 will notify the user that the provided candidate phrase is not sufficient and/or not permitted. The electronic device 2000 further may request that the user provide another natural-language speech input.

While displaying the record interface 2078, the electronic device 2000 detects selection of the stop affordance 2084. As shown in FIG. 20I, selection of the stop affordance 2084 is a tap gesture 2088. In response to selection of the stop affordance 2084, the electronic device 2000 displays (e.g., replaces display of the record interface 2078 with), on the display 2001, a completion interface 2090, as shown in FIG. 20J.

The completion interface 2090 includes a completion affordance 2092, cancel affordance 2094, task indicator 2096, application indicator 2098, candidate phrase 2002A, and re-record affordance 2004A. In some examples, in response to selection of the cancel affordance 2094, the electronic device 2000 ceases display of the completion interface 2090 and, optionally, terminates the voice shortcut generation process. In some examples, task indicator 2096 indicates a name and/or type of the task. In some examples, application indicator 2098 identifies the application corresponding to the task. The application indicator may, for instance, include a name of the application and/or an icon associated with the application. Candidate phrase 2002A is a suggested phrase that the user may elect to associate with the task.

In some examples, while displaying the completion interface 2090, the electronic device 2000 detects selection of the completion affordance 2092. As shown in FIG. 20J, selection of the completion affordance 2092 is a tap gesture 2004A. In response to selection of the completion affordance 2092, the electronic device 2000 associates the candidate phrase with the task of the candidate task affordance 2062. By associating the candidate phrase with the task in this manner, the user may provide (e.g., speak) the candidate phrase to a digital assistant of the electronic device to cause the device to perform the task associated with the candidate phrase. Candidate phrases associated with respective tasks may be referred to as voice shortcuts herein. In some examples, further in response to selection of the completion affordance 2092, the electronic device 2000 displays (e.g., replaces display of the completion interface 2090 with), on the display 2001, the application interface 2060, as shown in FIG. 20K. Because the candidate task affordance 2062 has been associated with a candidate phrase, the candidate task affordance 2062 includes a phrase indicator 2006A indicating the candidate phrase that has been associated with the task for the candidate task affordance 2062.

In some examples, a user may provide natural-language inputs using text inputs. The user may, for instance, enable one or more accessibility features that enables text entry in addition to, or in lieu of, speech inputs. In some examples, text inputs may be used to associate tasks with a particular phrase and/or, subsequently, to cause the electronic device to perform one or more tasks associated with the phrase.

By way of example, as described with respect to FIG. 20E, in response to selection of the candidate task suggestion affordance 2062, the electronic device displays (e.g., replaces display of the application interface 2060 with), on the display 2001, a task-specific interface. As shown in FIG. 20L, in response to detecting a tap gesture (e.g., tap gesture 2064), the electronic device 2000 displays the task-specific interface 2008A. The task-specific interface 2008A may be associated with a task of the candidate task affordance 2062 (e.g., Order large latte).

Task-specific interface 2008A includes task indicator 2010A, application indicator 2012A, candidate phrase 2014A, and text entry affordance 2016A. In some examples, task indicator 2010A indicates a name and/or type of the task. In some examples, task indicator 2010A includes a description of the task and/or indicates that a user may record a command or phrase to be linked with the task. In some examples, application indicator 2012A identifies an application corresponding to the task. The application indicator 2012A may, for instance, include a name of the application and/or an icon associated with the application. Candidate phrase 2014A includes a suggested phrase that the user may elect to associate with the task.

While displaying the task-specific interface 2008A, the electronic device 2000 detects selection of the text entry affordance 2016A. As shown in FIG. 20L, selection of the text entry affordance 2016A is a tap gesture 2018A. In contrast to selection of the record affordance 2074 (FIG. 20F), the electronic device 2000, in response to selection of the record affordance 2074, displays (e.g., replaces display of the task-specific interface 2008A with), on the display 2001, a text entry interface 2020A.

With reference to FIG. 20M, text entry interface 2020A includes cancel affordance 2022A, preview 2024A, and completion affordance 2026A. In some examples, in response to selection of the cancel affordance 2022A, the electronic device 2000 ceases display of the text entry interface 2020A and, optionally, terminates the shortcut generation process, thereafter returning operation to (e.g., displaying) the application.

In some examples, while displaying the text entry interface 2020A, the electronic device 2000 receives, using a text entry device (e.g., keyboard, soft keyboard) of the electronic device 2000, a natural-language text input from a user. In some examples, while receiving the natural-language text input, the electronic device 2000 provides a preview of the natural-language text input, such as the preview 2024A, displaying text the user has entered at a given time.

In some examples, the electronic device 2000 ensures that the candidate phrase is different than one or more predetermined phrases (e.g., "call 911"). By way of example, the electronic device 2000 determines whether a similarity between the phrase and each of the one or more predetermined phrases exceeds a similarity threshold. If the similarity threshold is not met, the electronic device 2000 will notify the user that the provided candidate phrase is not sufficient and/or not permitted. The electronic device 2000 further may request that the user provide another natural-language text input.

While displaying the text entry interface 2020A, the electronic device 2000 detects selection of the completion affordance 2026A. As shown in FIG. 20M, selection of the completion affordance 2026A is a tap gesture 2028A. In response to selection of the completion affordance 2026A, the electronic device 2000 displays (e.g., replaces display of the text entry interface 2020A with), on the display 2001, a completion interface 2028A, as shown in FIG. 20N.

The completion interface 2028A includes a completion affordance 2030A, cancel affordance 2032A, task indicator 2034A, application indicator 2036A, phrase 2038A, and reentry affordance 2040A. In some examples, in response to selection of the cancel affordance 2032A, the electronic device 2000 ceases display of the completion interface 2030A and, optionally, terminates the shortcut generation process. In some examples, task indicator 2034A indicates a name and/or type of the task. In some examples, application indicator 2036A identifies the application corresponding to the task. The application indicator may, for instance, include a name of the application and/or an icon associated with the application. Phrase 2038A is the phrase entered by the user during display of the text entry interface 2020A that the user may elect to associate with the task.

In some examples, while displaying the completion interface 2028A, the electronic device 2000 detects selection of the completion affordance 2030A. As shown in FIG. 20N, selection of the completion affordance 2030A is a tap gesture 2042A. In response to selection of the completion affordance 2030A, the electronic device 2000 associates the phrase 2038A with the task of the candidate task affordance 2062. By associating the phrase 2038A with the task in this manner, the user may provide (e.g., textually input) the phrase to a digital assistant of the electronic device to cause the device to perform the task associated with the phrase. In some examples, further in response to selection of the completion affordance 2030A, the electronic device 2000 displays (e.g., replaces display of the completion interface 2028A with), on the display 2001, the application interface 2060, as shown in FIG. 20K. Because the candidate task affordance 2062 has been associated with a phrase, the candidate task affordance 2062 includes a phrase indicator 2006A indicating the phrase that has been associated with the task for the candidate task affordance 2062.

FIGS. 21A-21F illustrate exemplary user interfaces for performing a task using a digital assistant, in accordance with some embodiments. The user interfaces in these figures are used to illustrate the processes described below, including the processes in FIGS. 11A-B.

Generally, user interfaces described with reference to FIGS. 21A-21E may be employed such that a user can associate tasks with respective user-specific phrases. These phrases may in turn be used to cause the electronic device to perform the associated tasks.

Figure 21A:
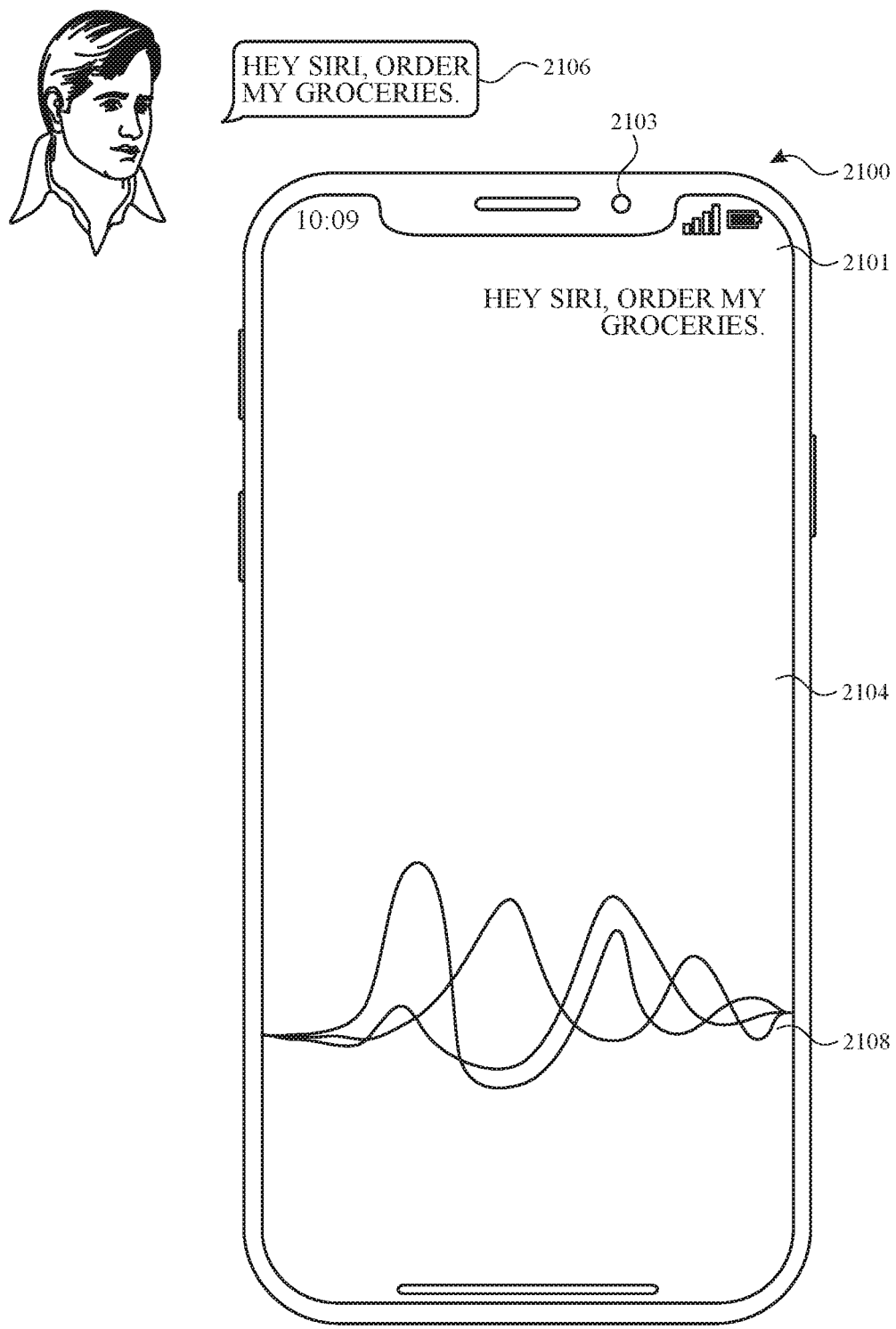
FIGS. 21A-21F illustrate exemplary user interfaces for performing a task using a digital assistant, according to various examples.

FIG. 21A illustrates an electronic device 2100 (e.g., device 104, device 122, device 200, device 600, or device 700). In the non-limiting exemplary embodiment illustrated in FIGS. 21A-21E, electronic device 2100 is a smartphone. In other embodiments, electronic device 2100 can be a different type of electronic device, such as a wearable device (e.g., a smartwatch). In some examples, electronic device 2100 has a display 2101, one or more input devices (e.g., touchscreen of display 2101, a button, a microphone), and a wireless communication radio. In some examples, the electronic device 2100 includes a plurality of cameras. In some examples, the electronic device includes only one camera. In some examples, the electronic device includes one or more biometric sensors (e.g., biometric sensor 2103) which, optionally, include a camera, such as an infrared camera, a thermographic camera, or a combination thereof.

In FIG. 21A, the electronic device 2100 displays, on display 2101, a digital assistant interface (e.g., conversational interface), such as the digital assistant interface 2104. While displaying the digital assistant interface 2104, the electronic device 2100 receives (e.g., obtains, captures) a natural-language input 2106 (e.g., "Hey Siri, order my groceries."). In some examples, the natural-language input 2106 is a natural-language speech input received, for instance, using an input device of the electronic device (e.g., microphone). As shown in FIG. 21A, in some examples in which the natural-language input 2106 is a natural-language speech input, the digital assistant interface optionally includes a preview 2108 (e.g., live preview) of the natural-language input 2106.

Figure 21B:
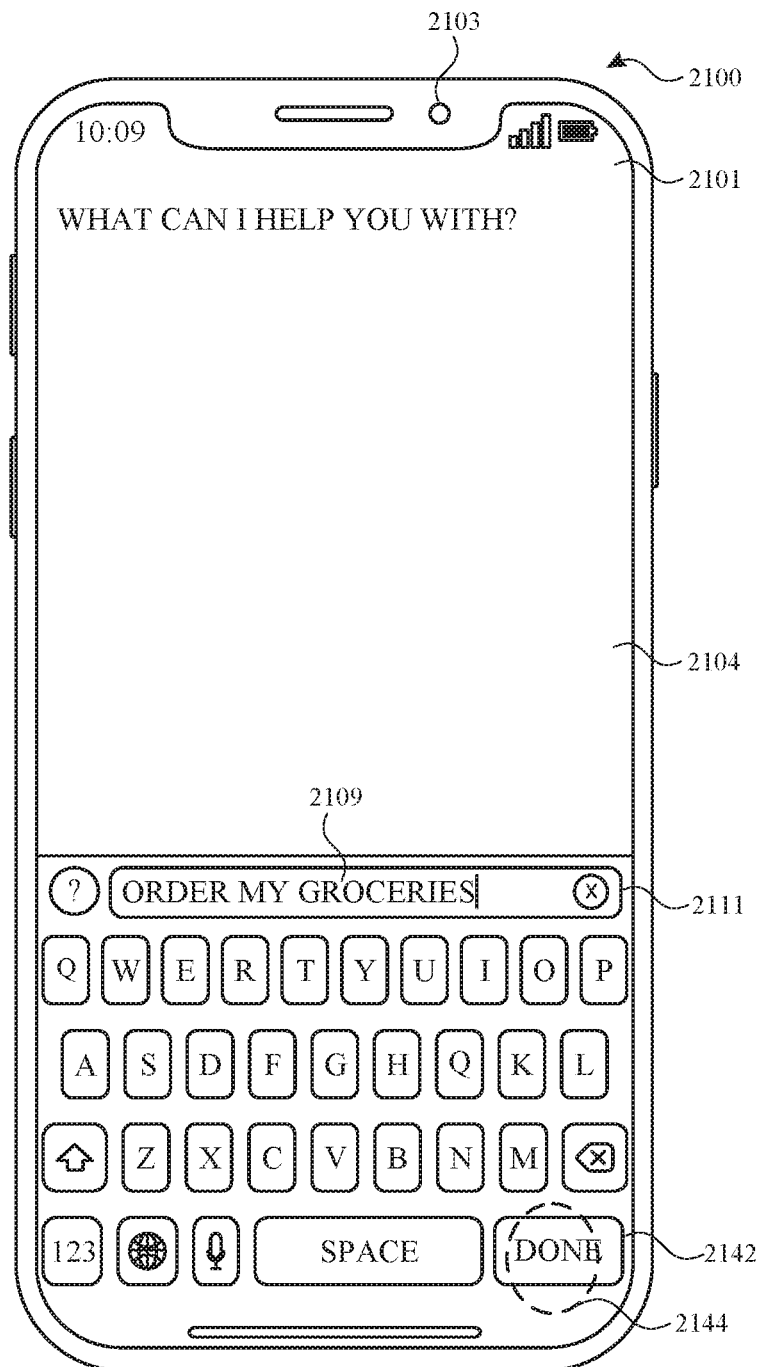

In other examples, the natural-language input 2106 is a text input, such as the natural-language text input 2109 of FIG. 21B. In some examples, a text field 2111 is displayed in response to selection of a text entry affordance, and a user may enter the natural-language text input 2109 in the text field 2111. Thereafter, a user may confirm entry of the natural-language text input 2109 for instance, by selecting a submit affordance 2142. A user may select the submit affordance 2142 using a tap gesture 2144 in some examples.

In some examples, in response to the natural-language input, the electronic device 2100 performs a task. By way of example, as described with reference to FIG. 14, the electronic device 2100 may determine whether the natural-language input matches a predetermined phrase, and if so, perform a task corresponding to the phrase. If the task does not corresponding to the phrase, natural-language processing may be used to determine a task associated with the natural-language input, and the electronic device 2100 may perform the task.

In some examples, prior to performing the task, the electronic device 2100 provides an output, such as the output 2132. In some examples, the output 2132 is a natural-language output (e.g., natural-language speech output, natural-language text output) and includes information associated with the task. By way of example, the output 2132 may indicate that the electronic device is initiating performance of the task (e.g., "I'll handle that now"), and/or that the task requires confirmation (e.g., "You'll need to confirm."). In some examples, the output 2132 further may request confirmation from the user (e.g., "Ready to order?"). The user may confirm the task using any form of user input, including a speech input or a touch input.

In some examples, performing a task may include causing an application to perform the task. Accordingly, in some examples, prior to performing the task, the electronic device 2100 identifies an application to perform the task and confirms that the application is capable of performing the task. Optionally, in response to the confirmation, the electronic device receives, from the application, a response indicating whether the application can successfully perform the task. In some examples, the response provided by an application includes a natural-language expression that may in turn be included in an output. In this manner, the application, by way of the digital assistant, may indicate whether the application is capable of performing the task and/or provide additional information about performance of the task to a user. In the example illustrated in FIG. 21C, for instance, the electronic device 2100 provides the output 2132 including a natural language expression 2134 received from the Grocery Store application (e.g., "It will be $58.31").

Figure 21C:
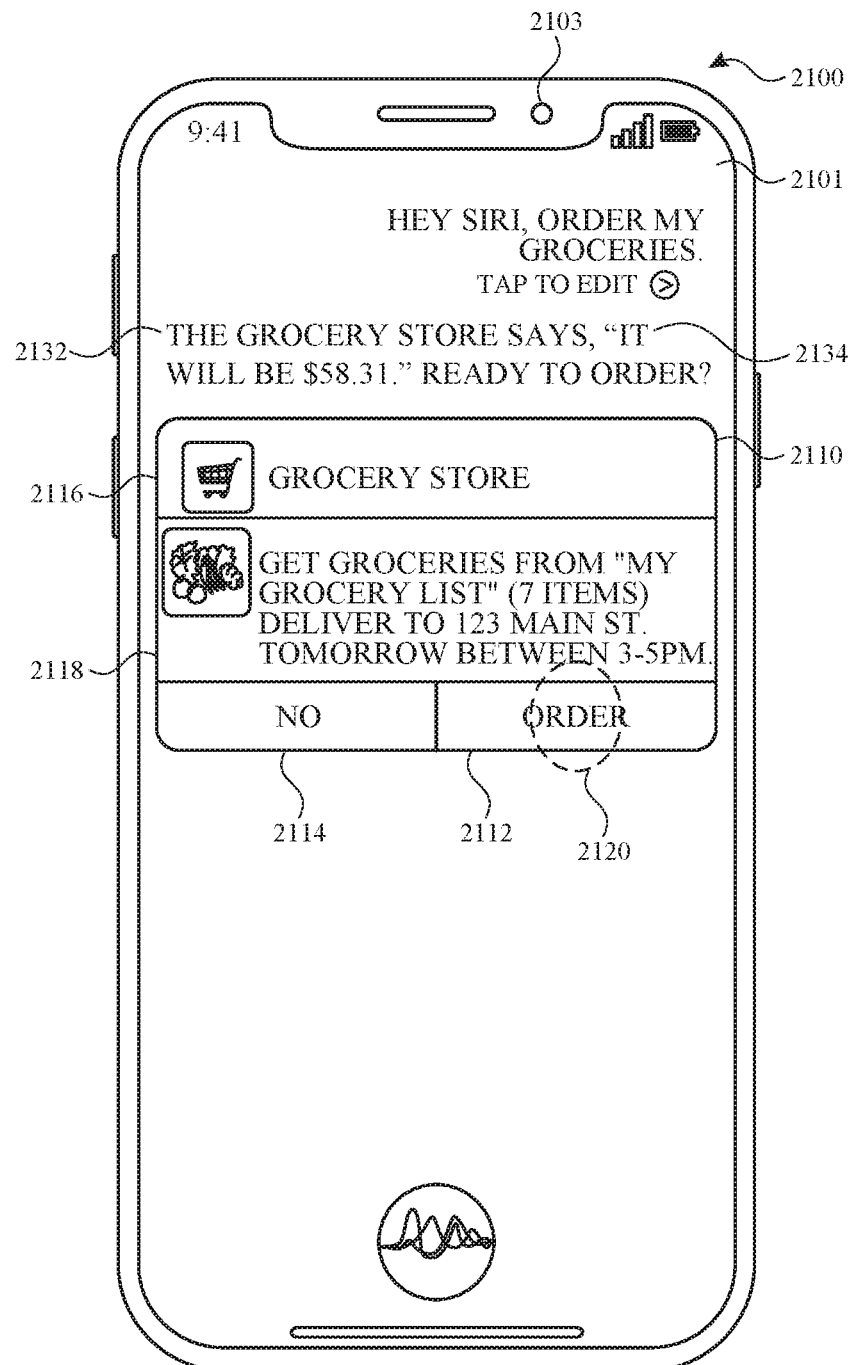

In some examples, the electronic device 2100 can display a confirmation interface, such as the confirmation interface 2110, to request confirmation. The confirmation interface 2110 includes a confirmation affordance 2112, a cancel affordance 2114, and an application affordance 2116. The confirmation interface further may include content 2118 associated with the task. In some examples, selection of the cancel affordance 2114 causes the electronic device 2100 to cease display of the confirmation interface 2110 and/or forgo performing the identified task. In some examples, selection of the application affordance 2116 causes the electronic device 2100 to open an application associated with the task. As described, opening the application in this manner may cause the application to be preloaded with one or more parameters associated with the task. Content 2118 may include information directed to the task, such as one or more parameters to be used to perform the task. As illustrated in FIG. 21C, for instance, content 2118 may specify that the task is directed to ordering a set of grocery items included in the group "My Grocery List", the number of items to be ordered, a delivery address, and a time window in which the delivery is to be made. Optionally, confirmation interface 2110 includes an icon (e.g., image, GIF) associated with the application of the task to help a user more readily identify the application performing the task.

Figure 21D:
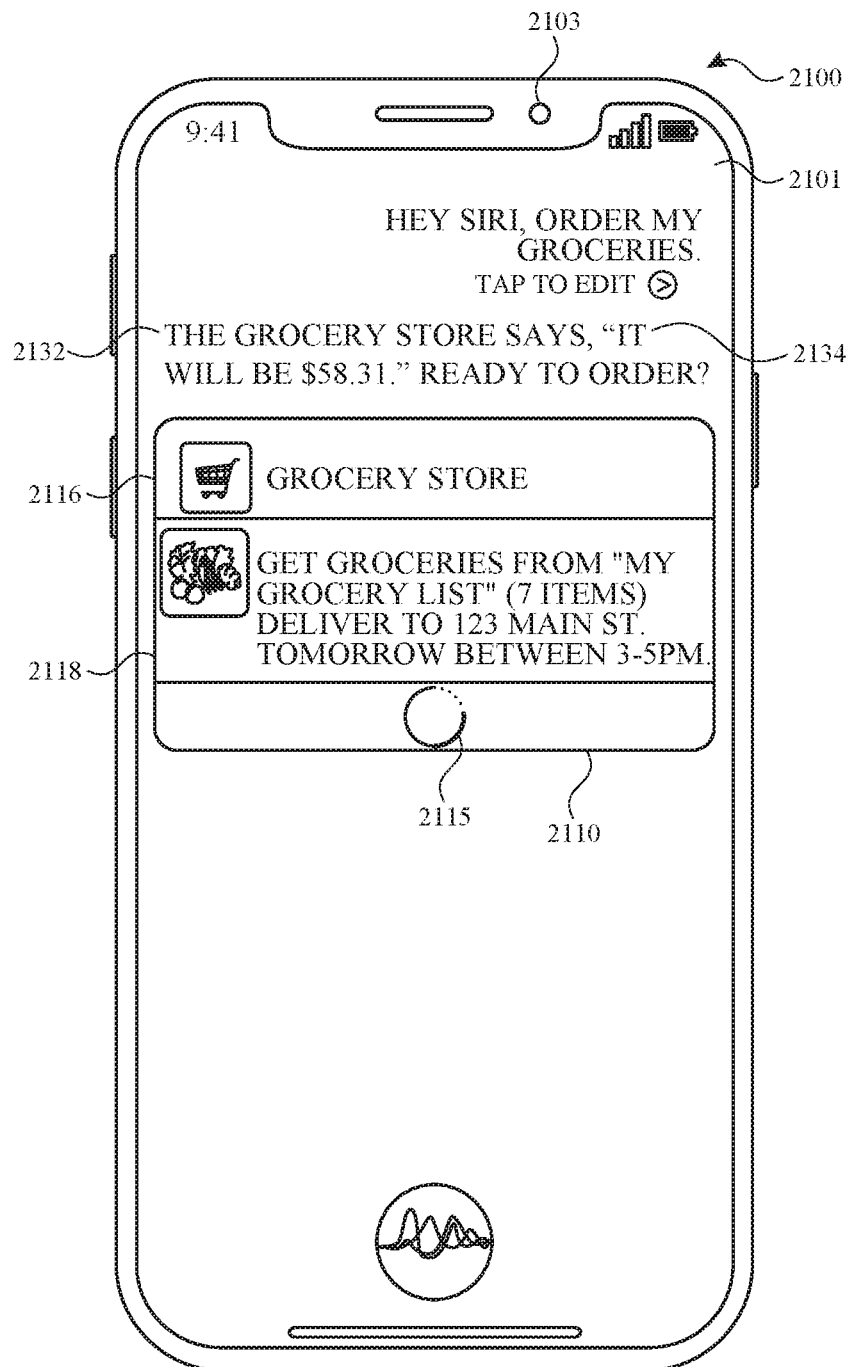

In some examples, in response to selection of the confirmation affordance 2112, for instance by user input 2120, the electronic device 2100 performs the task. As illustrated in FIG. 21D, in some examples, while the electronic device is performing the task, the electronic device 2100 displays a progress indicator 2115 indicating that the task is being performed. In some examples, display of the progress indicator 2115 replaces display of the confirmation affordance 2112 and the cancel affordance 2114.

Figure 21E:
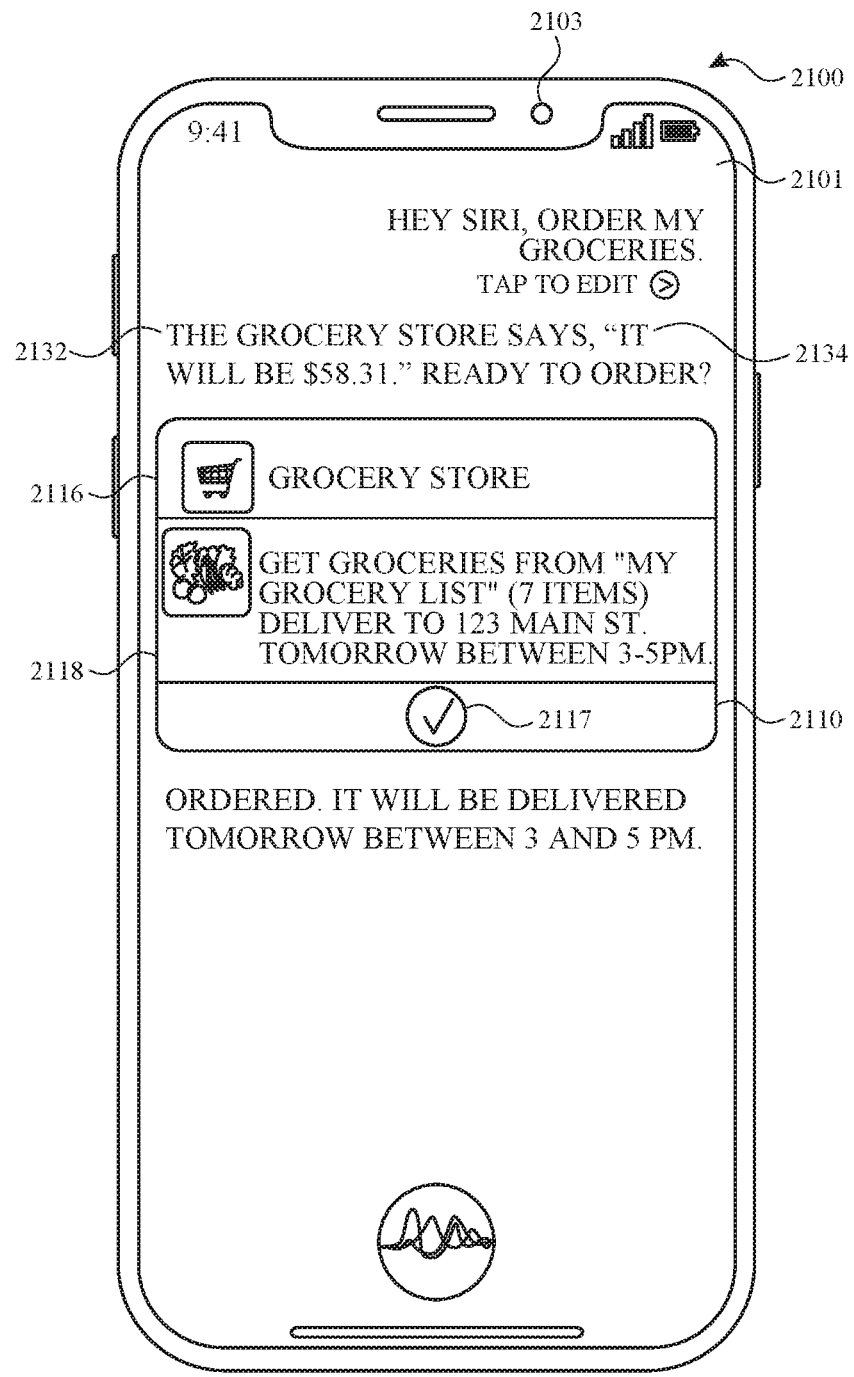

Once task has been performed, the electronic device 2100 provides an output indicating whether the task was performed successfully. In the example of FIG. 21E, the task is performed successfully, and as a result, the electronic device 2100 displays a success indicator 2117, indicating that the task was successfully performed. In some examples, display of the success indicator 2117 replaces display of the progress indicator 2115.

Figure 21F:
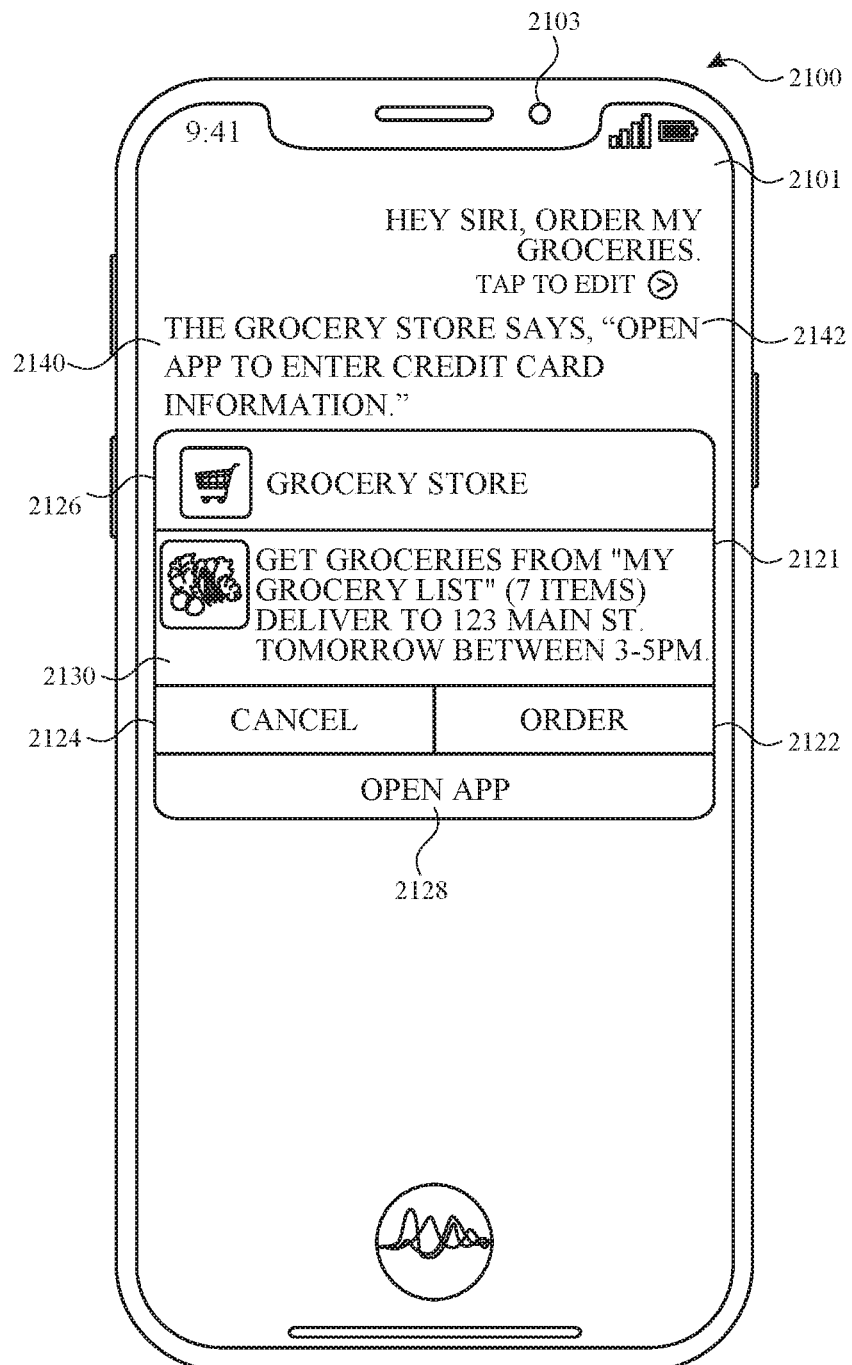

In the example of FIG. 21F, the task is not performed successfully, and as a result, the electronic device displays failure interface 2121. The failure interface 2121 includes a retry affordance 2122, a cancel affordance 2124, and application affordances 2126, 2128. The failure interface further includes content 2130. In some examples, selection of the retry affordance 2122 causes the electronic device 2100 to perform the task again. In some examples, selection of the cancel affordance causes the electronic device 2100 to cease display of the failure interface 2120. In some examples, selection of either the application affordance 2126 or application affordance 2128 causes the electronic device 2100 to open an application associated with the task. As described, opening the application in this manner may cause the application to be preloaded with one or more parameters associated with the task. Content 2130 may include information directed to the task, such as one or more parameters used to perform the task. In some examples, content 2130 is the same content as content 2118. In some examples, content 2130 is different than content 2118. Content 2130 may, for example, indicate that the electronic device failed to perform the task successfully (e.g., "There was a problem. Please try again.").

In some examples, after causing an application to perform a task, the electronic device 2100 receives a response from the application indicating whether the task was performed successfully. In some examples, the response provided by an application optionally includes a natural-language expression that may in turn be used by the electronic device 2100 to indicate whether a task was successfully performed and/or provide additional information, from the application, to a user. In the example illustrated in FIG. 21F, the electronic device 2100 receives a response from the Grocery Store application including the natural-language expression 2142 (e.g., "Open app to enter credit card information"), which is in turn provided in the output 2140 (e.g., "The Grocery Store says 'Open app to enter credit card information'").

Figure 22A:
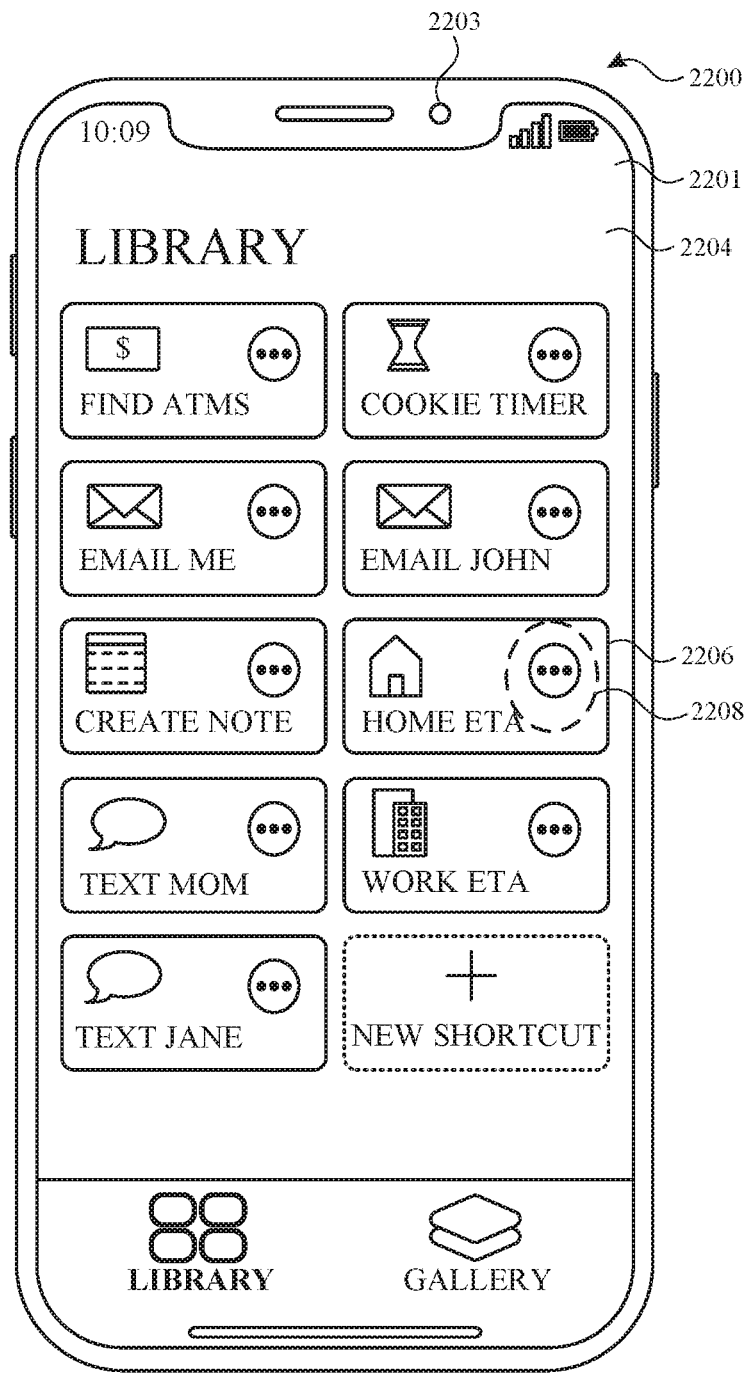
FIGS. 22A-22O illustrate exemplary user interfaces for performing a set of tasks using a digital assistant, according to various examples.
Figure 22B:
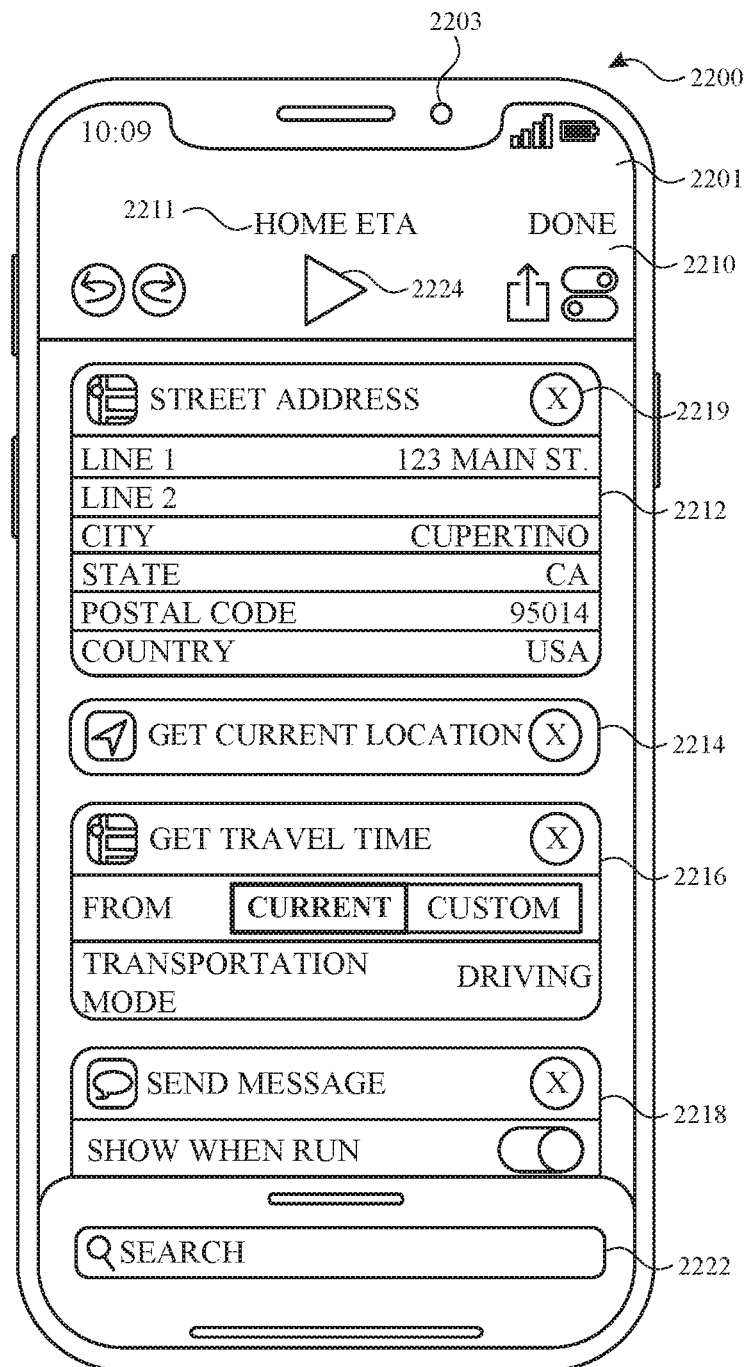
Figure 22C:
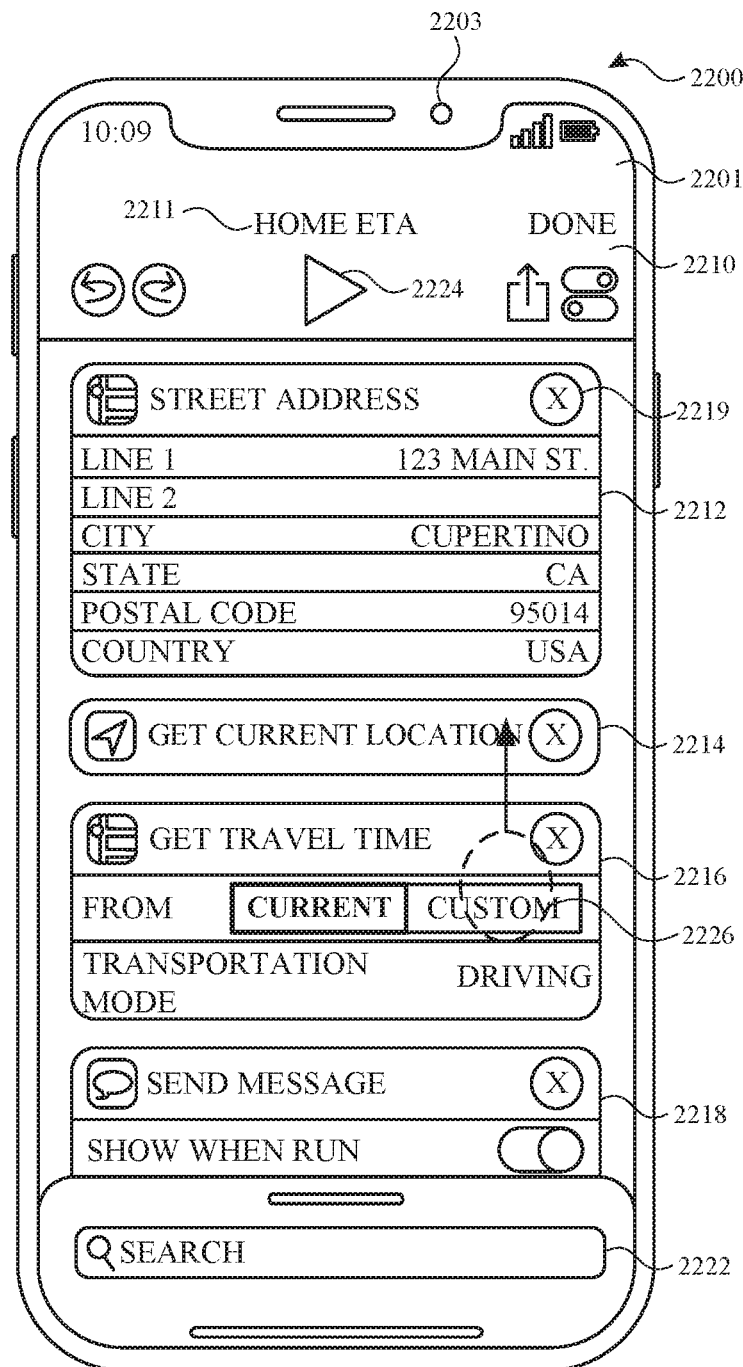
Figure 22D:
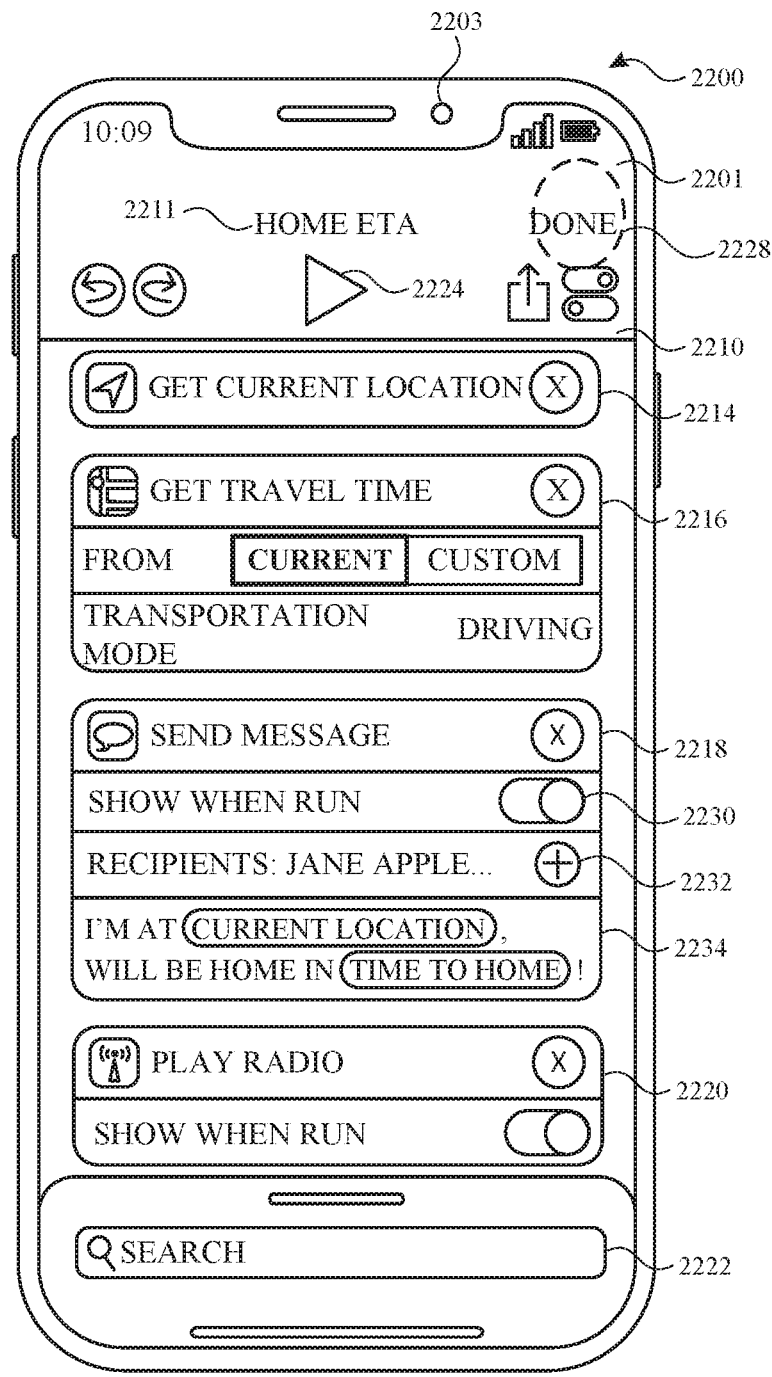
Figure 22E:
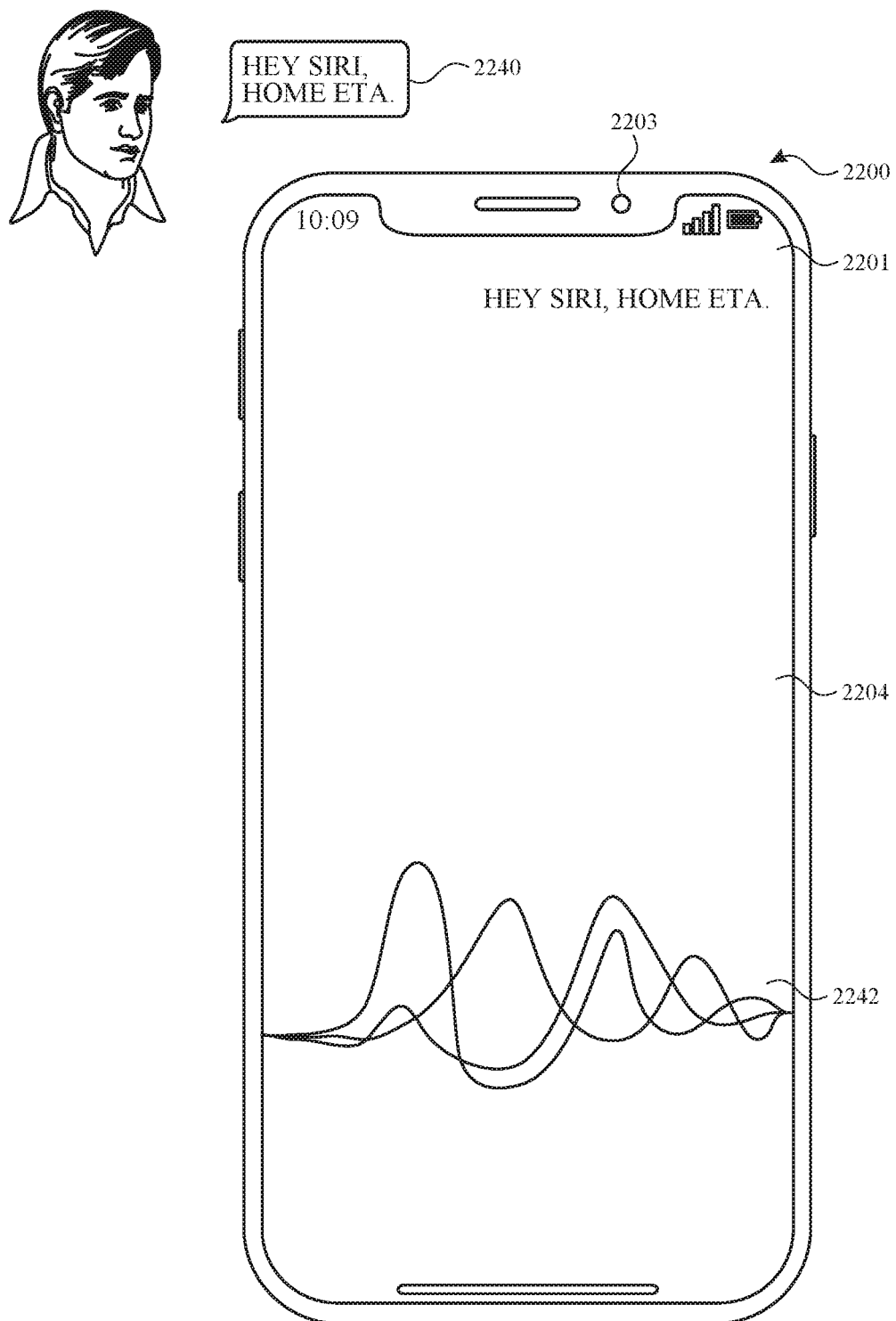
Figure 22F:
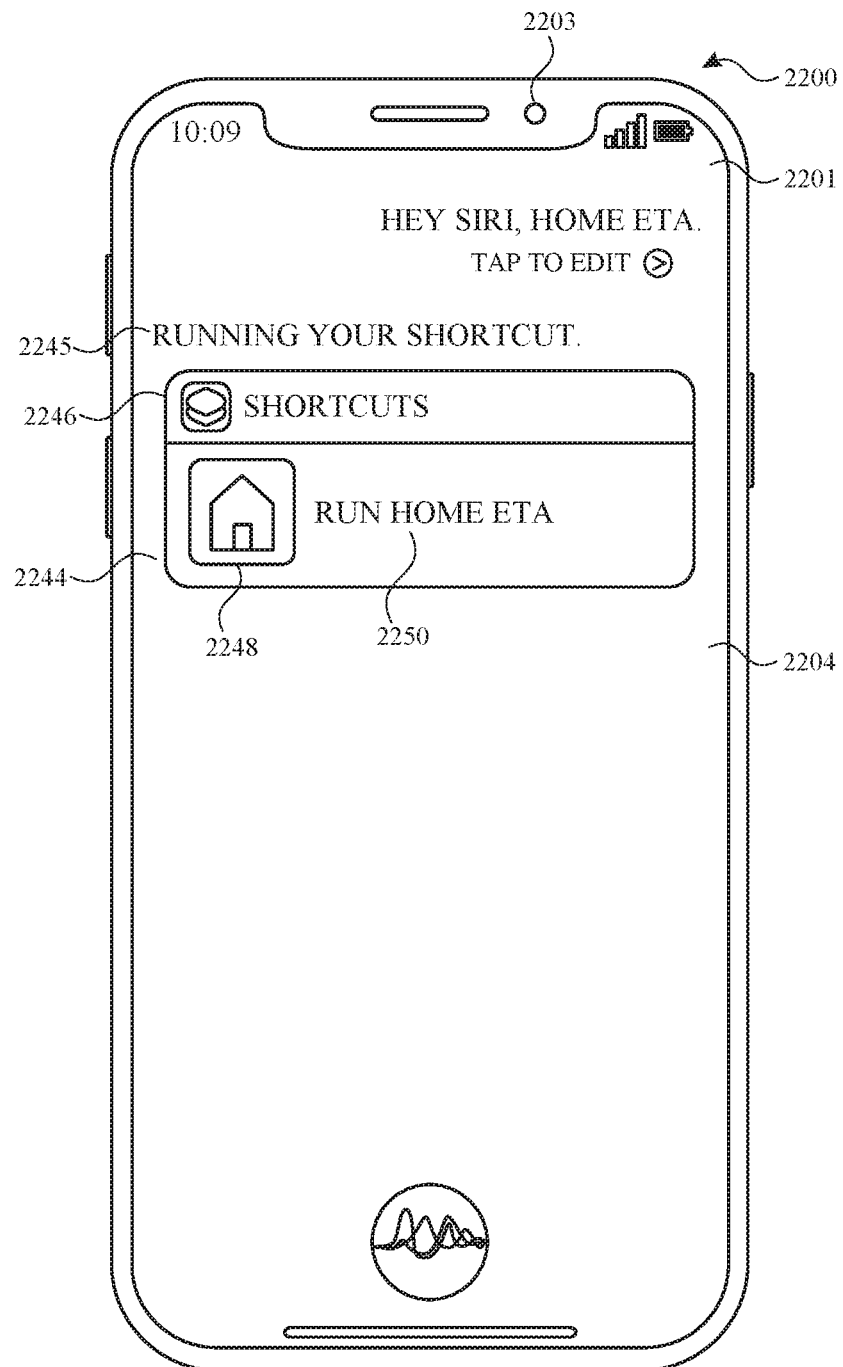
Figure 22G:
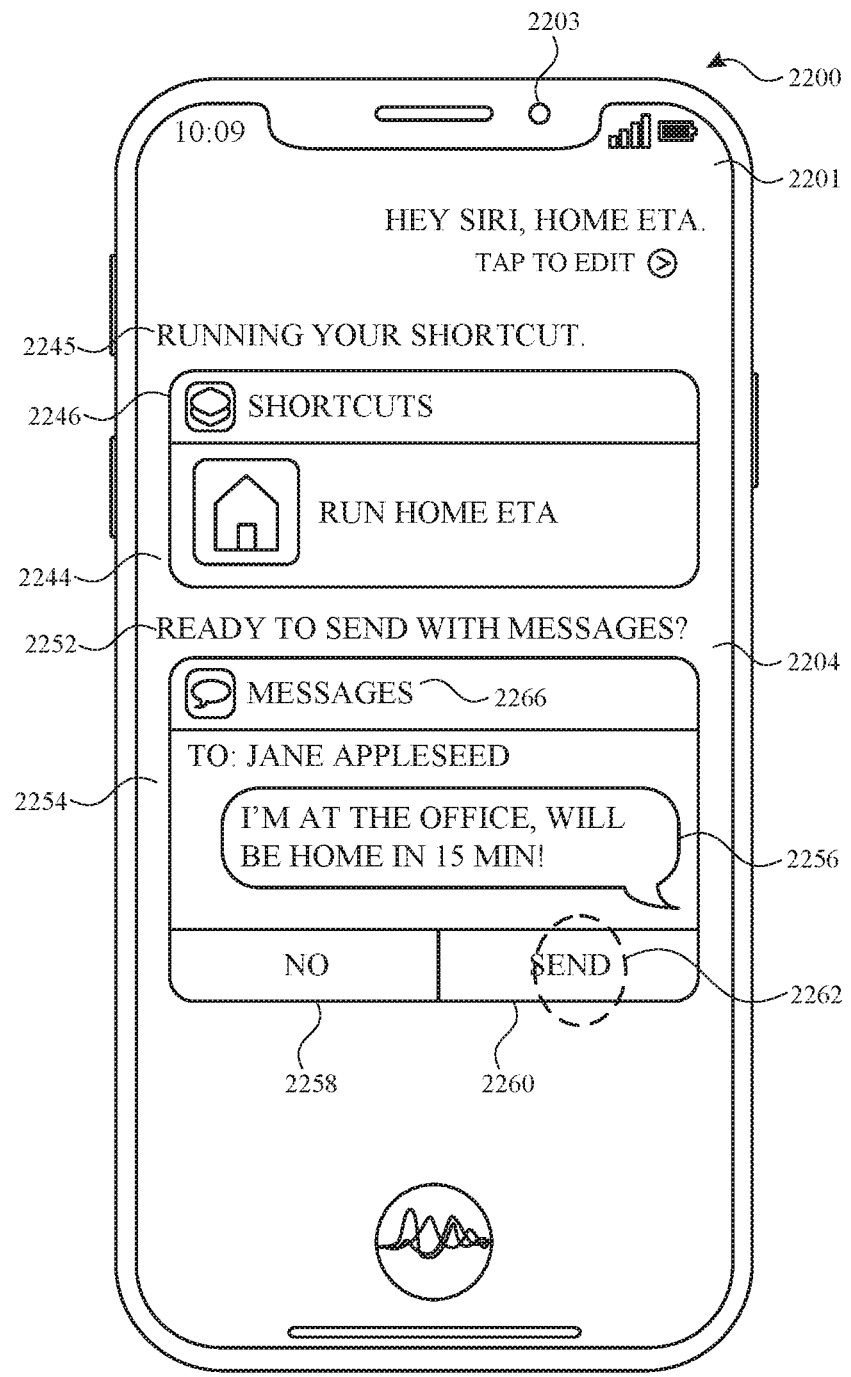
Figure 22H:
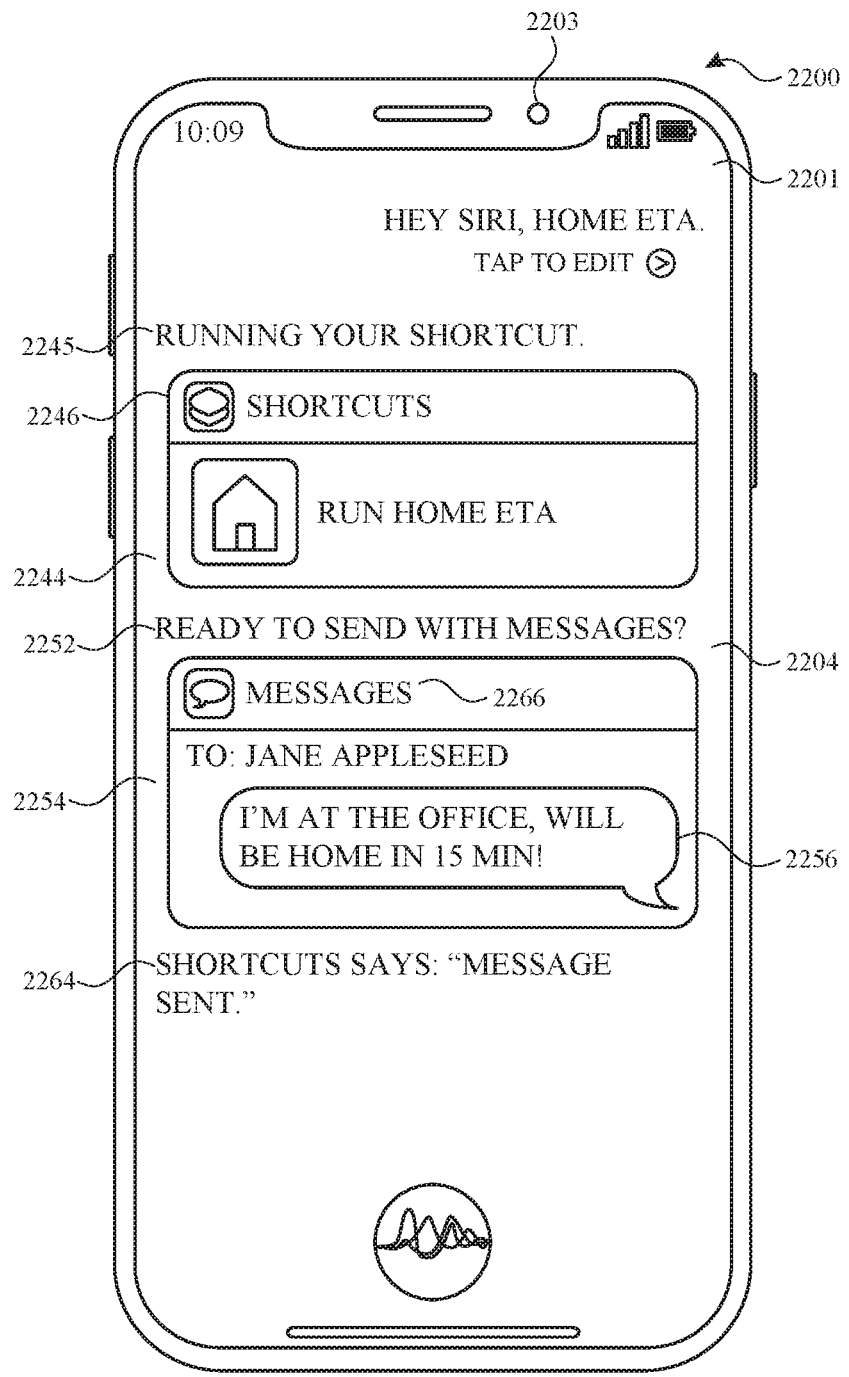
Figure 22I:
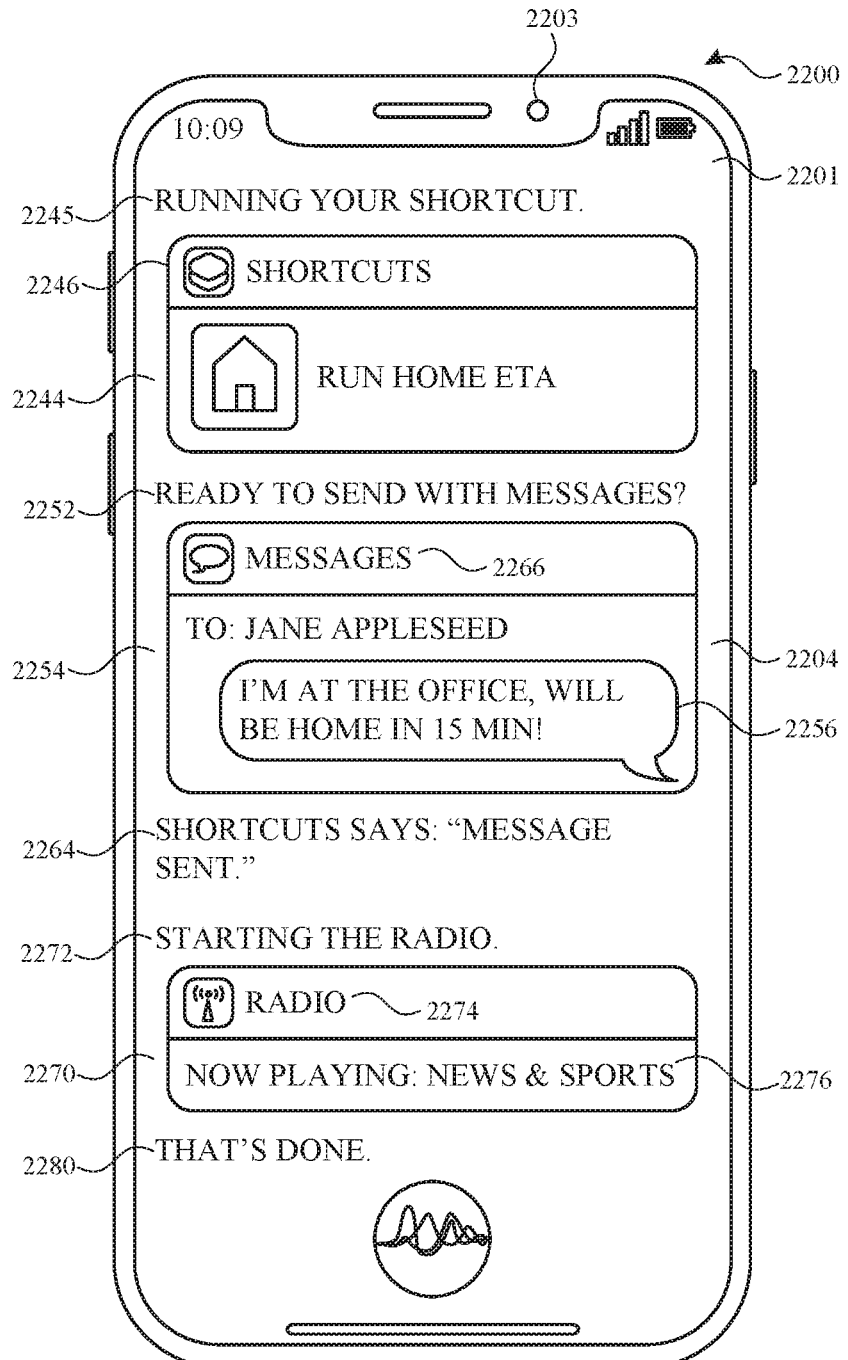
Figure 22J:
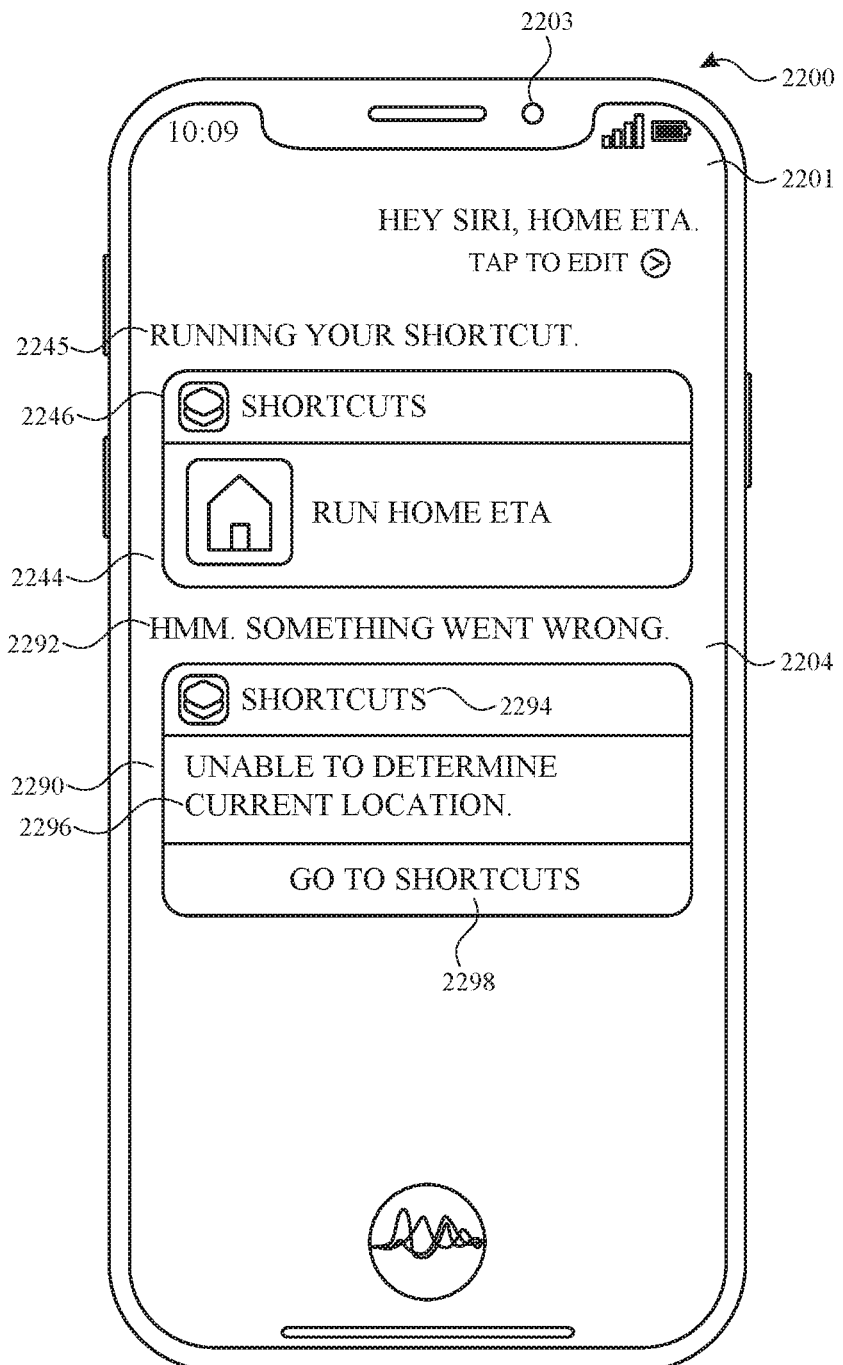
Figure 22K:
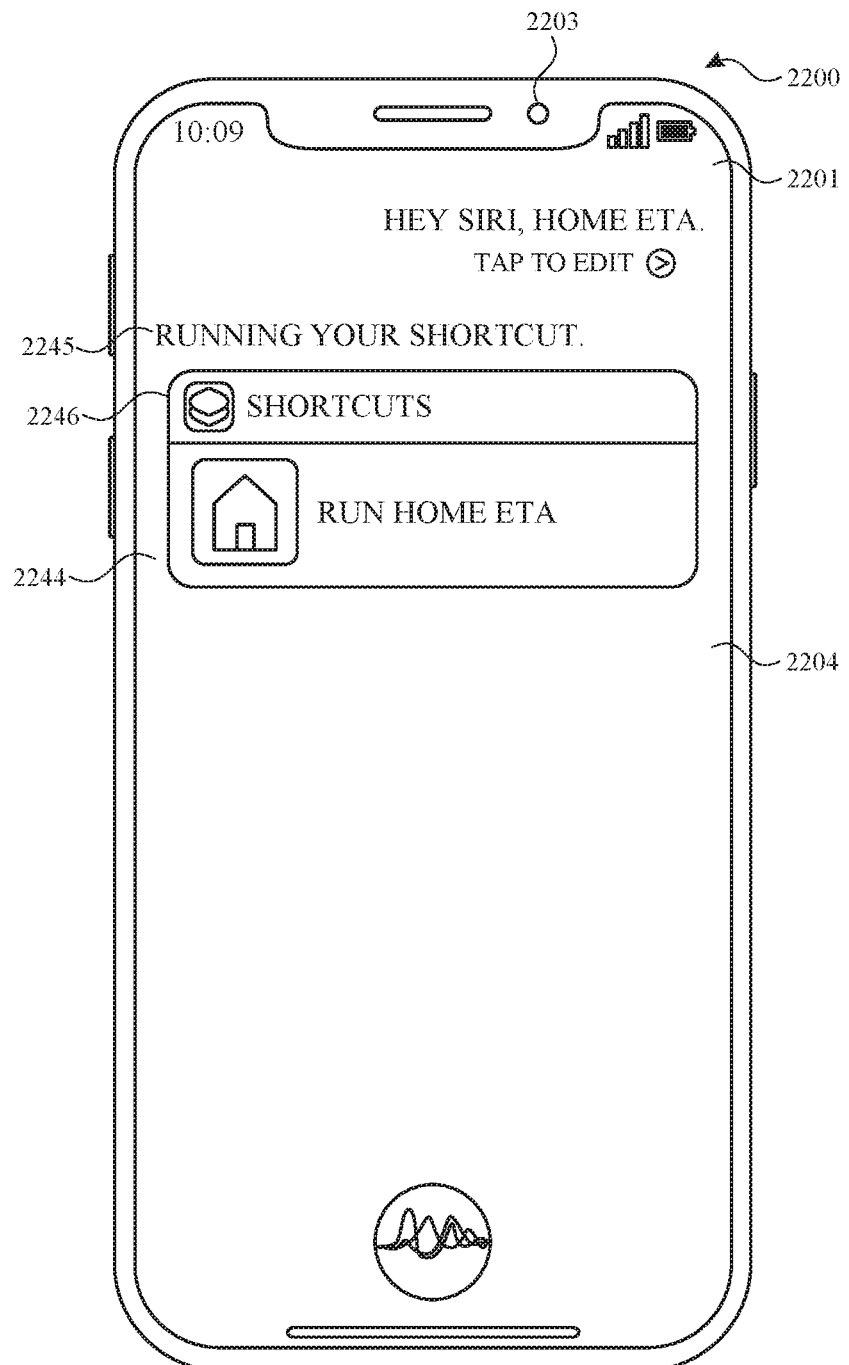
Figure 22L:
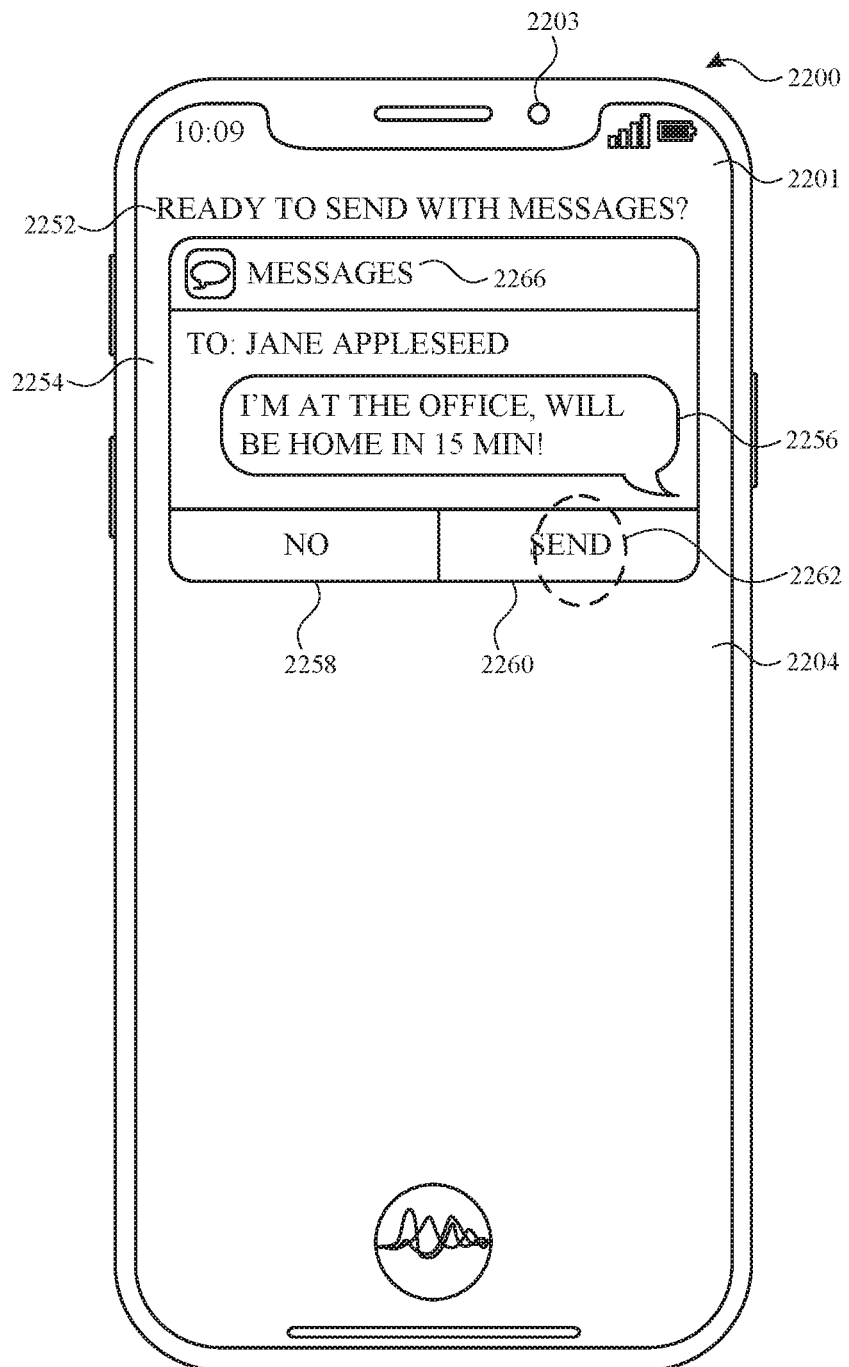
Figure 22M:
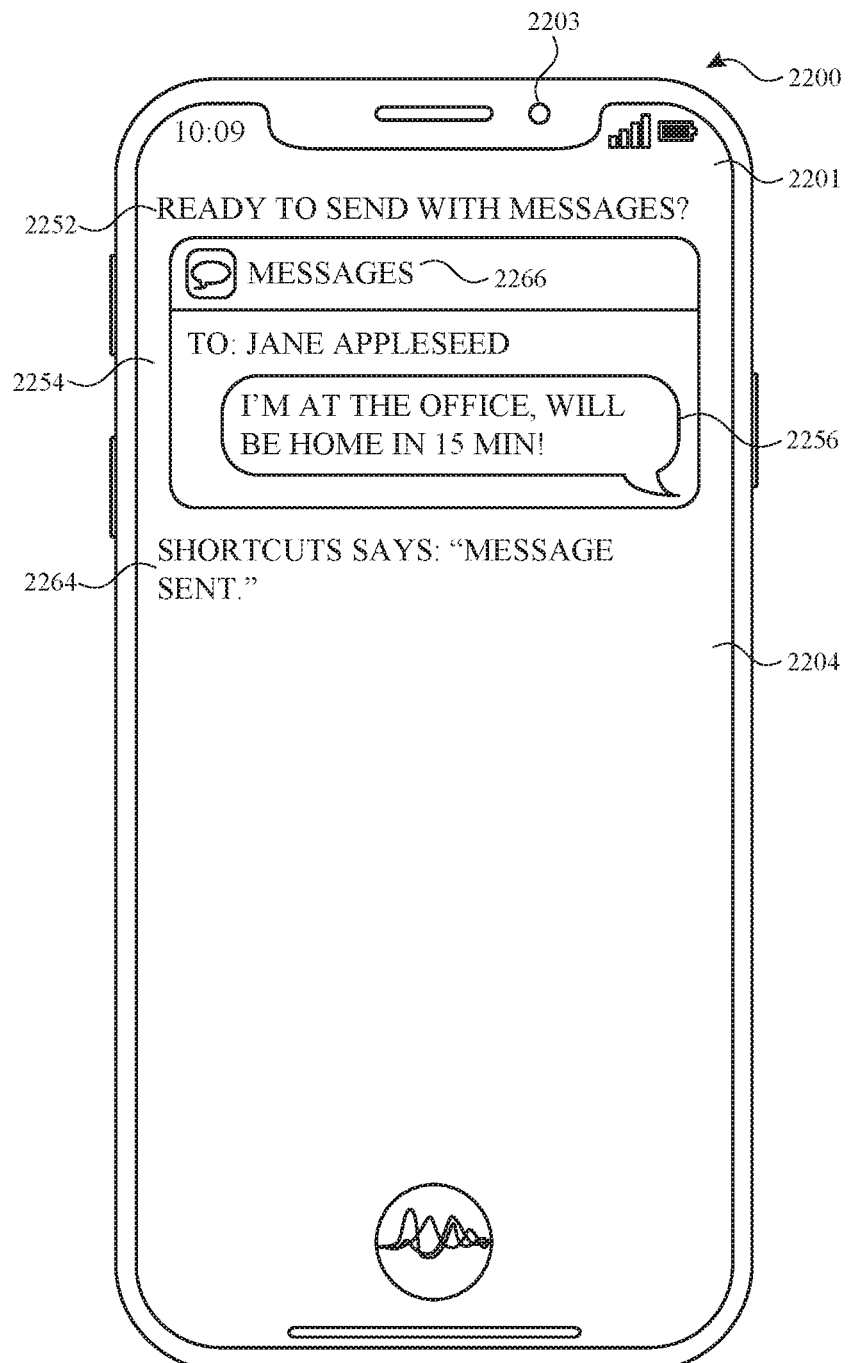
Figure 22N:
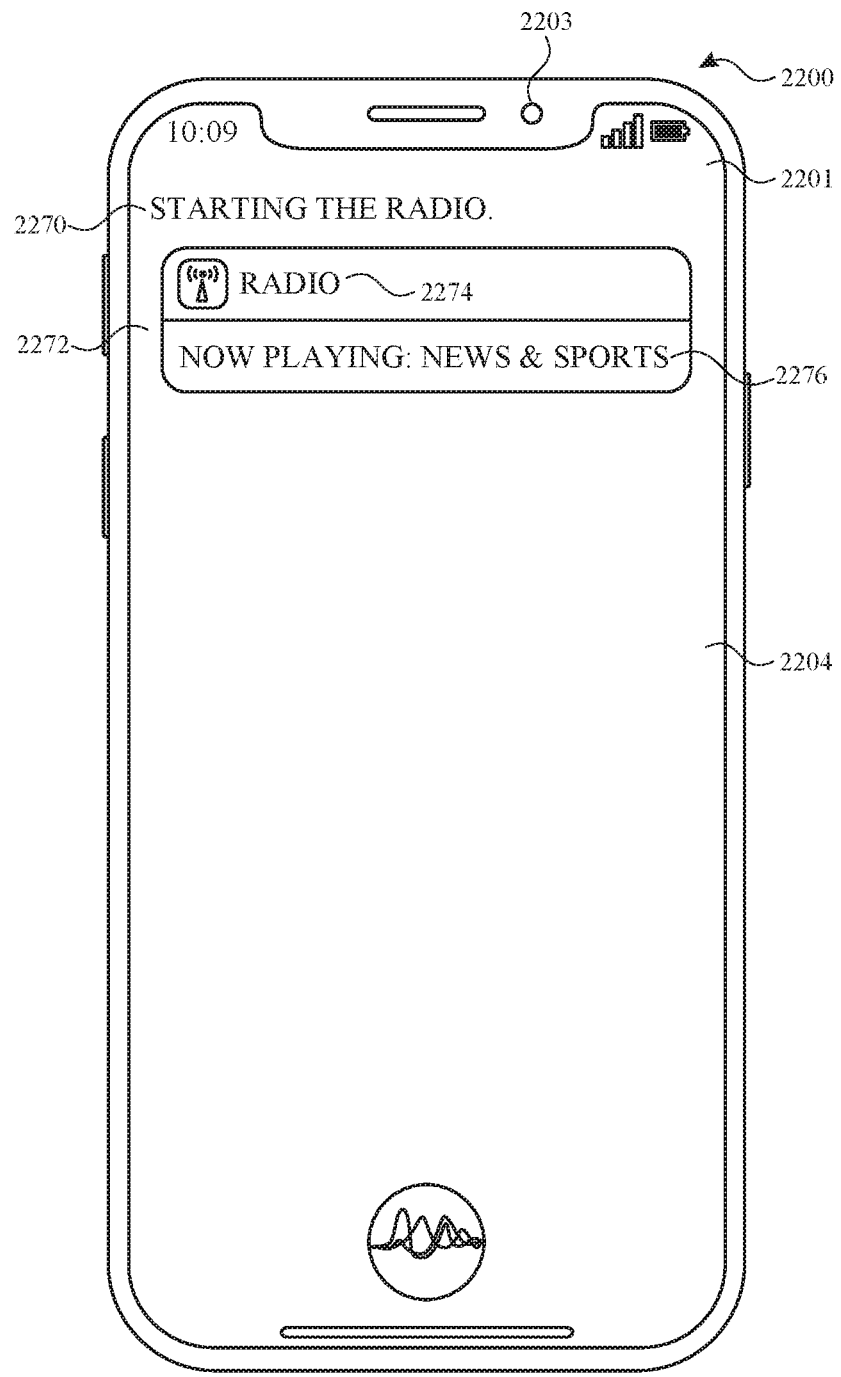
Figure 22O:
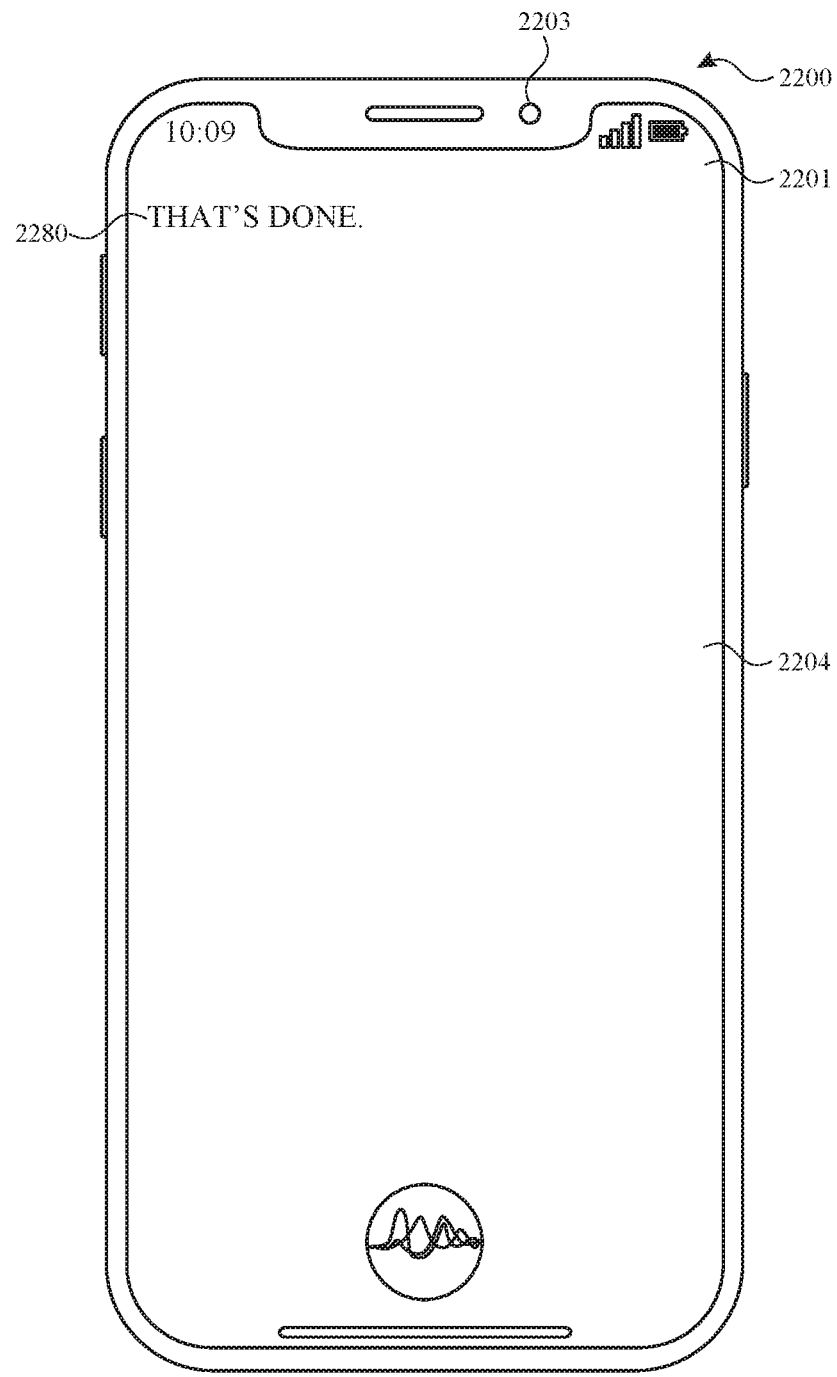

FIGS. 22A-22O illustrate exemplary user interfaces for performing a set of tasks on an electronic device (e.g., device 104, device 122, device 200, device 600, device 700), in accordance with some embodiments. The user interfaces in these figures are used to illustrate the processes described below, including the processes in FIG. 23.

FIG. 22A illustrates an electronic device 2200 (e.g., device 104, device 122, device 200, device 600, or device 700). In the non-limiting exemplary embodiment illustrated in FIGS. 22A-22O, electronic device 2200 is a smartphone. In other embodiments, electronic device 2200 can be a different type of electronic device, such as a wearable device (e.g., a smartwatch). In some examples, electronic device 2200 has a display 2201, one or more input devices (e.g., touchscreen of display 2201, a button, a microphone), and a wireless communication radio. In some examples, the electronic device 2200 includes a plurality of cameras. In some examples, the electronic device includes only one camera. In some examples, the electronic device includes one or more biometric sensors (e.g., biometric sensor 2203) which, optionally, include a camera, such as an infrared camera, a thermographic camera, or a combination thereof.

In FIG. 22A, the electronic device 2200 displays, on display 2201, an application interface 2204. The application interface 2204 may correspond to a task management application in some examples. As shown, the application interface 2204 includes a plurality of shortcut affordances, each of which may correspond to a respective set of tasks. By way of example, the application interface 2204 includes a shortcut affordance "Find ATMs", "Create Note", "Email me", "Text Mom", "Text Jane", "Cookie Timer", "Email John", "Home ETA", and "Work ETA".

In some examples, while displaying the application interface 2204, the electronic device 2200 detects selection of a shortcut affordance, such as shortcut affordance 2206 ("Home ETA"). As shown in FIG. 22A, the selection of the shortcut affordance 2206 is a tap gesture 2208. In some examples, in response to selection of the shortcut affordance 2206, the electronic device 2200 displays (e.g., replaces display of the application interface 2204 with), on the display 2001, shortcut-specific interface 2210, as shown in FIG. 22B.

Shortcut-specific interface 2210 includes shortcut indicator 2211, parameter 2212, tasks 2214-2218, search field 2222, and execute affordance 2224. In some examples, shortcut indicator 2211 indicates a name of the shortcut. In some examples, tasks 2214-2218 are tasks associated with the shortcut of the shortcut-specific interface 2210, and parameter 2212 is a parameter for a task, such as the task 2216. In some examples, the order in which each of the tasks are shown indicates the sequence in which the tasks are performed when the shortcut is performed. In some examples, each of the tasks includes a delete affordance 2219, which when selected, causes the corresponding task to be removed (e.g., deleted) from the shortcut.

In some examples, tasks may be added to a shortcut. By way of example, a user may input text into the search field 2222 to search for one or more tasks that may be associated with the shortcut. The user may thereafter set and/or adjust one or more parameter values for the task, as described below.

In some examples, a user may modify the sequence of tasks associated with a shortcut. By way of example, while displaying the shortcut-specific interface 2210, the electronic device detects a selection of a task (e.g., with a touch gesture) and displacement of the task on the display 2201 (e.g., using a swipe gesture on the display 2201). Accordingly, a user may "drag and drop" tasks in the shortcut-specific interface to reorder the set of tasks.

In some examples, while displaying the shortcut-specific interface 2210, the electronic device 2200 detects a swipe gesture on the display 2201, such as the swipe gesture 2226 of FIG. 22C. As shown in FIG. 22D, in response to the swipe gesture 2226, the electronic device 2200 slides the shortcut-specific interface 2210 in a direction corresponding to the swipe gesture 2226 (e.g., upward) to display (e.g., reveal) a portion of the shortcut-specific interface 2210 including one or more additional tasks (e.g., task 2220).

In some examples, tasks are performed according to one or more parameters associated with the task, and in some examples, parameter values may assigned using the shortcut-specific interface 2210. By way of example, for the task 2216 in which a travel time is determined, the user may specify a street address value for the parameter 2212 that is to be used as a destination address when determining a travel time. In some examples, because a destination address is required to determine a travel time, the electronic device 2200 may automatically include parameter 2212 in the shortcut-specific interface 2210 in response to addition of the task 2216 to the shortcut-specific interface 2210. As another example, a user may specify that a dynamic value (e.g., "current location") as a source address when determining a travel time. As yet another example, a user may specify one or more recipients for a task to send a message, for instance, by selecting the recipient affordance 2232.

In some examples, settings for a task may be configured using the shortcut-specific interface 2210. For instance, when performing particular tasks, the electronic device 220 displays an interface (e.g., completion interface) associated with the task. For some tasks, such as the task 2218, a user can elect to not have the interface shown during and/or after performance of the task (e.g., by toggling a "Show when run" setting, such as setting 2230). In some examples, the electronic device displays an interface for a task only when the task fails. In this manner, the electronic device 2200 indicates that the task failed and/or the cause of the failure.

In some examples, a task may be performed only following performance of another task. For instance, one or more values for parameters of a task may be specified by another preceding task (e.g., dynamic values). By way of example, a user may specify that for a task to determine travel time, such as the task 2214, the source address is the current location of the electronic device. Because the source address (i.e., current location of the electronic device) must be determined prior to determining the travel time, the electronic device may require that a task to determine a current location of the electronic device be determined prior to determining the travel time. As another example, a task to send a message, such as the task 2218, may include one or more values that are determined based on the result of another tasks. As illustrated in FIG. 22D, for instance, the message for the task 2218 includes dynamic values for "current location" and "time to home", values determined by task 2214 ("get current location") and task 2216 ("get travel time"), respectively. As a result of such task dependencies, in some examples, the electronic device requires certain couplings and/or sequences of tasks according to a plurality of task sequence rules such that each task can be successfully performed.

As described, in some examples, a set of (e.g., one or more) tasks associated with a shortcut are performed by the electronic device in response to a user providing an input specifying the shortcut. As illustrated in FIG. 22E, the electronic device 2200 displays, on display 2201, a digital assistant interface (e.g., conversational interface), such as the digital assistant interface 2204. While displaying the digital assistant interface 2204, the electronic device 2200 receives (e.g., obtains, captures) a natural-language input 2206 (e.g., "Hey Siri, Home ETA."). In some examples, the natural-language input 2206 is a natural-language speech input received, for instance, using an input device of the electronic device (e.g., microphone). As shown in FIG. 22E, in some examples in which the natural-language input 2206 is a natural-language speech input, the digital assistant interface optionally includes a preview 2208 (e.g., live preview) of the natural-language input 2206. In other examples, the natural-language input is a natural-language text input.

In some examples, the natural-language input includes a shortcut corresponding to a set of tasks, and in response the electronic device 2200 performs (e.g., sequentially perform) each task of the set of tasks. As an example, in response to the input "Home ETA", the electronic device 2200 begins to perform tasks associated with the "Home ETA" shortcut. As described, the "Home ETA" shortcut is associated with tasks including but not limited to "Get current location", "Get travel time", "Send Message", and "Play Radio".

As illustrated in FIG. 22F, in response to the natural-language input 2206, the electronic device 2200 provides (e.g., displays) shortcut interface 2244, which in turn includes output 2245, application identifier 2246, task identifier 2248, and shortcut identifier 2250. In some examples, output 2245 indicates that the electronic device has identified a shortcut based on the natural-language input 2206 and is initiating performance of the shortcut. Application identifier 2246 indicates which application is performing the shortcut. If, for instance, tasks associated with the shortcut correspond to multiple applications, tasks of the shortcut are performed (e.g., caused to be performed) by a task management application. In some examples, the task management application causes one or more other applications to perform tasks corresponding to applications associated with the respective tasks. If a shortcut is associated with only a single task, or, more generally, if all tasks associated with the shortcut correspond to a single application, the application corresponding to the task(s) performs the shortcut. Task identifier 2248 includes an icon corresponding to the shortcut and/or one or more specific tasks of the shortcut. In some examples, the shortcut identifier 2250 indicates which shortcut is being initiated.

Thereafter, as illustrated in FIGS. 22G-I, the electronic device performs each task of the set of tasks associated with the "Home ETA" shortcut (e.g., "Get current location", "Get travel time", "Send Message", and "Play Radio"), for instance, in a sequence corresponding to the sequence set forth in the shortcut-specific interface 2210. For example, the electronic device 2200 first performs tasks 2214 and 2216 to determine a current location of the electronic device and a travel time to a destination address, respectively.

In some examples, one or more tasks, such as the task 2218, require confirmation prior to performing the task. Accordingly, for tasks requiring confirmation, the electronic device 2200 can display a confirmation interface, such as the confirmation interface 2254. The confirmation interface 2254 includes a confirmation affordance 2260, a cancel affordance 2258, and an application affordance 2266. The confirmation interface 2254 further may include content 2256 associated with the task. In some examples, selection of the cancel affordance 2258 causes the electronic device 2200 to cease display of the confirmation interface 2254 and/or forgo performing the task 2218 (e.g., the electronic device moves on to the next task in the set of tasks). In some examples, selection of the application affordance 2266 causes the electronic device 2200 to open an application associated with the task. As described, opening the application in this manner may cause the application to be preloaded with one or more parameters associated with the task. Content 2256 includes information associated with the task, such as one or more parameters to be used to perform the task. As illustrated in FIG. 22G, for instance, content 2256 specifies a recipient of the message and text of the message to be delivered. In particular, the text includes a location and a travel time, as determined by previous tasks 2214 and 2216, respectively.

In some examples, in response to selection of the confirmation affordance 2260, for instance by user input 2262, the electronic device 2200 performs task 2218. Once task 2218 has been performed, the electronic device 200 provides a response indicating whether the task was performed successfully. In the example of FIG. 22H, the task is performed successfully, and as a result, the electronic device 200 displays a response 2264, indicating that the task was successfully performed. As described, in some examples, performing a task includes causing an application to perform the task, and optionally, receiving a response from the application indicating whether the task was performed successfully. In some examples, responses provided by an application includes a natural-language expression (e.g., "message sent") that may in turn be included in responses provided by the electronic device 2200 (e.g., "Shortcuts says: message sent").

After performing task 2218, the electronic device performs a next task in the set of tasks associated with the shortcut "Home ETA", task 2220, directed to initiating radio playback. In response to performing the task 2200, the electronic device displays completion interface 2270. Completion interface 2270 includes output 2272, application identifier 2274, and content 2276. In some examples, output 2272 indicates that the electronic device has initiated performance of task 2220. Application identifier 2274 indicates which application is associated with the task. Content 2276 includes information associated with the task, such as one or more parameters to be used to perform the task (e.g., playback is for radio channel "News & Sports").

After performing all tasks of the set of tasks for a shortcut, the electronic device provides a completion indicator, such as the completion indicator 2280 (e.g., "That's done.") signaling that all tasks of the set of tasks have been performed. In some examples, the electronic device 2200 indicates whether all tasks have been performed successfully, or whether one or more tasks were not performed successfully.

In some examples, if a task is not performed successfully, the electronic device 2200 indicates the failure to a user. As illustrated in FIG. 22J, for example, task 2214 is not performed successfully, and as a result, the electronic device displays failure interface 2290. The failure interface 2290 includes failure indicator 2292, application indicator 2294, content 2296, and application affordance 2298. In some examples, failure indicator 2292 indicates an error occurred when performing a task ("Hmm. Something went wrong"). The failure indicator may specify a cause of the error in some examples. In some examples, selection of the application affordance 2298 causes the electronic device 1600 to open an application specified by the application indicator 2294. Content 2296 may include information directed to the task, such as one or more parameters used to perform the task and/or an indication as to the cause of the task failure. Content 2296 may, for example, indicate that the electronic device failed to perform the task successfully (e.g., "Unable to determine current location.").

In some examples, performing a task may include causing an application to perform the task, and optionally, receive a response from the application indicating whether the task was performed successfully. In some examples, as illustrated in FIGS. 16F-16L below, the response provided by an application includes a natural-language expression that may in turn be used by the electronic device 1600 to indicate whether a task was successfully performed and/or provide additional information, from the application, to a user.

As shown in FIGS. 22F-J, for each task performed by the electronic device 2200, a new interface is displayed in the digital assistant interface 2204 (e.g., conversational interface) while maintaining display of one or more previously displayed interfaces (e.g., display of confirmation interface 2254 is maintained during display of response interface 2270). As additional interfaces are displayed, previously displayed interfaces may be scrolled in an upward directed such that the previously displayed interfaces are no longer displayed, but may be redisplayed in response to a scroll (e.g., swipe) gesture.

As illustrated in FIGS. 22K-O, in some examples, each time a new interface is displayed, the electronic device 2200 ceases display of previous interfaces. By way of example, in response to display of completion interface 2270 the electronic device 2200 ceases display of confirmation interface 2254. In some examples, previously displayed interfaces may be redisplayed in response to a scroll gesture.

Figure 23:
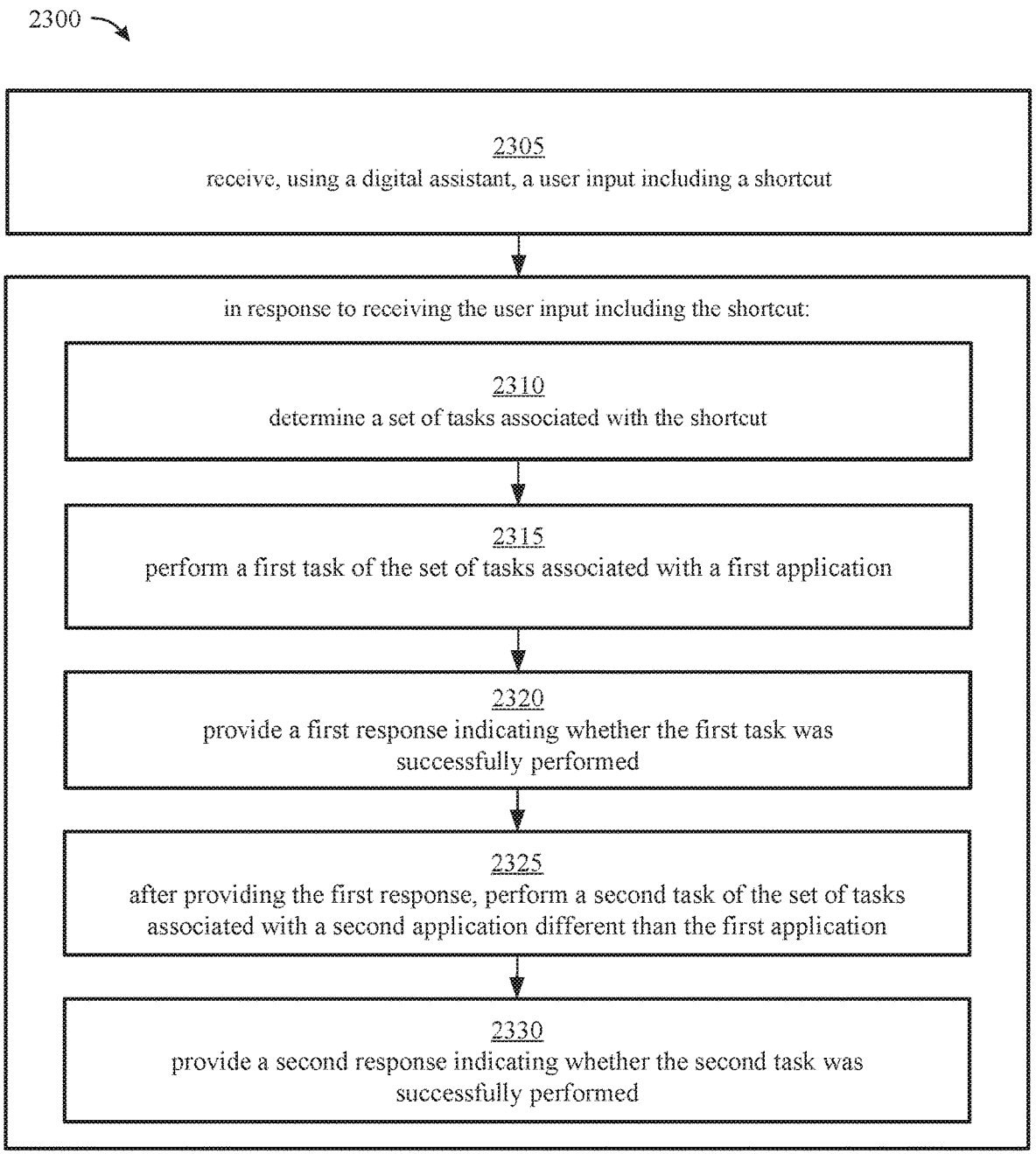
FIG. 23 is a flow diagram illustrating a method for performing a set of tasks using a digital assistant, according to various examples.

FIG. 23 illustrates method 2300 for performing a set of tasks using a digital assistant, according to various examples. Method 2300 is performed, for example, using one or more electronic devices implementing the digital assistant. In some examples, method 2300 is performed using a client-server system (e.g., system 100), and the blocks of method 2300 are divided up in any manner between the server (e.g., DA server 106) and a client device. In other examples, the blocks of method 2300 are divided up between the server and multiple client devices (e.g., a mobile phone and a smart watch). Thus, while portions of method 2300 are described herein as being performed by particular devices of a client-server system, it will be appreciated that method 2300 is not so limited. In other examples, method 2300 is performed using only a client device (e.g., user device 104) or only multiple client devices. In method 2300, some blocks are, optionally, combined, the order of some blocks is, optionally, changed, and some blocks are, optionally, omitted. In some examples, additional steps may be performed in combination with the method 2300.

Performing a set of tasks in response to user inputs including shortcuts (e.g., voice shortcuts, text shortcuts), as described herein, provides an intuitive and efficient approach for sequentially performing one or more tasks on the electronic device. By way of example, one or more tasks may be performed in response to a single user input without any additional input from the user. Accordingly, performing tasks in response to natural-language speech inputs in this manner decreases the number of inputs and amount of time needed for the user to successfully operate the electronic device (e.g., by helping the user to provide proper inputs and reducing user mistakes when operating/interacting with the device), which, additionally, reduces power usage and improves battery life of the device.

In some examples, the electronic device (e.g., includes one or more of a keyboard, mouse, microphone, display, and touch-sensitive surface. In some examples, the display is a touch-sensitive display. In other examples, the display is not a touch-sensitive display.

At block 2305, the electronic device (e.g., device 104, device 122, device 200, device 600, device 700, device 2200) receives, using a digital assistant, a user input (e.g., natural-language input, speech input, text input) (e.g., 2240) including a shortcut (e.g., voice shortcut) (e.g., "Home ETA"). In some examples, receiving the user input includes receiving a voice input (2240) and generating a textual representation of the voice input. In some examples, generating a textual representation of the voice input includes performing a speech to text process on the voice input. In some examples, the textual representation is displayed in an interface, such as an interface associated with a digital assistant (e.g., conversational interface). In some examples, receiving the user input further includes receiving a request to modify the textual representation to provide a modified textual representation. As an example, a user may select an edit affordance and edit the speech to text version of the voice input. In some examples, receiving the user input further includes selecting the modified textual representation as the user input.

At block 2310, in response to receiving the user input including the shortcut, the electronic device determines a set of tasks (e.g., 2214, 2216, 2218, 2220) associated with the shortcut. In some examples, the electronic device determines whether the natural-language speech input matches one or more shortcuts (e.g., voice shortcut, text shortcut) associated with a user of the electronic device. In some examples, determining whether a match exists in this manner includes determining whether a match exists locally and/or remotely. For example, in some instances the electronic device determines whether a match exists. In another example, the electronic device provides user input, or a representation thereof, to a backend server, and the backend server determines if a match exists. In some examples, both the electronic device and the backend server determine if a match exists and the electronic device evaluates both results to determine if a match exists.

In some examples, the electronic device identifies a set (e.g., plurality) of tasks associated with the shortcut. In some examples, the set of tasks is an ordered set of tasks having a predefined sequence. In some examples, the sequence is user-defined and/or determined by the electronic device according to one or more sequencing rules. In some examples, each of the tasks is associated with a respective application. Accordingly, the set of tasks may be associated with any number of first-party and third-party applications. In some examples, a set of tasks is generated using a task management application configured to automate performance of a plurality of tasks. In some examples, one or more parameters of each task may be configured, for instance, using the task management application. By way of example, recipients and/or text of a text message may be configured. As another example, a user may toggle whether a response indicating whether a task was successfully performed is displayed. In some examples, tasks of a first type require confirmation prior to being performed (e.g., 2218) and tasks of a second type do not require confirmation prior to being performed (e.g., 2220). In some examples, only responses associated with tasks of the second type may be selectively displayed.

At block 2315, further in response to receiving the user input including the shortcut, the electronic device performs a first task of the set of tasks. The task is associated with a first application in some examples. In some examples, performing the first task includes determining whether the first task is a task of a first type (e.g., a task requiring confirmation, such as a messaging task or a payment task); in accordance with a determination that the first task is a task of the first type: requesting confirmation to perform the task, receiving a user input indicating confirmation to perform the task (e.g., touch input, speech input), and in response to receiving the user input indicating confirmation to perform the task (in some examples, the user indicates confirmation by selecting a confirmation affordance and/or providing a speech input indicating confirmation), performing the task; and in accordance with a determination that the first task is not a task of the first type (e.g., a task not requiring confirmation, background task), performing the first task.

In some examples, performing the first task includes causing, using the digital assistant, the first task to be performed by a third-party application. In some examples, the digital assistant of the electronic device causes a third-party application to perform a task. In some examples, causing an application to perform a task in this manner includes providing an intent object to the application, which optionally includes one or more parameters (e.g., 2212) and/or parameter values. By way of example, the digital assistant may initiate music playback by instructing a third-party music streaming application to stream music.

At block 2320, further in response to receiving the user input including the shortcut, the electronic device provides a first response (e.g., 2264, 2270) indicating whether the first task was successfully performed. In some examples, the electronic device provides a response indicating whether a performed task was performed successfully. In some examples, the response is visual (e.g., displayed), and/or auditory. In some examples, the response is a natural-language output (e.g., 2264) and/or a visual platter (e.g., 2270). In some examples, after performing a task, an application provides an application response (1) indicating whether the task was successfully performed by the application and/or (2) provides information regarding performance of the task (e.g., an answer to a query provided by a user), and the response includes the application response (e.g., 2264). In some examples, the application response is a natural-language expression (e.g., "Your ETA is 32 minutes") and is included in the response (e.g., "Commute says 'Your ETA is 32 minutes'"). In some examples providing the first response includes providing an indication that the first task was performed successfully. In some examples, providing the first response includes receiving a natural-language expression from the first application; and providing an output including the natural-language expression (e.g., "Commute says: 'Your current ETA is 32 minutes'"). In some examples, providing the first response includes displaying the first response.

At block 2325, further in response to receiving the user input including the shortcut, the electronic device performs a second task of the set of tasks, The second task is associated with a second application different than the first application in some examples. In some examples, the electronic device performs the second task after providing the first response.

At block 2330, further in response to receiving the user input including the shortcut, after providing the first response, the electronic device provides a second response indicating whether the second task was successfully performed (e.g., 2264, 2270). In some examples, providing the first response includes displaying the first response in an interface (e.g., conversational interface) associated with the digital assistant (e.g., 2264); and providing the second response includes displaying the second response in the interface associated with the digital assistant (e.g., 2270).

In some examples, providing the second response includes ceasing display of the first response. In some examples, each time a new response is to be displayed, one or more previously displayed responses are no longer displayed. In some examples, the previously displayed responses are discarded (e.g., deleted from the conversational interface). In some examples, the previously displayed responses are scrolled off of the display but may be redisplayed in response to a scrolling input. In some examples, providing the second response further includes displaying the second response.

In some examples, providing the second response includes displaying the second response while maintaining display of at least a portion of the first response. In some examples, as each response is displayed by the electronic device, previously displayed responses are scrolled, for instance in an upward direction to allow for subsequent responses to be displayed.

In some examples, the electronic device provides an output (e.g., visual output, auditory output) indicating each task of the set of tasks has been performed (e.g., 2280). In some examples, the electronic device indicates when all tasks associated with a shortcut have been performed (e.g., "That's done.").

In some examples, the electronic device performs a third task of the set of tasks. The third task is associated with a third application in some examples. In some examples, after providing the second response, the electronic device selectively provides a third response indicating whether the third task was successfully performed (e.g., 2214). In some examples, the electronic device may omit providing a response for a task. In some examples, responses are omitted for tasks of a predetermined type (e.g., determination of location) (e.g., 2214). In some examples, a user may indicate a response is not to be provided for a particular task, for instance, by toggling a display setting for the task (e.g., 2230).

In some examples, after providing the second response, the electronic device performs a fourth task of the set of tasks, wherein performing the fourth task includes launching an application (e.g., launching a maps application to perform a task for getting directions). In some examples, performing a task includes launching an application (e.g., maps application). In some examples, launching an application in this manner includes causing an interface of the application to be displayed.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to accelerate user behavior using task suggestions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver task suggestions that are of greater interest to the user. Accordingly, use of such personal information data allows for accelerated and more efficient use of an electronic device by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of context data received by the electronic device (such as context data described with reference to FIG. 12), the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, task suggestions can be provided to a user by inferring likely previous usage of an electronic device based on non-personal information data or a bare minimum amount of personal information, such as the content being requested by the device associated with a user, other non-personal information available to the electronic device, or publicly available information.

What is claimed is:

1. An electronic device, comprising:
    a display;
    an audio input device;
    one or more processors;
    a memory; and
    one or more programs, wherein the one or more programs are stored in the memory and configured to be executed by the one or more processors, the one or more programs including instructions for:
        displaying a plurality of suggested candidate task affordances including a candidate task affordance associated with a task, wherein a first suggested candidate task affordance from the plurality of suggested candidate task affordances is suggested based on a first contextual characteristic associated with the electronic device and a second suggested candidate task affordance from the plurality of suggested candidate task affordances is suggested based on a second contextual characteristic associated with the electronic device, wherein the first contextual characteristic and the second contextual characteristic are different contextual characteristics;
        detecting a set of inputs including a first user input corresponding to a selection of the candidate task affordance associated with the task;
        in response to detecting the set of user inputs, displaying a first interface for generating a voice shortcut associated with the task;
        while displaying the first interface:
            receiving, by the audio input device, a natural-language speech input; and
            displaying, in the first interface, a candidate phrase, wherein the candidate phrase is based on the natural-language speech input;
        after displaying the candidate phrase, detecting a second user input; and
        in response to detecting the second user input, associating the candidate phrase with the task.

2. The electronic device of claim 1, wherein associating the candidate phrase with the task includes:
    associating the candidate phrase with a first action; and
    associating the candidate phrase with a second action.

3. The electronic device of claim 1, the one or more programs further including instructions for:
    receiving, by the audio input device, a user speech input;
    determining whether the user speech input includes the candidate phrase;
    in accordance with a determination that the user speech input includes the candidate phrase, performing the task; and
    in accordance with a determination that the user speech input does not include the candidate phrase, forgoing performing the task.

4. The electronic device of claim 1, wherein displaying a plurality of candidate task affordances including a candidate task affordance associated with a task includes displaying an application interface including the plurality of candidate task affordances.

5. The electronic device of claim 1, the one or more programs further including instructions for:
    while receiving the natural-language speech input, providing a live preview of the natural-language speech input.

6. The electronic device of claim 5, wherein the live preview of the natural-language speech input is a visual waveform of the natural-language speech input.

7. The electronic device of claim 1, the one or more programs further including instructions for:
    in response to receiving the natural-language speech input, determining the candidate phrase based on the natural-language speech input.

8. The electronic device of claim 7, wherein determining the candidate phrase based on the natural-language speech input includes determining the candidate phrase using natural-language processing.

9. The electronic device of claim 7, wherein determining the candidate phrase based on the natural-language speech input includes:
    providing the natural-language speech input to another electronic device; and
    receiving a representation of the candidate phrase from the another electronic device.

10. The electronic device of claim 7, wherein determining the candidate phrase based on the natural-language speech input includes:
    determining whether the natural-language speech input satisfies phrase similarity criteria; and
    in accordance with a determination that the natural-language speech input satisfies the phrase similarity criteria, indicating that the natural-language speech input satisfies the similarity criteria.

11. The electronic device of claim 1, the one or more programs further including instructions for:
    after associating the candidate phrase with the task, displaying a second interface including an edit affordance;
    detecting a third user input indicating a selection of the edit affordance; and
    in response to detecting the third user input, displaying a plurality of candidate phrase affordances including a first candidate phrase affordance corresponding to the candidate phrase and a second candidate phrase affordance corresponding to another candidate phrase, wherein the another candidate phrase is based on the natural-language speech input.

12. The electronic device of claim 10, the one or more programs further including instructions for:

detecting another set of inputs including a fourth user input indicating a selection of the second candidate phrase affordance; and in response to detecting the another set of inputs, associating the another candidate phrase with the task.

13. The electronic device of claim 1, the one or more programs further including instructions for:

in response to the first user input, displaying a fourth interface associated with the task, wherein the fourth interface includes a first suggested voice shortcut phrase.

14. The electronic device of claim 1, the one or more programs further including instructions for:

while displaying the first interface, determining whether the natural-language speech input has been received within a threshold amount of time; and in accordance with a determination that the natural-language speech input has not been received within the threshold amount of time, displaying, on the first interface, a second suggested voice shortcut phrase.

15. The electronic device of claim 1, the one or more programs further including instructions for:

after associating the candidate phrase with the task, detecting a fifth user input; and in response to detecting the fifth user input, displaying another plurality of candidate task affordances, wherein the another plurality of candidate task affordances does not include the candidate task affordance associated with the task.

16. The electronic device of claim 1, the one or more programs further including instructions for:

providing the candidate phrase to another electronic device.

17. A method, comprising:

at an electronic device with a display and an audio input device:

displaying a plurality of suggested candidate task affordances including a candidate task affordance associated with a task, wherein a first suggested candidate task affordance from the plurality of suggested candidate task affordances is suggested based on a first contextual characteristic associated with the electronic device and a second suggested candidate task affordance from the plurality of suggested candidate task affordances is suggested based on a second contextual characteristic associated with the electronic device, wherein the first contextual characteristic and the second contextual characteristic are different contextual characteristics;

detecting a set of inputs including a first user input corresponding to a selection of the candidate task affordance associated with the task;

in response to detecting the set of user inputs, displaying a first interface for generating a voice shortcut associated with the task;

while displaying the first interface:

receiving, by the audio input device, a natural-language speech input; and displaying, in the first interface, a candidate phrase, wherein the candidate phrase is based on the natural-language speech input;

after displaying the candidate phrase, detecting a second user input; and in response to detecting the second user input, associating the candidate phrase with the task.

18. A non-transitory computer-readable storage medium storing one or more programs configured to be executed by one or more processors of an electronic device with a display and an audio input device, the one or more programs including instructions for:

displaying a plurality of suggested candidate task affordances including a candidate task affordance associated with a task, wherein a first suggested candidate task affordance from the plurality of suggested candidate task affordances is suggested based on a first contextual characteristic associated with the electronic device and a second suggested candidate task affordance from the plurality of suggested candidate task affordances is suggested based on a second contextual characteristic associated with the electronic device, wherein the first contextual characteristic and the second contextual characteristic are different contextual characteristics;

detecting a set of inputs including a first user input corresponding to a selection of the candidate task affordance associated with the task;

in response to detecting the set of user inputs, displaying a first interface for generating a voice shortcut associated with the task;

while displaying the first interface:

receiving, by an audio input device, a natural-language speech input; and displaying, in the first interface, a candidate phrase, wherein the candidate phrase is based on the natural-language speech input;

after displaying the candidate phrase, detecting a second user input; and in response to detecting the second user input, associating the candidate phrase with the task.

19. The method of claim 17, wherein associating the candidate phrase with the task includes:

associating the candidate phrase with a first action; and
associating the candidate phrase with a second action.

20. The method of claim 17, further comprising:

receiving, by the audio input device, a user speech input;
determining whether the user speech input includes the candidate phrase;

in accordance with a determination that the user speech input includes the candidate phrase, performing the task; and in accordance with a determination that the user speech input does not include the candidate phrase, forgoing performing the task.

21. The method of claim 17, wherein displaying a plurality of candidate task affordances including a candidate task affordance associated with a task includes displaying an application interface including the plurality of candidate task affordances.

22. The method of claim 17, further comprising:

while receiving the natural-language speech input, providing a live preview of the nature language speech input.

23. The method of claim 22, wherein the live preview of the natural-language speech input is a visual waveform of the natural-language speech input.

24. The method of claim 17, further comprising:

in response to receiving the natural-language speech input, determining the candidate phrase based on the natural-language speech input.

25. The method of claim 24, wherein determining the candidate phrase based on the natural-language speech input includes determining the candidate phrase using natural-language processing.

26. The method of claim 24, wherein determining the candidate phrase based on the natural-language speech input includes:
   providing the natural-language speech input to another electronic device; and
   receiving a representation of the candidate phrase from the another electronic device.

27. The method of claim 24, wherein determining the candidate phrase based on the natural-language speech input includes:
   determining whether the natural-language speech input satisfies phrase similarity criteria; and
   in accordance with a determination that the natural-language speech input satisfies the phrase similarity criteria, indicating that the natural-language speech input satisfies the similarity criteria.

28. The method of claim 17, further comprising:
   after associating the candidate phrase with the task, displaying a second interface including an edit affordance;
   detecting a third user input indicating a selection of the edit affordance; and
   in response to detecting the third user input, displaying a plurality of candidate phrase affordances including a first candidate phrase affordance corresponding to the candidate phrase and a second candidate phrase affordance corresponding to another candidate phrase, wherein the another candidate phrase is based on the natural-language speech input.

29. The method of claim 28, further comprising:
   detecting another set of inputs including a fourth user input indicating a selection of the second candidate phrase affordance; and
   in response to detecting the another set of inputs, associating the another candidate phrase with the task.

30. The method of claim 17, further comprising:
   in response to the first user input, displaying a fourth interface associated with the task, herein the fourth interface includes a first suggested voice shortcut phrase.

31. The method of claim 17, further comprising:
   while displaying the first interface, determining whether-natural-language speech input has been received within a threshold amount of time; and
   in accordance with a determination that the natural-language speech input has not been received within the threshold amount of time, displaying, on the first interface, a second suggested voice shortcut phrase.

32. The method of claim 17, further comprising:
   after associating the candidate phrase with the task, detecting a fifth user input; and
   in response to detecting the fifth user input, displaying another plurality of candidate task affordances, wherein the another plurality of candidate task affordances does not include the candidate task affordance associated with the task.

33. The method of claim 17, further comprising:
   providing the candidate phrase to another electronic device.

34. The non-transitory computer-readable storage medium of claim 18, wherein associating the candidate phrase with the task includes:
   associating the candidate phrase with a first action; and
   associating the candidate phrase with a second action.

35. The non-transitory computer-readable storage medium of claim 18, the one or more programs further including instructions for:
   receiving, by the audio input device, a user speech input;
   determining whether the user speech input includes the candidate phrase;
   in accordance with a determination that the user speech input includes the candidate phrase, performing the task; and
   in accordance with a determination that the user speech input does not include the candidate phrase, forgoing performing the task.

36. The non-transitory computer-readable storage medium of claim 18, wherein displaying a plurality of candidate task affordances including a candidate task affordance associated with a task includes displaying an application interface including the plurality of candidate task affordances.

37. The non-transitotry computer-readable storage medium of claim 18, the one or more programs further including instructions for:
   while receiving the natural-language speech input, providing a live preview of the natural- language speech input.

38. The non-transitory computer-readable storage medium of claim 37, wherein the live preview of the natural-language speech input is a visual waveform of the natural-language speech input.

39. The non-transitory computer-readable storage medium of claim 18, the one or more programs further including instructions for:
   in response to receiving the natural-language speech nput, determining the candidate phrase based on the natural-language speech input.

40. The non-transitory computer-readable storage medium of claim 39, wherein determining the candidate phrase based on the natural-language speech input includes determining the candidate phrase using natural-language processing.

41. The non-transitory computer-readable storage medium of claim 39, wherein determining the candidate phrase based on the natural-language speech input includes:
   providing the natural-language speech input to another electronic device; and
   receiving a representation of the candidate phrase from the another electronic device.

42. The non-transitory computer-readable storage medium of claim 39, wherein determining the candidate phrase based on the natural-language speech input includes:
   determining whether the natural-language speech input satisfies phrase similarity criteria;
   and in accordance with a determination that the natural-language speech input satisfies the phrase similarity criteria, indicating that the natural-language speech input satisfies the similarity criteria.

43. The non-transitory computer-readable storage medium of claim 18, the one or more programs further including instructions for:
   after associating the candidate phrase with the task, displaying a second interface including an edit affordance;
   detecting a third user input indicating a selection of the edit affordance; and
   in response to detecting the third user input, displaying a plurality of candidate phrase affordances including a first candidate phrase affordance corresponding to the candidate phrase and a second candidate phrase affordance corresponding to another candidate phrase, wherein the another candidate phrase is based on the natural-language speech input.

44. The non-transitory computer-readable storage medium of claim 43, the one or more programs further including instructions for:
  detecting another set of inputs including a fourth user input indicating a selection of the second candidate phrase affordance; and
  in response to detecting the another set of inputs, associating the another candidate phrase with the task.

45. The non-transitory computer-readable storage medium of claim 18, the one or more programs further including instructions for:
  in response to the first user input, displaying a fourth interface associated with the task, wherein the fourth interface includes a first suggested voice shortcut phrase.

46. The non-transitory computer-readable storage medium of claim 18, the one or more programs further including instructions for:
  while displaying the first interface, determining whether the natural-language speech input has been received within a threshold amount of time; and
  in accordance with a determination that the natural-language speech input has not been received within the threshold amount of time, displaying, on the first interface, a second suggested voice shortcut phrase.

47. The non-transitory computer-readable storage medium of claim 18, the one or more programs further including instructions for:
  after associating the candidate phrase with the task, detecting a fifth user input; and
  in response to detecting the fifth user input, displaying another plurality of candidate task affordances, wherein the another plurality of candidate task affordances does not include the candidate task accordance associated with the task.

48. The non-transitory computer-readable storage medium of claim 18, the one or more programs further including instructions for:
  providing the candidate phrase to another electronic device.

* * * * *

UNITED STATES PATENT AND TRADEMARK OFFICE
CERTIFICATE OF CORRECTION

| | | |
|---|---|---|
| PATENT NO. | : 10,504,518 B1 | Page 1 of 1 |
| APPLICATION NO. | : 16/146978 | |
| DATED | : December 10, 2019 | |
| INVENTOR(S) | : Cyrus D. Irani et al. | |

It is certified that error appears in the above-identified patent and that said Letters Patent is hereby corrected as shown below:

In the Drawings

Sheet 131, Fig. 21F, delete reference numeral "2142" and insert reference numeral --2146--, therefor.

In the Specification

Column 4, Line 38, delete "means for means for" and insert --means for--, therefor.
Column 5, Line 44, delete "means for means for" and insert --means for--, therefor.
Column 6, Line 44, delete "means for means for" and insert --means for--, therefor.
Column 52, Line 39, delete "the electronic device 800 the electronic device 800" and insert --the electronic device 800--, therefor.
Column 65, Line 20, delete "record interface 1038" and insert --record interface 1034--, therefor.
Column 88, Line 39, delete "context data indicates a location of context data indicates a location of" and insert --context data indicates a location of--, therefor.
Column 97, Line 44, delete "providing the providing the" and insert --providing the--, therefor.
Column 119, Line 26, delete "the natural-language expression 2142" and insert --the natural-language expression 2146--, therefor.

In the Claims

Claim 12, Column 130, Line 66, delete "claim 10" and insert --claim 11--, therefor.
Claim 22, Column 132, Line 55, delete "nature language" and insert --natural-language - --, therefor.
Claim 30, Column 133, Line 38, delete "herein" and insert --wherein--, therefor.
Claim 31, Column 133, Line 42-43, delete "whethernatural-" and insert --whether the natural- --, therefor.
Claim 37, Column 134, Line 17, delete "non-transitotry" and insert --non-transitory--, therefor.
Claim 39, Column 134, Line 30, delete "nput," and insert --input,--, therefor.
Claim 47, Column 136, Line 13, delete "accordance" and insert --affordance--, therefor.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*